United States Patent
Radtke

(10) Patent No.: US 12,414,494 B2
(45) Date of Patent: Sep. 16, 2025

(54) WHEEL FOR CLOSING SYSTEM

(71) Applicant: Precision Planting LLC, Tremont, IL (US)

(72) Inventor: Ian Radtke, Washington, IL (US)

(73) Assignee: Precision Planting LLC, Tremont, IL (US)

( * ) Notice: Subject to any disclaimer, the term of this patent is extended or adjusted under 35 U.S.C. 154(b) by 288 days.

(21) Appl. No.: 17/594,400

(22) PCT Filed: Apr. 16, 2020

(86) PCT No.: PCT/IB2020/053599
§ 371 (c)(1),
(2) Date: Oct. 14, 2021

(87) PCT Pub. No.: WO2020/225623
PCT Pub. Date: Nov. 12, 2020

(65) Prior Publication Data
US 2024/0251698 A1 Aug. 1, 2024

Related U.S. Application Data

(60) Provisional application No. 62/985,094, filed on Mar. 4, 2020, provisional application No. 62/967,272, filed
(Continued)

(51) Int. Cl.
*A01C 5/06* (2006.01)
(52) U.S. Cl.
CPC .................................. *A01C 5/068* (2013.01)
(58) Field of Classification Search
CPC ........... A01C 5/068; A01C 5/064; B60B 3/02; B60B 25/004
See application file for complete search history.

(56) References Cited

U.S. PATENT DOCUMENTS 2,687,682 A * 8/1954 Oehler .................. B60B 21/021
172/519
3,207,234 A * 9/1965 Stewart ................ A01B 29/043
172/519
(Continued)

FOREIGN PATENT DOCUMENTS

CA 2690360 A1 7/2011
CN 201557379 U 8/2010
(Continued)

OTHER PUBLICATIONS

Precision Planting LLC, VSet® meter, referenced in Spec paragraph [0138], found @ https://www.precisionplanting.com/products/product/vset, accessed Oct. 14, 2021.
(Continued)

*Primary Examiner* — Jamie L McGowan

(57) ABSTRACT

A wheel adapted for use with a trench closing assembly. The wheel has a circumferential tread coaxial with a central axis of the wheel, the circumferential tread extending axially an axial width. A continuous wall member joined with the circumferential tread extends radially inward to a central opening and axially outward from an inner edge of the circumferential tread by an axial distance, the axial distance not extending beyond a vertical plane that is perpendicular to the central axis at a midpoint of the axial width, whereby the circumferential tread and the wall member together defining a shape in the form of an uppercase Greek letter sigma.

20 Claims, 100 Drawing Sheets

Related U.S. Application Data on Jan. 29, 2020, provisional application No. 62/866,700, filed on Jun. 26, 2019, provisional application No. 62/843,037, filed on May 3, 2019.

(56) References Cited

U.S. PATENT DOCUMENTS

| | | | | |
|---|---|---|---|---|
| 3,235,312 | A * | 2/1966 | Hollander | B60B 3/04 228/114.5 |
| 3,538,971 | A * | 11/1970 | Stewart | A01C 5/068 152/452 |
| 3,598,069 | A * | 8/1971 | Hatcher | A01C 5/068 111/190 |
| 3,669,501 | A * | 6/1972 | Derleth | B60B 5/02 301/63.101 |
| 3,799,079 | A | 3/1974 | Dietrich | |
| 4,023,507 | A | 5/1977 | van der Lely | |
| 4,596,200 | A * | 6/1986 | Gafford | A01C 5/064 111/140 |
| 4,733,730 | A * | 3/1988 | Murray | A01C 5/068 172/519 |
| 4,995,325 | A * | 2/1991 | Herriau | A01C 5/066 111/137 |
| 5,360,261 | A * | 11/1994 | Archibald | B23K 9/028 301/63.105 |
| 5,435,631 | A * | 7/1995 | Maloney | B60B 7/063 301/37.42 |
| 5,435,632 | A * | 7/1995 | Gajor | B60B 25/004 301/63.105 |
| 5,435,633 | A * | 7/1995 | Jaskierny | B60B 3/02 301/63.105 |
| 5,443,125 | A | 8/1995 | Clark | |
| 5,483,907 | A * | 1/1996 | Gaalswyk | A01B 71/00 111/163 |
| 5,515,709 | A * | 5/1996 | Lowe | B60B 25/004 72/105 |
| 5,517,759 | A * | 5/1996 | Hill | B60B 3/10 29/894.325 |
| 5,558,406 | A * | 9/1996 | Melbinger | B60B 23/10 29/894.353 |
| 5,564,792 | A * | 10/1996 | Archibald | F16F 15/324 301/5.21 |
| 5,579,578 | A * | 12/1996 | Ashley, Jr. | B21D 53/30 29/894.353 |
| 5,595,130 | A * | 1/1997 | Baugher | A01C 5/068 111/164 |
| 5,704,431 | A | 1/1998 | Bercheid | |
| 5,718,485 | A * | 2/1998 | Stach | B60B 21/025 228/114.5 |
| 5,802,995 | A * | 9/1998 | Baugher | A01C 7/205 111/140 |
| 6,152,351 | A * | 11/2000 | Separautzki | B60B 25/004 228/144 |
| 6,158,820 | A * | 12/2000 | Archibald | B60B 1/08 29/894.32 |
| 6,325,462 | B1 * | 12/2001 | Hummel | B60B 1/08 301/66 |
| 6,374,493 | B1 * | 4/2002 | Howald | B60B 25/004 29/418 |
| 6,460,938 | B1 * | 10/2002 | Baumgarten | B60B 3/06 301/37.11 |
| 6,473,967 | B1 * | 11/2002 | Coleman | B60B 3/02 301/63.101 |
| 7,530,644 | B2 * | 5/2009 | Hodges | B60B 3/02 301/37.108 |
| 8,561,472 | B2 | 10/2013 | Sauder et al. | |
| 8,720,351 | B1 * | 5/2014 | Wipf | A01C 7/203 172/578 |
| 8,939,095 | B2 * | 1/2015 | Freed | A01C 5/068 111/926 |
| 9,173,339 | B2 | 11/2015 | Sauder et al. | |
| 9,474,203 | B2 * | 10/2016 | Anderson | A01C 5/068 |
| 10,202,000 | B2 * | 2/2019 | Lim | B60B 7/04 |
| 11,203,226 | B2 * | 12/2021 | Bedeschi | B60B 3/10 |
| 12,035,651 | B2 * | 7/2024 | Phely | A01C 5/068 |
| 2004/0012243 | A1 * | 1/2004 | Marcao | B60B 21/00 301/5.1 |
| 2005/0017571 | A1 * | 1/2005 | McCorry | B60B 3/02 301/64.101 |
| 2005/0045080 | A1 | 3/2005 | Halford et al. | |
| 2005/0045256 | A1 * | 3/2005 | Corte | B60B 3/005 152/152 |
| 2005/0184579 | A1 * | 8/2005 | Bryant | B60B 3/10 301/63.105 |
| 2010/0180808 | A1 * | 7/2010 | Liu | A01C 7/205 701/50 |
| 2010/0181822 | A1 * | 7/2010 | Nakamura | B21D 19/04 29/894.35 |
| 2010/0314932 | A1 * | 12/2010 | Fukaya | B60B 3/02 301/63.101 |
| 2011/0095597 | A1 * | 4/2011 | Knowles | B60B 3/16 301/64.303 |
| 2011/0140506 | A1 * | 6/2011 | Kermelk | B60B 25/004 301/63.101 |
| 2012/0186503 | A1 | 7/2012 | Sauder et al. | |
| 2013/0037284 | A1 * | 2/2013 | Phely | A01B 29/043 172/537 |
| 2013/0206431 | A1 * | 8/2013 | Freed | A01C 5/068 172/151 |
| 2014/0090585 | A1 | 4/2014 | Sauder et al. | |
| 2014/0124112 | A1 * | 5/2014 | Phely | B60C 11/0311 152/450 |
| 2015/0223388 | A1 * | 8/2015 | Phely | A01C 5/068 111/135 |
| 2015/0223389 | A1 * | 8/2015 | Phely | B60B 25/006 172/604 |
| 2016/0037704 | A1 * | 2/2016 | Raetzman | A01C 5/068 172/140 |
| 2016/0114623 | A1 * | 4/2016 | Smith | B60B 3/147 29/894.31 |
| 2017/0000014 | A1 * | 1/2017 | Anderson | A01C 5/068 |
| 2017/0208734 | A1 * | 7/2017 | Weisz | A01C 7/203 |
| 2017/0231149 | A1 * | 8/2017 | Devloo | A01C 5/068 172/559 |
| 2018/0054948 | A1 | 3/2018 | Dietrich | |
| 2019/0297769 | A1 | 10/2019 | Zielke et al. | |
| 2020/0107486 | A1 | 4/2020 | Martin et al. | |
| 2020/0231001 | A1 * | 7/2020 | Renson | B60B 25/004 |
| 2020/0281109 | A1 * | 9/2020 | Schaefer | A01B 63/16 |
| 2020/0305335 | A1 * | 10/2020 | Schoeny | A01B 71/08 |
| 2021/0168992 | A1 * | 6/2021 | Phely | A01C 5/068 |
| 2022/0105746 | A1 * | 4/2022 | Von Czarnowski | B60B 1/042 |
| 2023/0172094 | A1 * | 6/2023 | Stanhope | A01C 7/105 111/194 |
| 2023/0389463 | A1 * | 12/2023 | Armoa | A01C 5/068 |
| 2024/0206362 | A1 * | 6/2024 | Stanhope | A01C 5/068 |
| 2024/0306527 | A1 * | 9/2024 | Schoeny | A01B 63/008 |

FOREIGN PATENT DOCUMENTS

| | | |
|---|---|---|
| CN | 206851304 U | 1/2018 |
| CN | 206865998 U | 1/2018 |
| CN | 107750530 A | 3/2018 |
| EP | 1 238 824 A1 | 9/2002 |
| WO | 2014/066650 A1 | 5/2014 |
| WO | 2014/186810 A1 | 11/2014 |
| WO | 2017/197274 A1 | 11/2017 |
| WO | 2019/099748 A1 | 5/2019 |
| WO | 2019/169369 A1 | 9/2019 |
| WO | 2020/208442 A1 | 10/2020 |

OTHER PUBLICATIONS

Precision Planting, LLC, CleanSweep® system, referenced in Spec paragraph [0140], found @ https://www.precisionplanting.com/products/product/cleansweep, accessed Oct. 14, 2021.

ASCO Valve Inc, examples of 2-way pneumatic valves as referenced in Spec in paragraph [0206], can be found @https://www.emerson.com/en-us/catalog/automation-solutions/asco-210?fetchFacets=

(56) References Cited

OTHER PUBLICATIONS true#facet:&partsFacet:&facetLimit:&productBeginIndex:0&partsBeginIndex:0&orderBy:0&partsOrderBy:&pageView:list&minPrice:&maxPrice:&pageSize:&, accessed on Oct. 13, 2021.

Honeywell, examples of Honeywell board mounted pressure sensor as referenced in paragraph [0208], can be found @ https://sps.honeywell.com/us/en/products/sensing-and-iot/sensors/pressure-sensors/board-mount-pressure-sensors, accessed Oct. 13, 2021.

European Patent Office, International Search Report for related International Application No. PCT/IB2020/053599, mailed Jul. 22, 2020.

UK Intellectual Property Office, Search Report prepared for related UK Application No. GB2005120.7, dated Oct. 7, 2020.

UK Intellectual Property Office, Search Report prepared for related UK Application No. GB2004249.5, dated Nov. 12, 2020.

UK Intellectual Property Office, Search Report prepared for related UK Application No. GB1910423.1, dated Jan. 17, 2020.

* cited by examiner

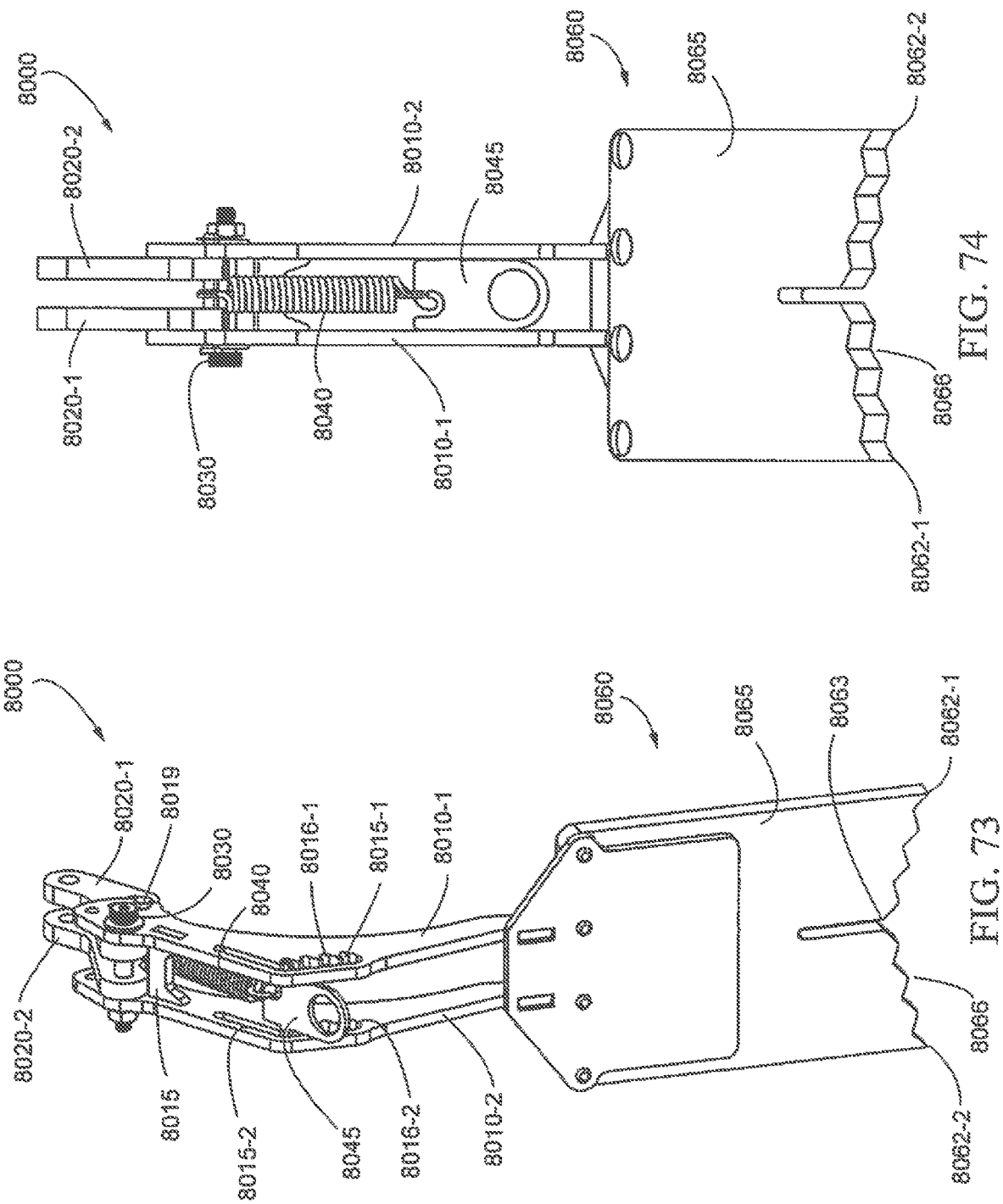

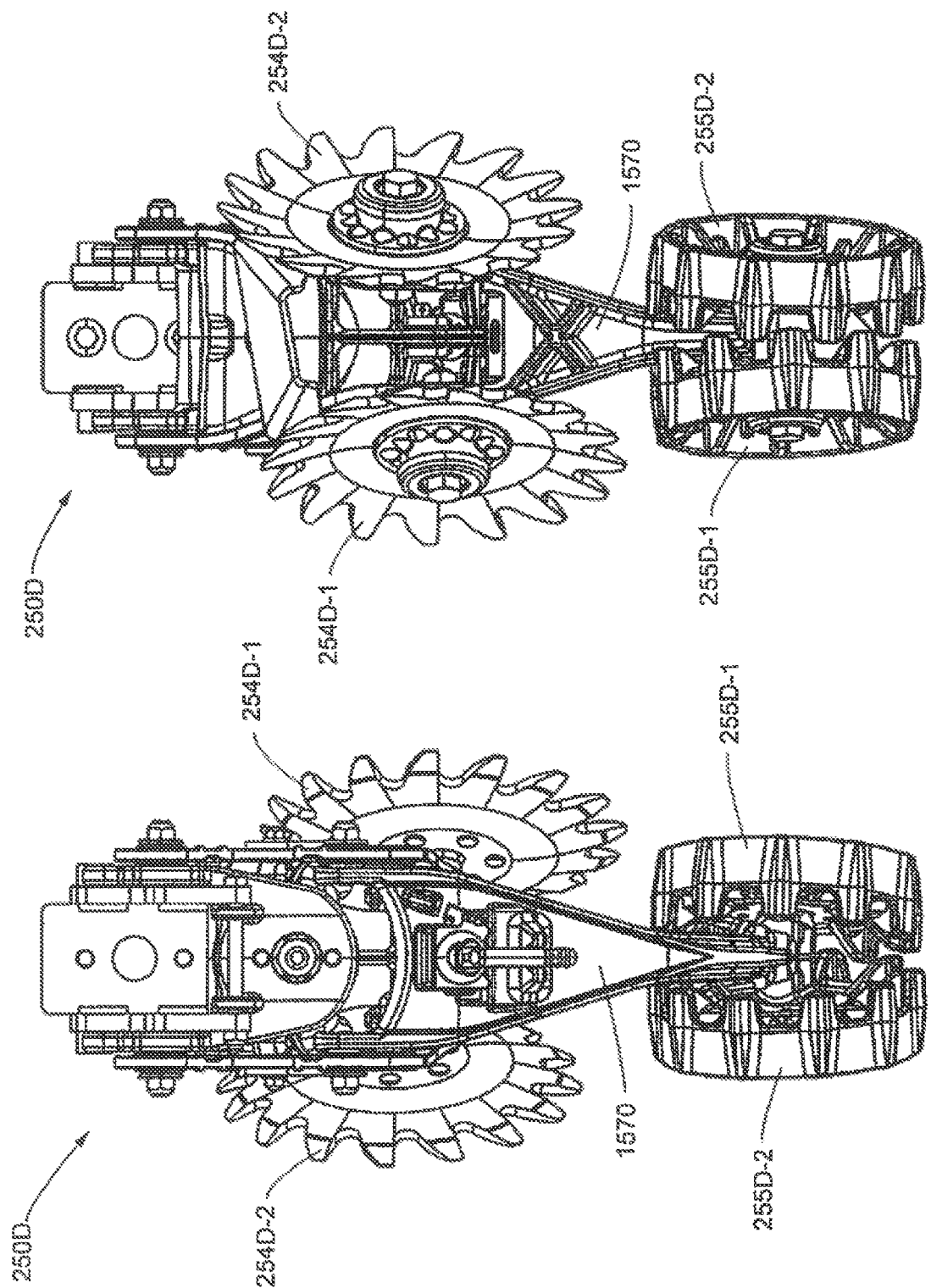

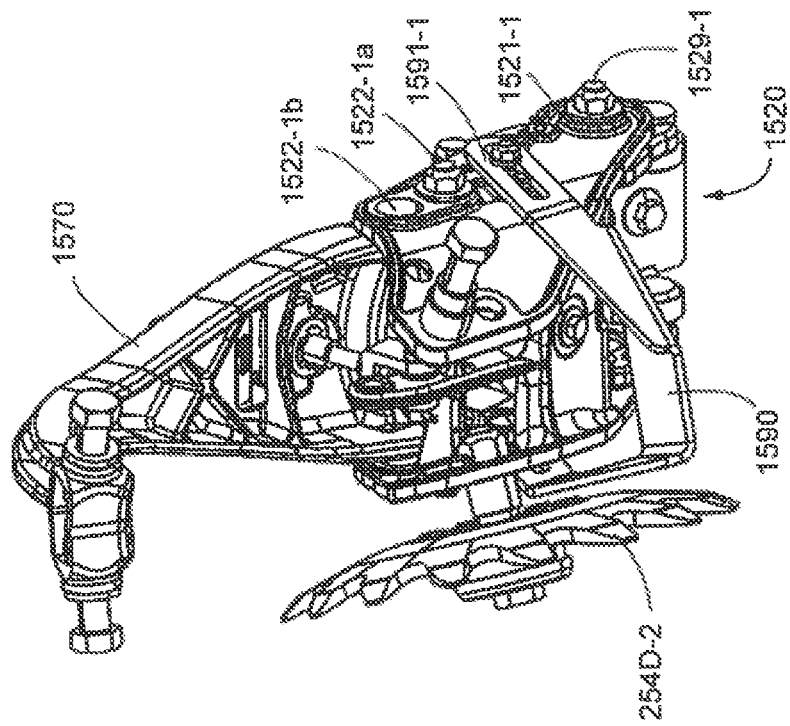
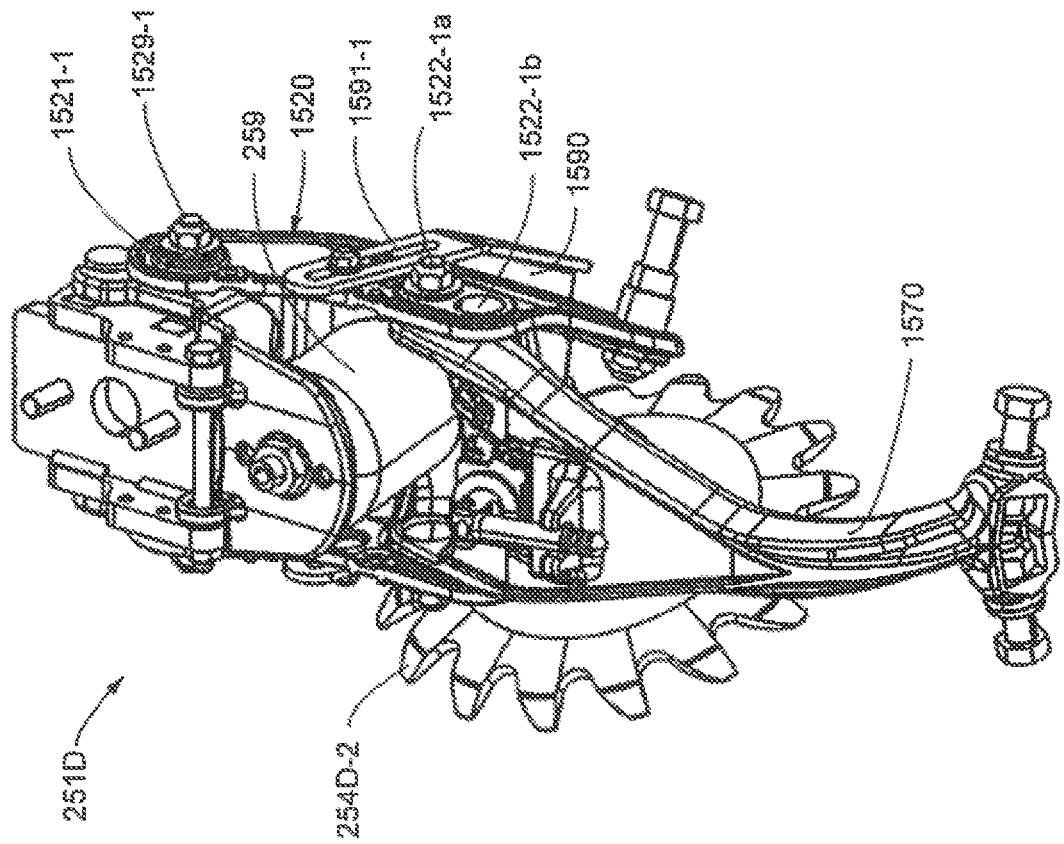

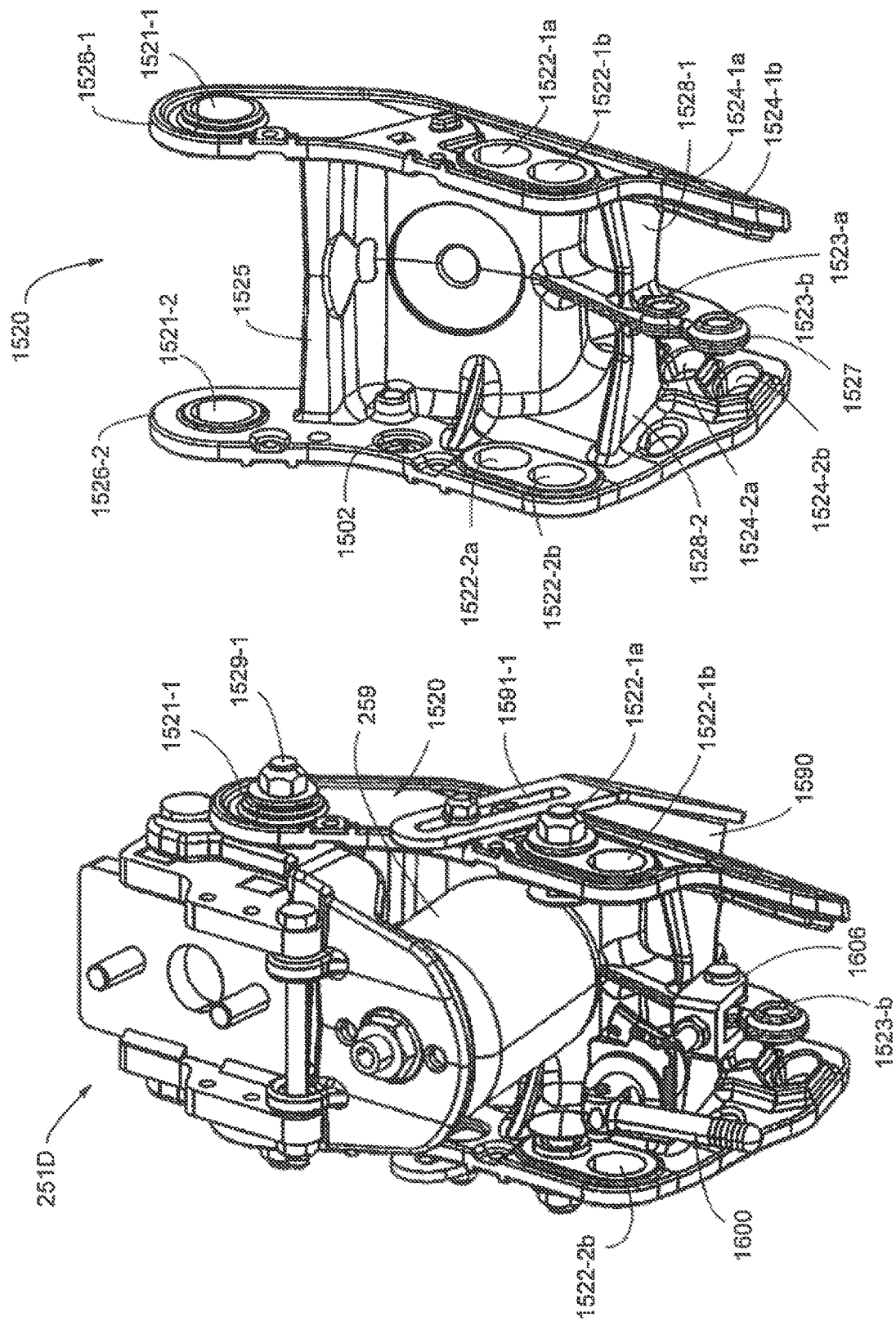

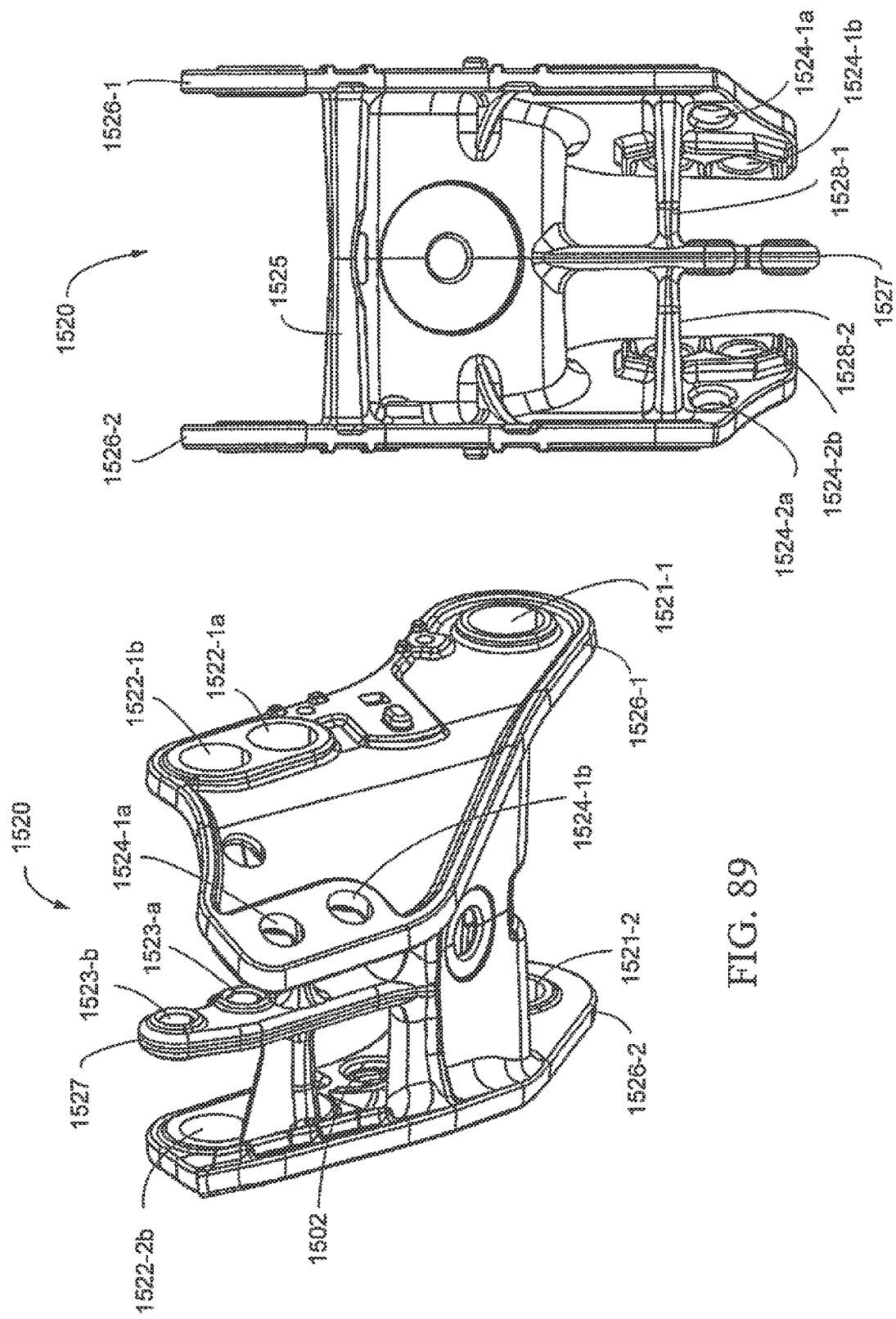

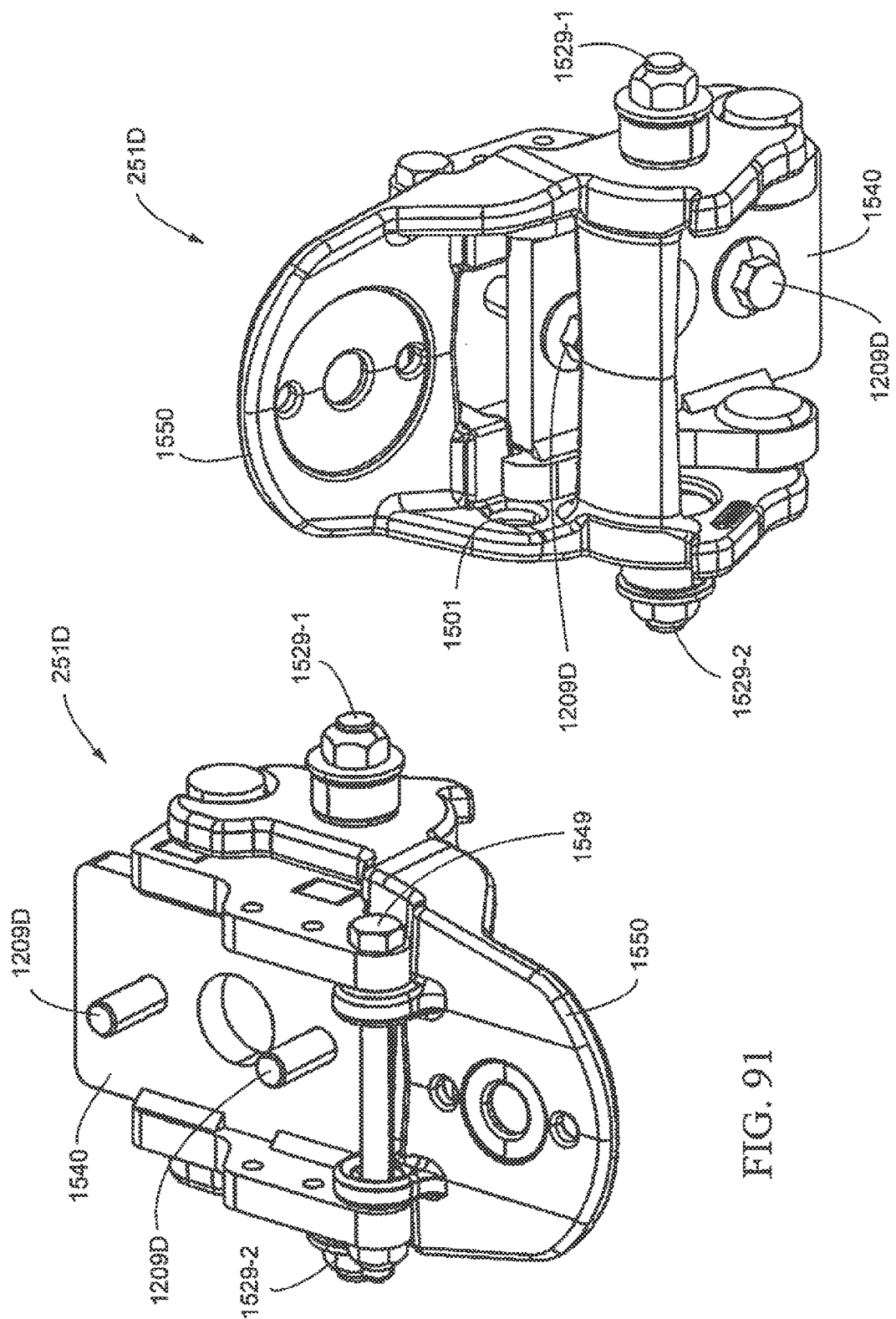

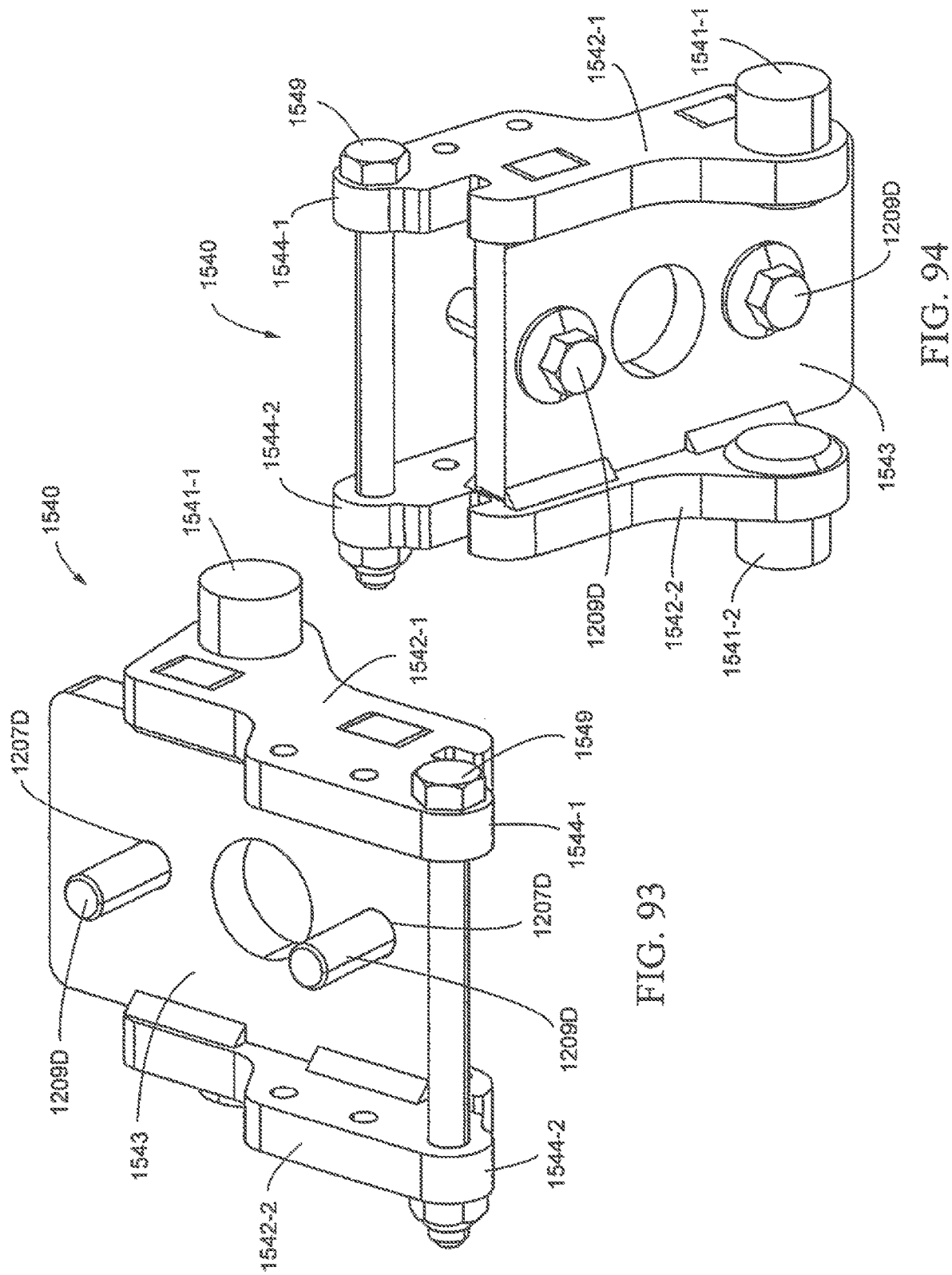

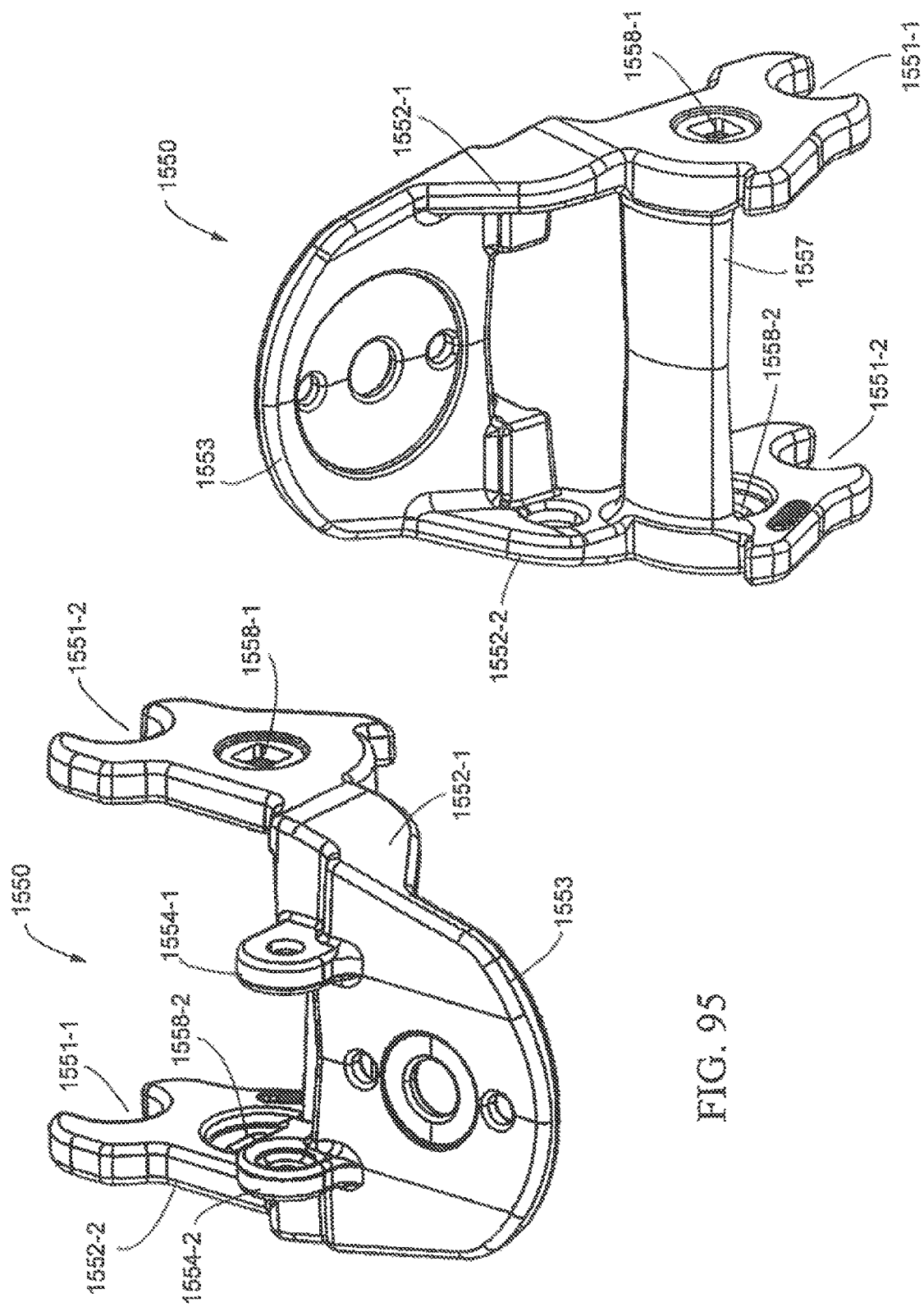

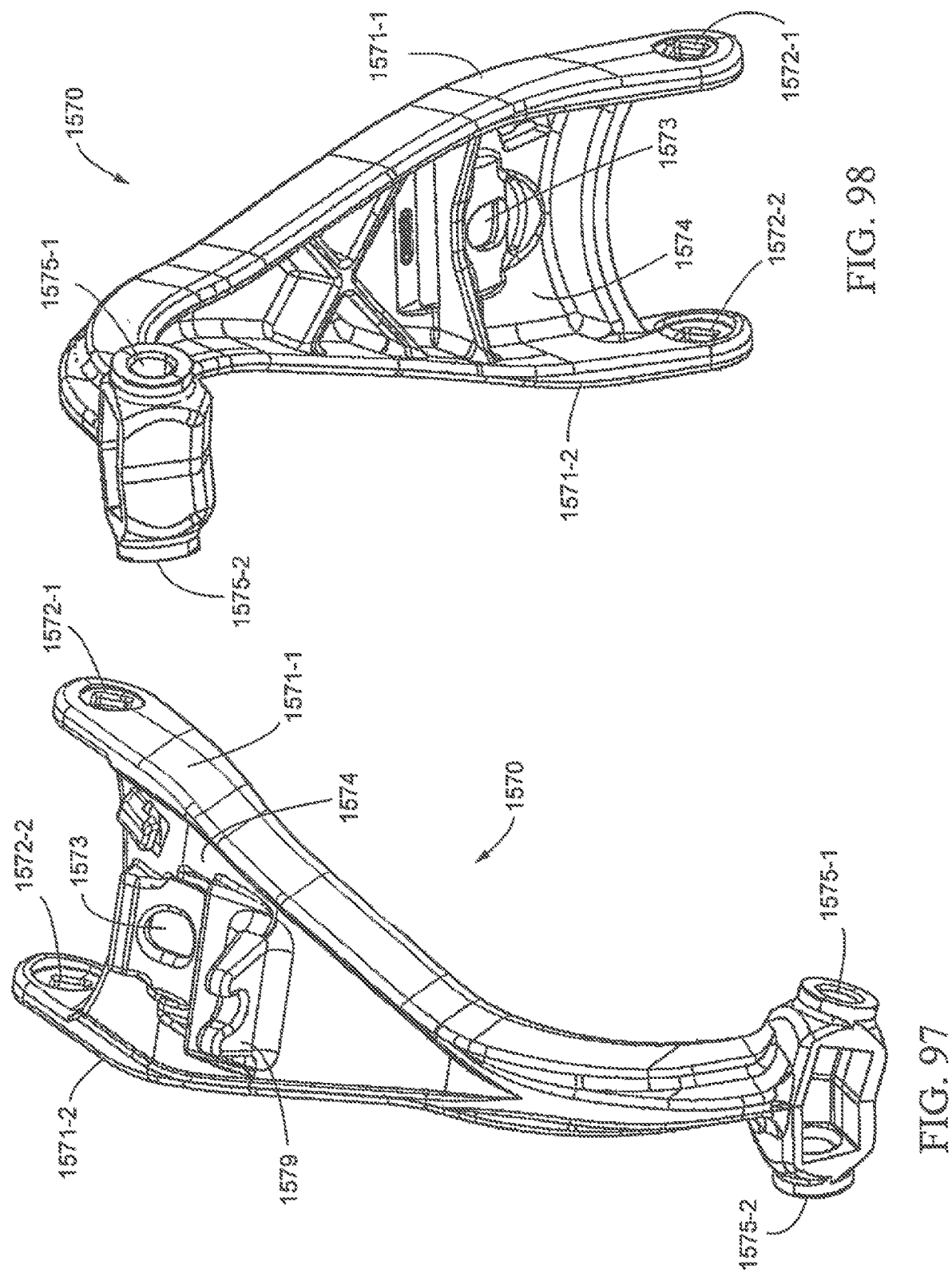

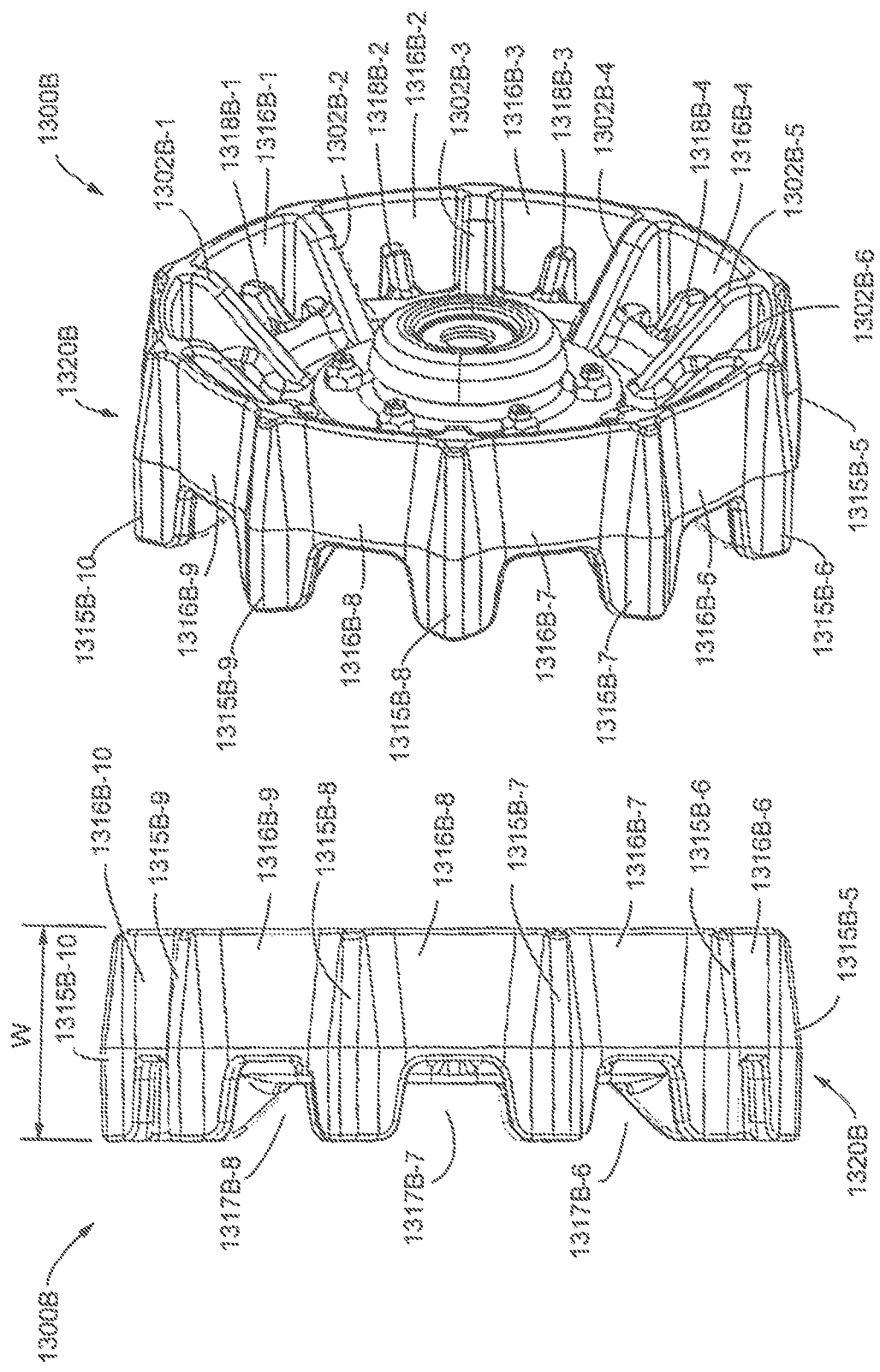

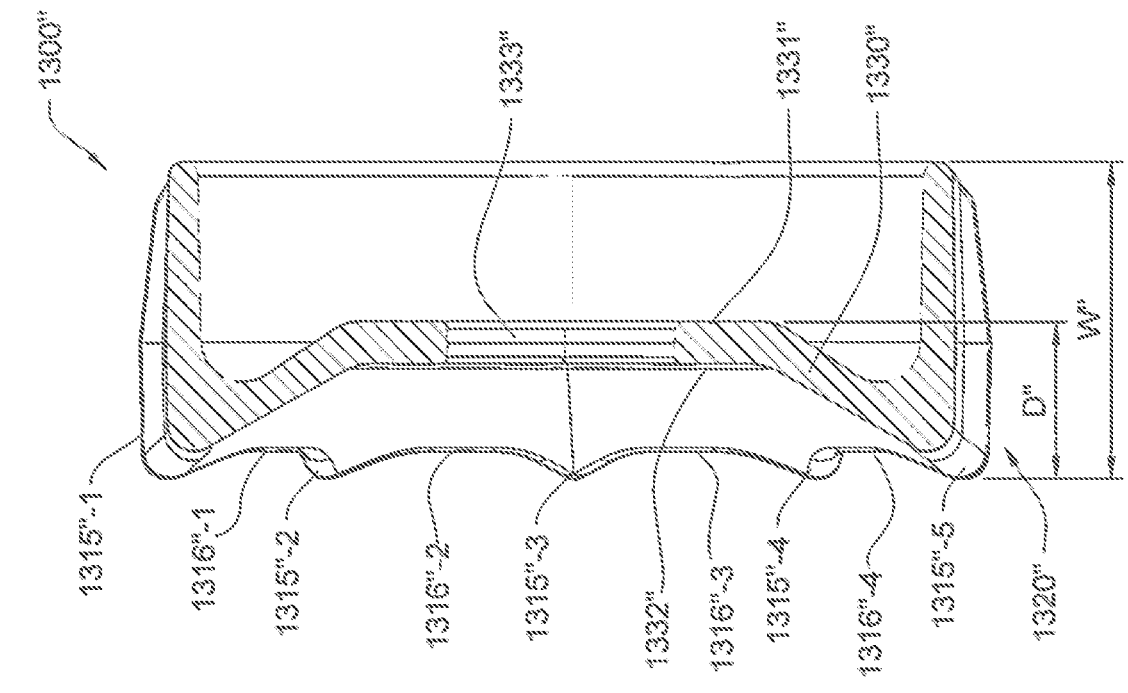
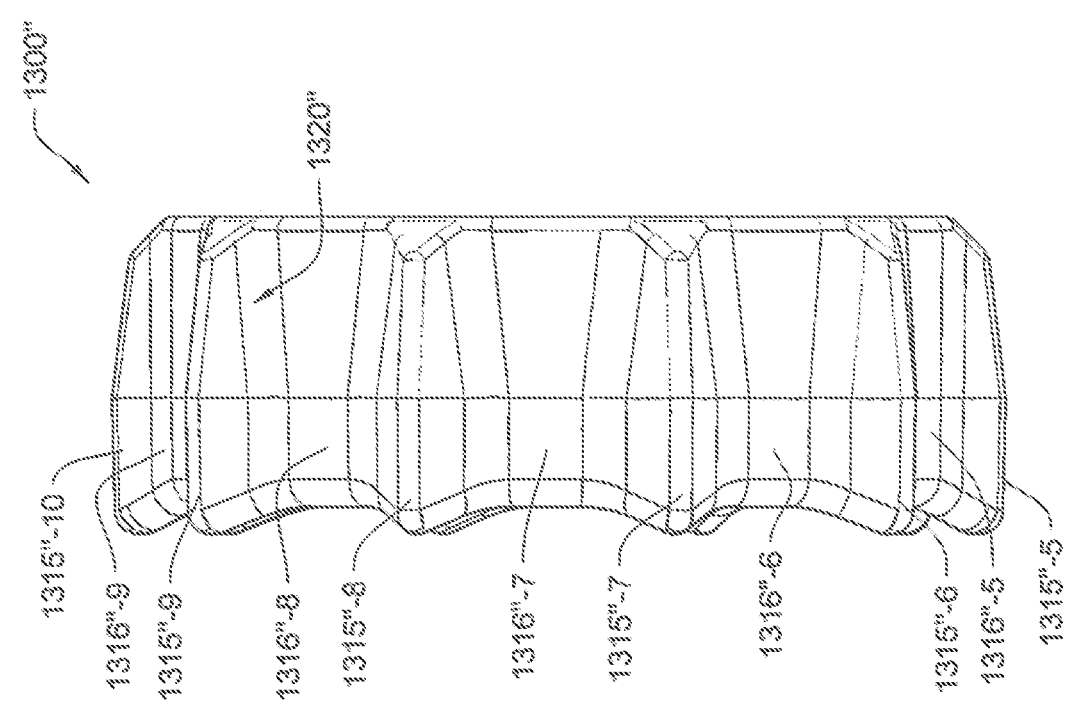

WHEEL FOR CLOSING SYSTEM

BACKGROUND

It is well known that good seed-to-soil contact within the seed trench is a critical factor in uniform seed emergence and high yields. To obtain good seed-to-soil contact, once seeds are planted in a seed trench, the seed trench needs to be closed so that soil surrounds the seed.

BRIEF DESCRIPTION OF THE DRAWINGS

FIG. 73 is a perspective view of the soil leveler of FIG. 72.

FIG. 74 is a bottom plan view of the soil leveler of FIG. 72.

FIG. 81 is a top plan view of the trench closing assembly of FIG. 80.

FIG. 82 is a bottom plan view of the trench closing assembly of FIG. 80.

FIG. 83 is a top perspective view of the trench closing assembly of FIG. 80 with some parts removed.

FIG. 84 is a bottom perspective view of the trench closing assembly of FIG. 83.

FIG. 87 is a top perspective view of the trench closing assembly of FIG. 86.

FIG. 88 is a top perspective view of the frame of the trench closing assembly of FIG. 80.

FIG. 89 is a bottom perspective view of the frame of FIG. 88.

FIG. 90 is bottom plan view of the frame of FIG. 88.

FIG. 91 is top perspective view of the frame of the trench closing assembly of FIG. 80.

FIG. 92 is a bottom perspective view of the frame of FIG. 91.

FIG. 93 is a top perspective view of the connection bracket of the frame of FIG. 91.

FIG. 94 is a bottom perspective view of the connection bracket of FIG. 93.

FIG. 95 is a top perspective view of the attachment bracket of the frame of FIG. 91.

FIG. 96 is a bottom perspective view of the attachment bracket of FIG. 95.

FIG. 97 is top perspective view of the mounting arm of the trench closing assembly of FIG. 80.

FIG. 98 is a bottom perspective view of the mounting arm of FIG. 97.

FIG. 98 is a front elevation view of the handle assembly of the trench closing assembly of FIG. 80.

FIG. 105 is a side elevation view of a press wheel according to one embodiment.

FIG. 106 is a perspective view of the press wheel of FIG. 105.

FIG. 118 is a perspective view of one of the wheels of FIG. 117 shown in isolation.

FIG. 119 is a front elevation view of the wheel of FIG. 118.

FIG. 120 is a rear elevation view of the wheel of FIG. 118.

FIG. 121 is another perspective view of the wheel of FIG. 118 with the hub removed.

FIG. 122 is a side elevation view of the wheel of FIG. 118.

FIG. 123 is a cross-section view of the wheel of FIG. 118.

FIG. 124 is a perspective view of the cross-sectional view of FIG. 123.

FIG. 125 is a perspective view of an outer side of another embodiment of a wheel which may be used as one of the press wheels for a trench closing assembly.

FIG. 126 is a perspective view of the inner side of the wheel of FIG. 125.

FIG. 127 is an elevation view of the outer side of the wheel of FIG. 125.

FIG. 128 is an elevation view of the inner side of the wheel of FIG. 125.

FIG. 129 is a side elevation view of the wheel of FIG. 125.

Figures 125, 126:
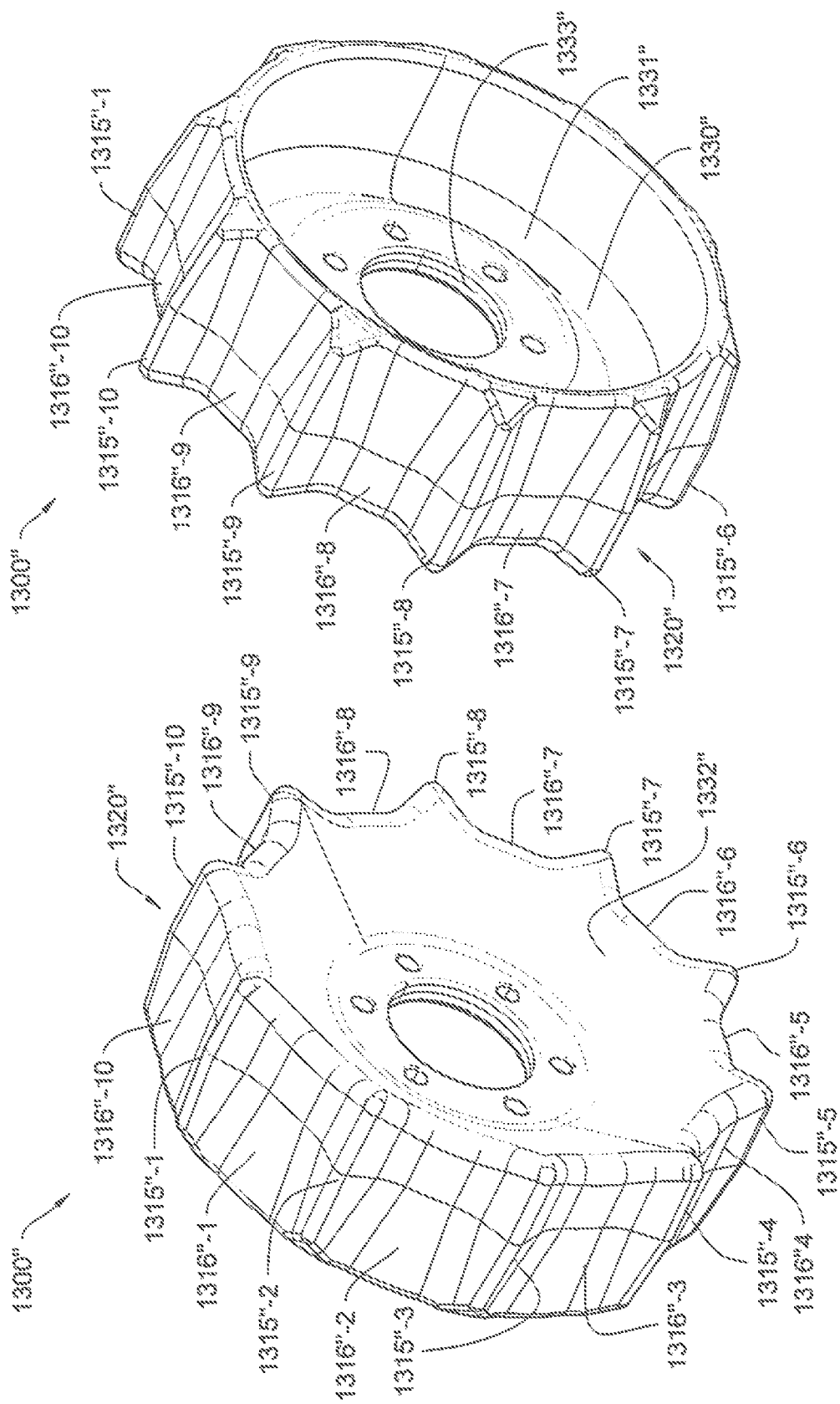
Figures 127, 128:
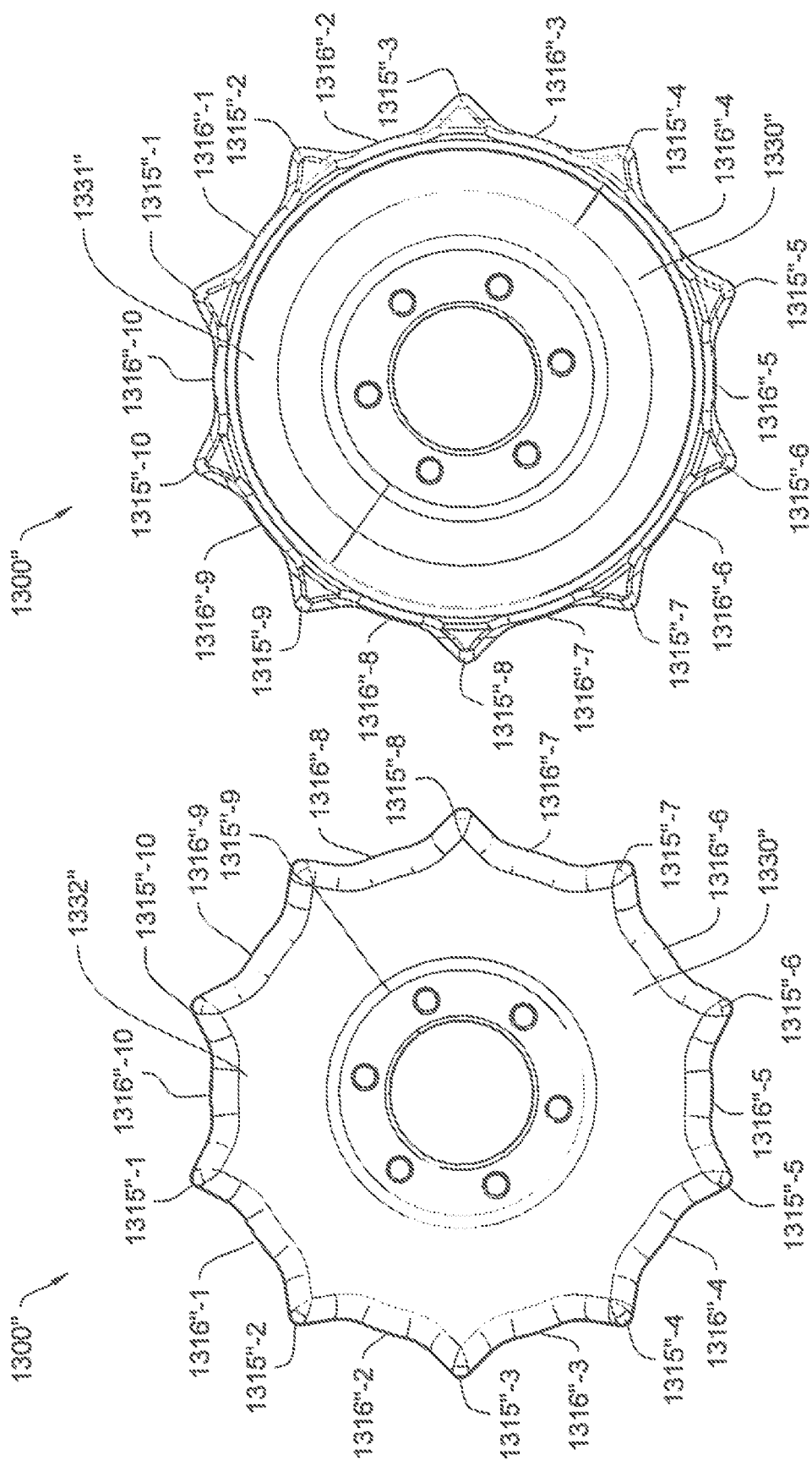

FIG. 130 is a cross-section view of the wheel of FIG. 125.

DESCRIPTION

Figure 1:
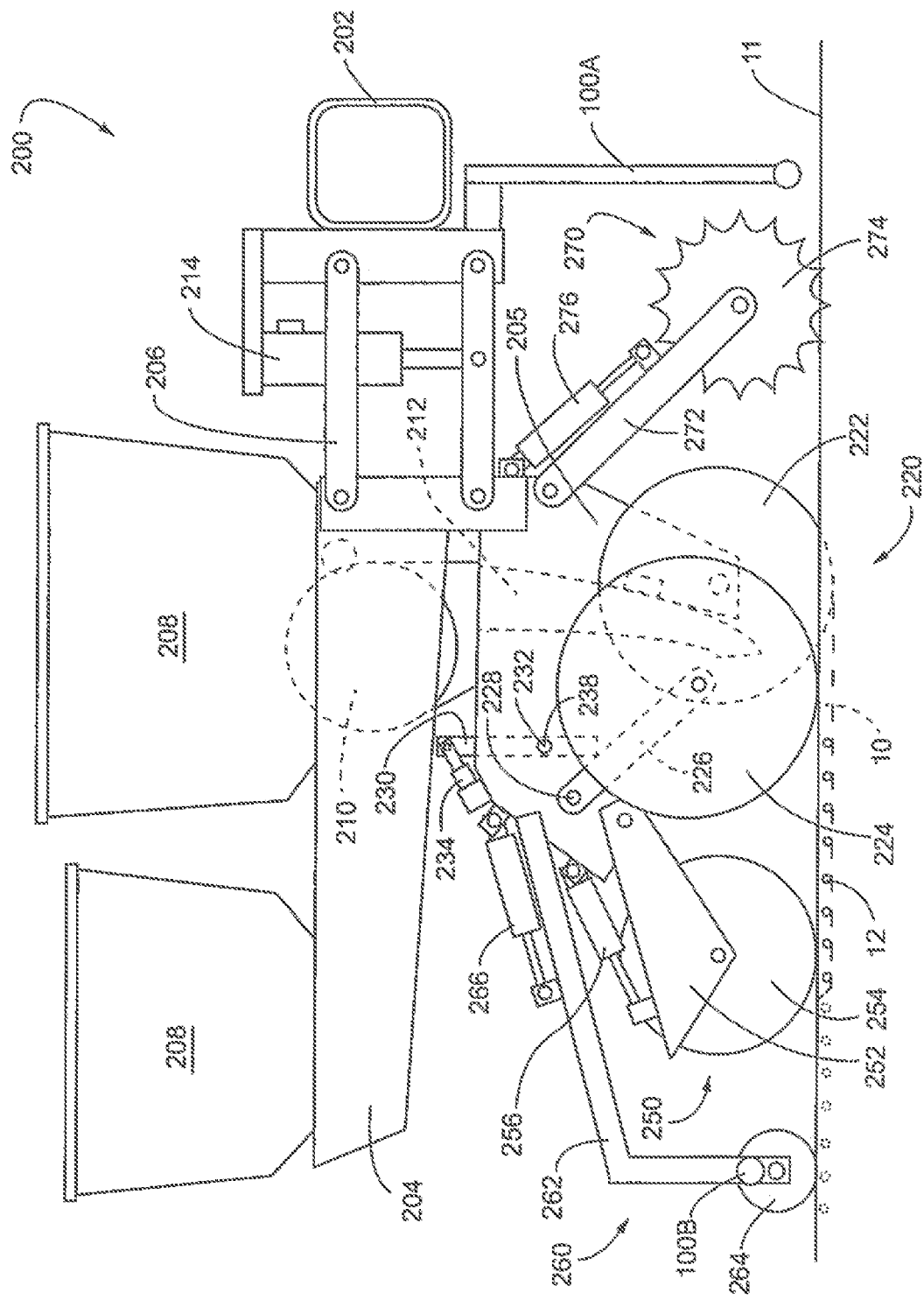
FIG. 1 is a side elevation view of an embodiment of a row unit of an agricultural planter.

Referring now to the drawings, wherein like reference numerals designate identical or corresponding parts throughout the several views, FIG. 1 illustrates an embodiment of an agricultural planter row unit 200. The row unit 200 is comprised of a frame 204 pivotally connected to a toolbar 202 by a parallel linkage 206 enabling each row unit 200 to move vertically independently of the toolbar 202. The frame 204 operably supports one or more hoppers 208, a seed meter 210, a seed delivery mechanism 212, a downforce control system 214, a seed trench opening assembly 220, a trench closing assembly 250, an optional packer wheel assembly 260, and an optional row cleaner assembly 270. It should be understood that the row unit 200 shown in FIG. 1 may be for a conventional planter or the row unit 200 may be a central fill planter, in which case the hoppers 208 may be replaced with one or more mini-hoppers and the frame 204 modified accordingly as would be recognized by those of skill in the art.

The optional downforce control system 214 is disposed to apply lift and/or downforce on the row unit 200 such as disclosed in U.S. Publication No. US2014/0090585, which is incorporated herein in its entirety by reference. The downforce applied by downforce control system 214 can be determined by methods disclosed in U.S. Pat. No. 9,173,339, which is incorporated herein in its entirety by reference.

The seed trench opening assembly 220 includes a pair of opening discs 222 rotatably supported by a downwardly extending shank member 205 of the frame 204. The opening discs 222 are arranged to diverge outwardly and rearwardly so as to open a v-shaped trench 10 in the soil 11 as the planter traverses the field. The seed delivery mechanism 212, such as a seed tube or seed conveyor, is positioned between the opening discs 222 to deliver seed from the seed meter 210 into the opened seed trench 10. The depth of the seed trench 10 is controlled by a pair of gauge wheels 224 positioned adjacent to the opening discs 222. The gauge wheels 224 are rotatably supported by gauge wheel arms 226 which are pivotally secured at one end to the frame 204 about pivot pin 228. A rocker arm 230 is pivotally supported on the frame 204 by a pivot pin 232. It should be appreciated that rotation of the rocker arm 230 about the pivot pin 232 sets the depth of the trench 10 by limiting the upward travel of the gauge wheel arms 226 (and thus the gauge wheels) relative to the opening discs 222. The rocker arm 230 may be adjustably positioned via a linear actuator 234 mounted to the row unit frame 204 and pivotally coupled to an upper end of the rocker arm 230. The linear actuator 234 may be controlled remotely or automatically actuated as disclosed, for example, in International Publication No. WO2014/186810, which is incorporated herein in its entirety by reference.

An optional downforce sensor 238 is configured to generate a signal related to the amount of force imposed by the gauge wheels 224 on the soil. In some embodiments the pivot pin 232 for the rocker arm 230 may comprise the downforce sensor 238, such as the instrumented pins disclosed in U.S. Pat. No. 8,561,472, which is incorporated herein in its entirety by reference.

An optional seed meter 210 may be any commercially available seed meter, such as a finger-type meter or a vacuum seed meter. One exemplary vacuum seed meter is the VSet® meter, available from Precision Planting LLC, 23207 Townline Rd, Tremont, TL 61568.

An optional packer wheel assembly 260 comprises an arm 262 pivotally attached to the row unit fame 204 and extends rearward of the closing wheel assembly 250 and in alignment therewith. The arm 262 rotatably supports a packer wheel 264. An actuator 266 is pivotally attached at one end to the arm 262 and at its other end to the row unit frame 204 to vary the amount of downforce exerted by the packer wheel 264 to pack the soil over the seed trench 10.

An optional row cleaner assembly 270 may be the CleanSweep® system available from Precision Planting LLC, 23207 Townline Rd, Tremont, IL 61568. The row cleaner assembly 270 includes an arm 272 pivotally attached to the forward end of the row unit frame 204 and aligned with the trench opening assembly 220. A pair of row cleaner wheels 274 are rotatably attached to the forward end of the arm 272. An actuator 276 is pivotally attached at one end to the arm 272 and at its other end to the row unit frame 204 to adjust the downforce on the arm to vary the aggressiveness of the action of the row cleaning wheels 274 depending on the amount of crop residue and soil conditions.

Figure 2:
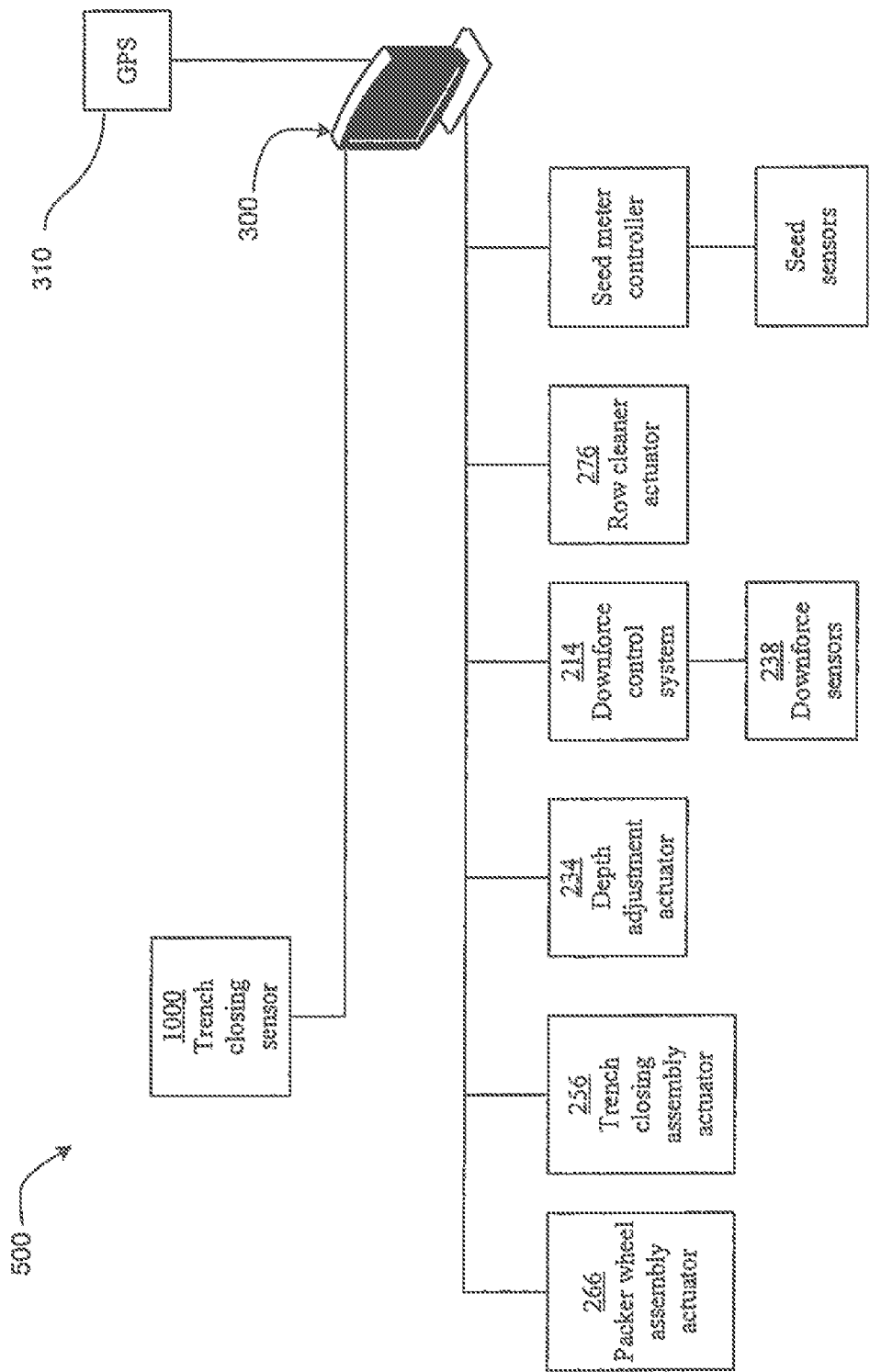
FIG. 2 is a diagram of a system for implementing operational control of the closing wheel assembly based on signals generated by the trench closing sensor.
Figure 3:
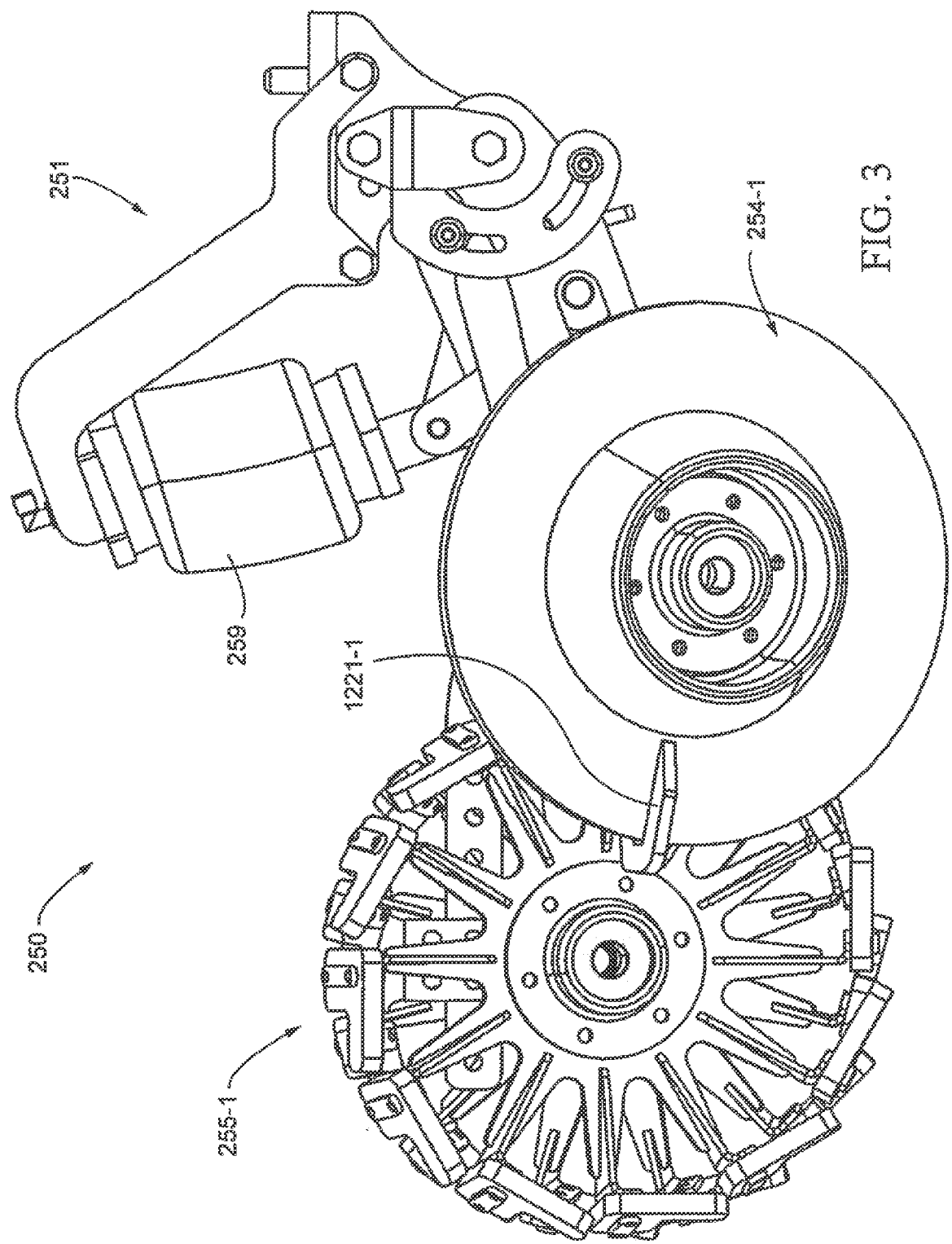
FIG. 3 is a side elevation view of an embodiment of a trench closing assembly.
Figure 4:
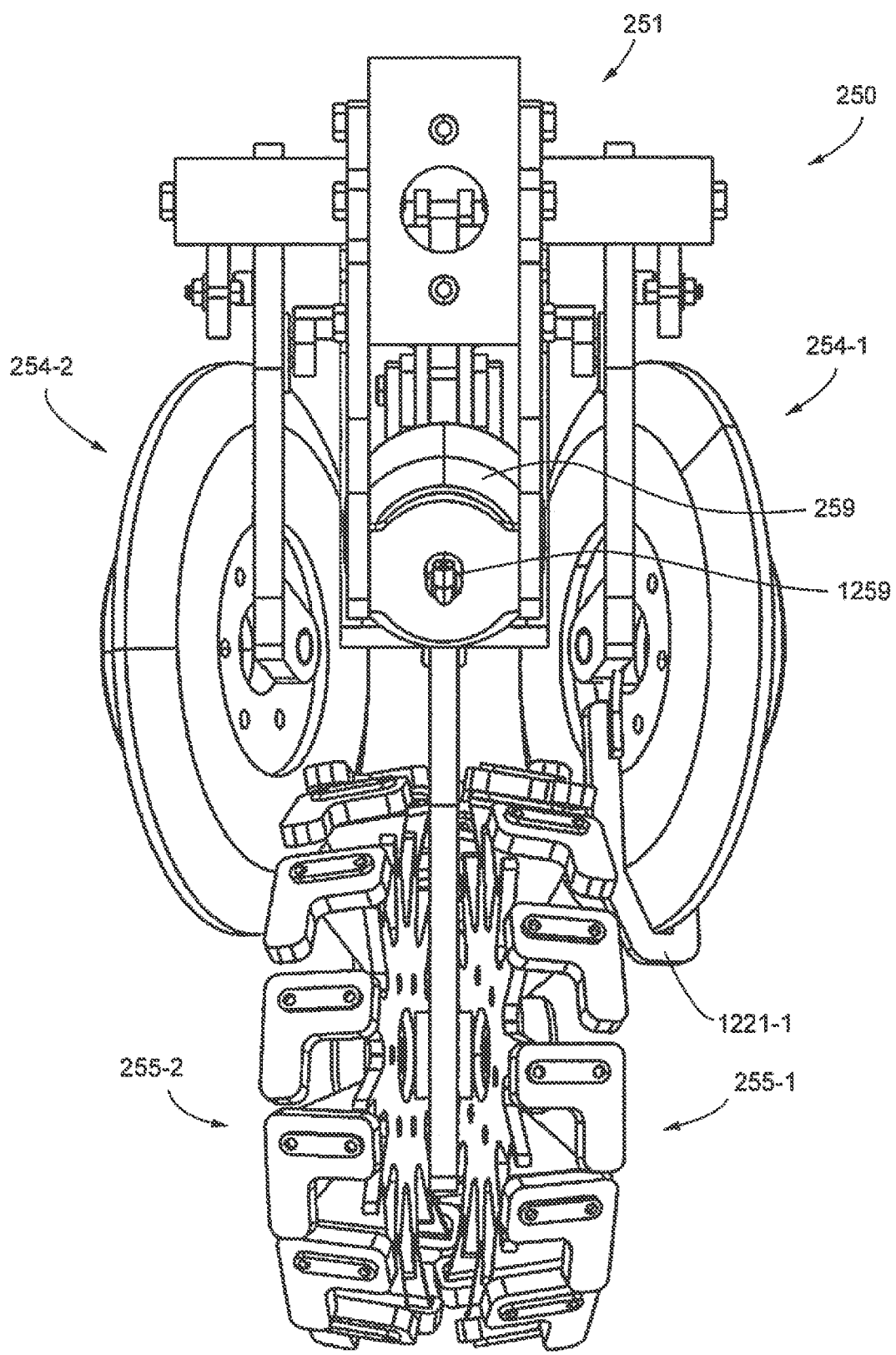
FIG. 4 is a top plan view of the trench closing assembly of FIG. 3.
Figure 5:
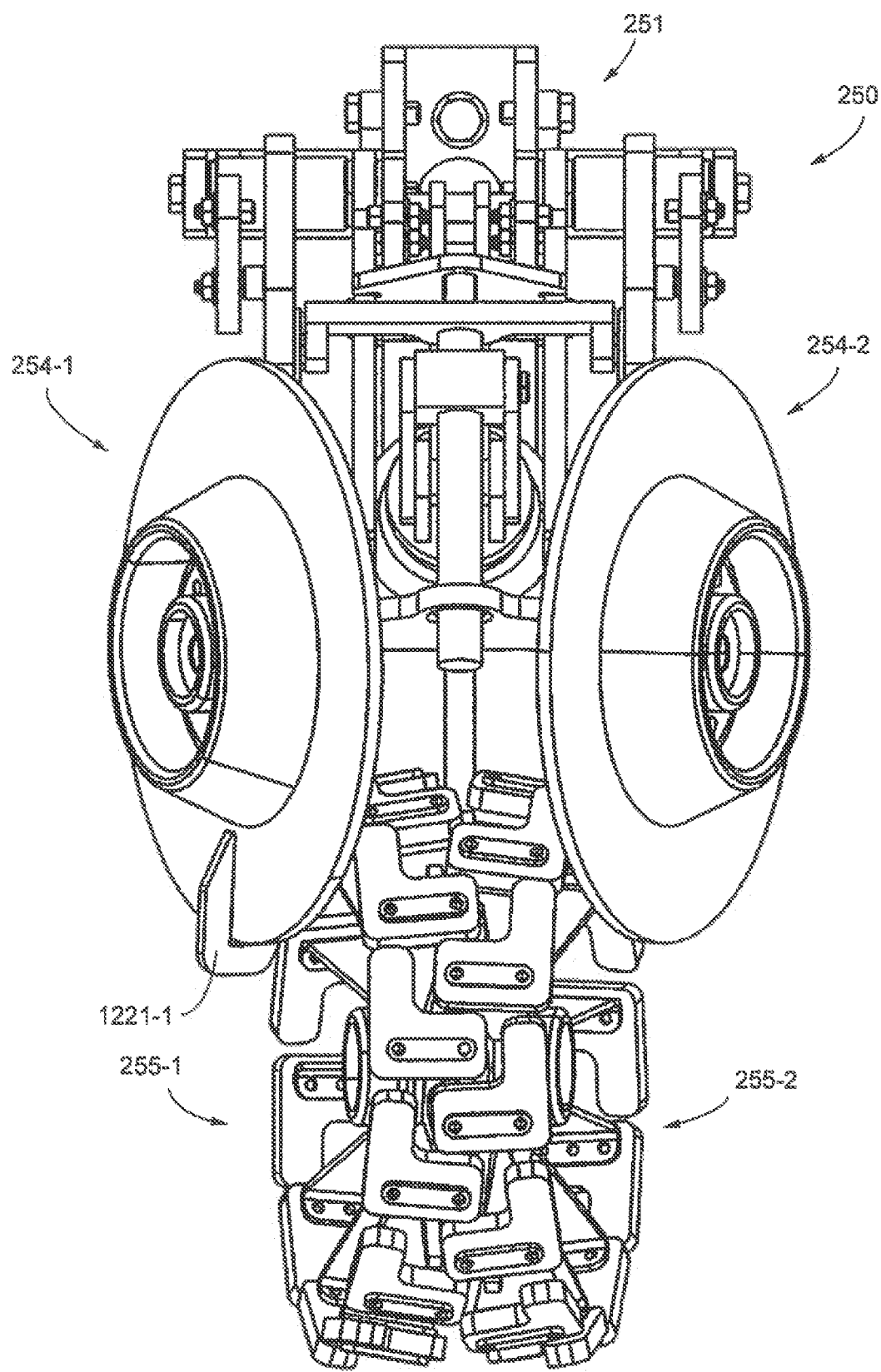
FIG. 5 is a bottom plan view of the trench closing assembly of FIG. 3.

Referring to FIG. 2, a monitor 300 is visible to an operator within the cab of a tractor pulling the planter. The monitor 300 may be in signal communication with a GPS unit 310, the trench closing assembly actuator 256 and the optional packer wheel assembly actuator 266 to enable operational control of the trench closing assembly 250 and the optional packer wheel assembly 260 based on the signals generated by trench closing sensors 1000, which are described in International Publication No. WO2017/197274, which is incorporated herein by reference in its entirety. Also as discussed later, the monitor 300 may be programmed to display operational recommendations based on the signals generated by the trench closing sensors 1000. The monitor 300 may also be in signal communication with the row cleaner actuator 276, the downforce control system 214, the depth adjustment actuator 234 to enable operational control of row cleaner assembly 270, the downforce control system 214 and the trench opening assembly 230, respectively.

Trench Closing Assembly

FIGS. 3 to 24 illustrate a trench closing assembly 250 according to one embodiment. The trench closing assembly 250 is adapted to be attached to row unit 200. Trench closing assembly 250 has a frame 251, an actuator 259, a pair of closing wheels 254, and optionally, a pair of press wheels 255. While illustrated with a pair of press wheels 255, a single press wheel 255 can be used. Actuator 259 can apply one force to frame 251, and this force can be divided between the closing wheels 254 and the press wheels 255.

Actuator 259 can be any actuator that can apply a force. Examples of actuators include, but are not limited to, pneumatic actuators, hydraulic actuators, electro-mechanical actuators, and electro-hydraulic actuators. In one embodiment, actuator 259 is a pneumatic actuator, such as an air bag or an air cylinder. A gas supply (not shown) can be connected to nozzle 1259 to supply gas (such as air) to actuator 259.

Figure 7:
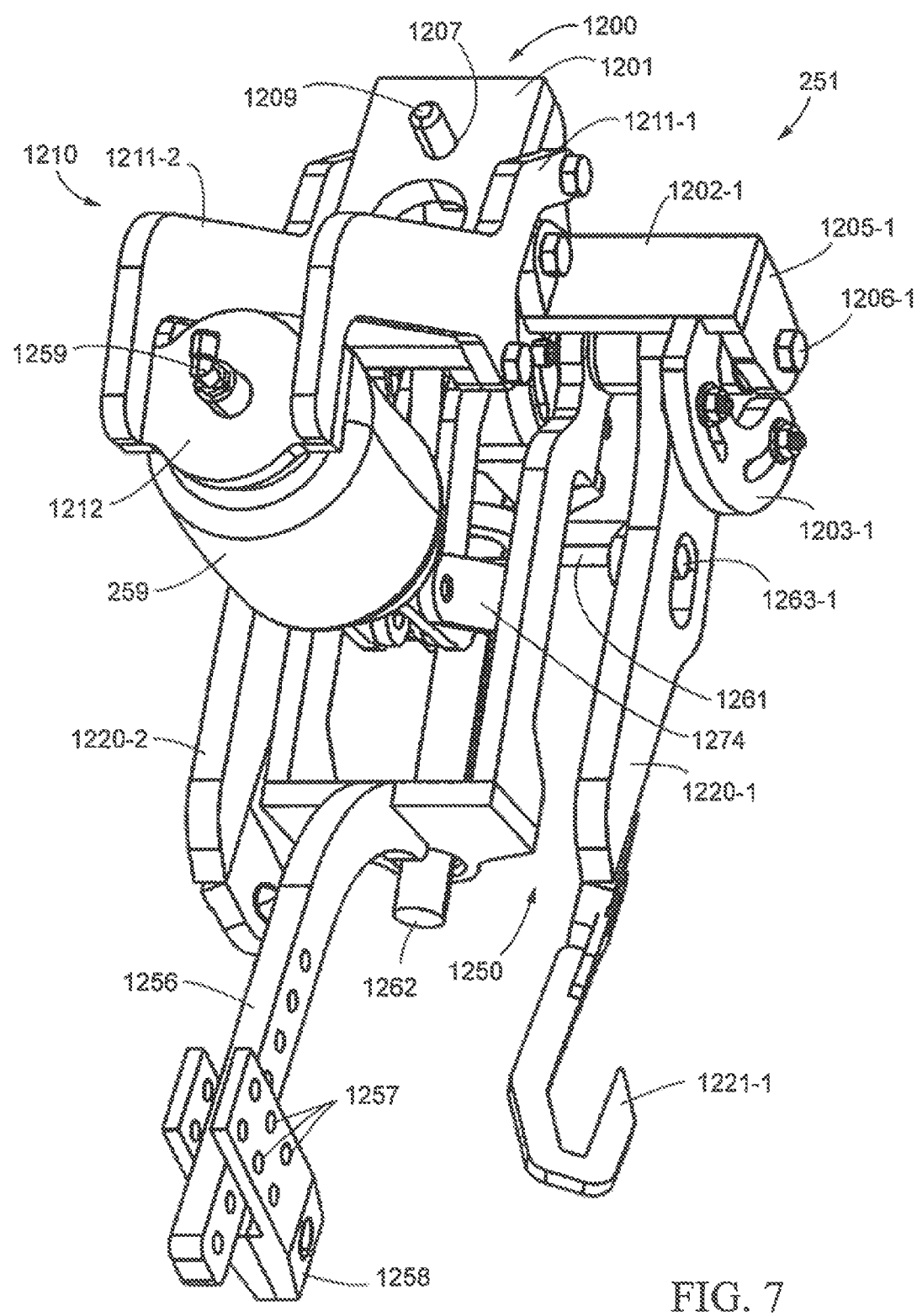
FIG. 7 is a perspective view of the frame of the trench closing assembly of FIG. 3.
Figure 8:
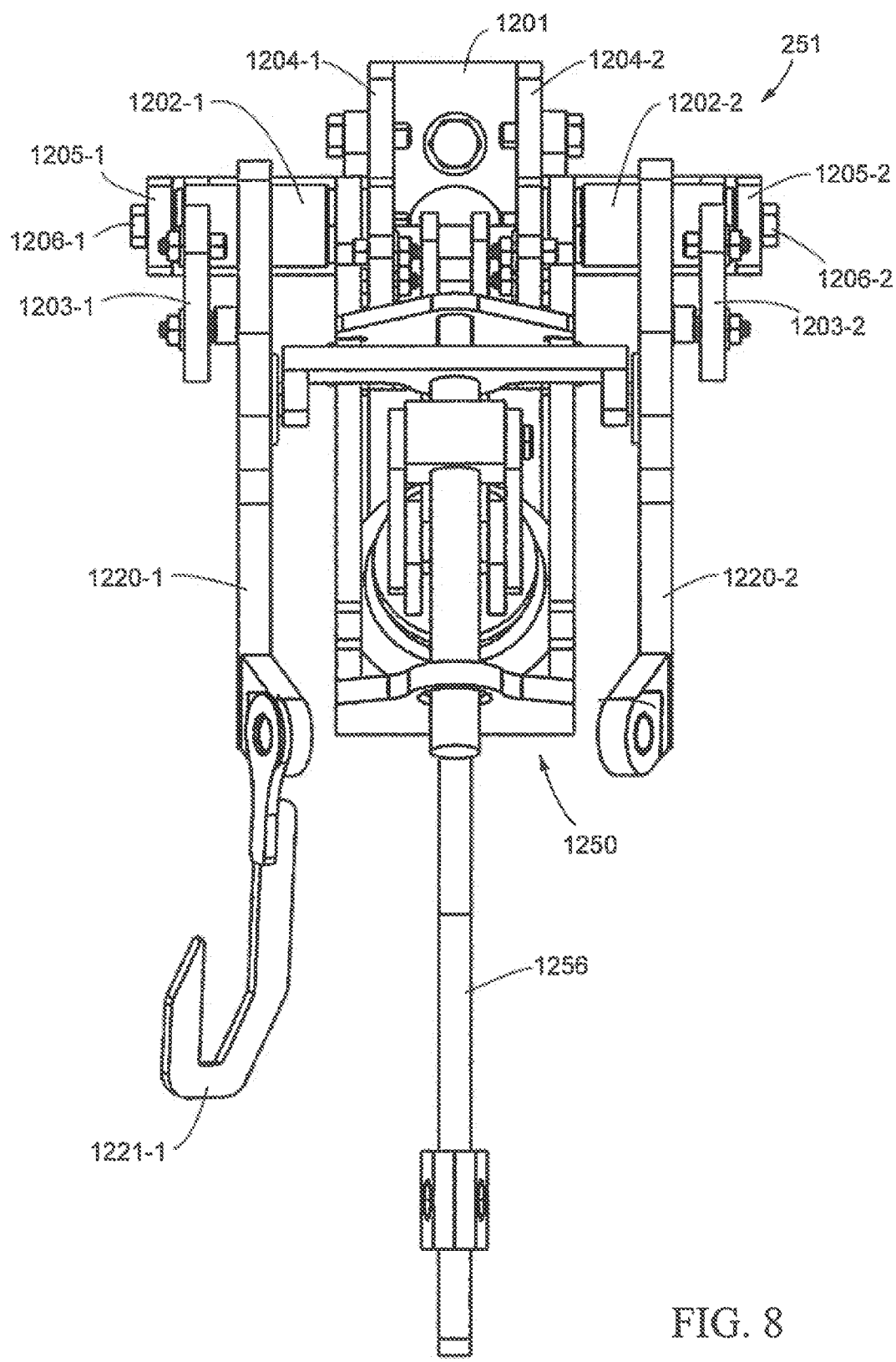
FIG. 8 is a bottom plan view of the frame of the trench closing assembly of FIG. 7.
Figure 9:
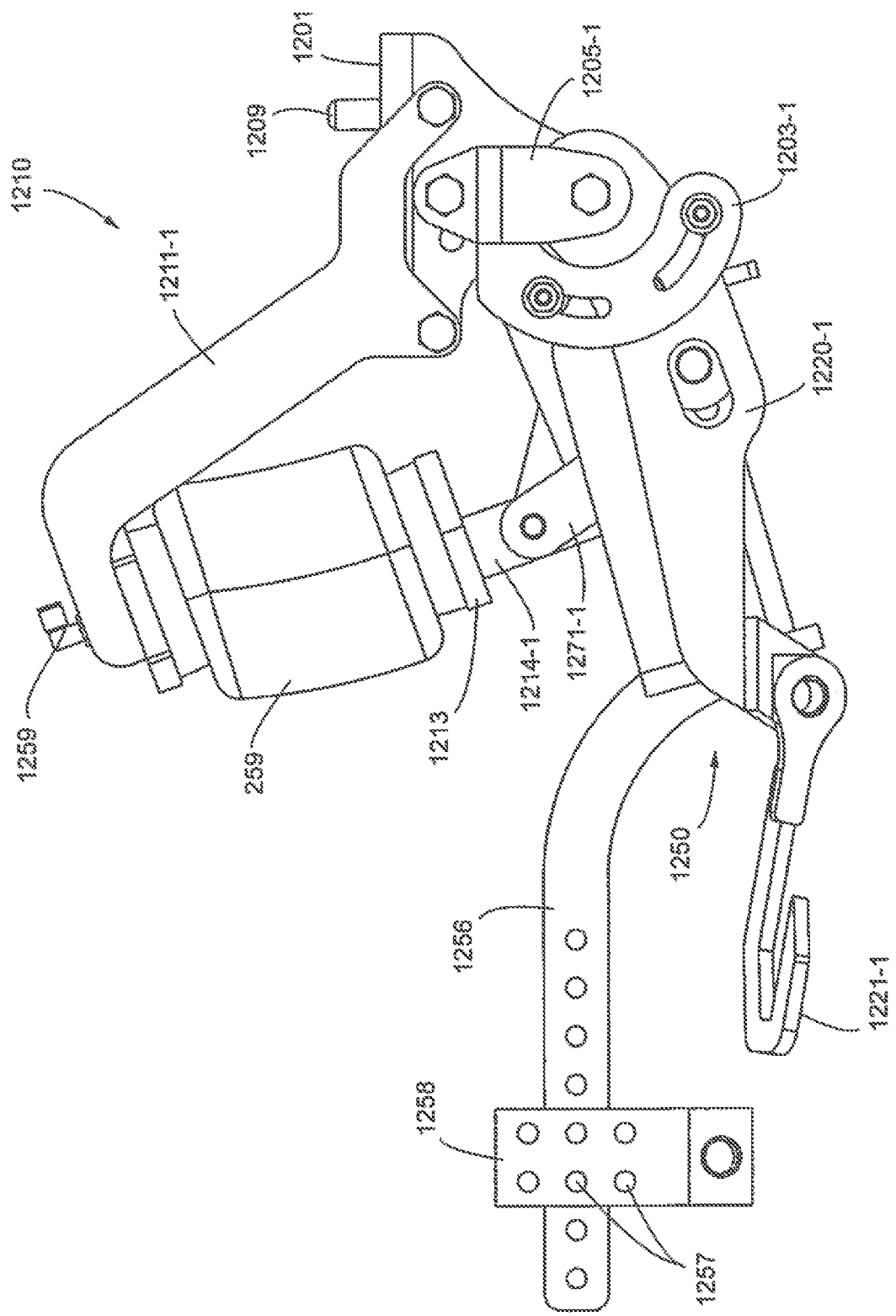
FIG. 9 is a side elevation view of the frame of the trench closing assembly of FIG. 7.
Figure 10:
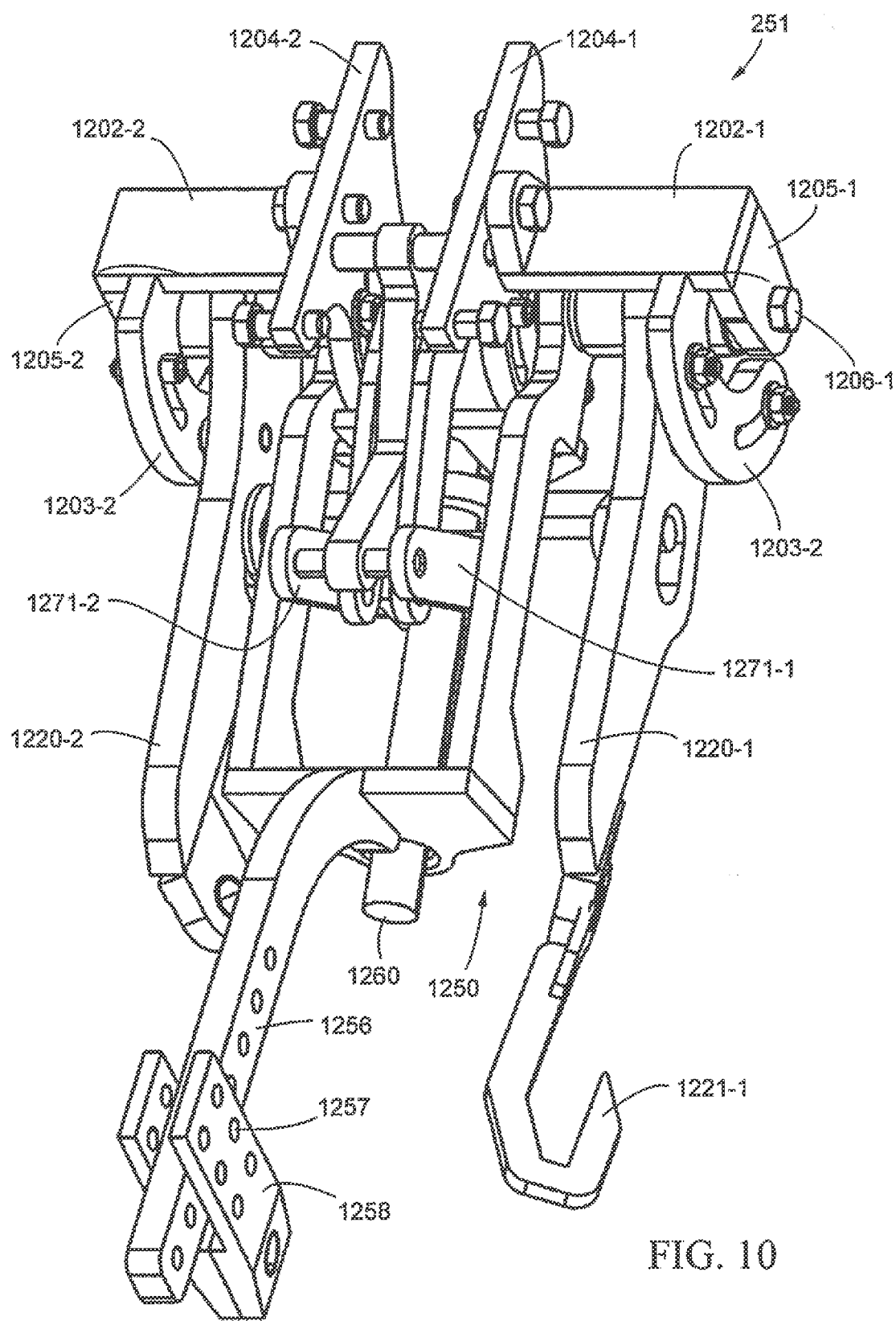
FIG. 10 is a perspective view of the frame of the trench closing assembly of FIG. 7 with the actuator removed.
Figure 12A:
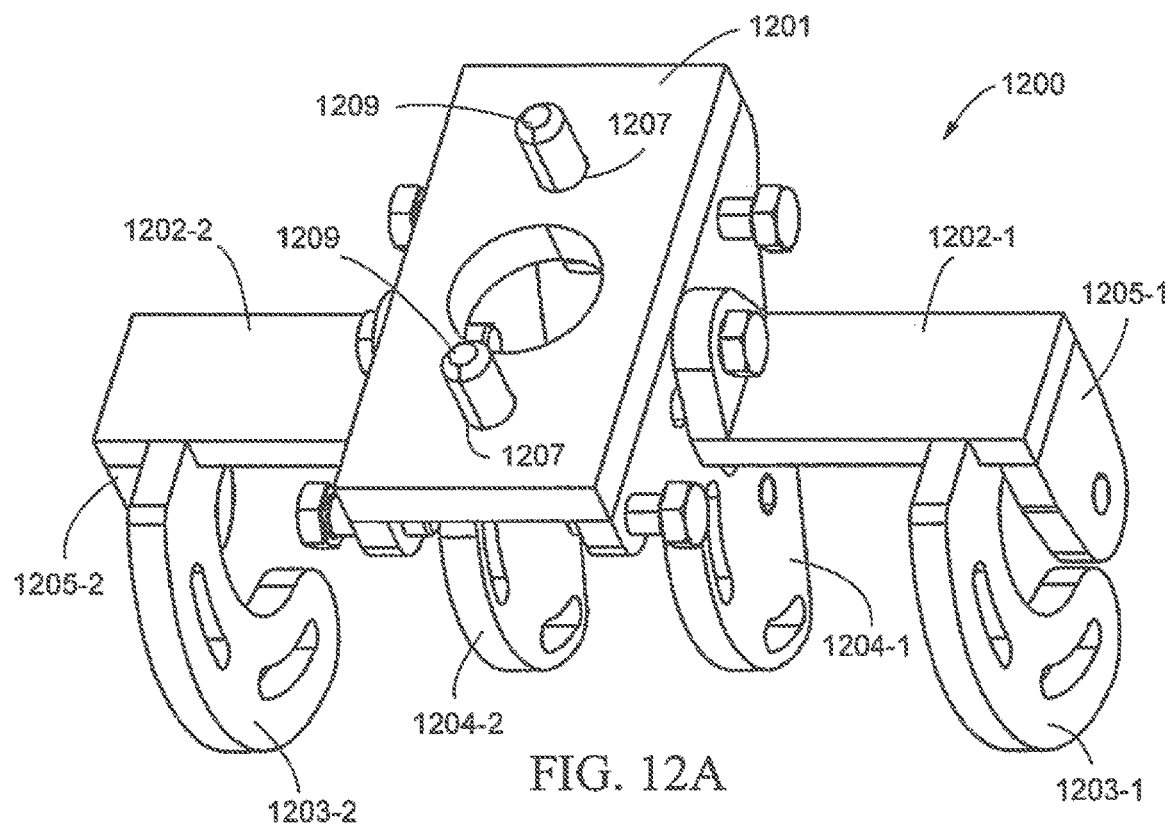
FIG. 12A is top perspective view of the main frame of the trench closing assembly.
Figure 12B:
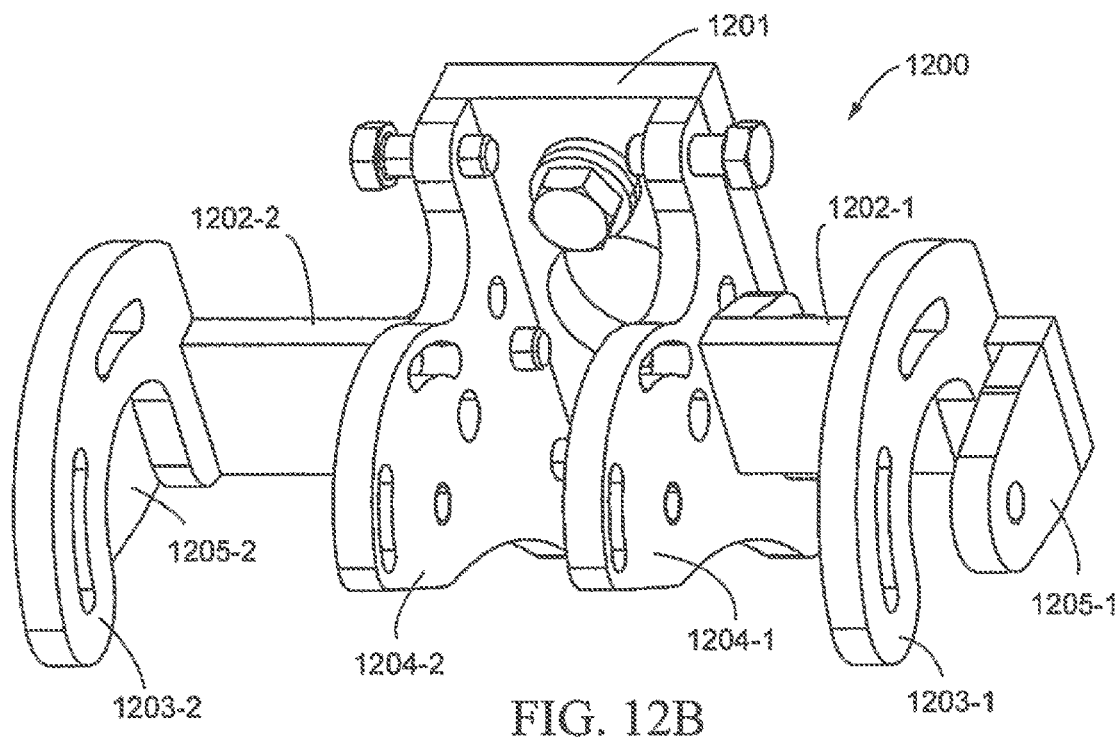
FIG. 12B is bottom perspective view of the main frame of the trench closing assembly.

Referring to FIGS. 7 and 12A and 12B, frame 251 has a main frame 1200 having a connection bracket 1201 that is adapted to be connected to row unit 200. Optionally, one or more bolts 1209 extending through apertures 1207 (FIG.

12A) in the connection bracket 1201 for mounting the frame 251 to the row unit 200. Extending up from connection bracket 1201 is actuator bracket 1210. Actuator bracket 1210 in one embodiment has a first bracket arm 1211-1, a second bracket arm 1211-2, and a cross connector 1212 connecting first bracket arm 1211-1 and second bracket arm 1211-2. Main frame 1200 has a first wing 1202-1 and a second wing 1202-2 extending laterally outward transverse to a direction of travel of trench closing assembly 250. As best viewed in FIGS. 12A-12B, extending downwardly from connection bracket 1201 is a first inner bracket 1204-1 and a second inner bracket 1204-2 to which the first wing 1202-1 and second wing 1202-2 are respectively attached. Extending downwardly from wings 1202-1 and 1202-2 at an end opposite to where the wings 1202-1, 1202-2 attach to inner brackets 1204-1, 1204-2 are outer brackets 1205-1 and 1205-2, respectively. Extending downwardly from wings 1202-1 and 1202-2 and between inner brackets 1204-1, 1204-2 and outer brackets 1205-1, 1205-2 are middle brackets 1203-1 and 1203-2, respectively.

Figure 11:
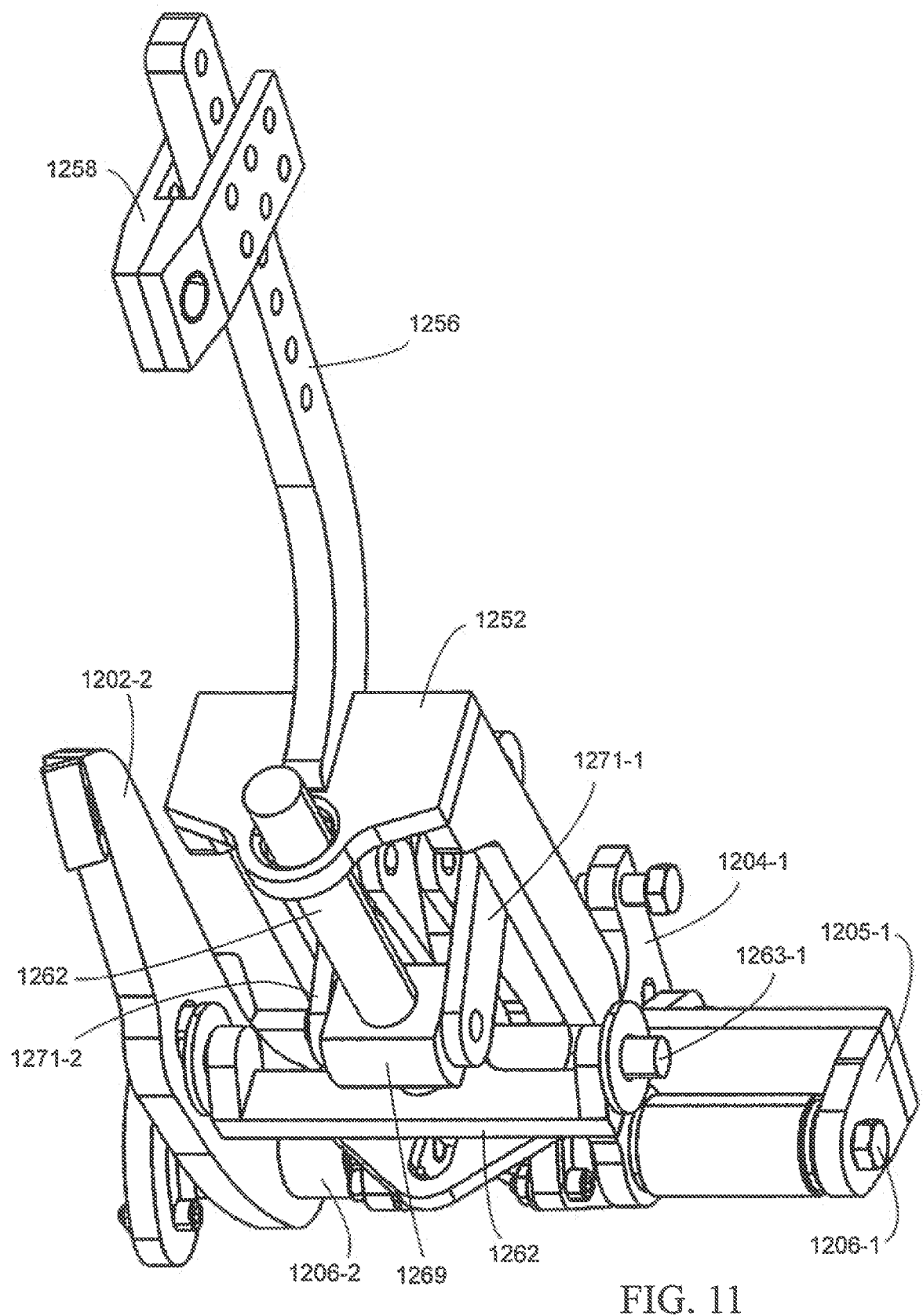
FIG. 11 is a bottom perspective view of the frame of the trench closing assembly of FIG. 10 with a swing arm removed.
Figure 18:
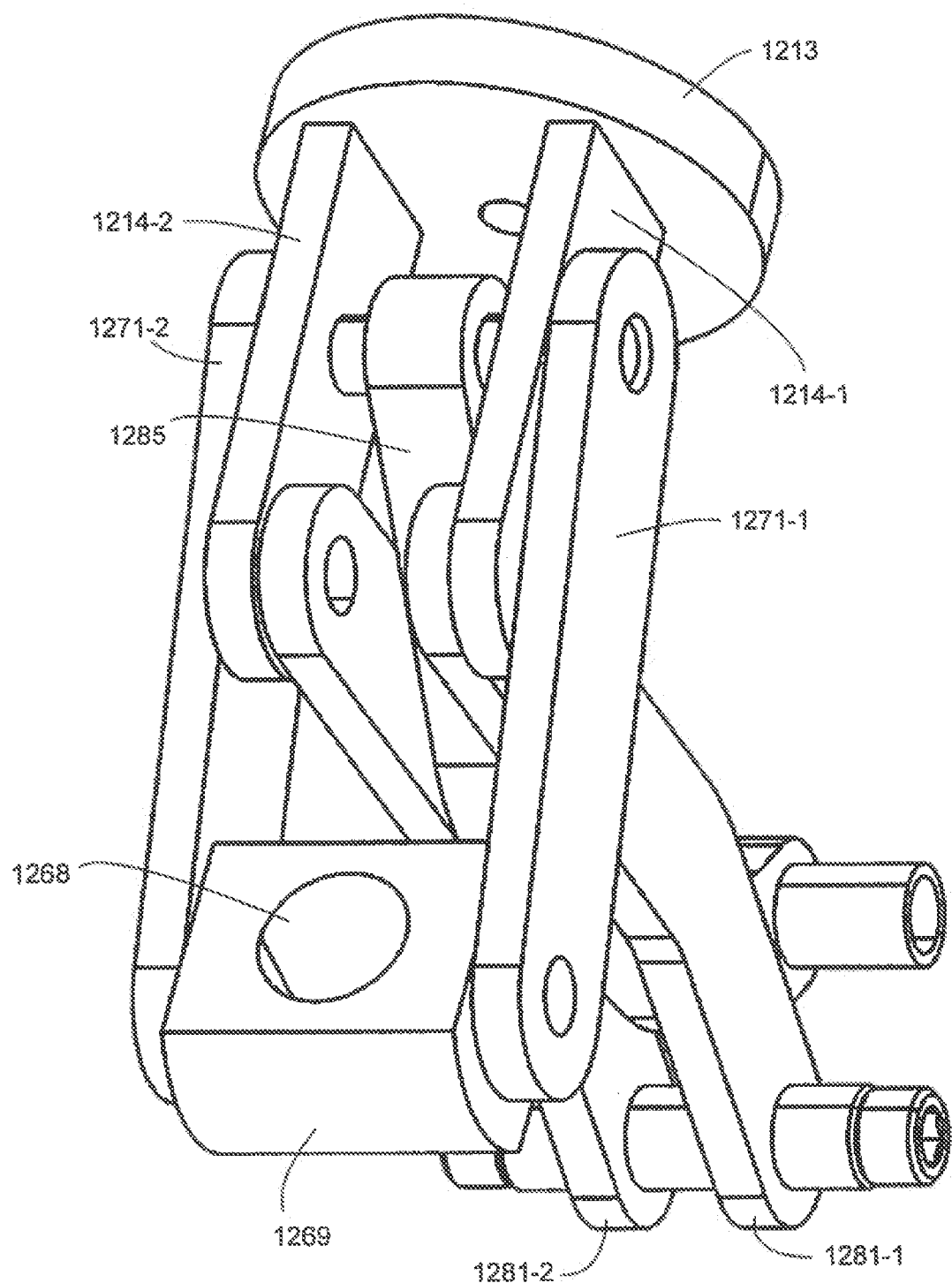
FIG. 18 is a perspective view of portions of the trench closing assembly.

As seen in FIG. 18, an actuator base 1213 is connected to first base arm 1214-1 and 1214-2. A first transfer arm 1271-1 is connected to first base arm 1214-1, and a second transfer arm 1271-2 is connected to second base arm 1214-2. Connected to first transfer arm 1271-1 and second transfer arm 1271-2 at an end opposite to where the first base arm 1214-1 and second base arm 1214-2 connect is a transfer block 1269 through which a hole 1268 extends. As shown in FIG. 11, a transfer bar 1260 is disposed through the hole 1268 in the transfer block 1269.

Figure 14:
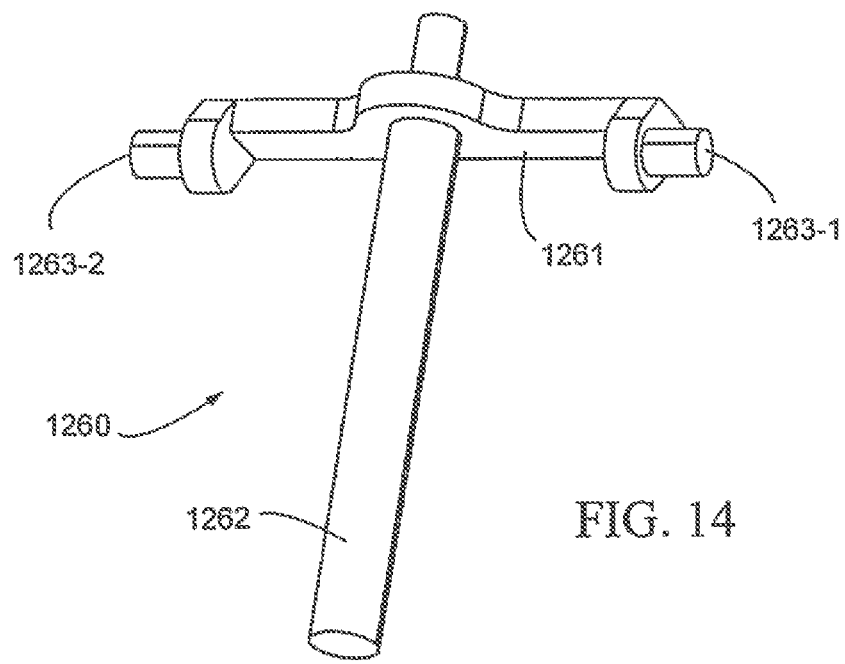
FIG. 14 is perspective view of the transfer bar of the trench closing assembly.
Figure 15:
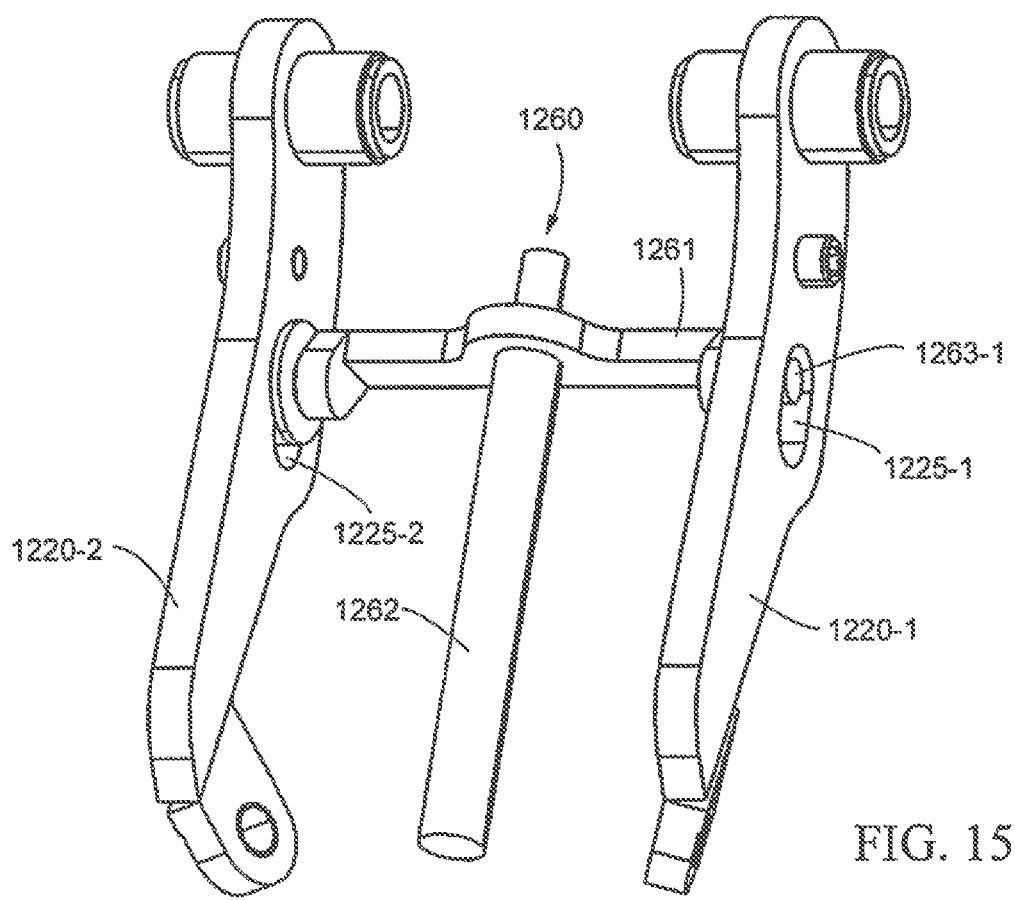
FIG. 15 is a perspective view of the transfer bar and swing arms of the trench closing assembly.
Figure 16:
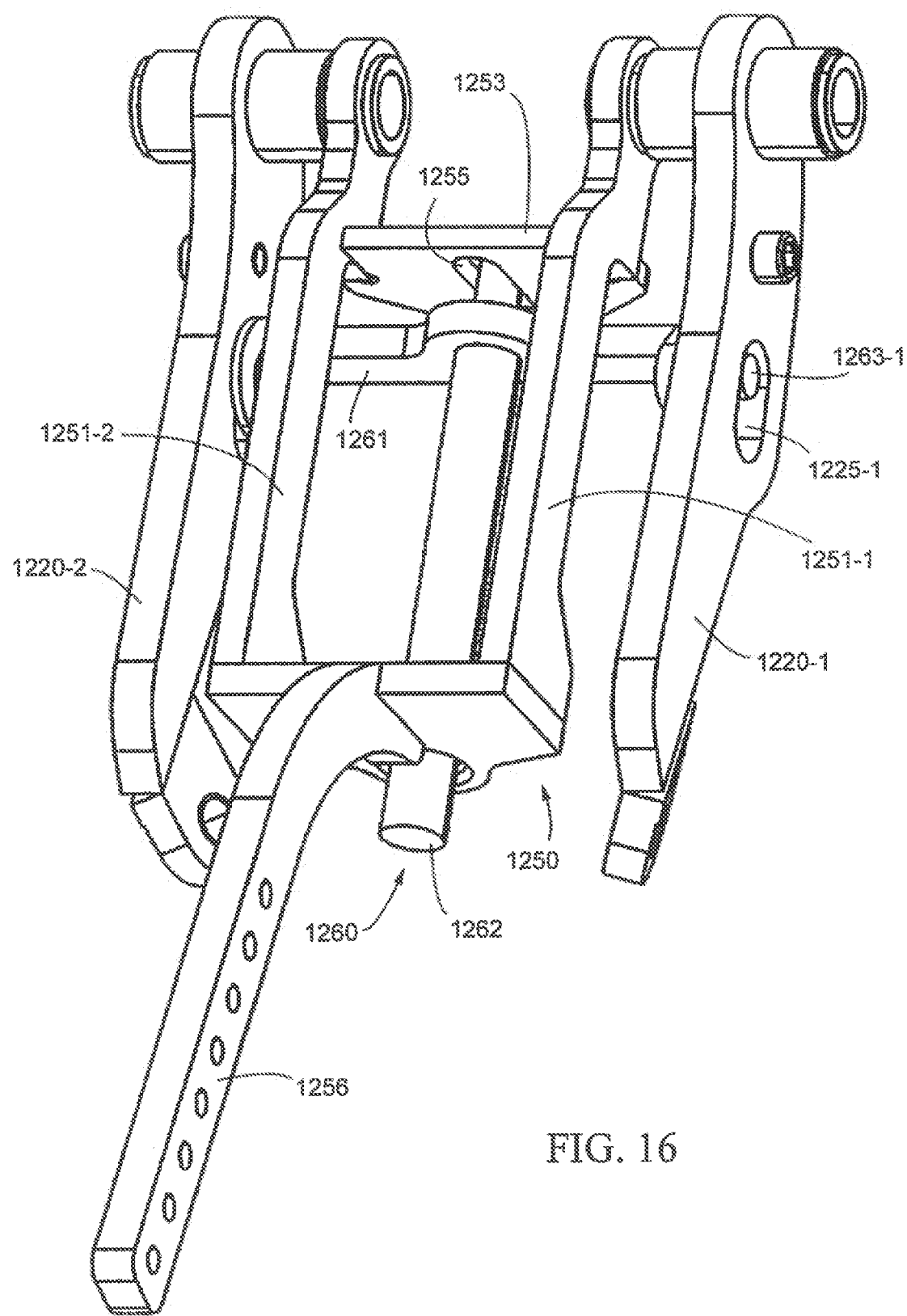
FIG. 16 is a perspective view of the transfer bar and swing arms of FIG. 15 and further including the press wheel frame.

As seen in FIG. 14, transfer bar 1260 has a longitudinal bar 1262 and a transverse bar 1261. Transfer bar 1260 can be a unitary part, or (as shown) longitudinal bar is disposed through a bore in the transverse bar 1261. Longitudinal bar 1262 is generally oriented parallel to the direction of travel of trench closing assembly 250, and transverse bar 1261 is generally oriented transverse to the direction of travel. At each end of transverse bar 1261 are tabs 1263-1 and 1263-2. Tabs 1263-1 and 1263-2 are for mating with respective swing arms 1220-1 and 1220-2, via respective holes 1225-1 and 1225-2, as best seen in FIG. 15.

Transfer bar 1260 divides the force from actuator 259 between closing wheels 254 (254-1, 254-2) and press wheels 255 (255-1, 255-2). Closing wheels 254-1 and 254-2 are connected to swing arms 1220-1 and 1220-2, respectively. Force applied to transfer bar 1260 is transferred through transverse bar 1261 to tabs 1263-1 and 1263-2. Also, force is transferred to press wheel frame 1250 via longitudinal bar 1262.

Figure 13:
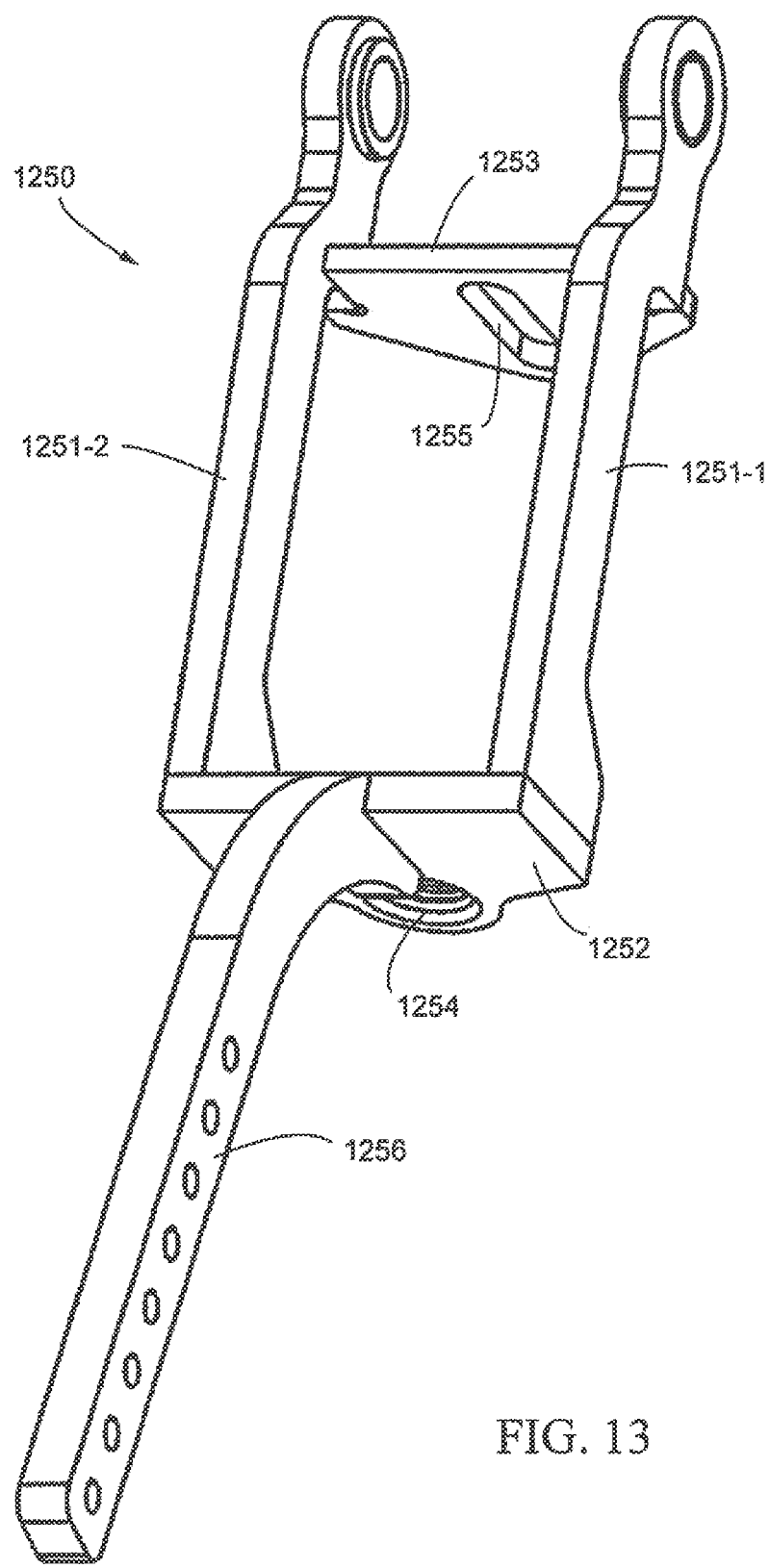
FIG. 13 is a perspective view of the press wheel frame of the trench closing assembly.

As seen in FIG. 13, press wheel frame 1250 has a first arm 1251-1, a second arm 1251-2, a first cross brace 1253, which can optionally have a hole 1255 for receiving longitudinal bar 1262, a second cross brace 1252 having a hole 1254 for receiving longitudinal bar 1262, and a mounting arm 1256 to which press wheels 255-1 and 255-2 are mounted through bracket 1258. Press wheel frame 1250 is pivotably disposed between inner brackets 1204 (1204-1, 1204-2) and outer brackets 1205 (1205-1, 1205-2) about pivots 1206-1 and 1206-2, respectively.

Swing arms 1220 (1220-1, and 1220-2) are pivotably disposed between inner brackets 1204 (1204-1, 1204-2) and outer brackets 1205 (1205-1, 1205-2) about pivots 1206-1 and 1206-2, respectively.

Figure 17:
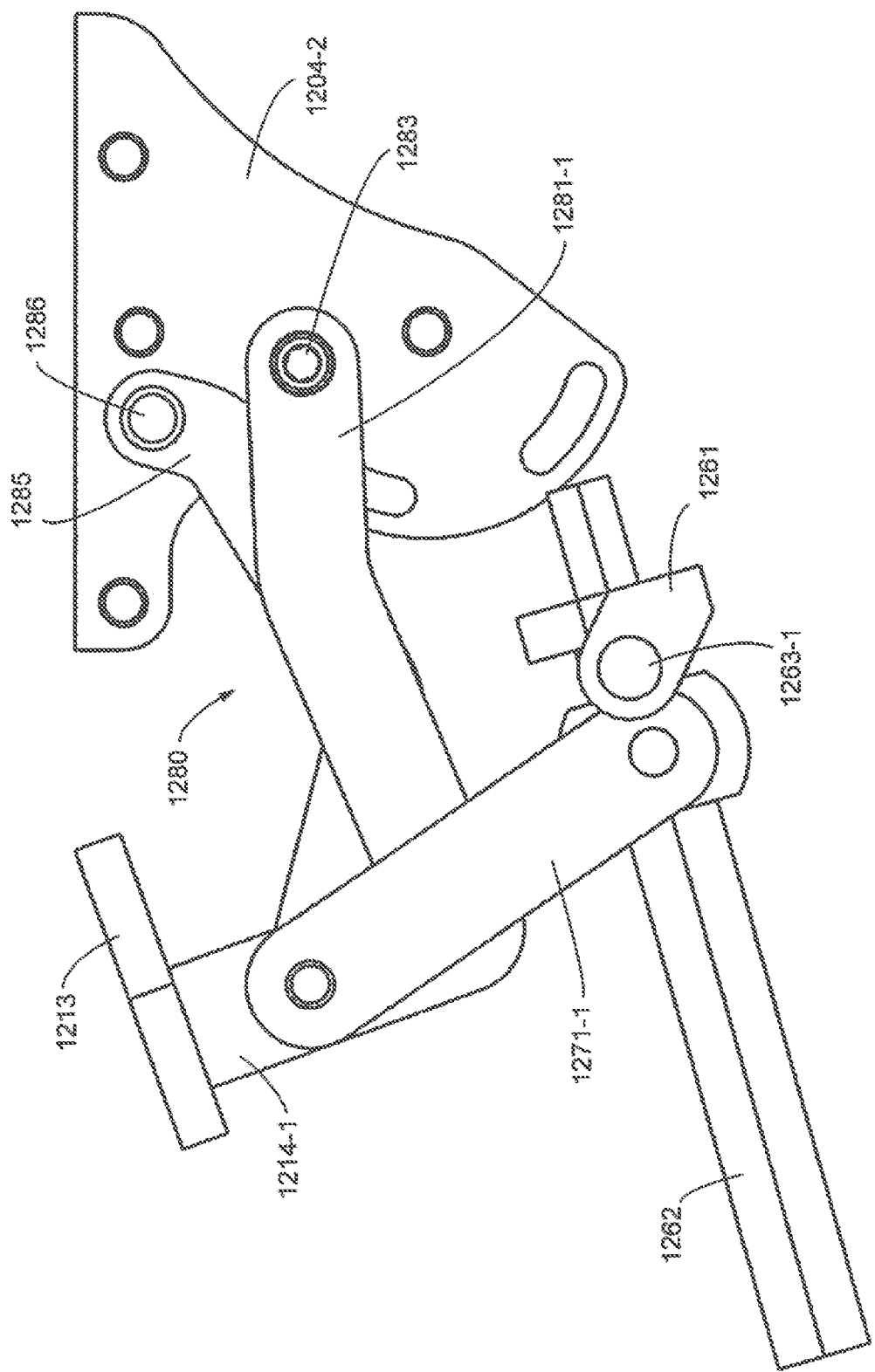
FIG. 17 is a side elevation view of a portion of the trench closing assembly.
Figure 19:
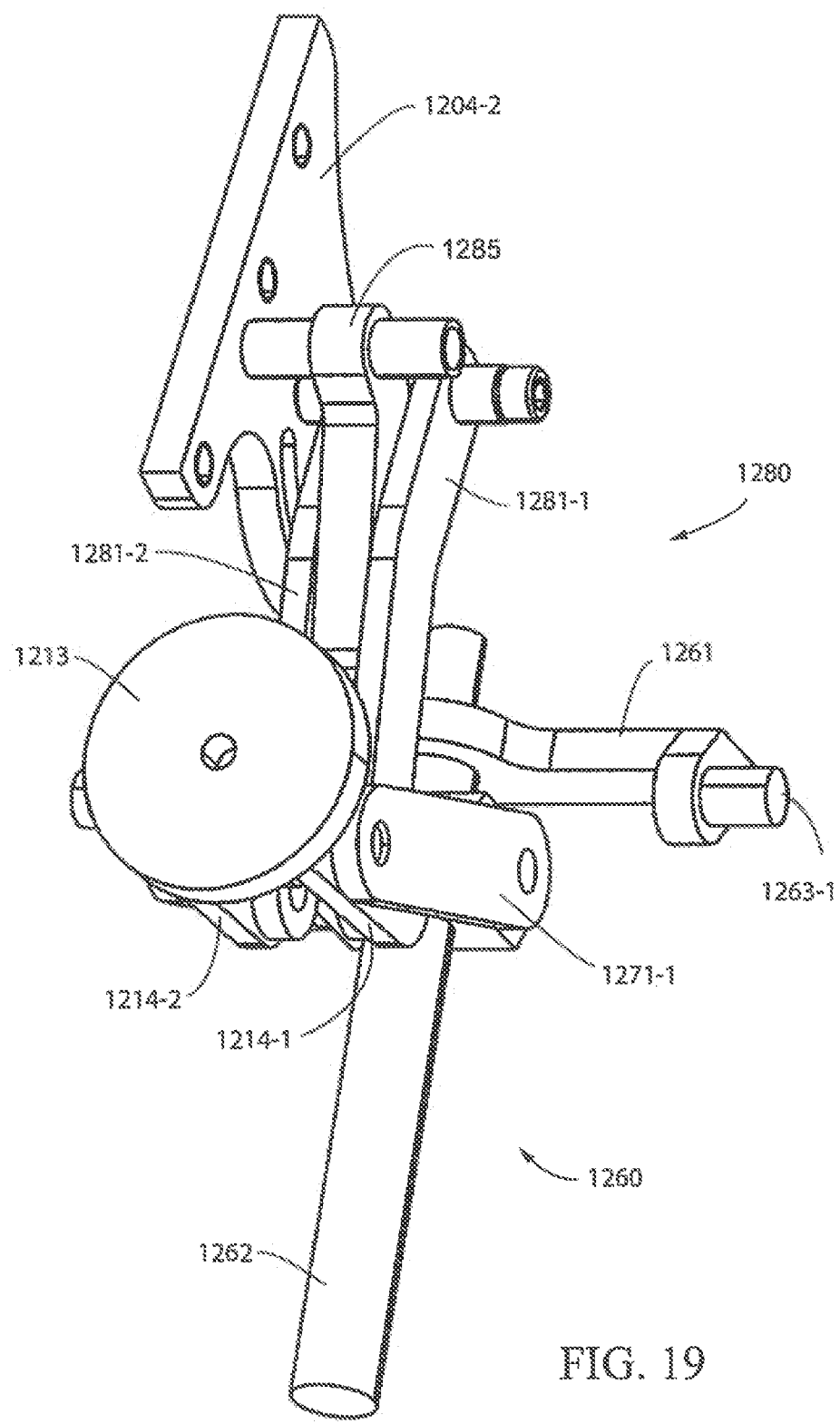
FIG. 19 is a perspective view of portions of the trench closing assembly.
Figure 20:
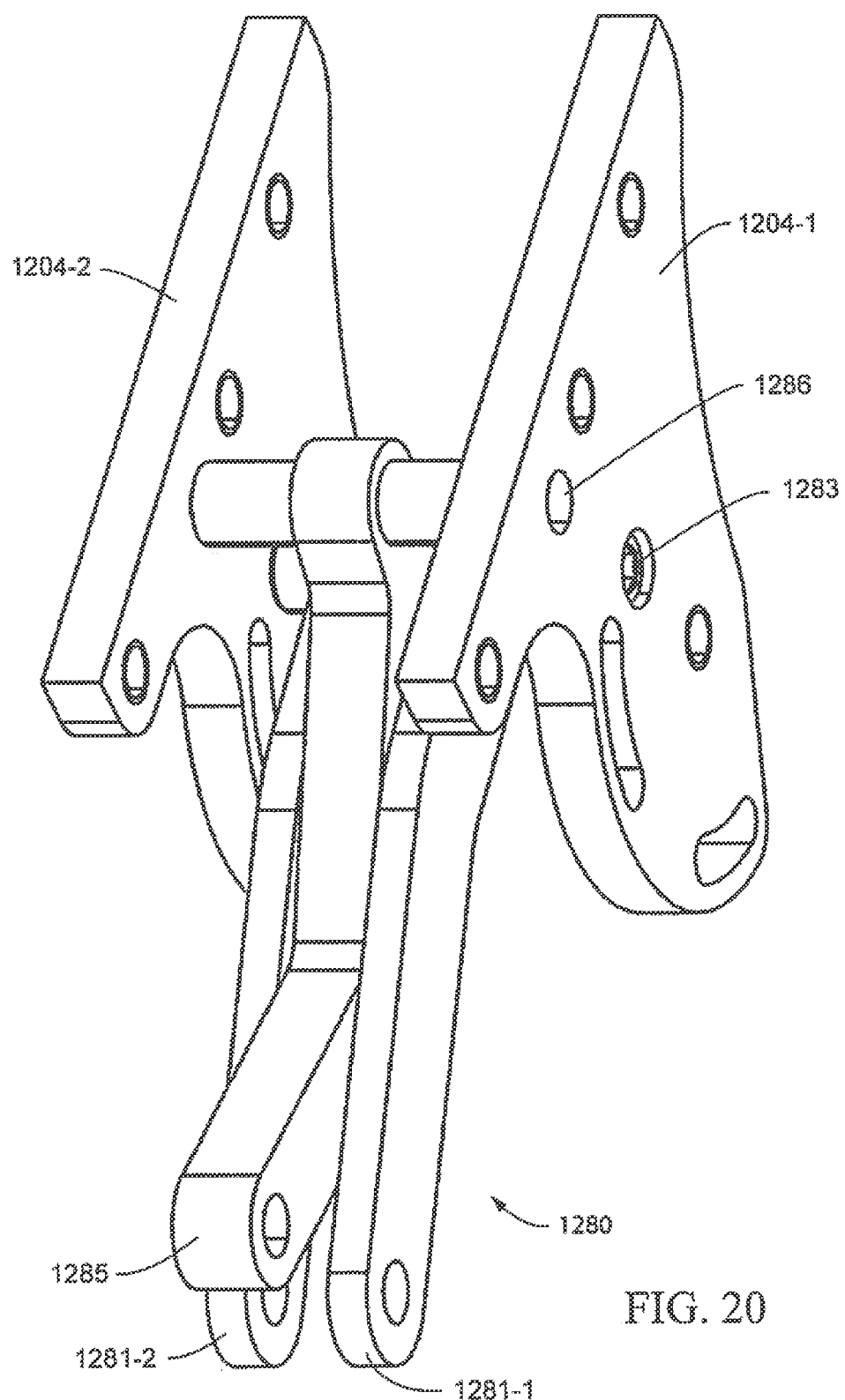
FIG. 20 is a perspective view of portions of the trench closing assembly.

As illustrated in FIGS. 17 to 19, first base arm 1214-1 and second base arm 1214-2 are pivotably connected to main frame 1200 through a first pivot arm 1280 and a second pivot arm 1285. First pivot arm 1280 has a first arm 1281-1 and a second arm 1281-2. First pivot arm 1280 and second pivot arm 1285 are pivotably disposed between inner brackets 1204-1 and 1204-2. First pivot arm 1280 pivots about pivot 1283, and second pivot arm pivots about pivot 1286.

Figure 6:
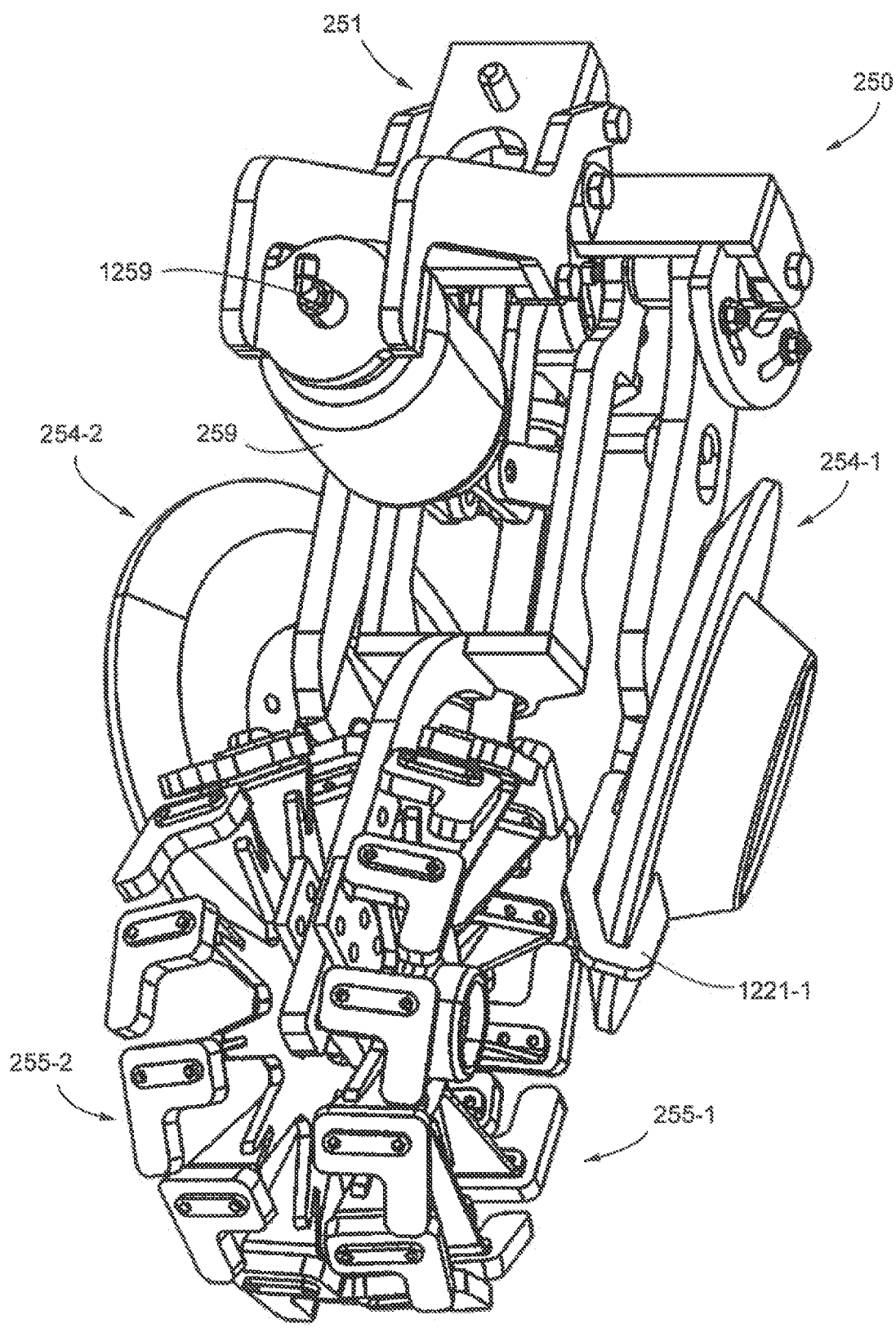
FIG. 6 is a perspective view of the trench closing assembly of FIG. 3.

As illustrated in FIGS. 6 and 7, press wheels 255-1 and 255-2 are disposed on bracket 1258. Bracket 1258 has a plurality of holes 1257 for adjustable mating to mounting arm 1256. Wheels of different diameters can be attached to bracket 1258 or a different placement of wheels can be used to change the distribution of force with the adjustable mating.

Optionally, a scrapper 1221 (1221-1) can be included. Scrapper 1221 is attached to swing arm 1220 and is disposed to receive a closing wheel 254. While shown with one scrapper 1221-1, a scrapper 1221-2 (not shown) can be attached to swing arm 1220-2 similar to scrapper 1221-1 being connected to swing arm 1220-1.

FIGS. 29-43 illustrate another trench closing assembly 250A according to another embodiment. The trench closing assembly 250A is adapted to be attached to row unit 200. Trench closing assembly 250A has a frame 251A, an actuator 259, a pair of closing wheels 254-1, 254-2, and optionally, a press wheel 255A. As illustrated, the press wheel 255A may comprise a pair of press wheels 255A-1, 255A-2, but a single press wheel (not shown) may be utilized. Actuator 259 can apply one force to frame 251A, and this force can be divided between the closing wheels 254 and the press wheel 255A.

Figure 29:
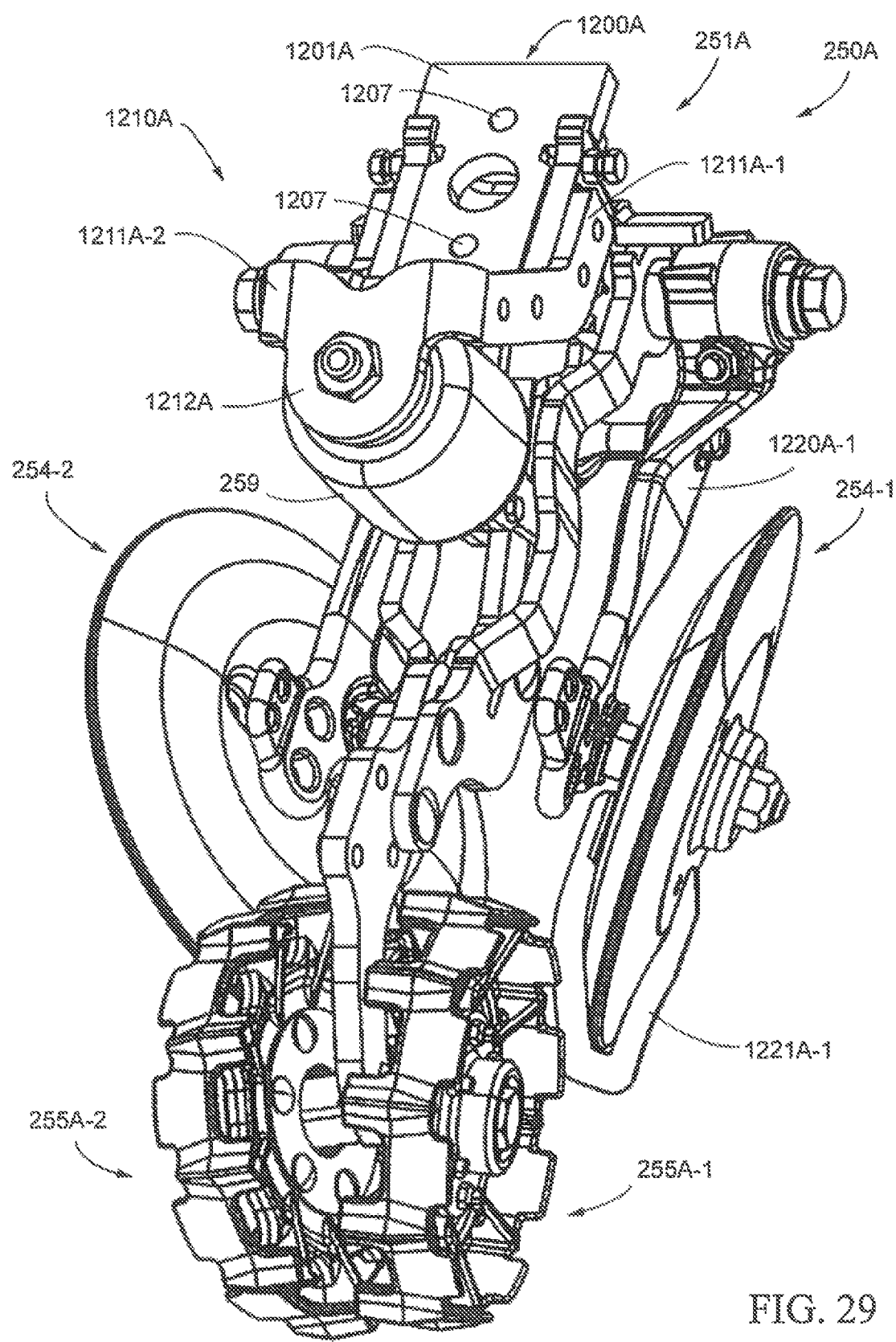
FIG. 29 is a perspective view of an embodiment of a trench closing assembly.
Figure 30:
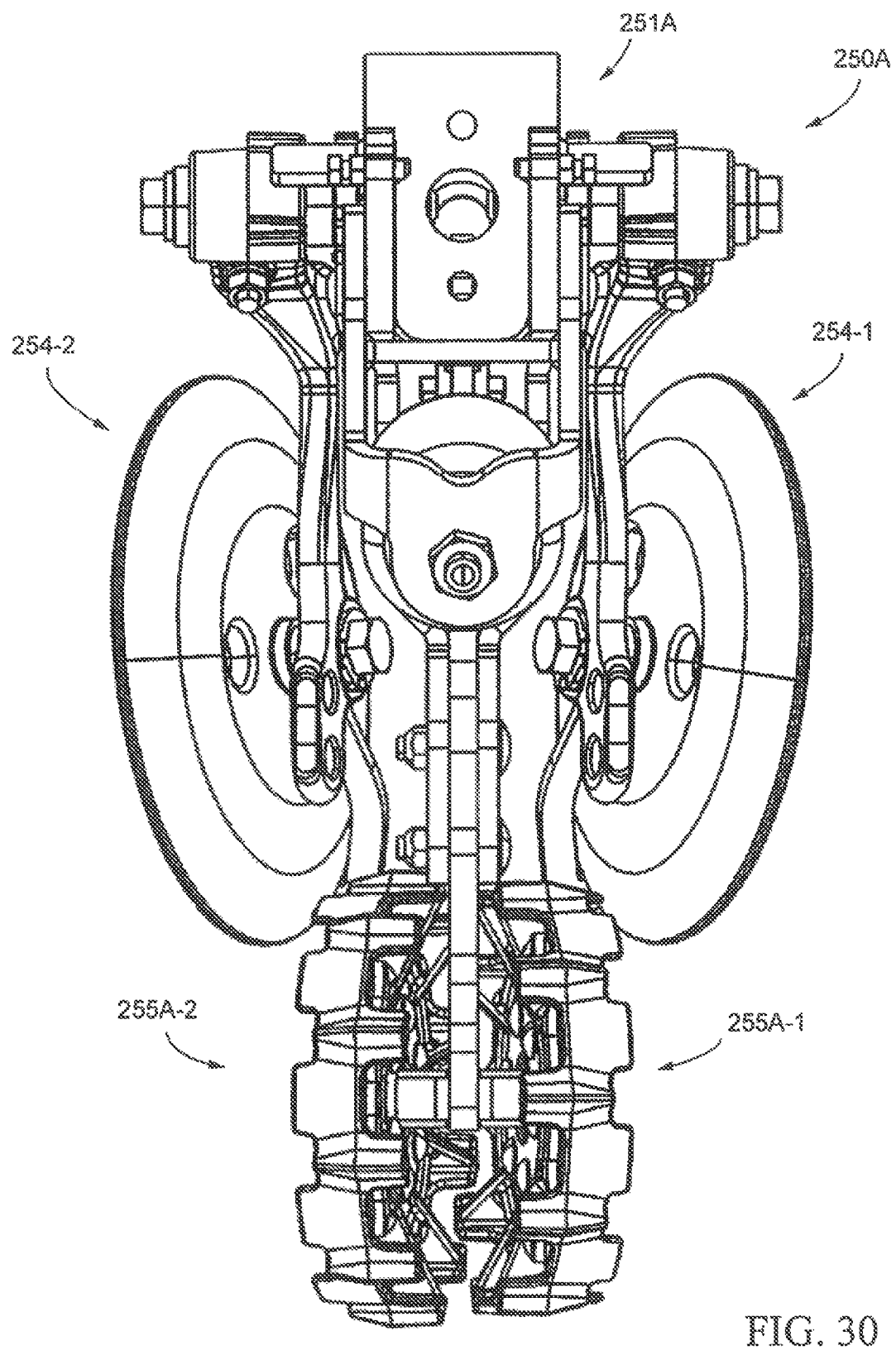
FIG. 30 is a top plan view of the trench closing assembly of FIG. 29.
Figure 31:
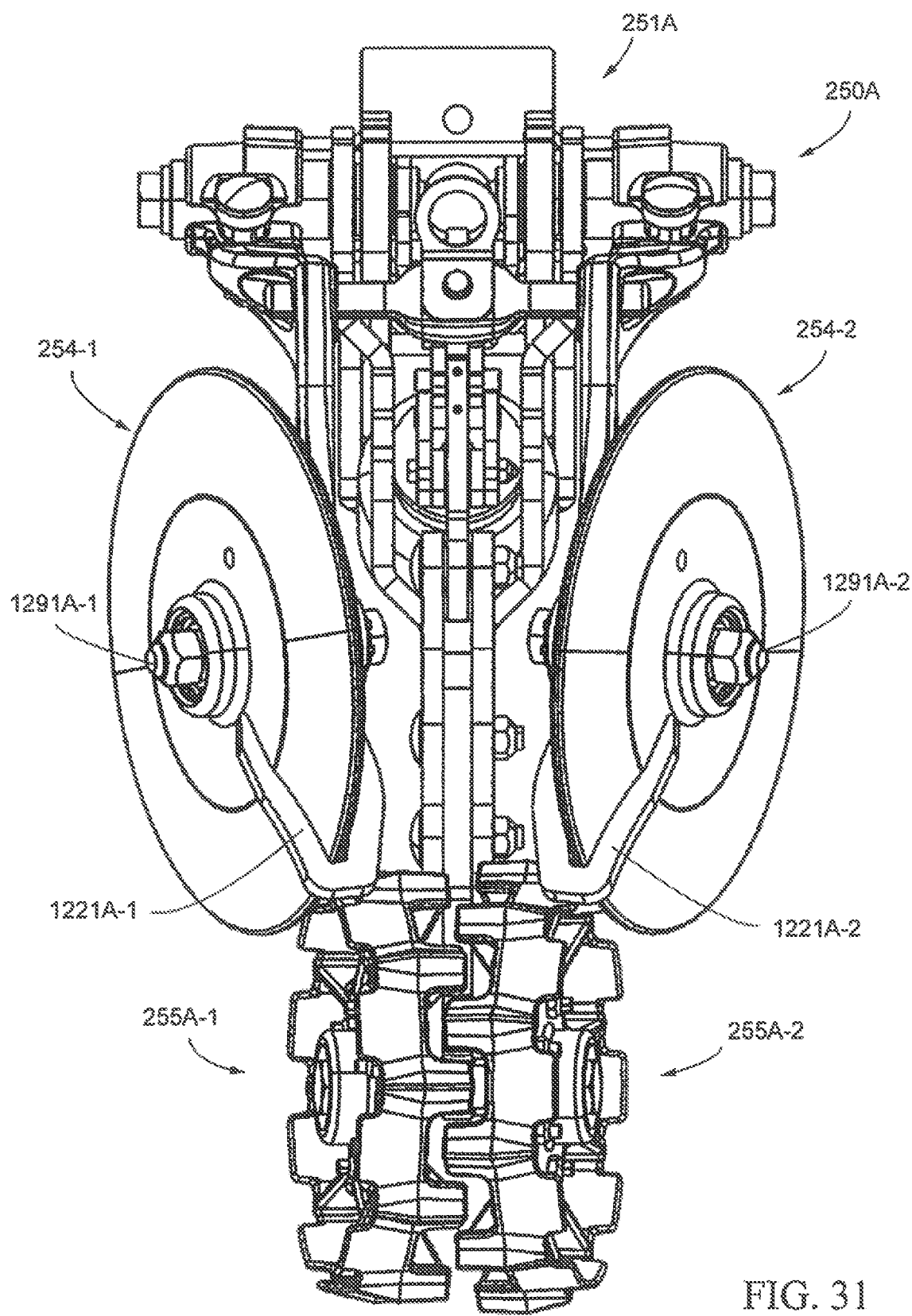
FIG. 31 is a bottom plan view of the trench closing assembly of FIG. 29.

Referring to FIG. 29, frame 251A has a main frame 1200A having a connection bracket 1201A that is adapted to be connected to row unit 200. As in the previous embodiment, one or more bolts 1209 (FIG. 33) can extend through apertures 1207 in connection bracket 1201A for mounting the frame 251A to the row unit 200. Extending up from connection bracket 1201A is actuator bracket 1210A. In one embodiment, actuator bracket 1210A has a first bracket arm 1211A-1, a second bracket arm 1211A-2, and a cross connector 1212A connecting first bracket arm 1211A-1 and second bracket arm 1211A-2. Actuator bracket 1210A can be made from separate parts or as a single part. As best viewed in FIGS. 34 and 37, extending downwardly from connection bracket 1201A are first bracket 1204A-1 and second bracket 1204A-2 with cross-braces 1208A-1 and 1208A-2 extending first bracket 1204A-1 and second bracket 1204A-2. Extending outward, transverse to the direction of travel, are optional stops 1229A. Stop 1229A-1 is disposed on first bracket 1204A-1, and stop 1229A-2 is disposed on second bracket 1204A-2. Stop 1229A-1 cooperates with stops 1228A (1228A-1a and 1228A-1b) on first swing arm 1220A-1 and stops 1259A (1259A-1a and 1259A-1b) on first arm 1251A-1. Stop 1229A-2 cooperates with stops 1228A (1228A-2a and 1228A-2b) on second swing arm 1220A-2 and stops 1259A (1259A-2a and 1259A-2b) on second arm 1251A-2. The angle of rotation of swing arms 1220A and first and second arms 1251A can be limited.

Figure 39:
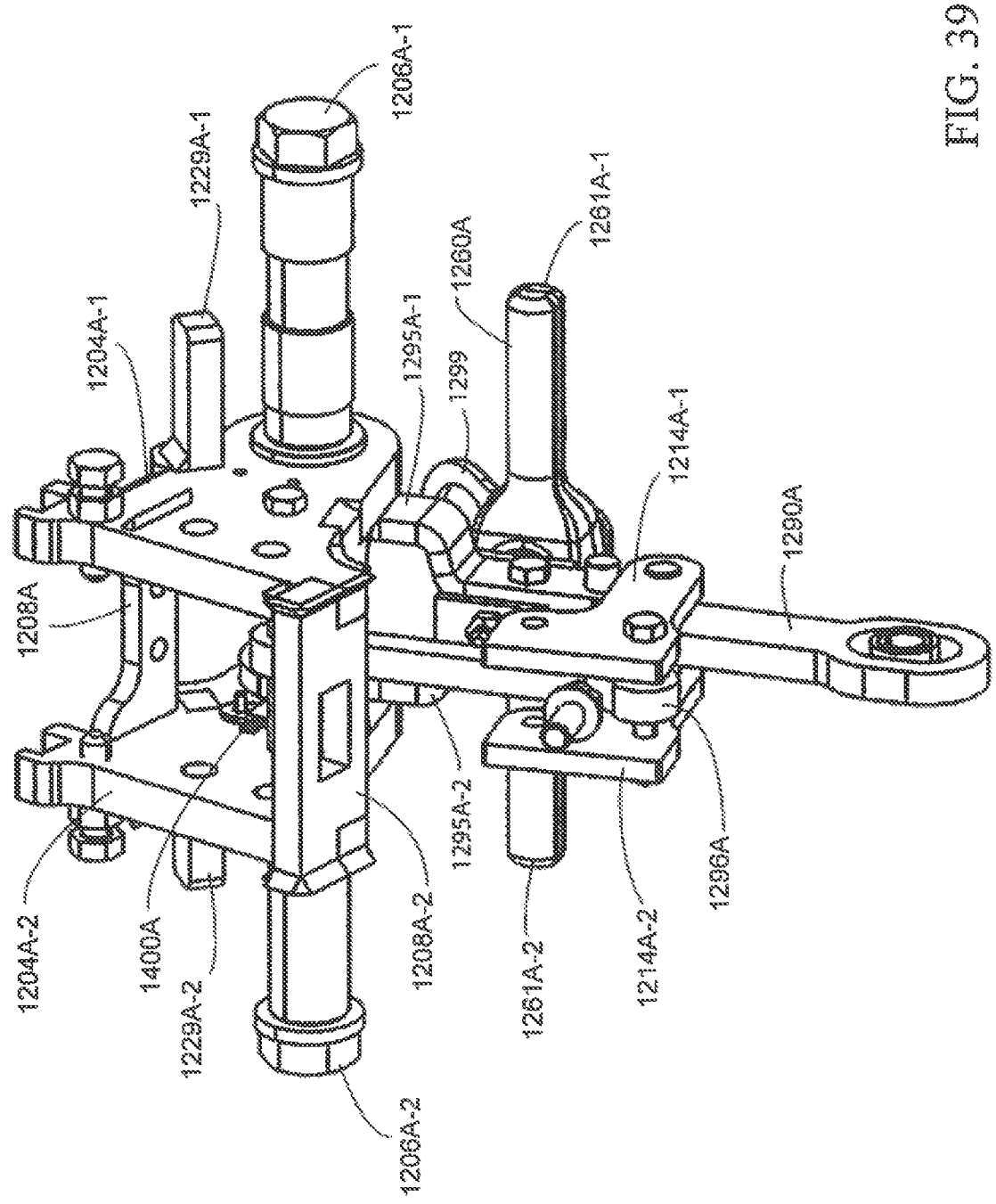
FIG. 39 is a perspective view of the trench closing assembly of FIG. 37 with additional parts removed.
Figure 40:
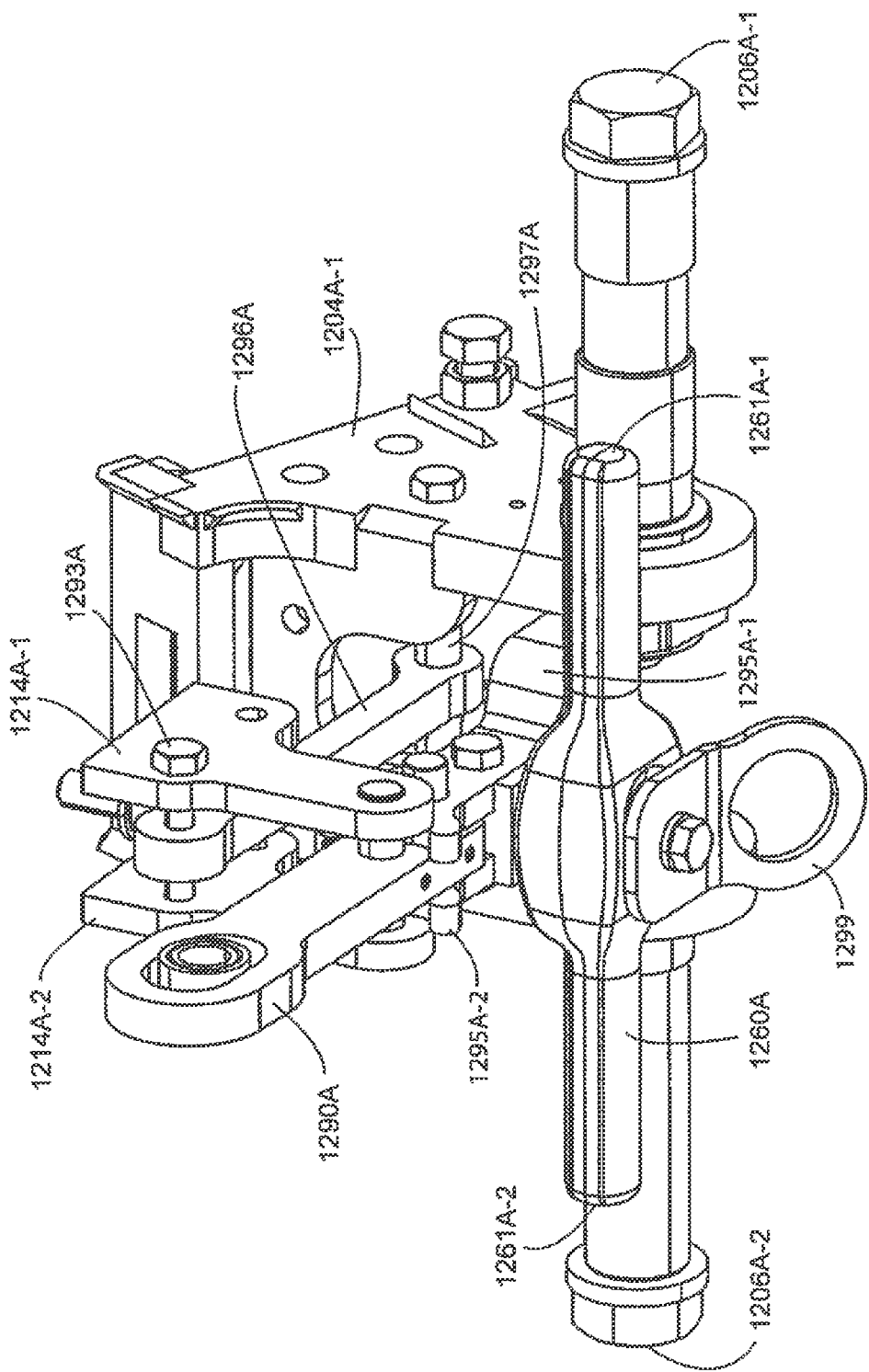
FIG. 40 is a bottom perspective view of the trench closing assembly of FIG. 39.

As viewed in FIGS. 39 and 40, extending through first bracket 1204A-1 is pivot 1206A-1 transverse to the direction of travel. Extending through second bracket 1204A-2 is pivot 1206A-2 transverse to the direction of travel. Pivots 1206A-1 and 1206A-2 allow for pivoting of swing arms 1220A-1 and 1220A-2, respectively, first arm 1251A-1 and second arm 1251A-2, respectively, and arms 1295A-1 and 1295A-2, respectively.

Swing arms 1220A-1 and 1220A-2 are pivotably disposed about pivots 1206A-1 and 1206A-2, respectively. Swing arms 1220A-1 and 1220A-2 are adjustable transverse to the direction of travel along pivot 1206A-1 and pivot 1206A-2, respectively. This allows for changing the width of spacing of closing wheels 254.

Figure 38B:
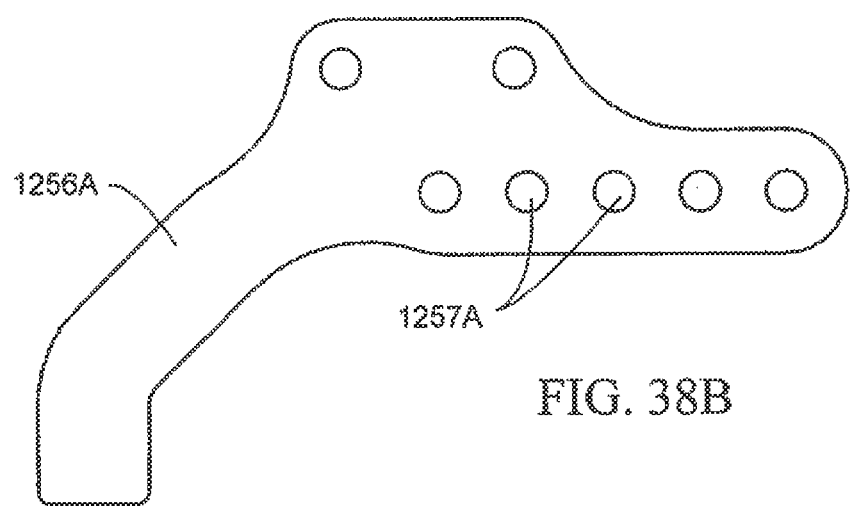
FIG. 38B is a perspective view of the press wheel frame.
Figure 38A:
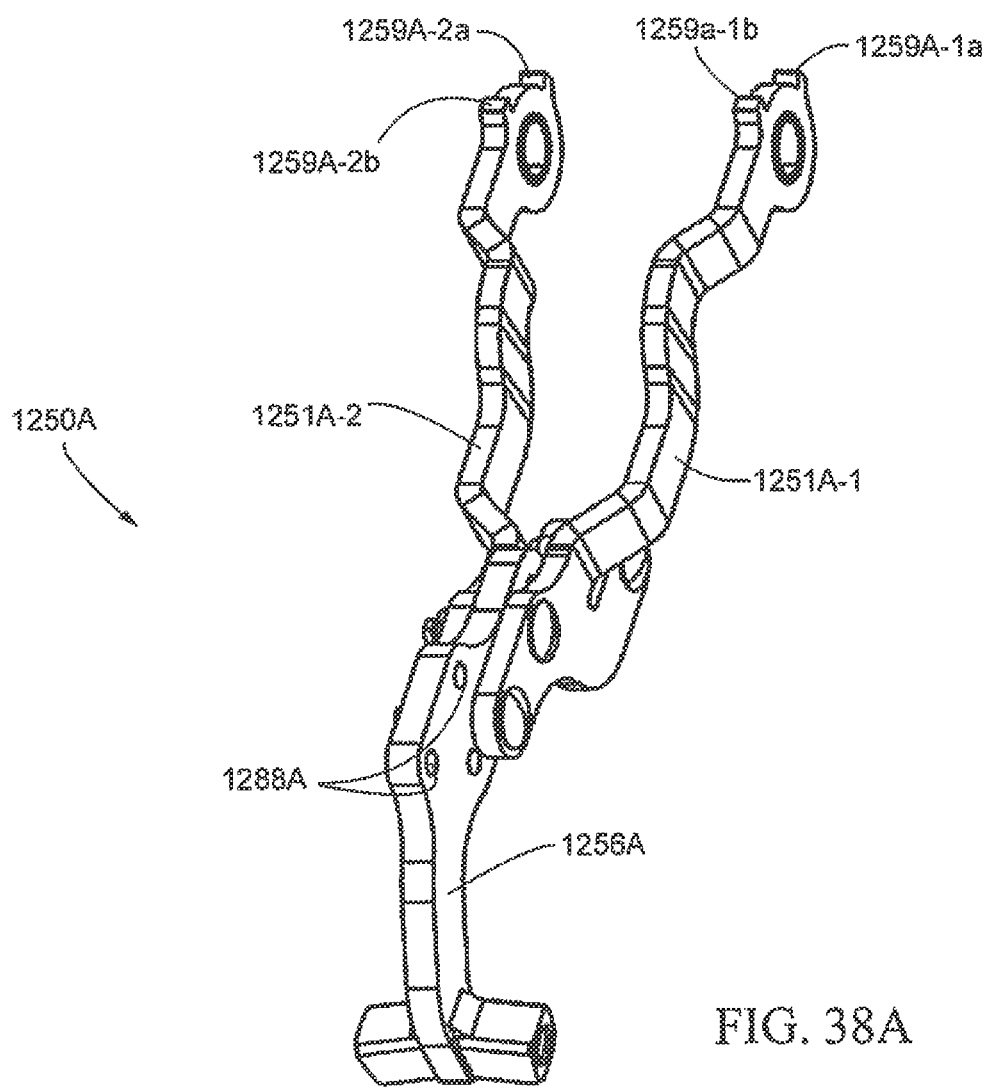
FIG. 38A is a side elevation view of the mounting arm.

Illustrated in FIG. 38A, press wheel frame 1250A has a first arm 1251A-1 and a second arm 1251A-2. First arm 1251A-1 and second arm 1251A-2 pivot about pivots 1206A-1 and 1206A-2, respectively. Mounting arm 1256A is connected to both first arm 1251A-1 and second arm 1251A-2. First arm 1251A-1 can optionally include stops 1259A-1a and 1259A-1b to limit the rotation of first arm 1251A-1 about pivot 1206A-1. Second arm 1251A-2 can optionally include stops 1259A-2a and 1259A-2b to limit the rotation of second arm 1251A-2 about pivot 1206A-2 at stops 1229A-1 and 1229A-2, respectively. As seen in FIG. 38B, mounting arm 1256A can have a plurality of holes 1257A to provide adjustment for the distance of press wheels 255A along the direction of travel.

Figure 32:
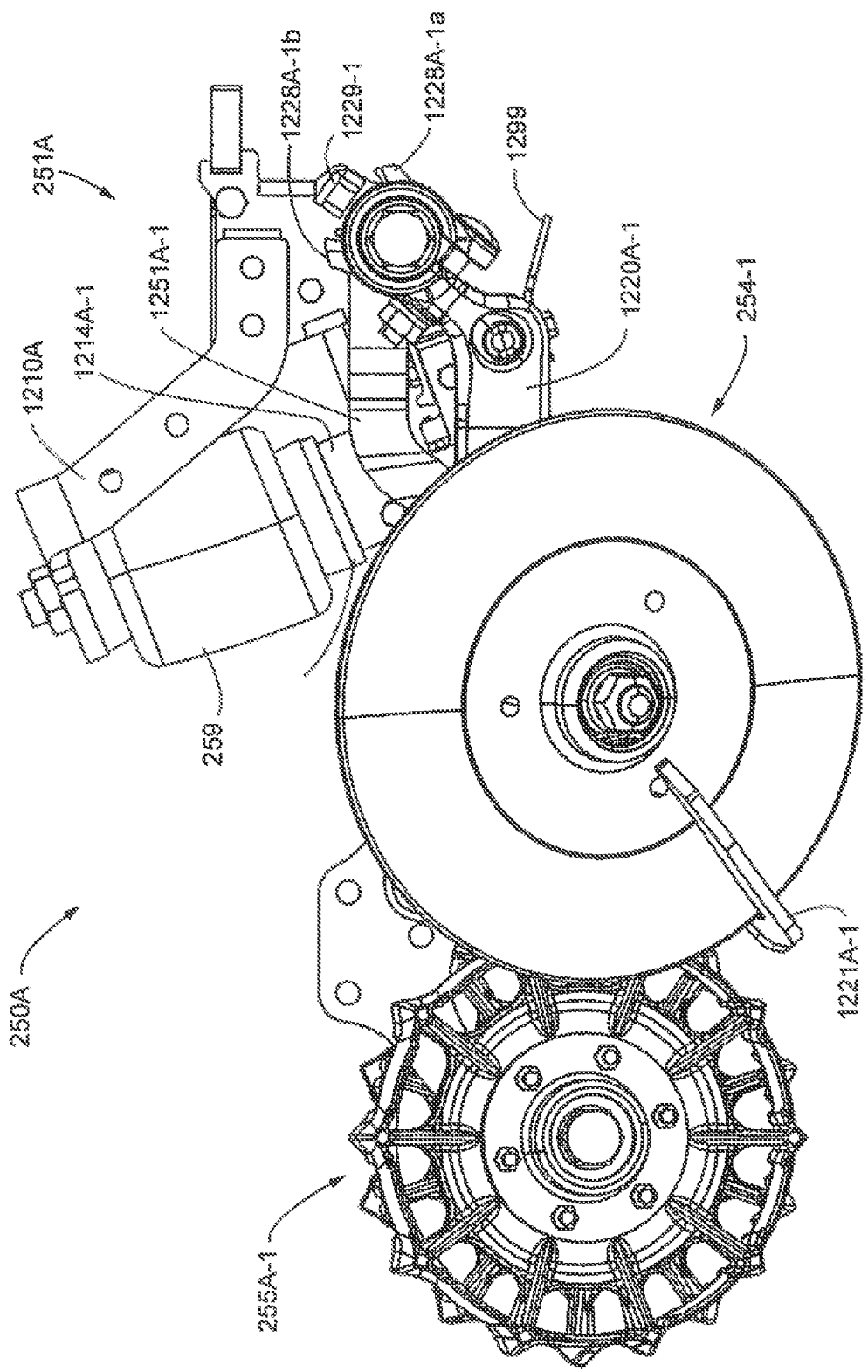
FIG. 32 is a side elevation view of the trench closing assembly of FIG. 29.
Figure 33:
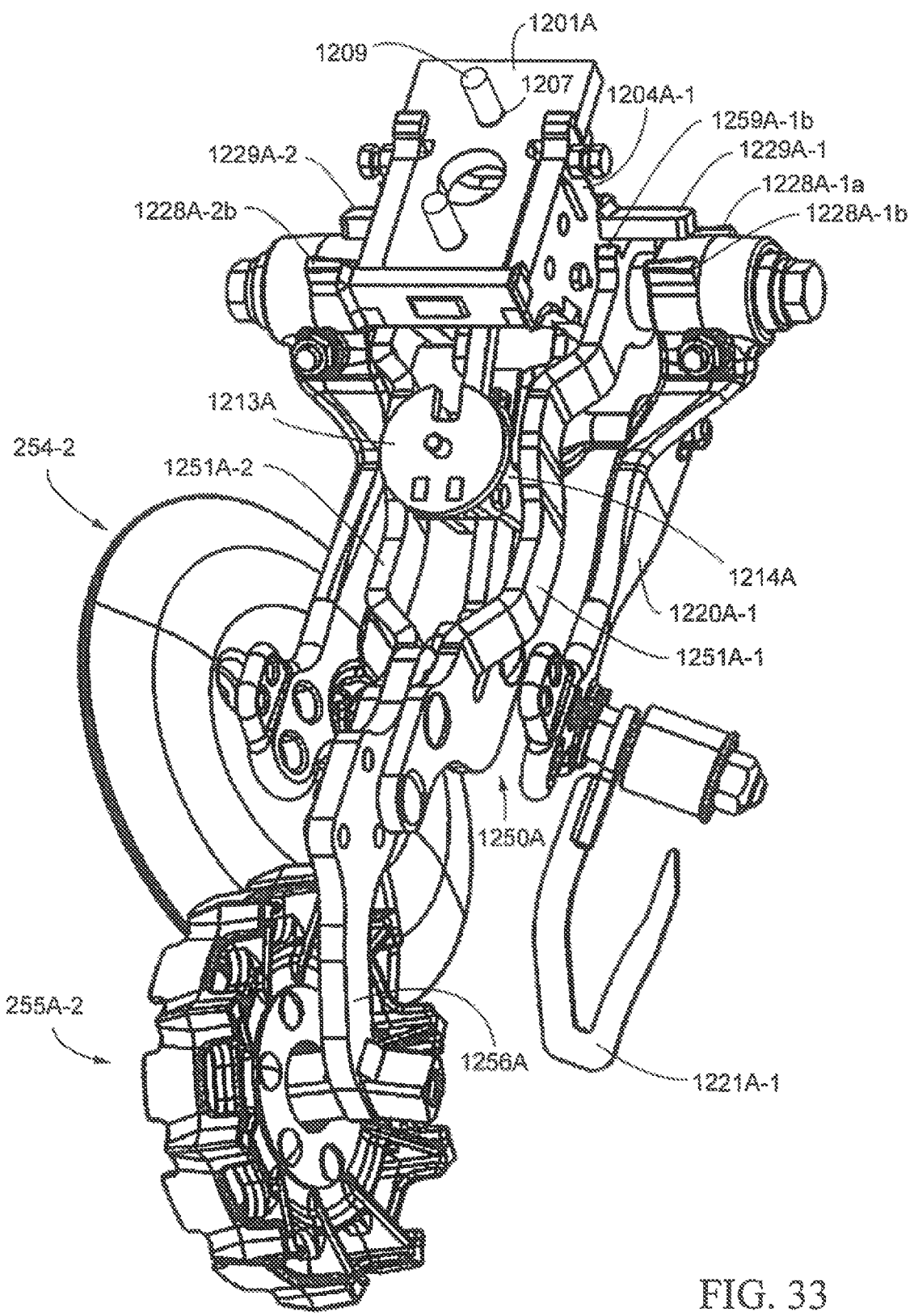
FIG. 33 is a perspective view of the trench closing assembly of FIG. 29 with the actuator and a wheel removed.
Figure 34:
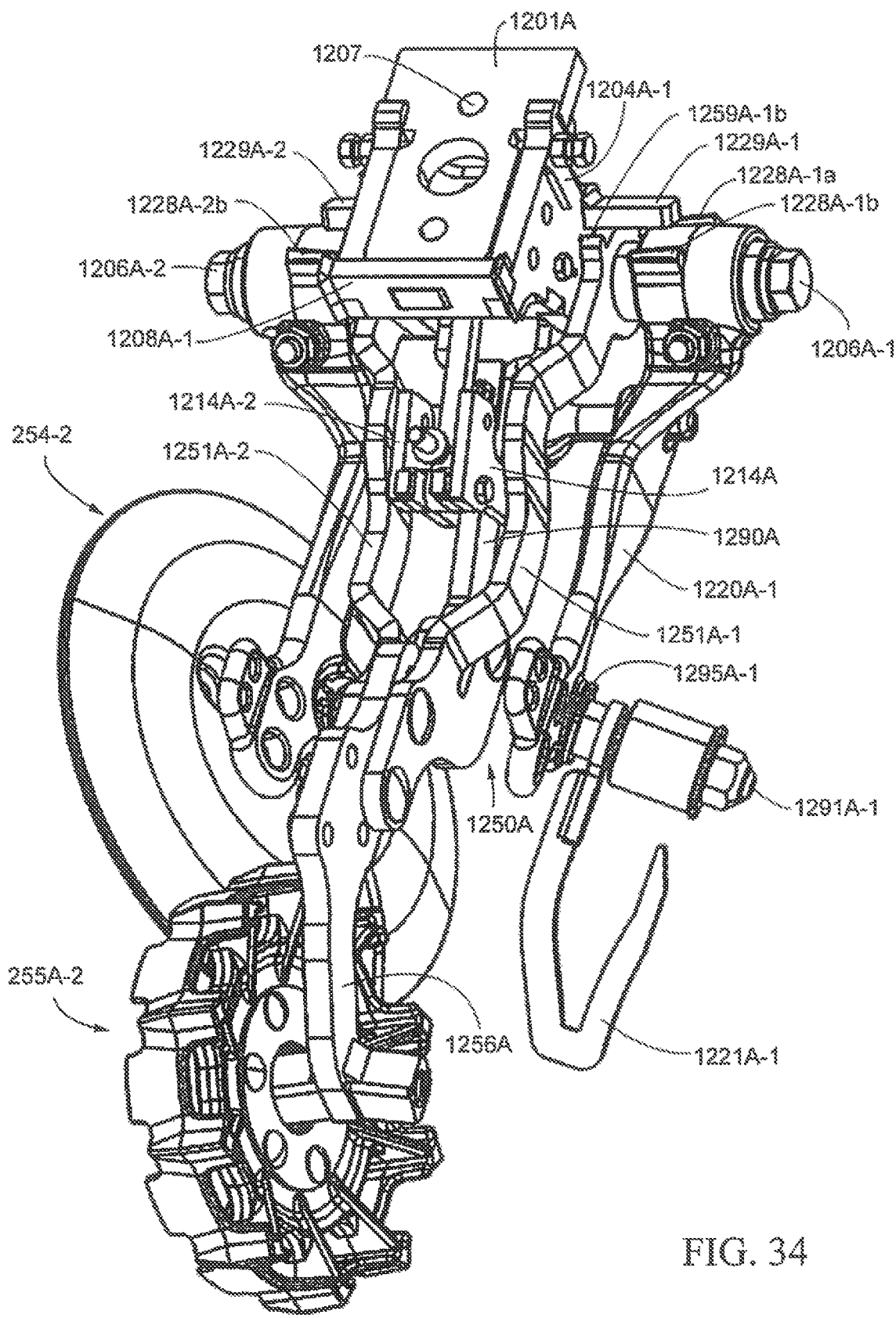
FIG. 34 is a perspective view of the trench closing assembly of FIG. 33 with the actuator base removed.
Figure 35:
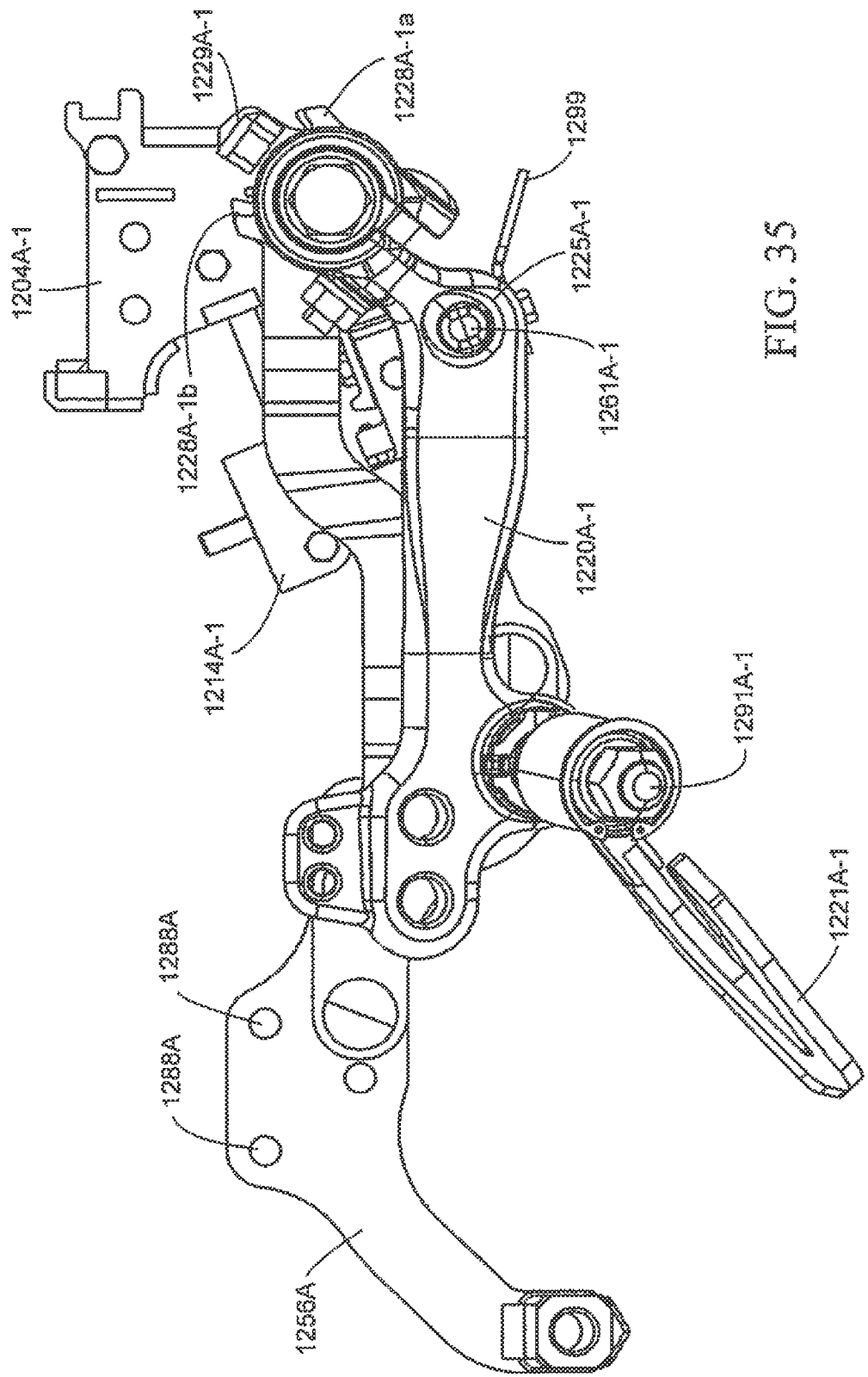
FIG. 35 is a side elevation view of the trench closing assembly of FIG. 34 with the wheels removed.
Figure 36:
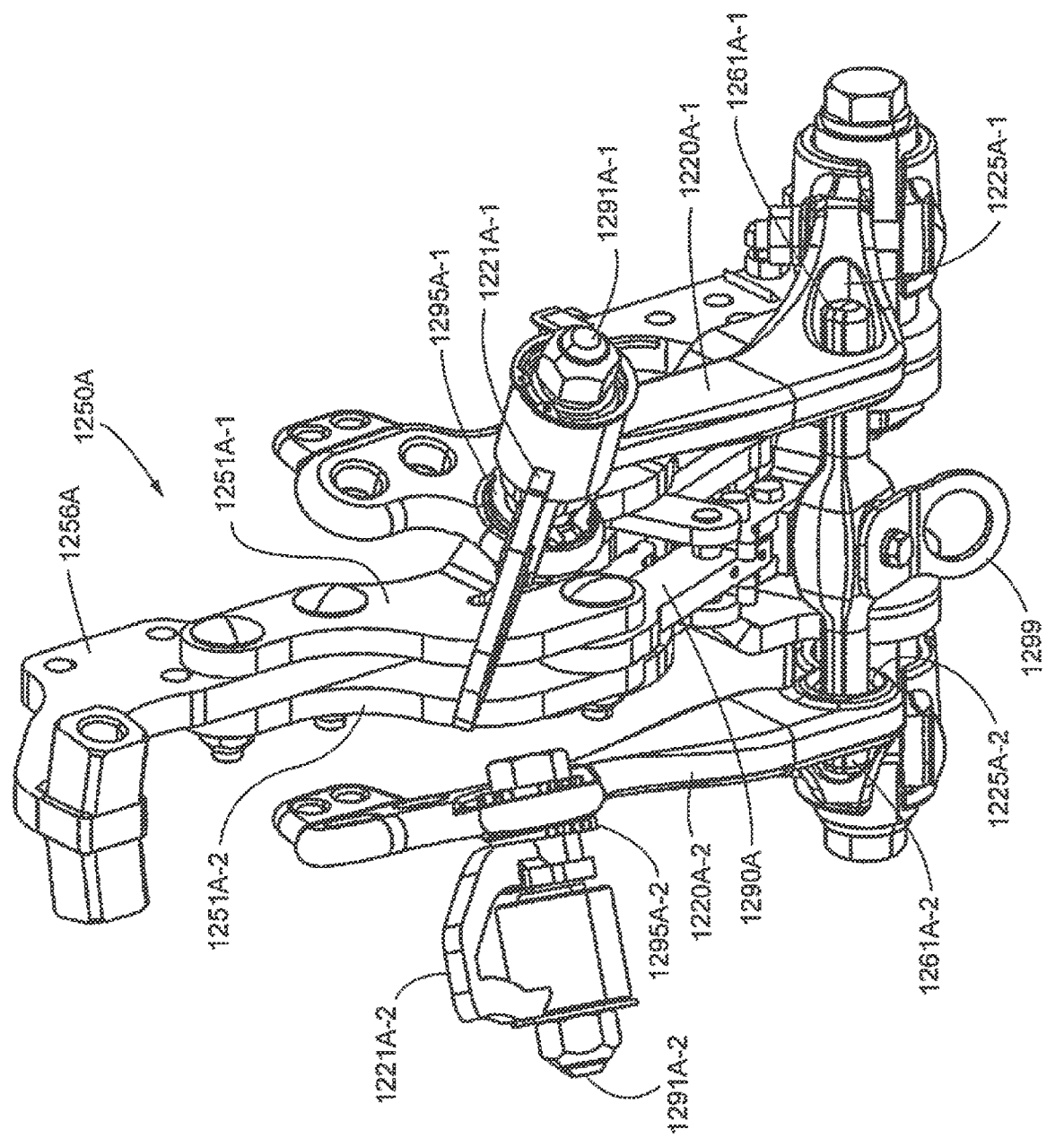
FIG. 36 is a bottom perspective view of the trench closing assembly of FIG. 35.
Figure 37:
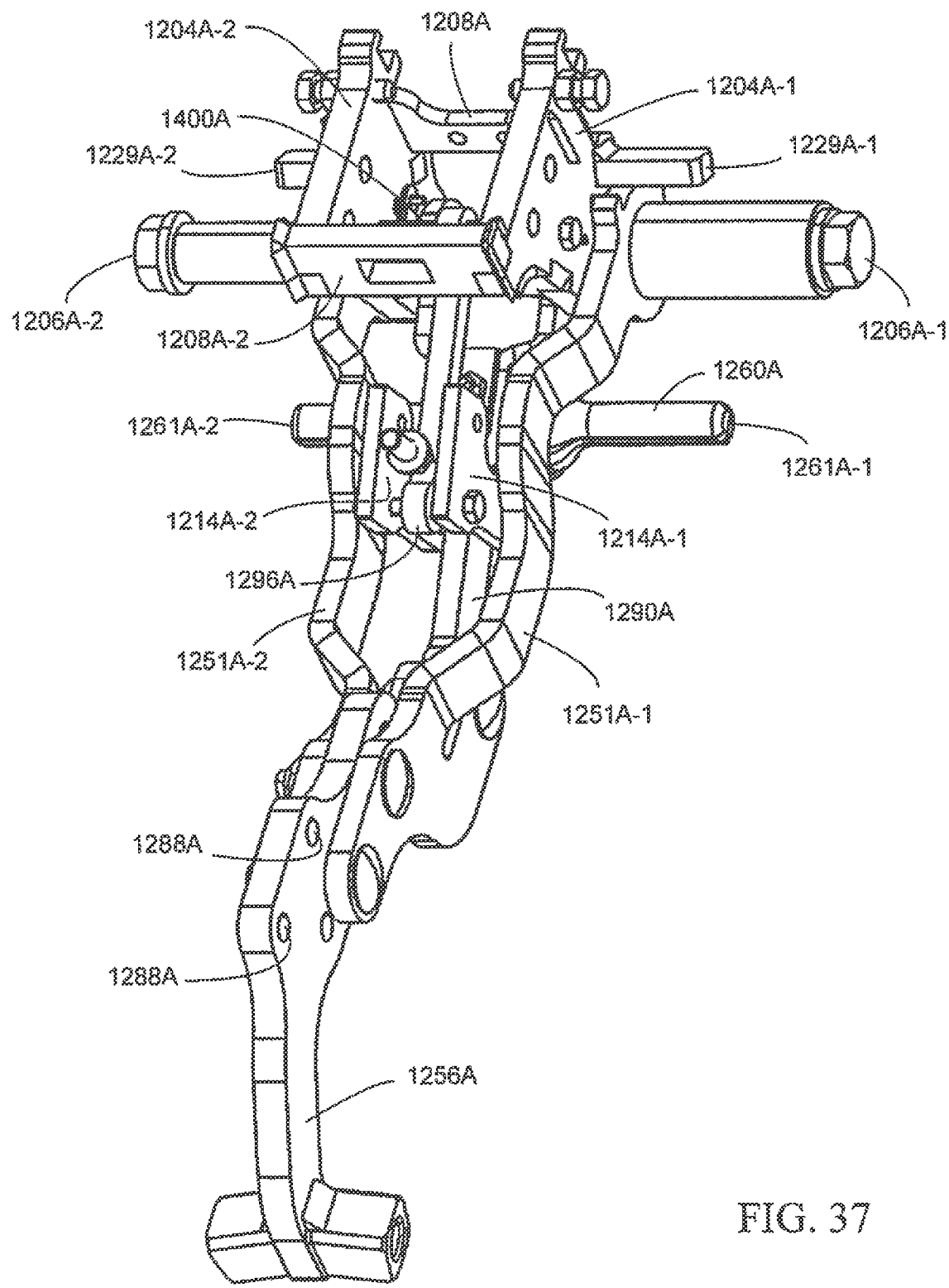
FIG. 37 is a perspective view of the trench closing assembly of FIG. 35 with additional parts removed.

As viewed in FIGS. 39 to 43, also connected to press wheel frame 1250A is arm 1290A. Arm 1290A connects with brackets 1214A-1 and 1214A-2. Brackets 1214A-1 and 1214A-2 are connected to actuator base 1213A (as seen in FIGS. 32 and 33). As force is applied from actuator 259 through actuator base 1213A, force is applied to both the closing wheels 254 and press wheels 255A. Arm 1290A is also connected to arms 1295A-1 and 1295A-2. Arms 1295A-1 and 1295A-2 are disposed about pivots 1206A-1 and 1206A-2, respectively. Crossbar 1260A is connected to arms 1295A-1 and 1295A-2 and is disposed transverse to the direction of travel. As seen in FIG. 36, crossbar 1260A has a first end 1261A-1 disposed in opening 1225A-1 of swing arm 1220A-1 and a second end 1261A-2 disposed in opening 1225A-2 of swing arm 120A-2.

Figure 41:
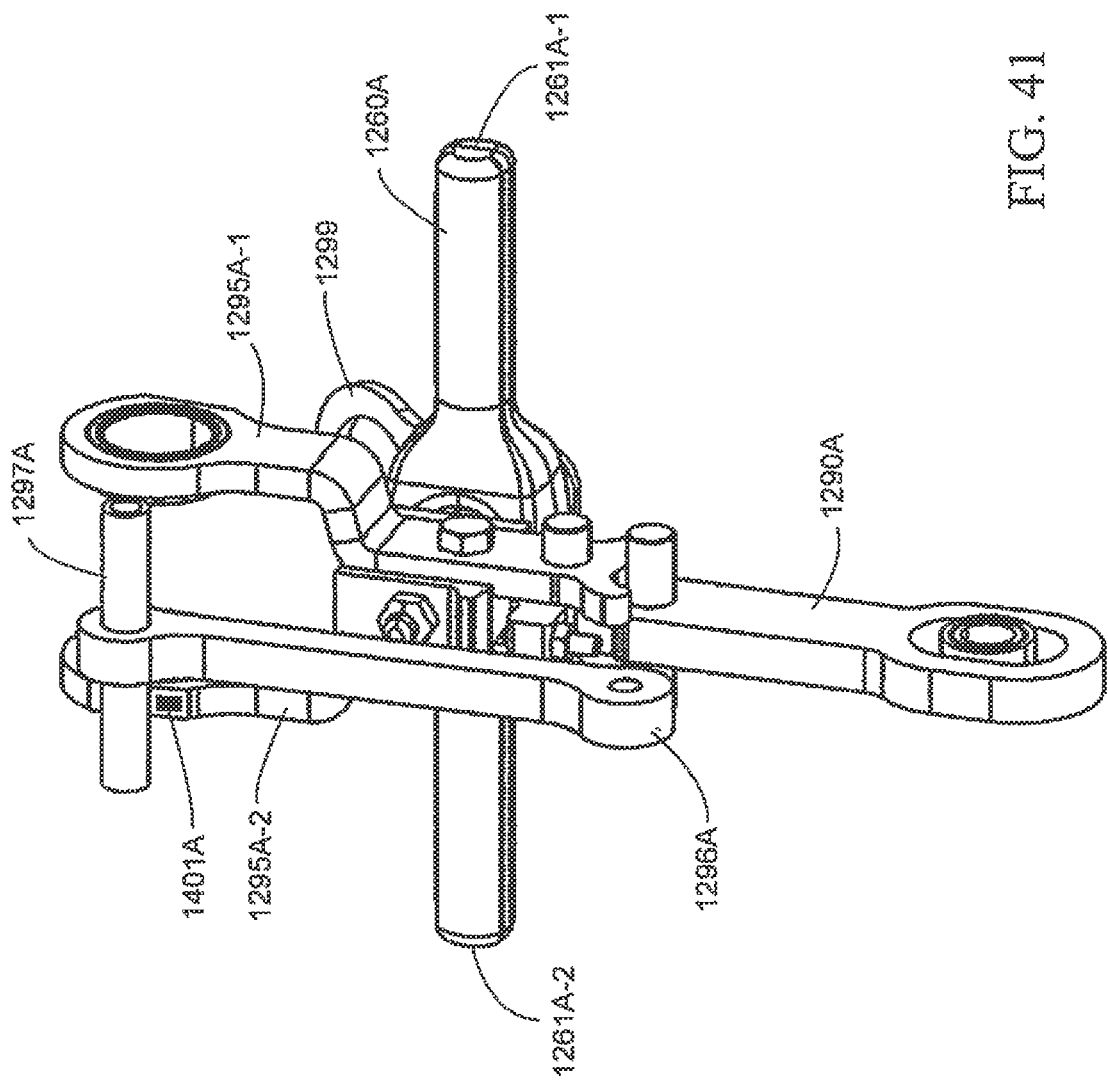
FIG. 41 is a perspective view of the trench closing assembly of FIG. 39 with additional parts removed.
Figure 42:
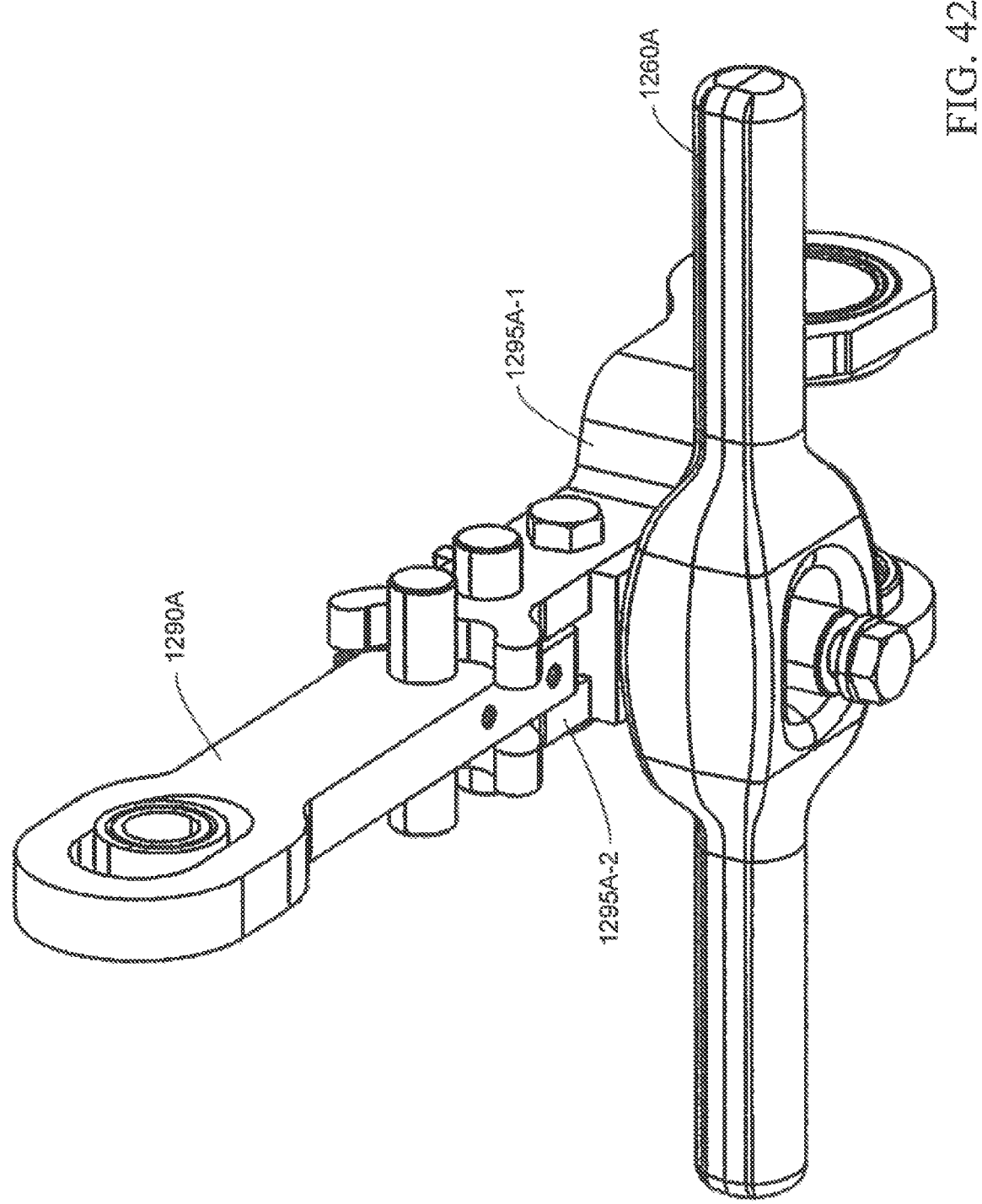
FIG. 42 is a bottom perspective view of the crossbar connected to the arms.
Figure 43:
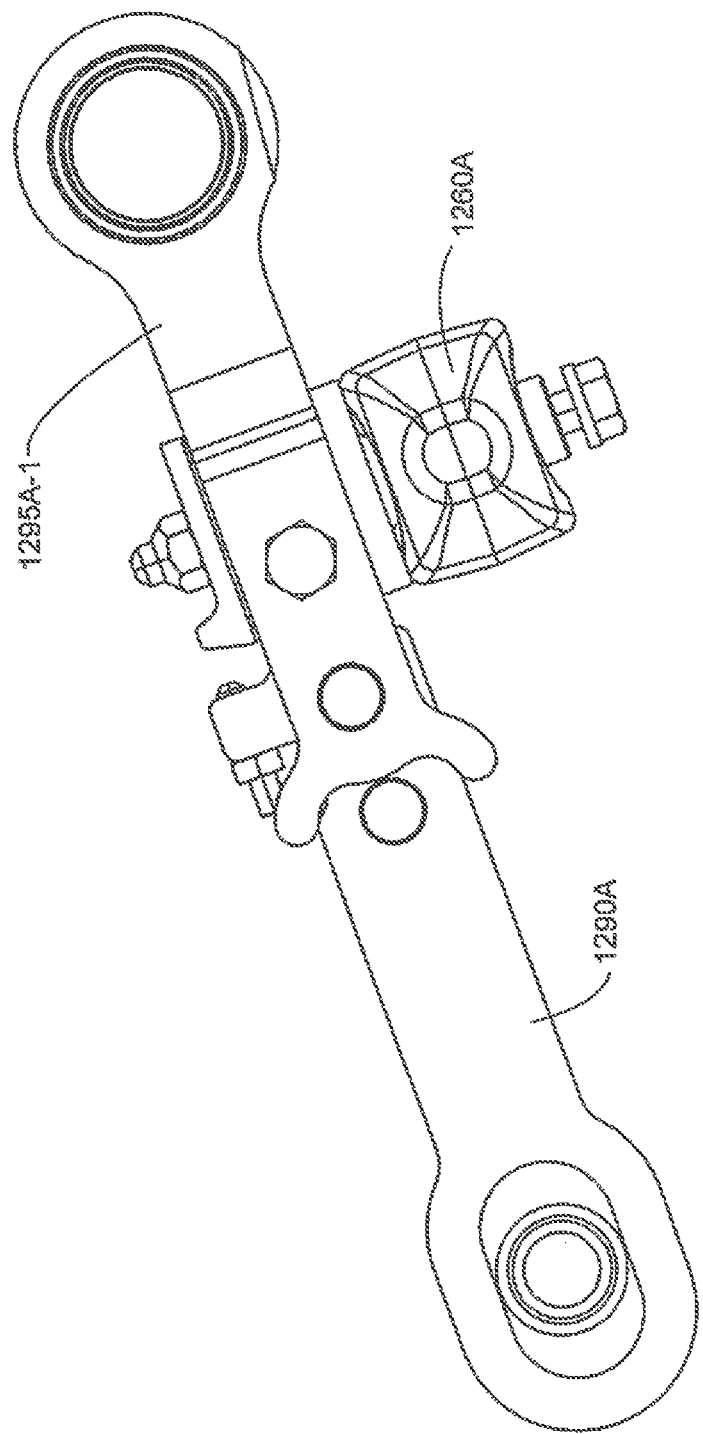
FIG. 43 is a side elevation view of FIG. 42.

In another embodiment, an angle sensor, which is described in International Publication No. WO2017/197274 as angle sensor 3006, or in International Publication No. WO2014/066650 as angle sensor 280, can be included. As illustrated in FIGS. 39 and 41, the angle sensor is a Hall effect sensor 1400A and a magnet 1401A. While it can be installed on either the right or left side, Hall effect sensor 1400A is illustrated as being disposed on second bracket 1204A-2 adjacent to arm 1295A-2. A magnet 1401A is disposed on arm 1295A-2. In this embodiment, the angular rotation of arm 1295A-2, which is connected to the entire assembly of the closing wheels 254 and press wheels 255A, is measured as the average of both closing wheels 254 and both press wheels 255A.

Optionally, a bracket 1299 can be included to route a line (not shown) through. The line could be for applying material into the furrow, such as fertilizer, herbicide, or insecticide. Bracket 1299 can be connected to crossbar 1260A as seen in FIG. 40.

As seen in FIG. 41, there is an arm 1296A pivotally disposed between brackets 1214A-1 and 1214A-2 about pivot 1293A and between first bracket 1204A-1 and second bracket 1204A-2 about pivot 1295A.

Optionally, a trailing arm (not shown), such as the bracket 132 and flap 130 from International Publication No. WO2014/066650, can be included. The optional trailing arm can be connected to mounting arm 1256A at connection 1288A.

Optionally, toe angle shim 1290A (1290A-1 and 1290A-2) can be included to change the toe angle of closing wheels 254A (254A-1, 254A-2) by being disposed over axle 1291A (1291A-1, 1291A-2), respectively.

The trench closing assembly 250 or 250A can be a single stage by not including press wheels 255, 255A and the associated press wheel frame 1250, 1250A.

In any of the embodiments, the distribution of force between the closing wheels 254 and press wheels 255 can be adjusted. In some embodiments, 80% of the force applied by actuator 259 is applied to the closing wheels 254 and 20% to the press wheels 255. In another embodiment, 100% of the force can be applied to the closing wheels 254.

Figures 47, 48:
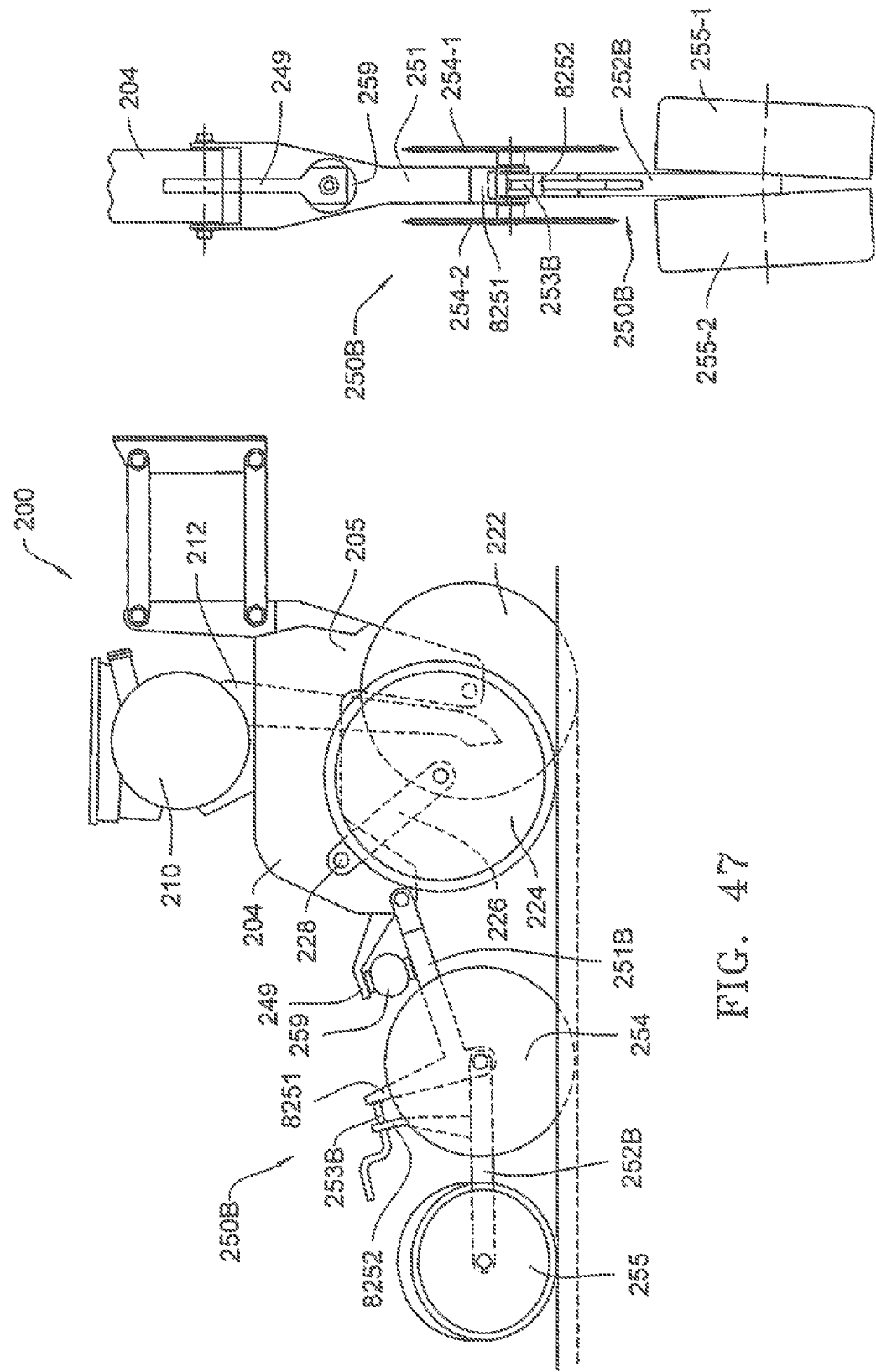
FIG. 47 is a side elevation view of a trench closing assembly with adjustable depth according to one embodiment.
FIG. 48 is a top plan view of the trench closing assembly of FIG. 47.

FIGS. 47 and 48 illustrate a trench closing assembly 250B according to another embodiment. In this embodiment, trench closing assembly 250B has a main frame 251B that is pivotably connected to row unit 200. Disposed on row unit frame 204 is bracket 249 that extends over main frame 251B. Disposed between bracket 249 and main frame 251B is actuator 259 to apply a variable force to trench closing assembly 250B. Closing wheels 254 (254-1 and 254-2) are disposed on main frame 251B. Pivotably connected to main frame 251B is secondary frame 252B. Secondary wheels 255 (255-1, 255-2), such as press wheels, are disposed on secondary frame 252B. Extending upward from main frame 251B is bracket 8251, and extending upward from secondary frame 252B is bracket 8252. Connecting brackets 8251 and 8252 is depth adjustor 253B. The relative angle between main frame 251B and secondary frame 252B is adjusted with depth adjustor 253B. This allows secondary wheels 255 to act as gauge wheels for closing wheels 254.

FIGS. 50-63 illustrate a trench closing assembly 250C according to another embodiment. In this embodiment, trench closing assembly 250C has a main frame 251C that is pivotably connected to row unit 200. Trench closing assembly 250C has a frame 251C, an actuator 259, a pair of closing wheels 254-1, 254-2, and optionally, a press wheel 255C. As illustrated, the press wheel 255C may comprise a pair of press wheels 255C-1, 255C-2, but a single press wheel (not shown) may be utilized. Actuator 259 can apply one force to frame 251C, and this force can be divided between the closing wheels 254 and the press wheel 255C.

Figure 50:
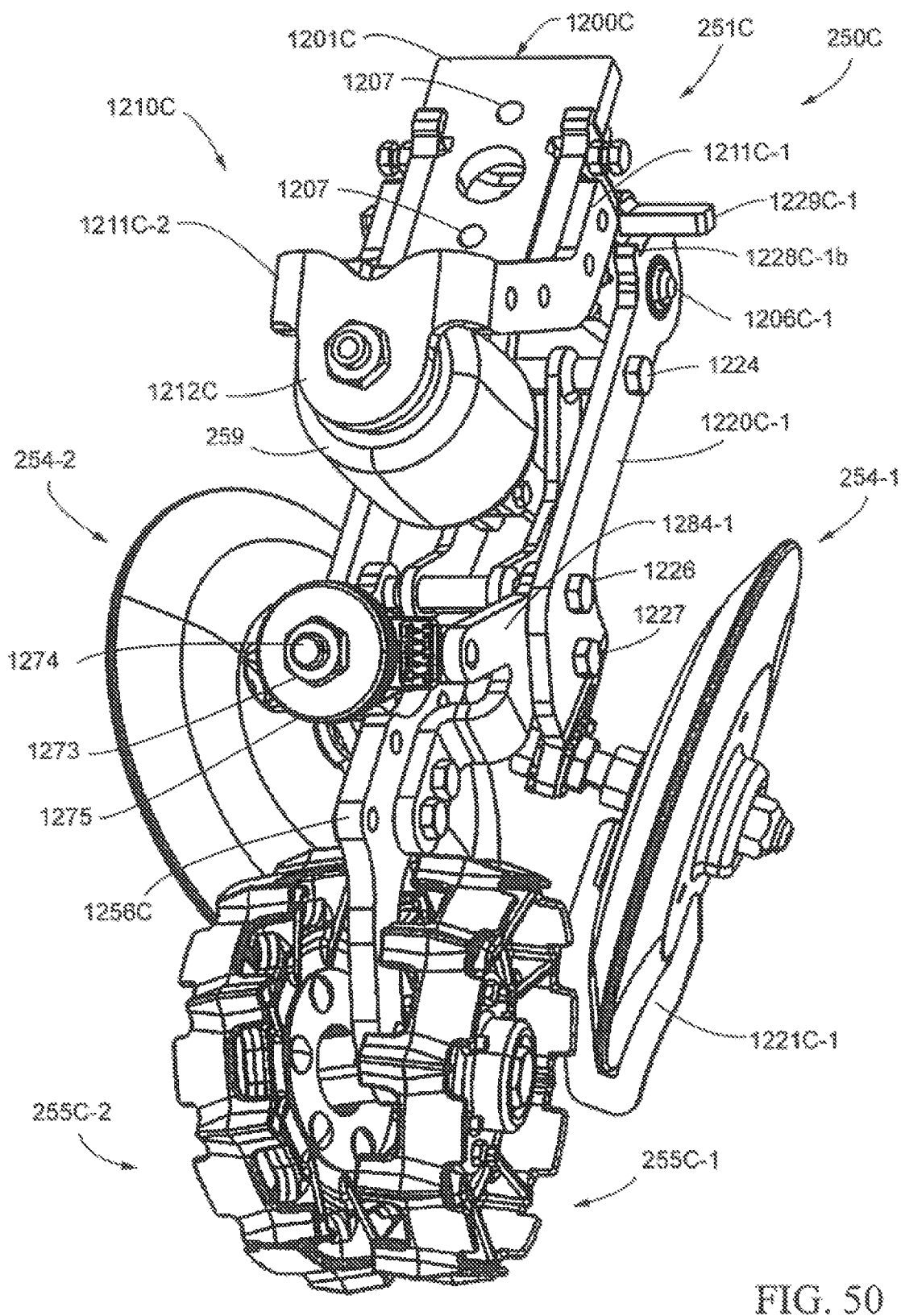
FIG. 50 is a perspective view of an embodiment of a trench closing assembly.
Figure 51:
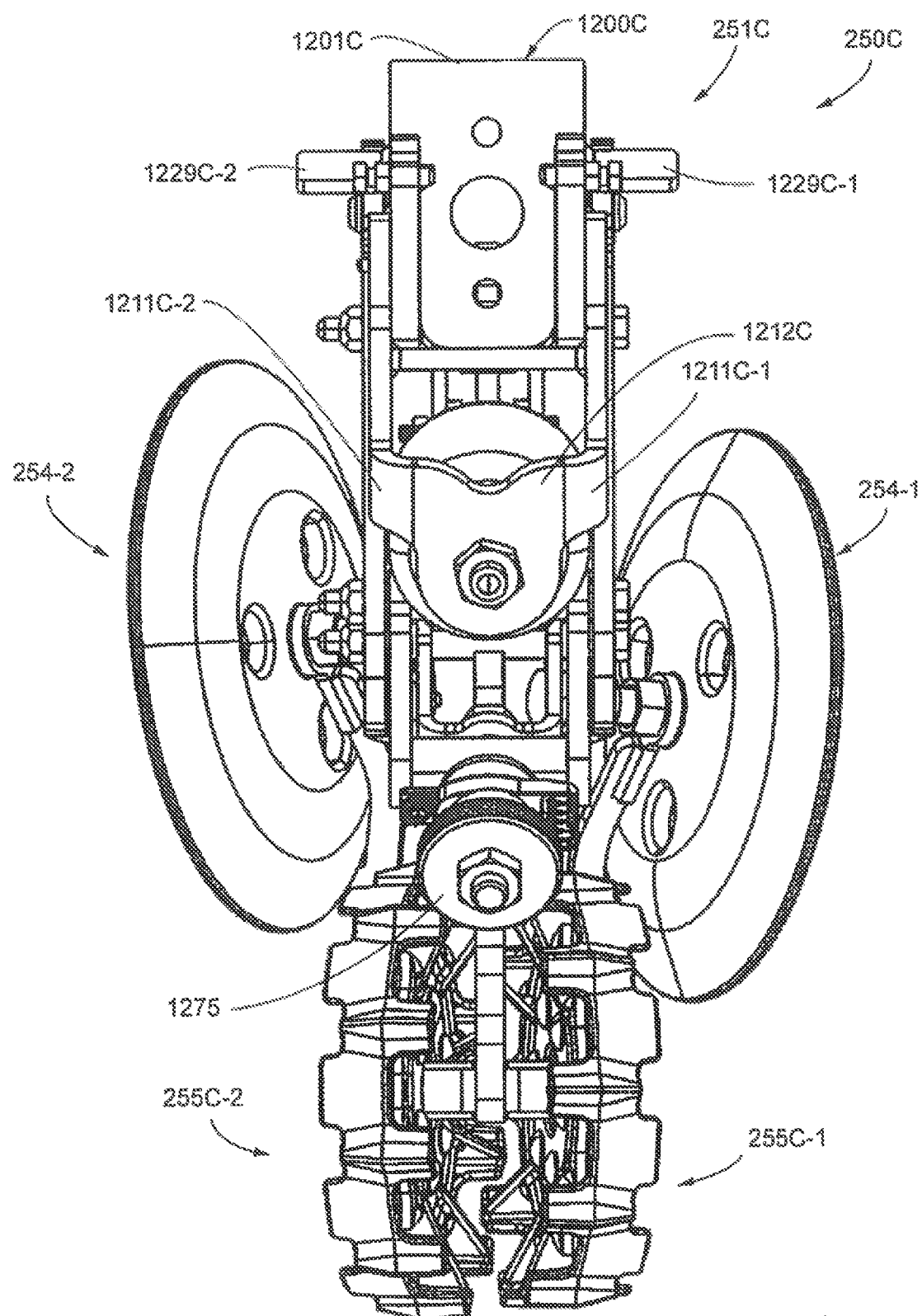
FIG. 51 is a top plan view of the trench closing assembly of FIG. 50.
Figure 52:
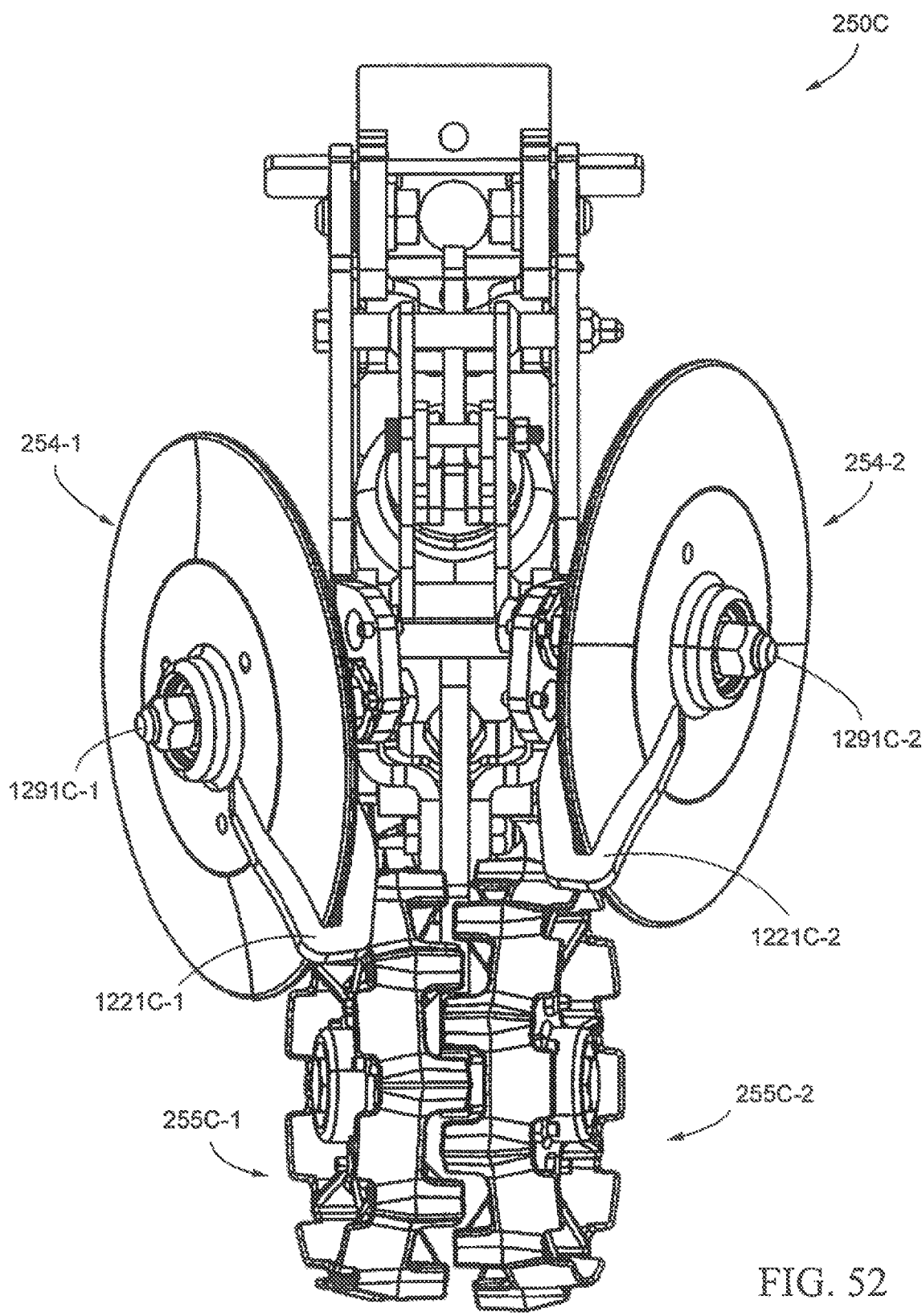
FIG. 52 is a bottom plan view of the trench closing assembly of FIG. 50.
Figure 53:
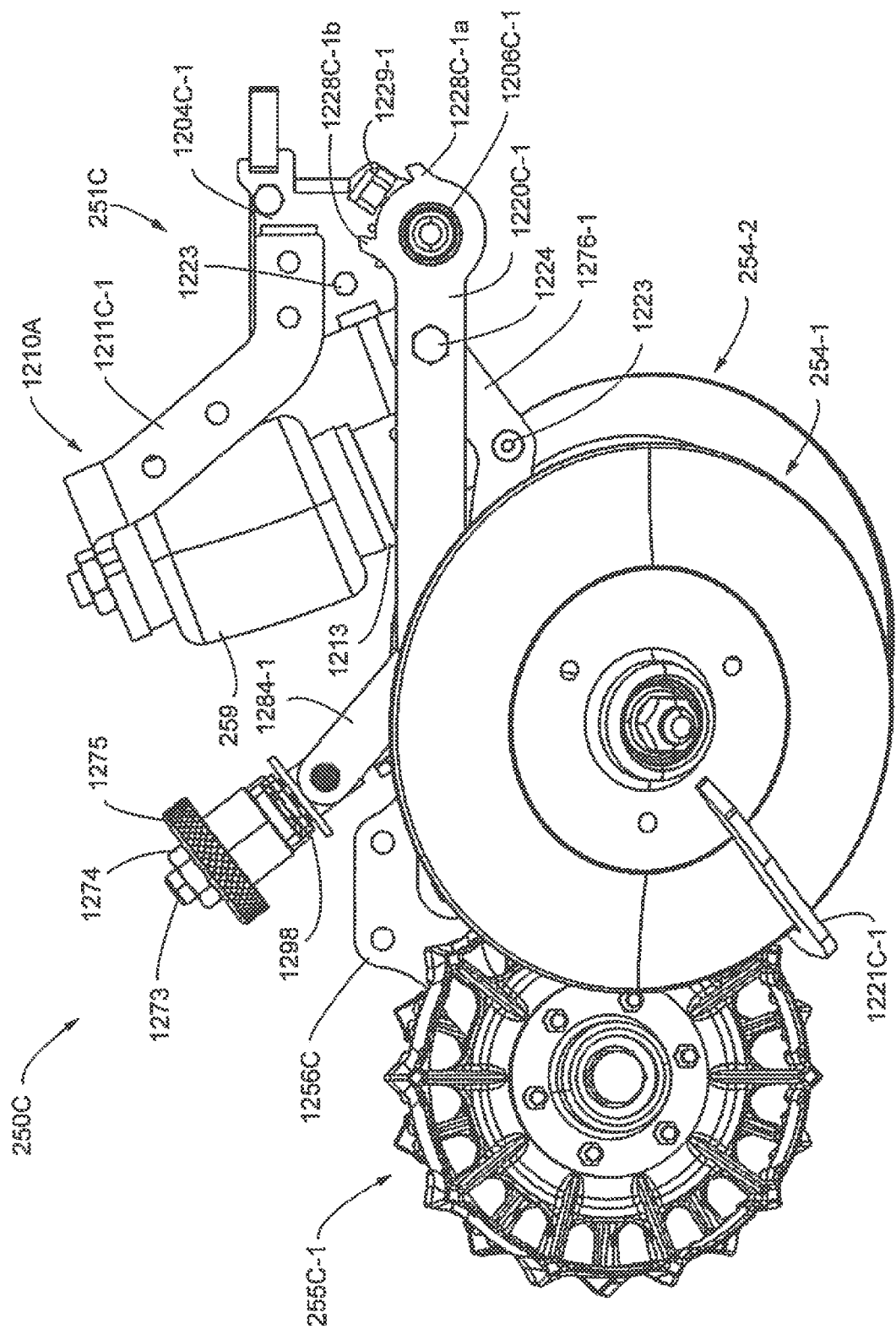
FIG. 53 is a side elevation view of the trench closing assembly of FIG. 50.
Figure 54:
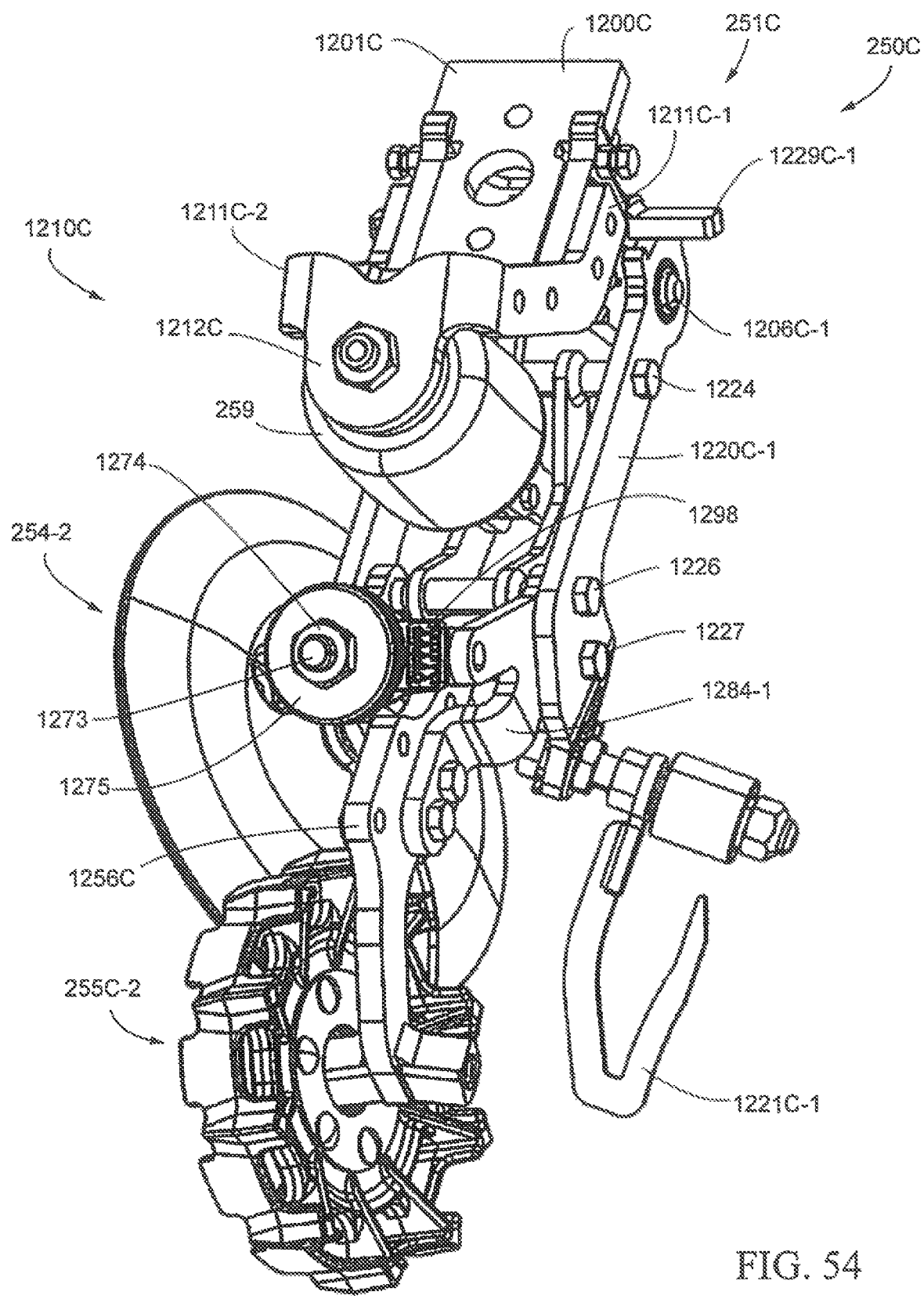
FIG. 54 is a perspective view of the trench closing assembly of FIG. 50 with a wheel removed.
Figure 55:
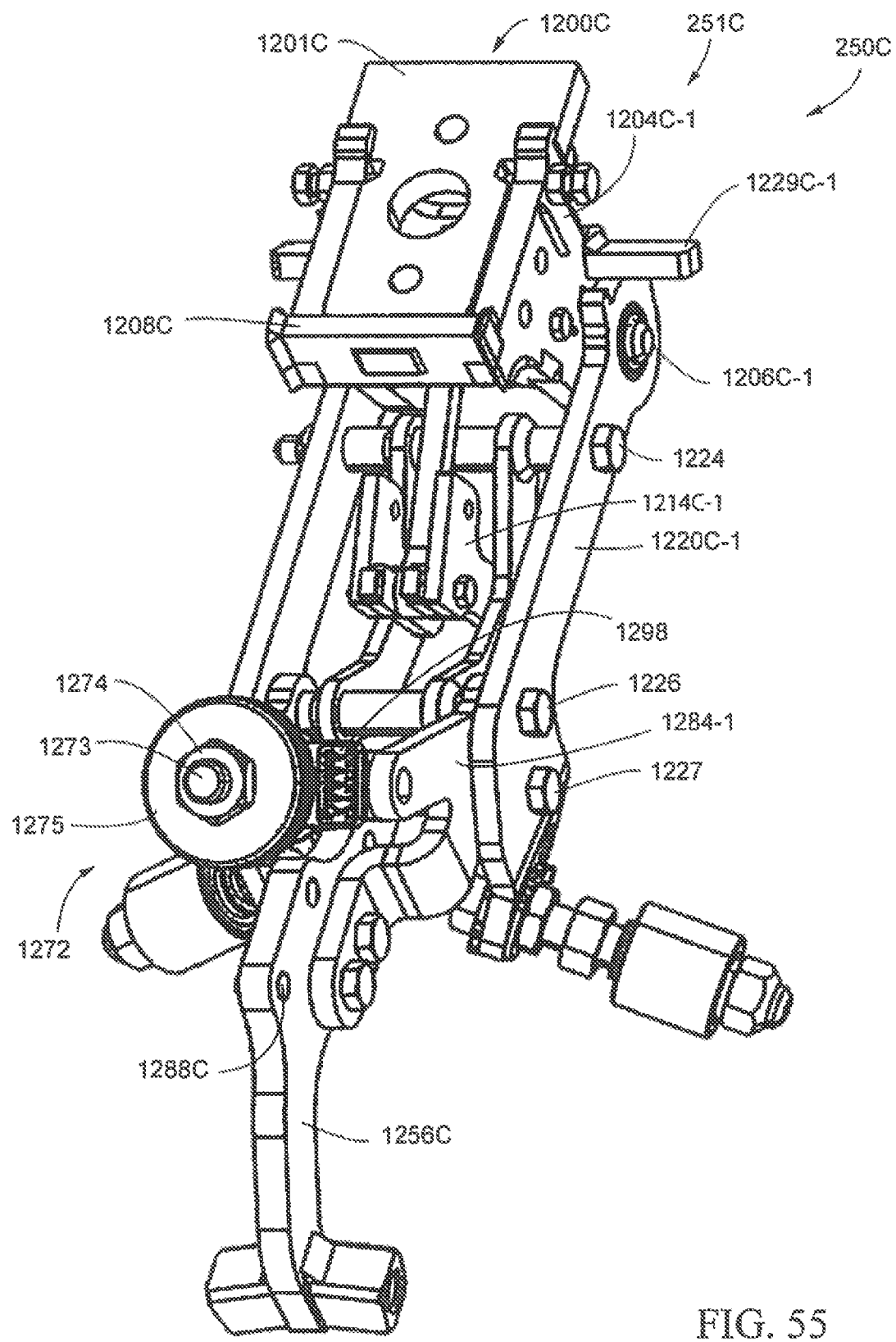
FIG. 55 is a perspective view of the trench closing assembly of FIG. 50 with the wheels, scrapper, and actuator removed.
Figure 56:
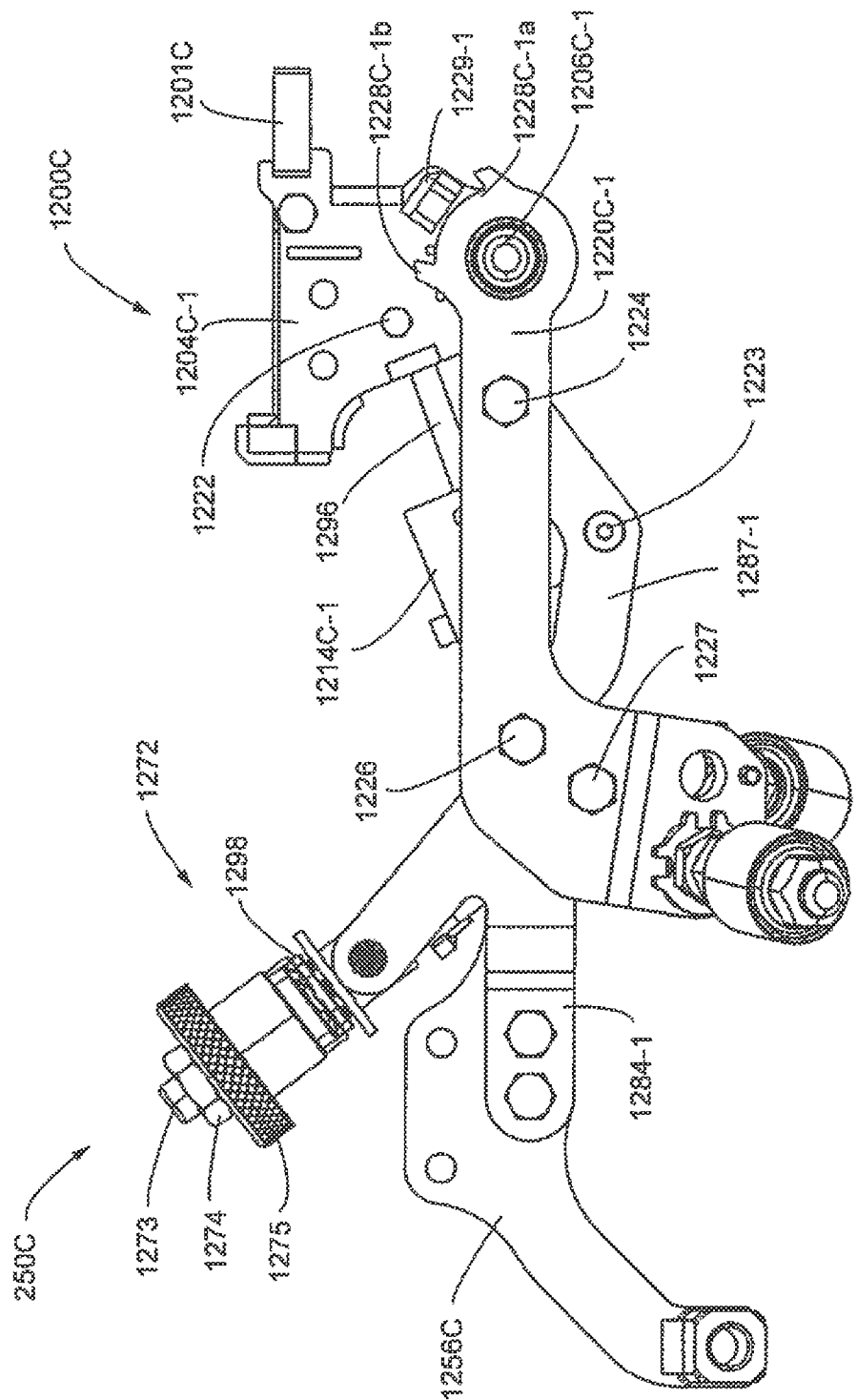
FIG. 56 is a side elevation view of the trench closing assembly of FIG. 55.
Figure 57:
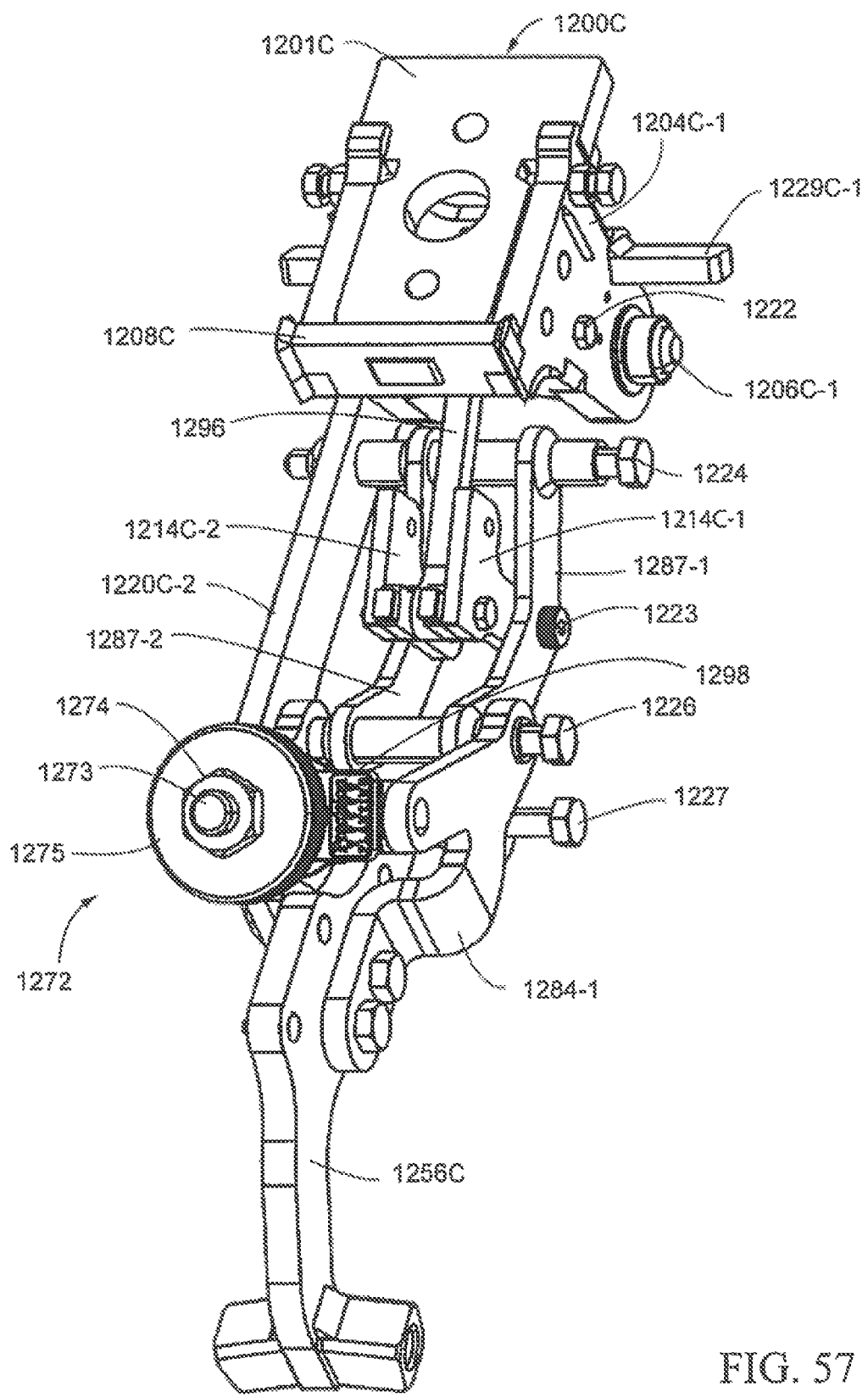
FIG. 57 is a perspective view of the trench closing assembly of FIG. 55 with an arm removed.
Figure 58:
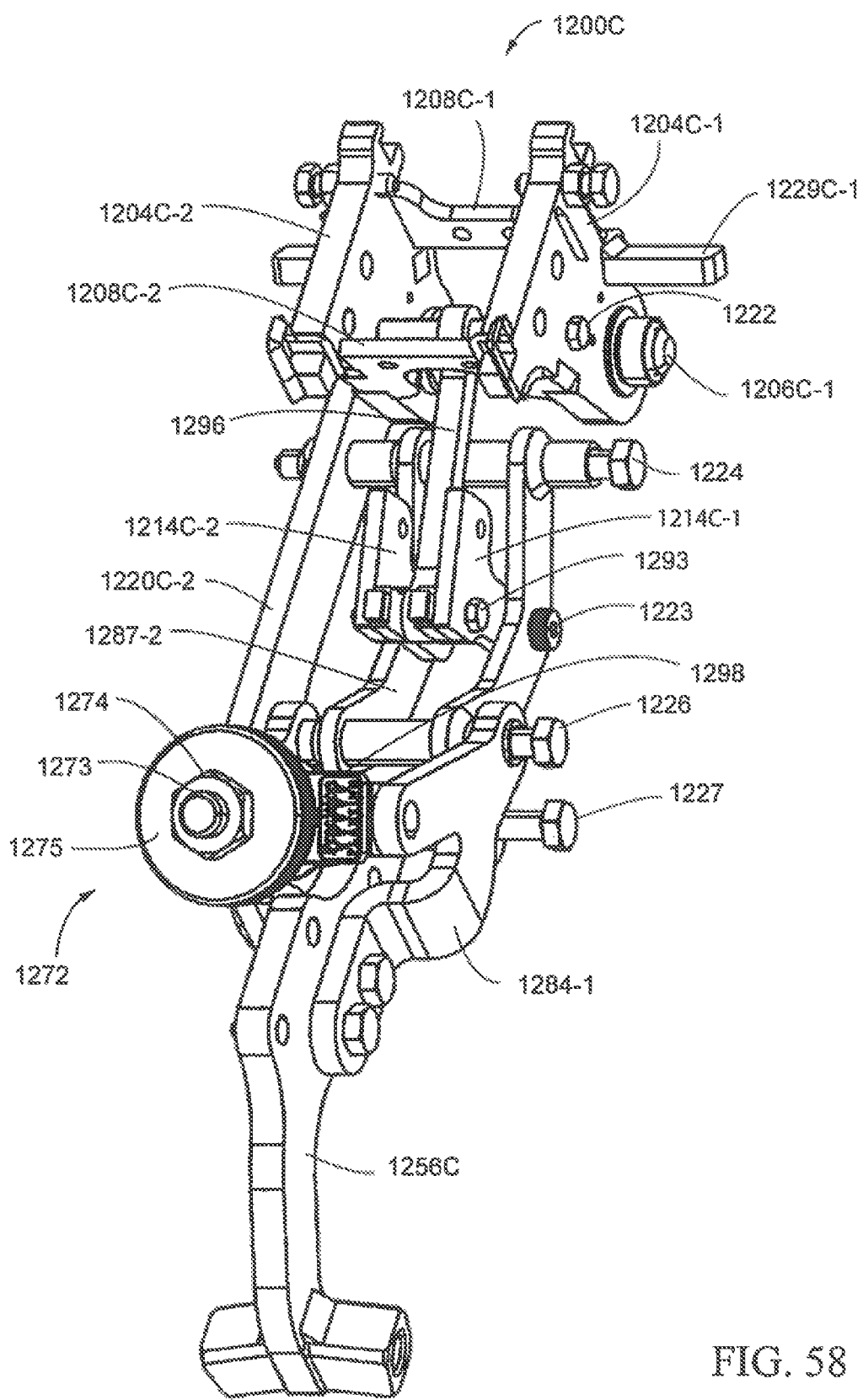
FIG. 58 is a perspective view of the trench closing assembly of FIG. 57 with the connection bracket removed.
Figure 59:
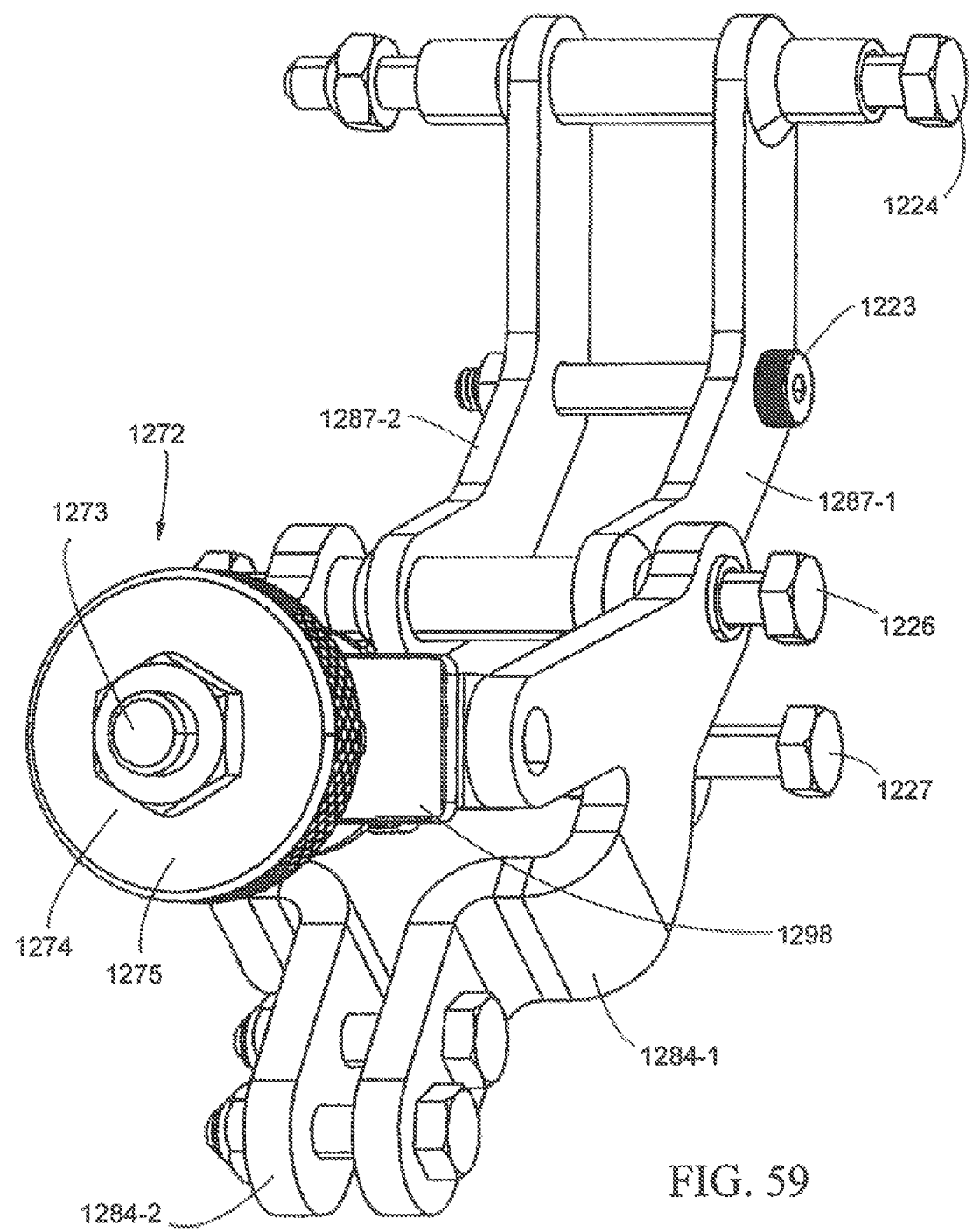
FIG. 59 is a perspective view of a portion of the trench closing assembly of FIG. 50.
Figure 60:
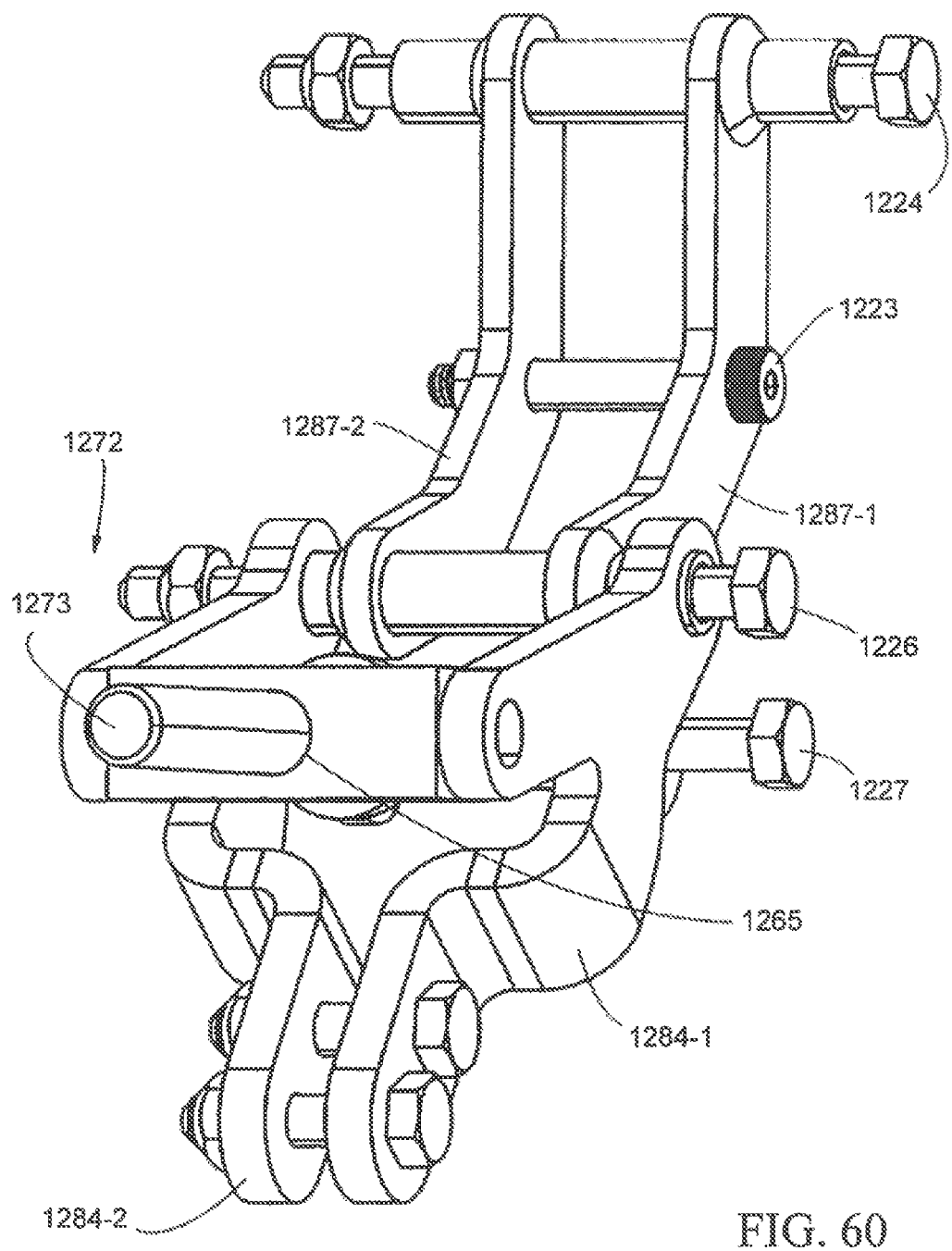
FIG. 60 is a perspective view of the trench closing assembly of FIG. 59 with the knob and force sensor removed.
Figure 65:
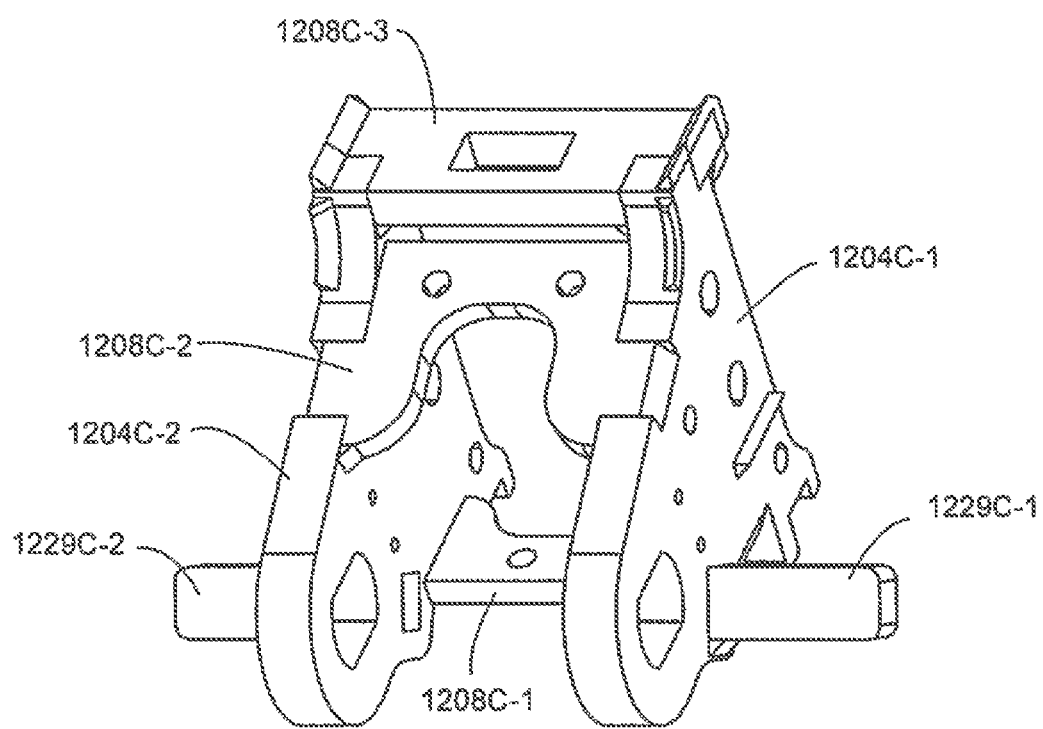
FIG. 65 is a perspective view of the connection bracket.

Referring to FIG. 50, frame 251C has a main frame 1200C having a connection bracket 1201C that is adapted to be connected to row unit 200. As in a previous embodiment, one or more bolts 1209 (FIG. 33) can extend through apertures 1207 in connection bracket 1201C for mounting the frame 251C to the row unit 200. Extending up from connection bracket 1201C is actuator bracket 1210C. In one embodiment, actuator bracket 1210C has a first bracket arm 1211C-1, a second bracket arm 1211C-2, and a cross connector 1212C connecting first bracket arm 1211C-1 and second bracket arm 1211C-2. Actuator bracket 1210C can be made from separate parts or as a single part. As best viewed in FIGS. 55, 58, and 65, extending downwardly from connection bracket 1201C are first bracket 1204C-1 and second bracket 1204C-2 with cross-braces 1208C-1, 1208C-2, and 1208C-3 extending first bracket 1204C-1 and second bracket 1204C-2. Extending outward, transverse to the direction of travel, are optional stops 1229C. Stop 1229C-1 is disposed on first bracket 1204C-1, and stop 1229C-2 is disposed on second bracket 1204C-2. Stop 1229C-1 cooperates with stops 1228C (1228C-1a and 1228C-1b) on first swing arm 1220C-1. Stop 1229C-2 cooperates with stops 1228C (1228C-2a and 1228C-2b) on second swing arm 1220C-2. The angle of rotation of swing arms 1220C can be limited.

Figure 61:
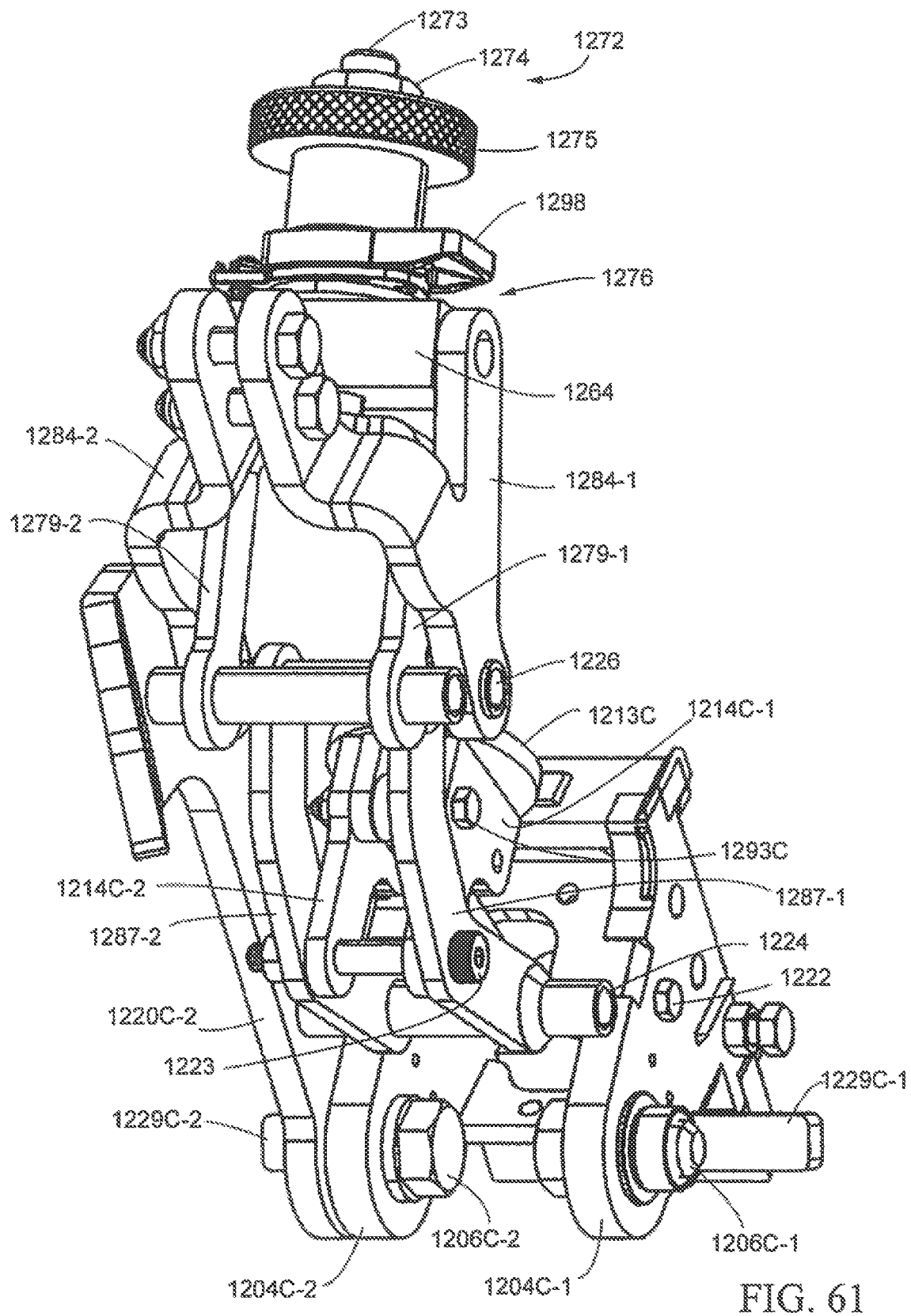
FIG. 61 is a perspective view of the trench closing assembly of FIG. 50 with parts removed for viewing.
Figure 62:
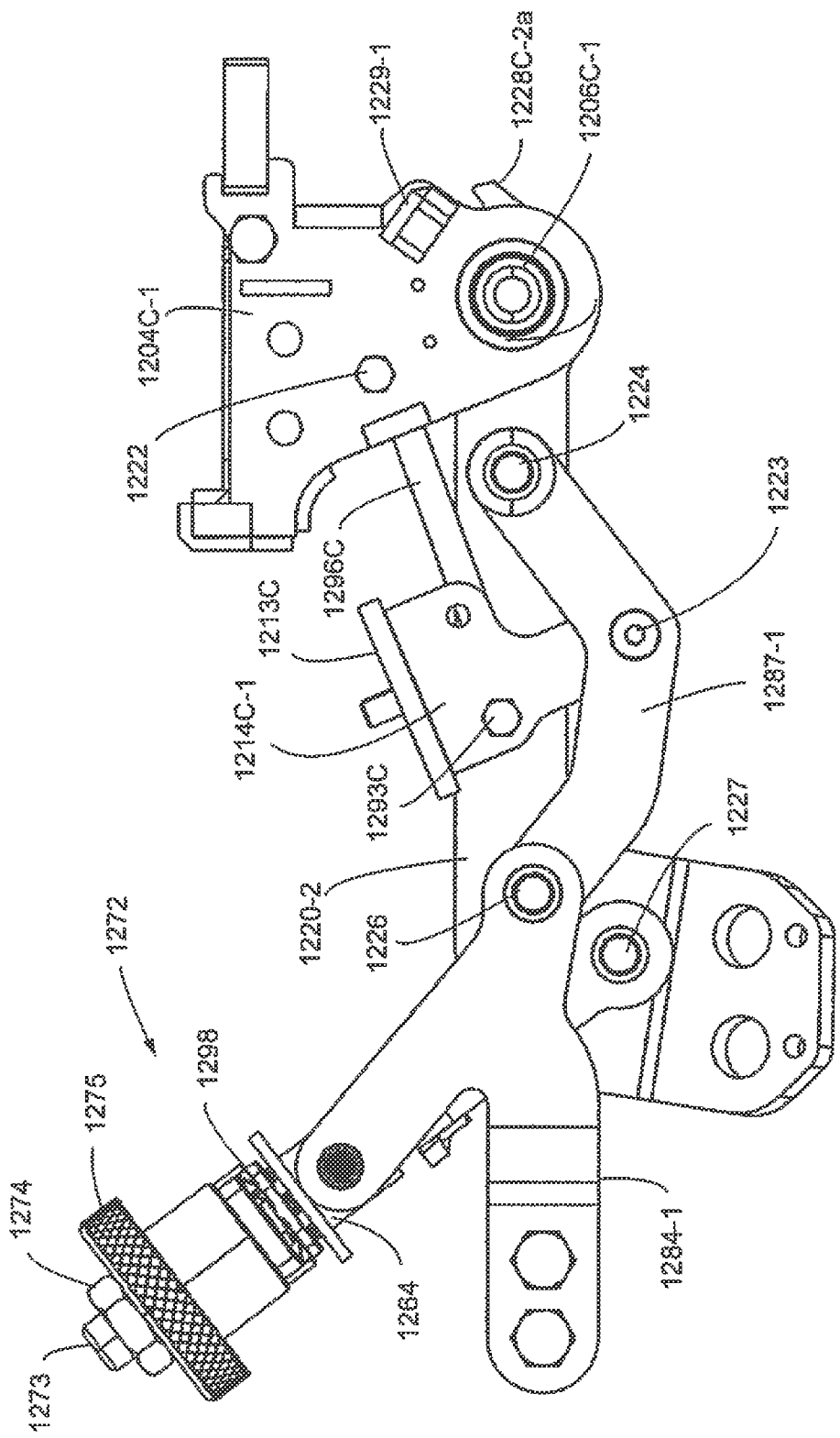
FIG. 62 is a side elevation view of the trench closing assembly of FIG. 61.
Figure 63:
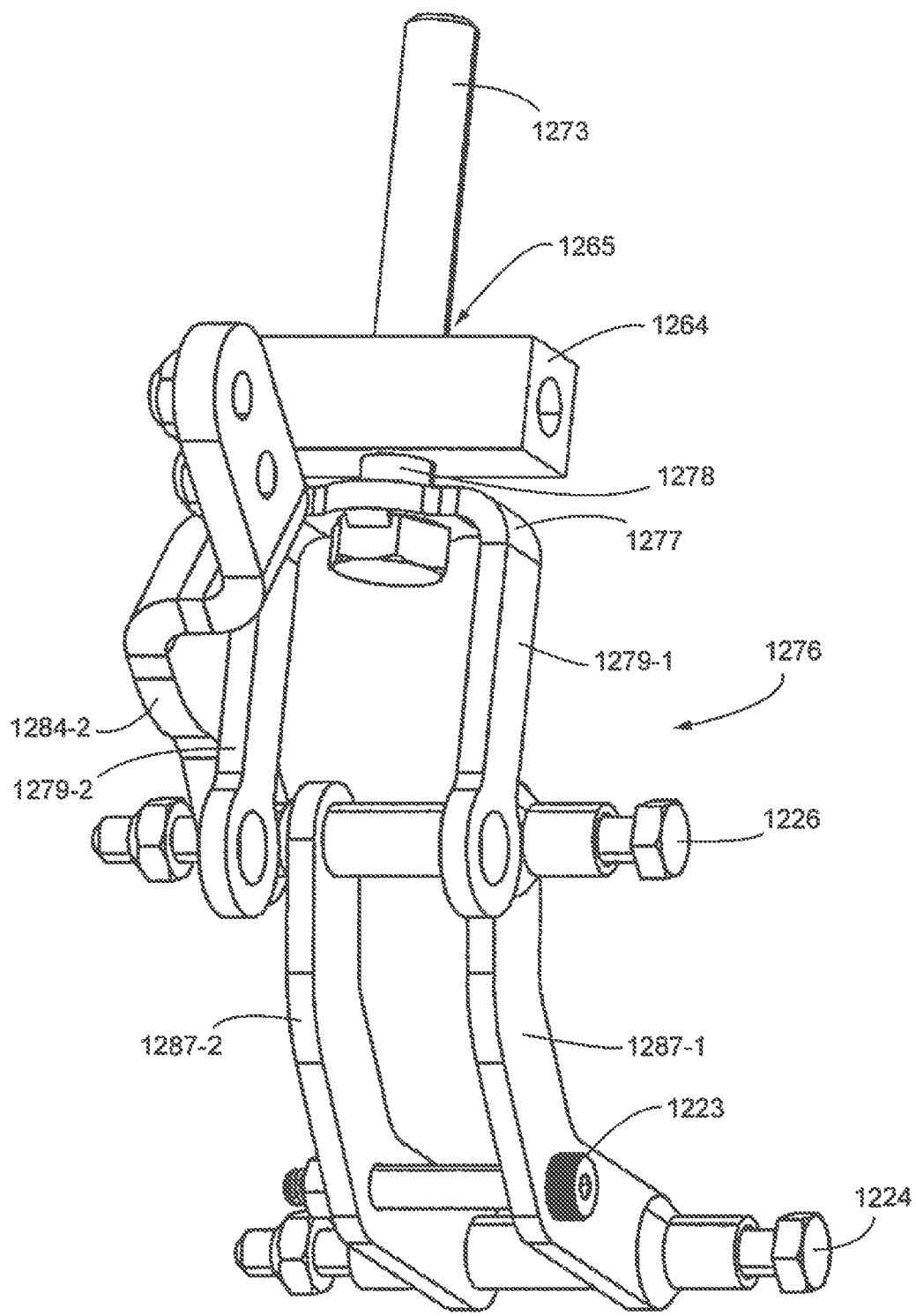
FIG. 63 is a perspective view of a portion of the trench closing assembly of FIG. 50.
Figure 64:
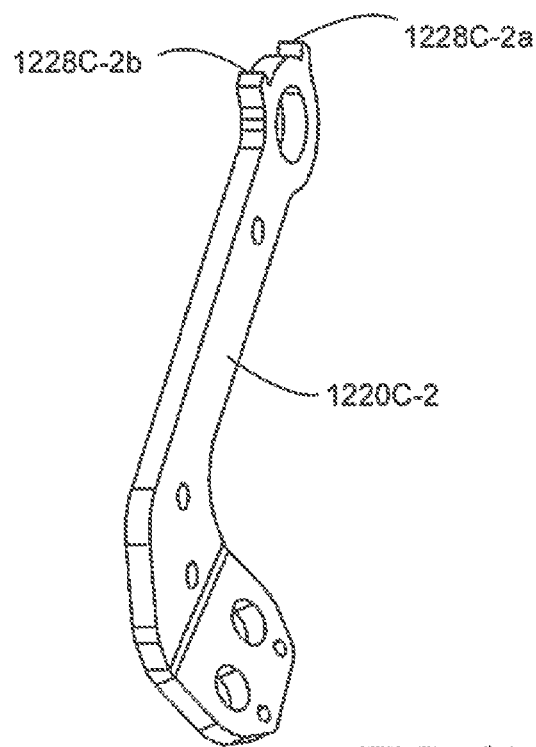
FIG. 64 is a perspective view of an arm.

As viewed in FIG. 61, extending through first bracket 1204C-1 is pivot 1206C-1 transverse to the direction of travel. Extending through second bracket 1204C-2 is pivot 1206C-2 transverse to the direction of travel. Pivots 1206C-1 and 1206C-2 allow for pivoting of swing arms 1220C-1 and 1220C-2, respectively.

Swing arms 1220C-1 and 1220C-2 are pivotably disposed about pivots 1206C-1 and 1206C-2, respectively. Swing arms 1220C-1 and 1220C-2 are adjustable transverse to the direction of travel along pivot 1206C-1 and pivot 1206C-2, respectively. This allows for changing the width of spacing of closing wheels 254.

As seen in FIG. 61, an actuator base 1213C is connected to first base arm 1214C-1 and second base arm 1214C-2. First base arm 1214C-1 and second base arm 1214C-2 are pivotably connected to pivot 1223. Also first transfer arm 1287-1 and second transfer arm 1287-2 are disposed about pivot 1223. Disposed forward of pivot 1223 in a direction of travel is pivot 1224. Pivot 1224 is disposed through swing arm 1220C-1 and swing arm 1220C-2, and first transfer arm 1287-1 and second transfer arm 1287-2 are pivotably disposed about pivot 1224. Disposed rearward of pivot 1223 in a direction of travel is pivot 1226. Pivot 1226 is disposed through swing arm 1220C-1 and swing arm 1220C-2, and first transfer arm 1287-1 and second transfer arm 1287-2 are pivotably disposed about pivot 1226. Also disposed about pivot 1226 are first bracket 1284-1 and second bracket 1284-2. Disposed between first bracket 1284-1 and second bracket 1284-2 is cross brace 1264. As viewed in FIG. 63, cross brace 1264 has a hole 1265 for bolt 1273 to be disposed through. As viewed in FIG. 53, mounting arm 1256C is connected between first bracket 1284-1 and second bracket 1284-2. Mounting arm 1256C has the same design as a previous embodiment. An arm 1296C is disposed about pivot 1293C between first base arm 1214C-1 and second base arm 1214C-2. Arm 1296C is also disposed about pivot 1222 between first bracket 1204C-1 and second bracket 1204C-2.

As seen in FIGS. 56-63, an adjustor 1272 is included for changing the relative position of closing wheels 254 (254-1 and 254-2) to press wheels 255C (255C-1 and 255C-2). By changing the relative position, the percentage of the applied force from actuator 259 is changed between the closing wheels 254 (254-1 and 254-2) the press wheels 255C (255C-1 and 255C-2). Adjustor 1272 has a bracket 1276 having a first arm 1279-1 a second arm 1279-2, a cross-connector 1277, and a hole 1278 through cross-connector 1277. Bracket 1276 can be made as a unitary part or from separate parts. First arm 1279-1 and second arm 1279-2 are pivotably disposed about pivot 1227. Pivot 1227 is disposed through swing arm 1220C-1 and swing arm 1220C-2. Disposed through hole 1278 is bolt 1273. Bolt 1273 is also disposed through hole 1265 in cross brace 1264. Knob 1275 is disposed about bolt 1273 to adjust the position of bolt 1273. Optionally, a retaining nut 1274 can be disposed at the end of bolt 1273 to retain knob 1275 on bolt 1273. Optionally, force sensor 1298 can be disposed between knob 1275 and cross brace 1264 about bolt 1273. The combined down force applied to closing wheels 254 (254-1 and 254-2) and press wheels 255C (255C-1 and 255C-2) can be measured by force sensor 1298. An example of force sensor 1298 is a load sensor, such as the Case IH Load Sensor, Part No. 725875, from Precision Planting, LLC.

Figure 21:
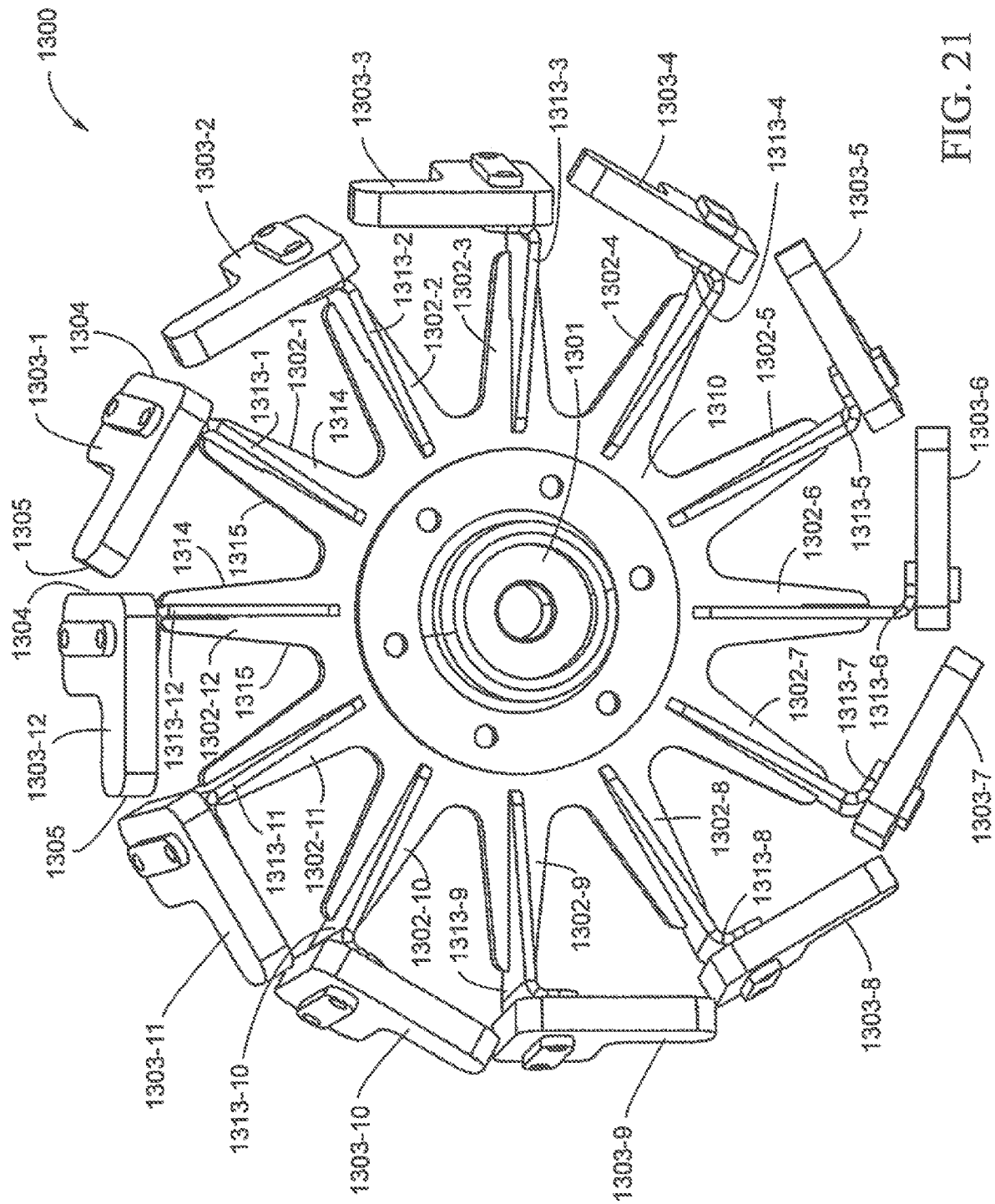
FIG. 21 is a side elevation view of a wheel according to one embodiment.
Figure 22:
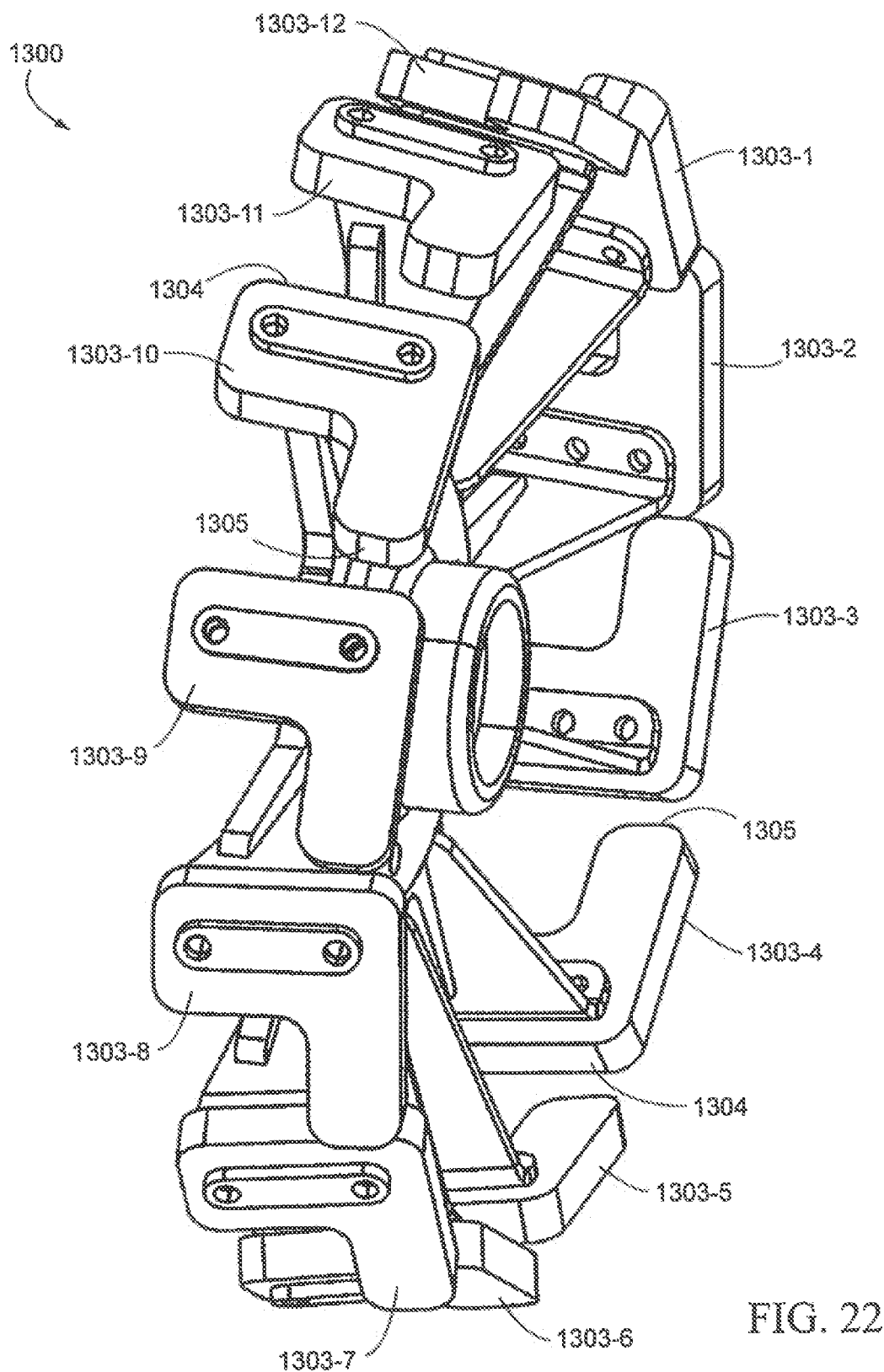
FIG. 22 is a perspective view of the wheel of FIG. 21.
Figure 23:
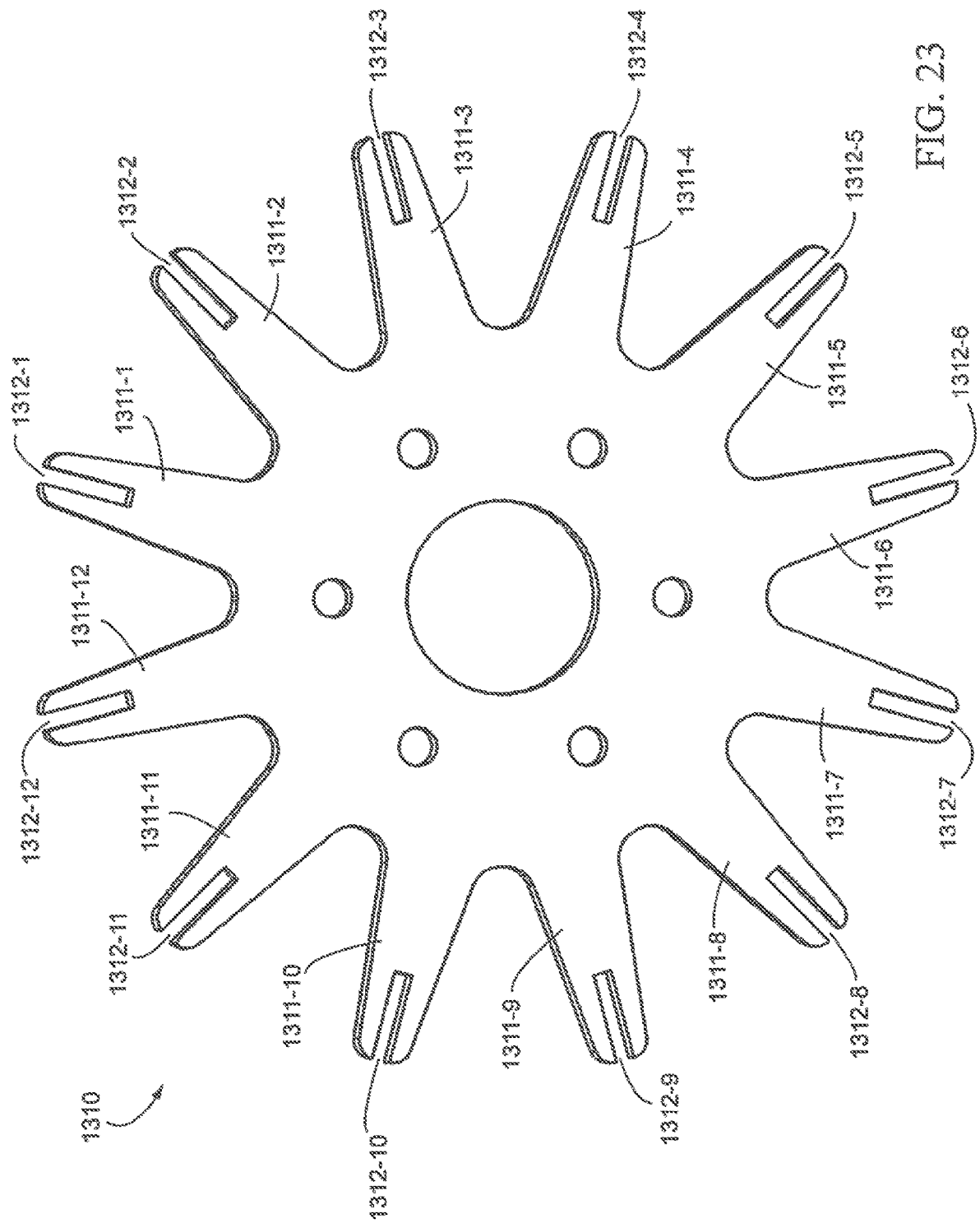
FIG. 23 is a side elevation view of an embodiment of the spoke disk of the wheel of FIG. 21.
Figure 24:
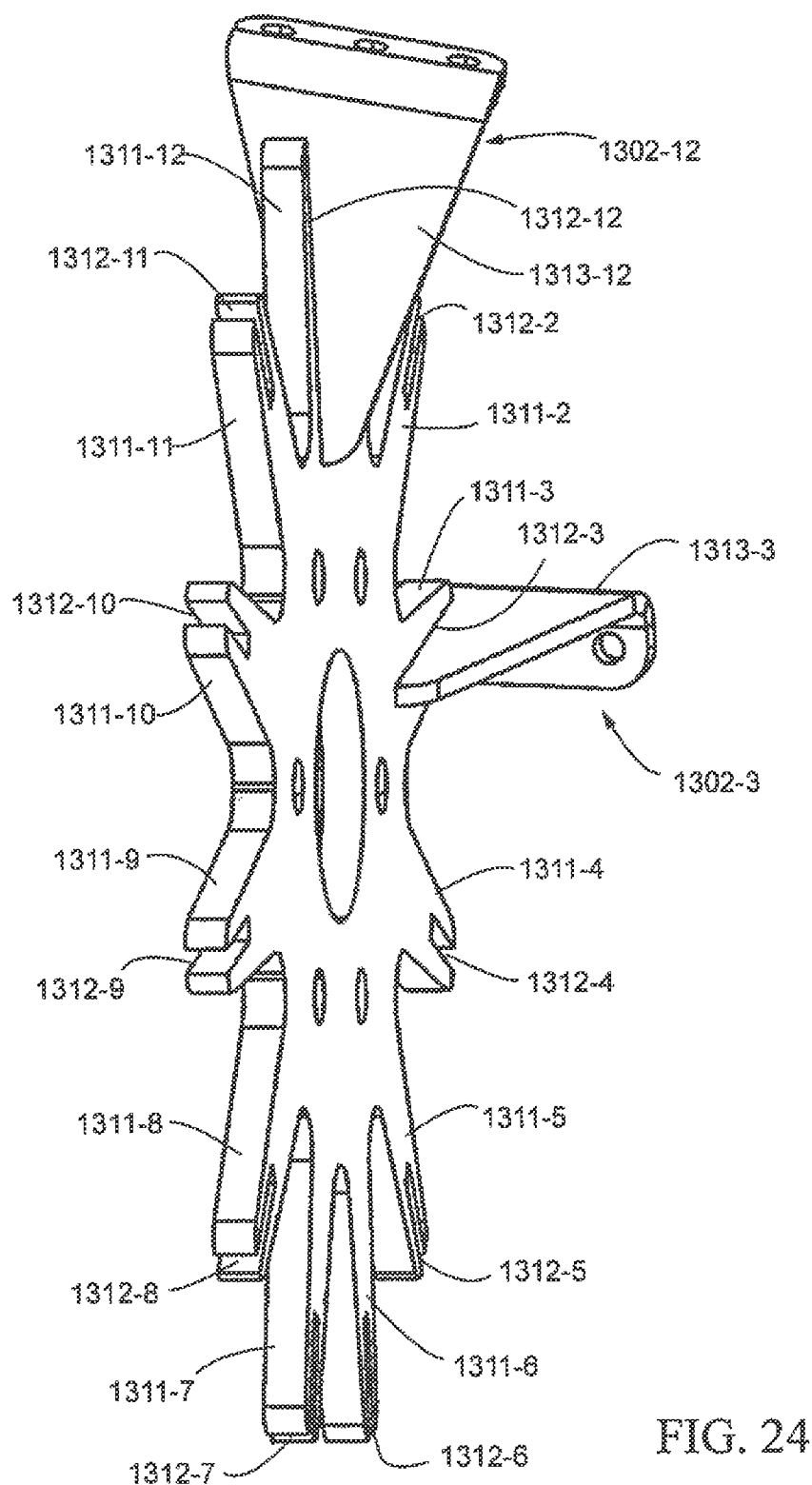
FIG. 24 is a perspective view of the spoke disk of FIG. 23 showing some of the flanges received within the notches of respective spoke arms.

As bolt 1273 is adjusted upwards by knob 1275, pivot 1273 is pulled upwards by first arm 1279-1 and second arm 1279-2, which raises swing arms 1220C (1220C-1 and 1220C-2) under adjustor 1272. As bolt 1273 is adjusted downwards by knob 1275, pivot 1273 is lowered by first arm 1279-1 and second arm 1279-2, which lowers swing arms 1220C (1220C-1 and 1220C-2) under adjustor 1272.
Wheel FIGS. 21-24 illustrate a wheel 1300 according to one embodiment. Wheel 1300 can be used as press wheel 255, 255A or 255C. Wheel 1300 comprises a spoke disk 1310 having a hub 1301 and a plurality of spokes 1302 (1302-1 to 1302-12) radially disposed about hub 1301. Disposed at the end of a spoke 1302 is a cleat 1303 (1303-1 to 1303-12). Each spoke 1302 can be a two part spoke. FIG. 23 illustrates the spoke disk 1310 having a plurality of spoke arms 1311 (1311-1 to 1311-12). Each spoke arm 1311-1 to 1311-12 has a leading edge 1314 and a trailing edge 1315. The radial end of each spoke arm 1311-1 to 1311-12 has a respective notch 1312-1 to 1312-12. Received within each notch 1312-1 to 1312-12 is a respective flange 1313-1 to 1312-12. FIG. 24 is a perspective view of the spoke disk 1310 showing flanges 1313-12 and 1313-3 disposed in the respective notches 1312-12 and 1312-3 of spoke arms 1311-12 and 1311-3. As best viewed in FIGS. 21 and 22, a respective cleat 1303-1 to 1303-12 is attached to each of the respective flanges 1313-1 to 1313-12. As best viewed in FIG. 22, the cleat 1303 can have an L shape. Referring to FIG. 21, a forward edge 1304 of each of the cleats 1303 is shown aligned with the leading edge 1314 of the respective spoke arm 1311, with a rearward end 1305 of each cleat 1303 extending rearwardly of the trailing end 1315 of the spoke arm 1311 substantially spanning the space between the adjacent radial spokes 1302.

In one aspect, wheel 1300 can move soil from the sides of a seed trench to knit the soil together to increase the amount of closing of the seed trench.

Figure 44:
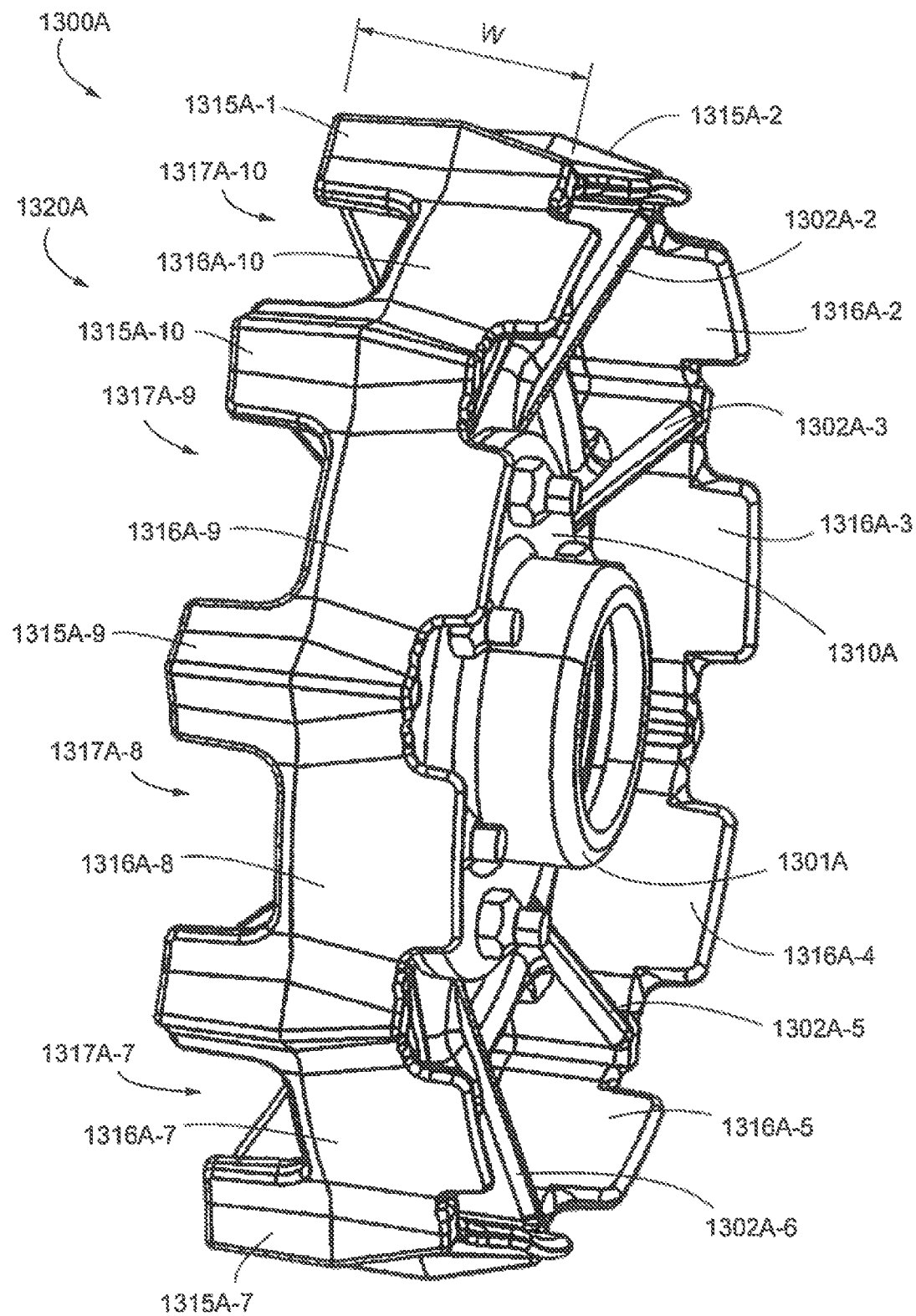
FIG. 44 is a perspective view of a press wheel according to one embodiment.
Figure 45:
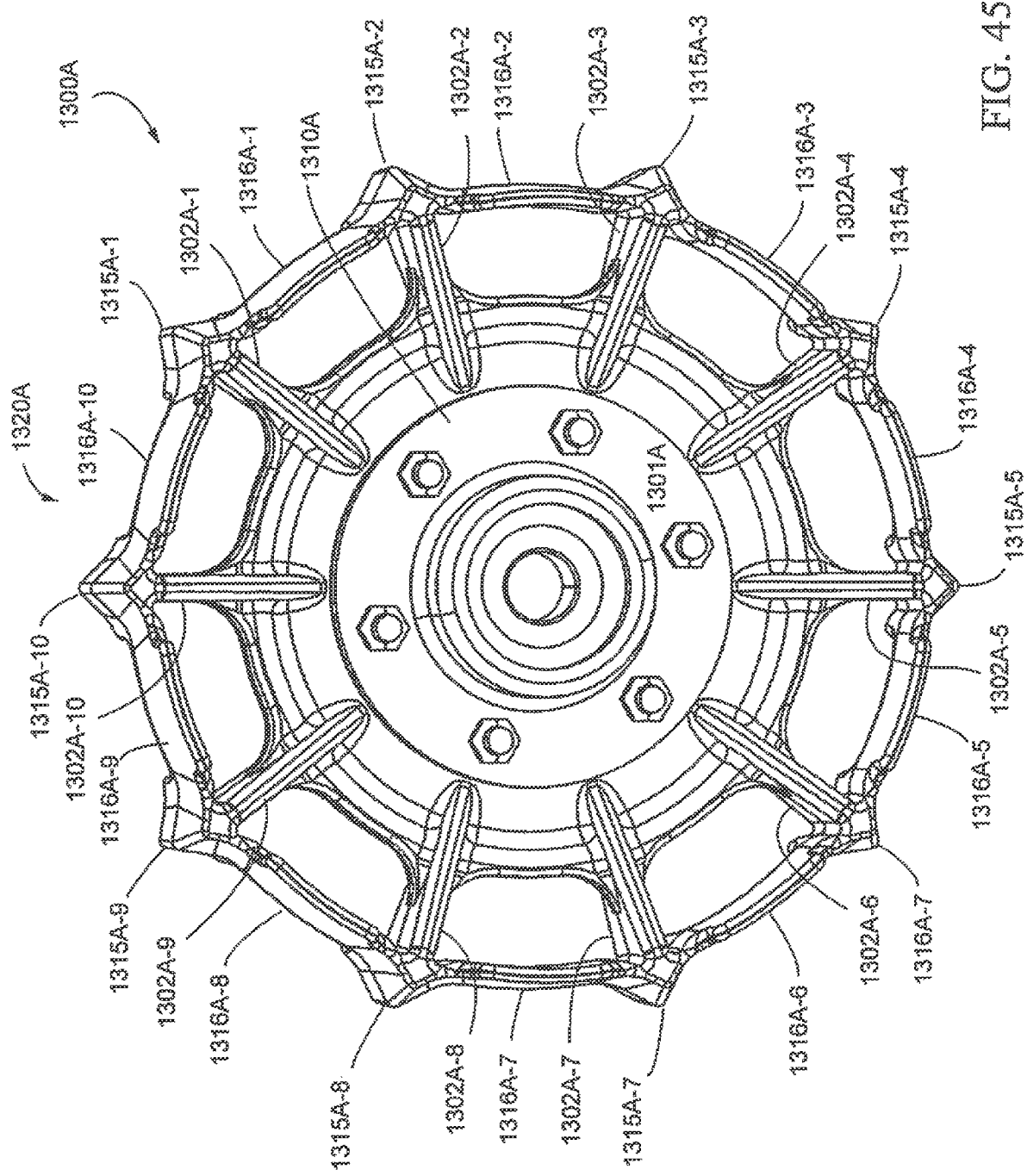
FIG. 45 is a side elevation view of the press wheel of FIG. 44.
Figure 46:
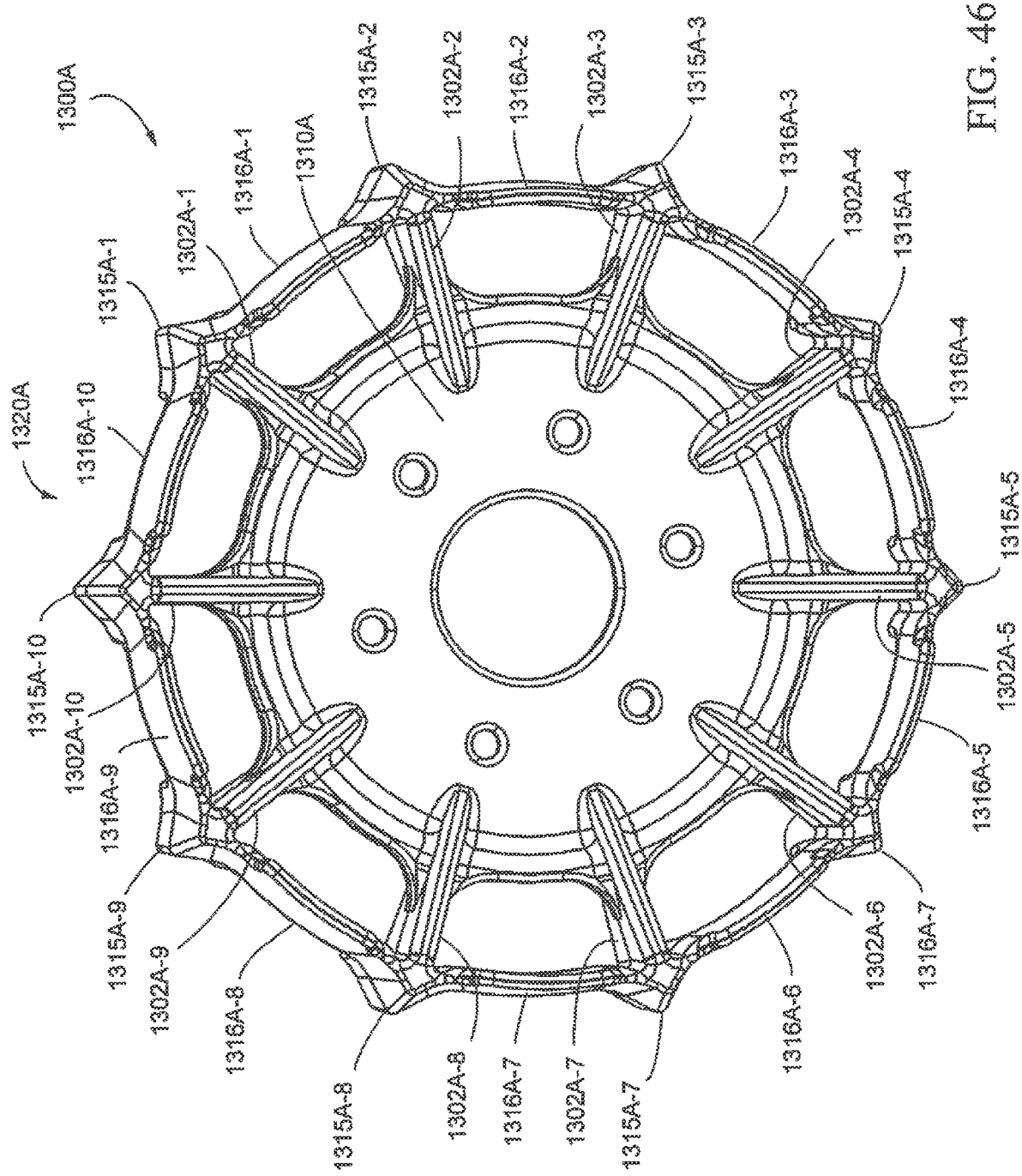
FIG. 46 is a side elevation view of the press wheel of FIG. 45 with the hub removed.

FIGS. 44-46 illustrate another embodiment of a wheel 1300A. Wheel 1300A can be used as press wheel 255, 255A or 255C. Wheel 1300A comprises a spoke disk 1310A and a hub 1301A. Spoke disk 1310A can be molded as a unitary part. Spoke disk 1310A has plurality of spokes 1302A (1302A-1 to 1302A-10). Connecting spokes 1302A is a tread 1320A. Tread 1320A has a rib 1315A (1315A-1 to 1315A-10) disposed at the radial end of spoke 1302A. Between each rib 1315A, there is a tread portion 1316A (1316A-1 to 1316A-10). Tread portion 1316A can extend through the entire width W of a rib 1315A, or tread portion 1316A can extend only a portion of the width W to leave a gap 1317A (1317A-1 to 1317A-10).

FIGS. 117-124 illustrate wheel 1300'. The wheel 1300' may be used in place of a press wheel 255 (255, 255A, 255C, 255D) or the wheel 1300 (1300, 1300A, 1300B), which are described above and in U.S. Provisional Patent Application No. 62/731,813 and International Application No. PCT/US2019/020452, both of which are incorporated herein in their entirety by reference. In FIG. 17, the wheel 1300' (1300'-1, 1300'-2) is shown disposed on a trench closing assembly 250D, describe above.

Turning to FIGS. 118-124, wheel 1300' has a central axis and a circumferential tread 1320' coaxial with the central axis. The circumferential tread 1320' extends axially between an inner edge and an outer edge defining an axial width W' (FIG. 123) of the wheel 1300'. The tread 1320' may include a plurality of ribs 1315' (1315'-1 to 1315'-10). While the wheel 1300' is shown with 10 ribs 1315' it should be appreciated that any number of ribs may be used. In one embodiment, the ribs 1315' extend axially in a direction substantially parallel with the central axis. Between each rib 1315' there is a tread web 1316' (1316'-1 to 1316'-10). The tread web 1316' may extend through the entire axial width W' between each of the ribs 1315'. Alternatively, the tread web 1316' may extend only a portion of the axial width W' between the ribs 1315', such as illustrated in the embodiments of wheels 1300A and 1300B.

Figures 122, 123, 124:
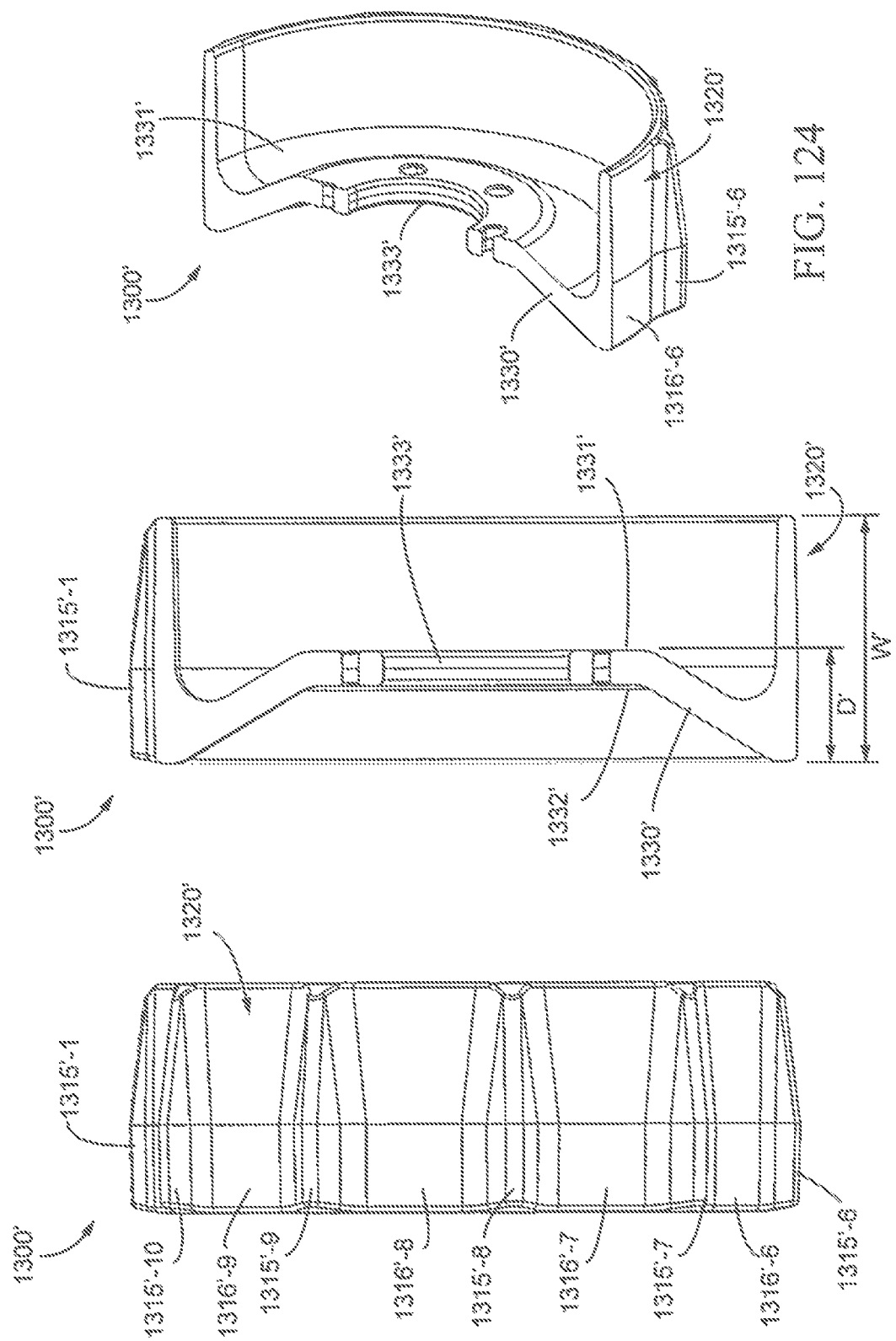

The wheel 1300' includes a wall member 1330' joined with the circumferential tread 1320'. The wall member 1330' extends radially inward from the circumferential tread 1320' to a central opening 1333' coaxial with the central axis. The wall member 1330' is continuous (i.e., solid) between the central opening 1333' and the circumferential tread 1320' for the reasons discussed later. The central opening 1333' receives a hub 1301' by which the wheel 1300' may be rotatably mounted to the frame of the trench closing assembly 250. The wall member 1330' has a first side 1331' (outer side) and a second side 1332' (inner side). The wall member 1330' extends axially outward from the inner edge of the circumferential tread 1320' toward the outer edge of the circumferential tread 1320' by an axial distance D' (FIG. 123), but the axial distance D' does not extend outward beyond a vertical plane that is perpendicular to the central axis at a midpoint of the axial width W'. In one embodiment, the axial distance D' is equal to or less than half of the axial width W'. In another embodiment, the axial distance D' is less than one half of the axial width W'. In another embodiment, the axial distance D' is equal to or greater than 10% of the axial width W'. As seen in FIG. 123, when viewed in cross-section, the circumferential tread together with the wall 1330' has a cross-sectional shape in the form of an uppercase Greek letter sigma (X). In one embodiment, by having the axial distance D' not extend beyond the vertical plane perpendicular to the central axis at a midpoint of the axial width, the portion of the tread 1320' that extends axially outward beyond the first side 1331' of the wall member 1330' is able to flex radially inward towards the central axis of the wheel 1300'. When the hub 1301' is installed, the center of the wheel 1300' is solid so that nothing can pass through the wall member 1330' from the second side 1332' to the first side 1331' or vice versa. Thus, when in muddy conditions, the solid wall of the wheel 1300' prohibits a flow of mud from one side of the wheel to other. It should be appreciated that if the wall member 1330' is spoked or has openings through the wall 1330' from one side of the wheel to the other, mud may become entrapped, which may require cleaning of the wheel to remove the mud.

FIGS. 125-130 illustrate another embodiment of a wheel 1300" which may be used in place of a press wheel 255 (255, 255A, 255C, 255D) or any of the wheels 1300, 1300A, 1300B, 1300' referenced above. Similar to wheel 1300', wheel 1300" has a central axis and a circumferential tread 1320" coaxial with the central axis. The circumferential tread 1320" extends axially between an inner edge and an outer edge defining an axial width W" (FIG. 130) of the wheel 1300'. The tread 1320" may include a plurality of ribs 1315" (1315"-1 to 1315"-10). While the wheel 1300" is shown with 10 ribs 1315" it should be appreciated that any number of ribs may be used. In one embodiment, the ribs 1315" extend axially in a direction substantially parallel with the central axis. Between each rib 1315" there is a tread web 1316" (1316"-1 to 1316"-10). The tread web 1316" may extend through the entire axial width W" between each of the ribs 1315". Alternatively, the web tread 1316" may extend only a portion of the axial width W" between the ribs 1315", such as illustrated in the embodiments of wheels 1300A and 1300B.

The wheel 1300" includes a wall member 1330" joined with the circumferential tread 1320". The wall member 1330" extends radially inward from the circumferential tread 1320" to a central opening 1333" coaxial with the central axis. The wall member 1330" is continuous (i.e., solid) between the central opening 1333" and the circumferential tread 1320" for the reasons discussed later. Similar to the previously described wheel 1300', the central opening 1333" of the wheel 1300" is adapted to receive a hub (not shown) by which the wheel 1300" may be rotatably mounted to the frame of the trench closing assembly 250. The wall member 1330" has a first side 1331" (outer side) and a second side 1332" (inner side). The wall member 1330" extends axially outward from the inner edge of the circumferential tread 1320" toward the outer edge of the circumferential tread 1320" by an axial distance D" (FIG. 130), but the axial distance D does not extend axially outward beyond a vertical plane that is perpendicular to the central axis at a midpoint of the axial width W". In one embodiment, the axial distance D" is equal to or less than half of the axial width W". In another embodiment, the axial distance D" is less than one half of the axial width W". In another embodiment, the axial distance D" is equal to or greater than 10% of the axial width W". As seen in FIG. 130, when viewed in cross-section, the circumferential tread together with the wall 1330" has a cross-sectional shape in the form of an uppercase Greek letter sigma (X). In one embodiment, by having the axial distance D" not extend beyond the vertical plane perpendicular to the central axis at a midpoint of the axial width, the portion of the tread 1320" that extends axially outward beyond the first side 1331" of the wall member 1330" is able to flex radially inward towards the central axis of the wheel 1300". When the hub is installed, the center of the wheel 1330" is solid so that nothing can pass through the wall 1330" from the second side 1332" to the first side 1331" or vice versa. Thus, when in muddy conditions, the solid wall of the wheel 1300" prohibits a flow of mud from one side of the wheel to other. It should be appreciated that if the wall member 1330" is spoked or has openings through the wall 1330" from one side of the wheel to the other, mud may become entrapped, which may require cleaning of the wheel to remove the mud.

Pressure Control

Figure 25:
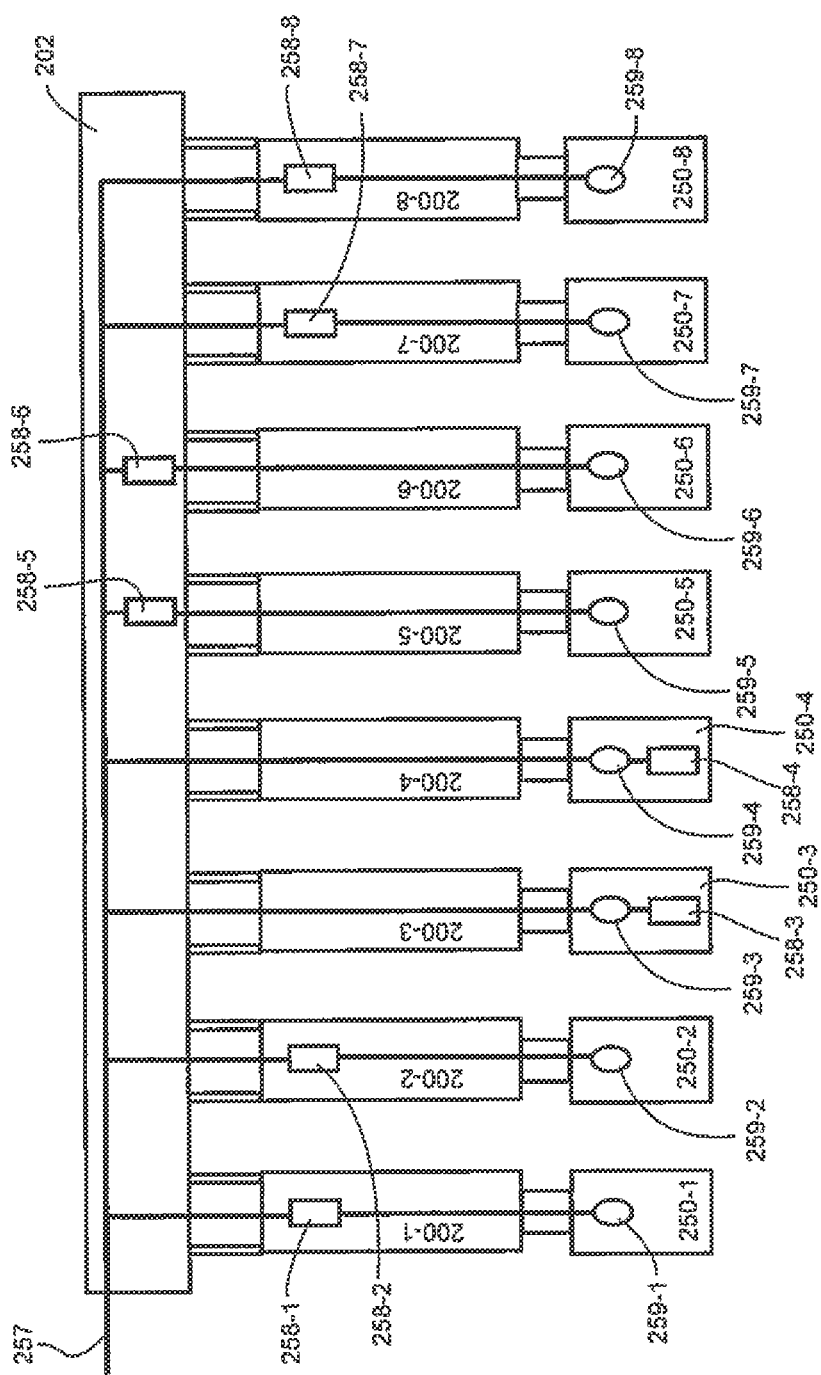
FIG. 25 is a schematic illustration of a fluid system according to one embodiment.
Figure 26:
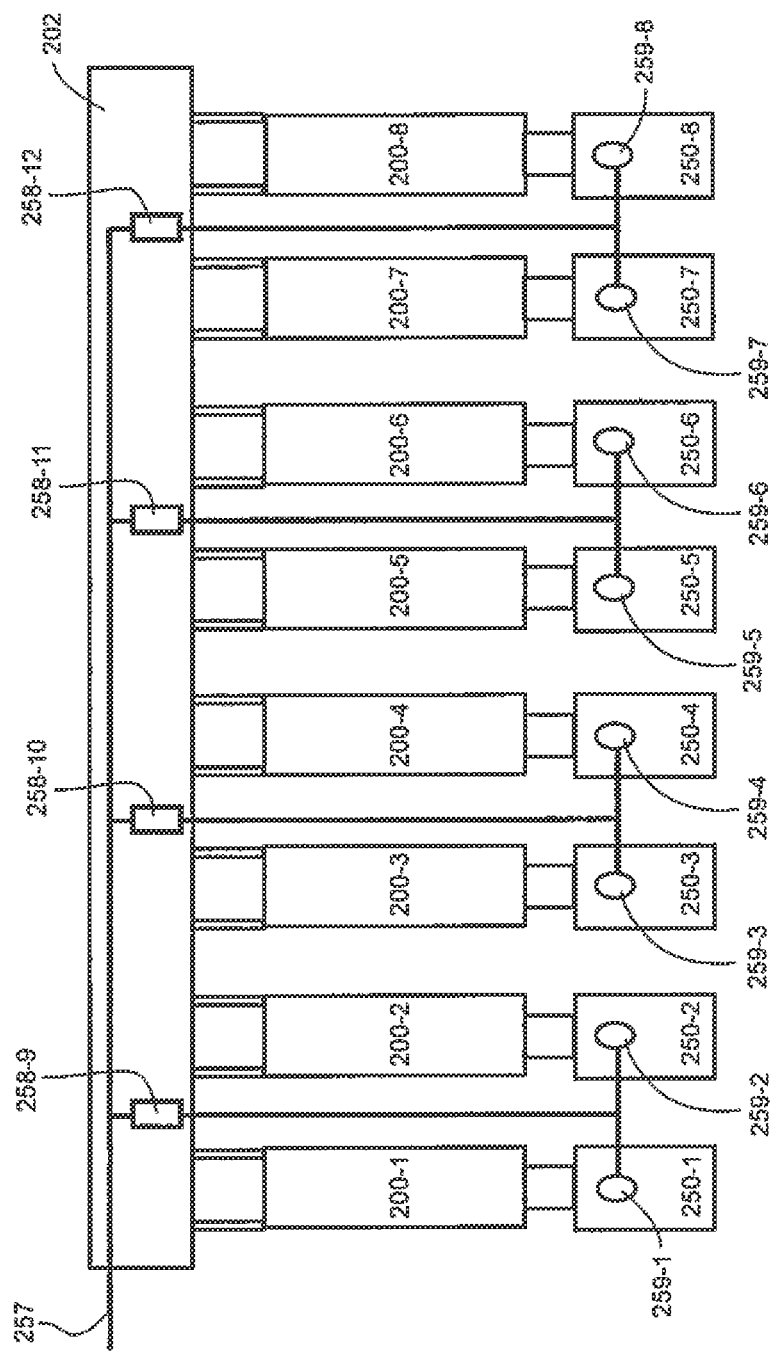
FIG. 26 is a schematic illustration of a fluid system according to another embodiment.

To control the flow of fluid (e.g., air) to actuator 259, a control valve 258 can be included. As illustrated in FIG. 25 for an eight row system, there can be a control valve 258 (258-1 to 258-8) associated with each actuator 259 (259-1 to 259-8). A fluid supply line 257 can supply fluid (e.g., air) from a fluid supply system. While shown schematically, control valve 258 can be disposed on the row unit 200, trench closing assembly 250, or on toolbar 202. Different locations are shown in FIG. 25 for illustrating different locations, but they can all be the same. Section control can also be used. FIG. 26 illustrates section control in which a control valve 258 (258-9 to 258-12) supplies fluid to two or more actuators 259 (259-1 to 259-8). While shown with one control valve 258 to two actuators 259, any amount of sectioning can be used up to having one control valve 258 supplying all actuators 259 (not shown). Each control valve 258 can be in signal communication with monitor 300 for controlling each valve 258. While illustrated for air, which can be vented to atmosphere, the fluid can by hydraulic, which can further include a return line (not shown). An example of control valve 258 is the ITV series (such as ITV 1051) electro-pneumatic valve from SMC Pneumatics. This electro-pneumatic valve has a solenoid supply valve for inlet air and a solenoid valve for exhaust to atmosphere. When air is needed to the actuator, the inlet air valve is open and the valve to atmosphere is closed. When air pressure at the actuator needs to be reduced, the inlet air valve is closed, and the valve to atmosphere is opened.

Figure 49:
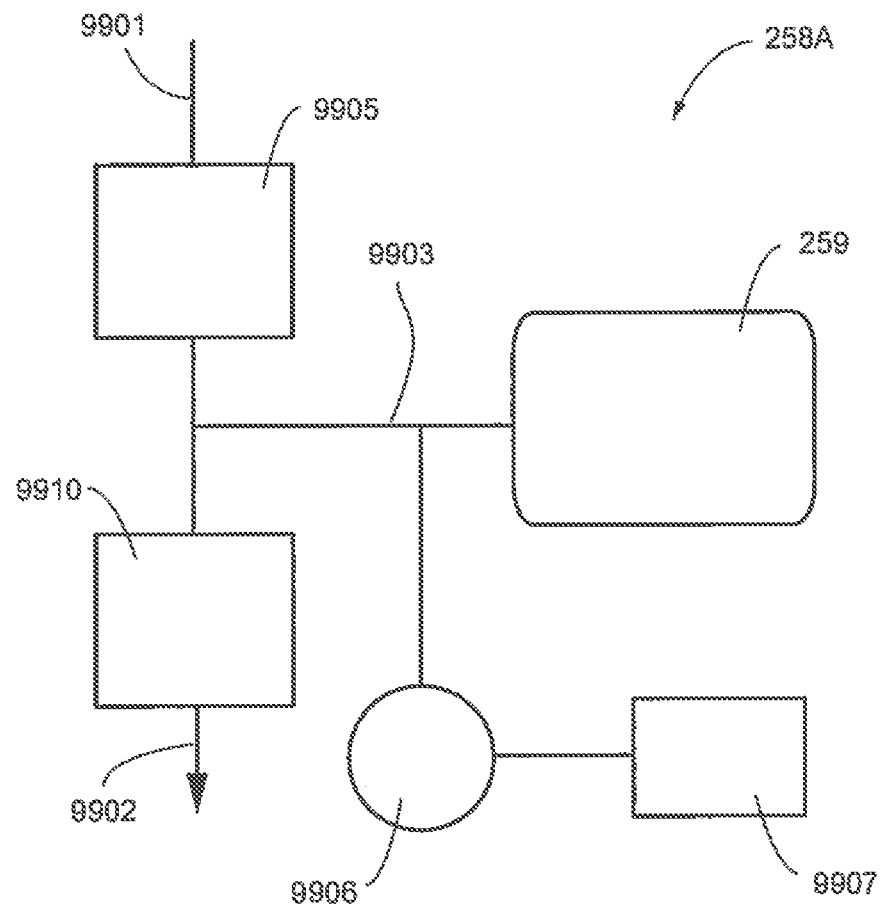
FIG. 49 is a schematic of a valve system.

While a single control valve 258, such as the ITV 1051 valve, can be used, an equivalent valve system 258A can be used that is made from component parts. Valve system 258A is illustrated in FIG. 49. Valve system 258A is supplied with fluid (e.g., air) from line 9901 to inlet valve 9905. Inlet valve 9905 discharges to line 9903, which is connected to actuator 259, exhaust valve 9910, and pressure sensor 9906. Pressure sensor 9906 is in signal communication with a circuit 9907, which is in signal communication with monitor 300. Exhaust valve 9910 discharges to atmosphere, such as through optional line 9902.

Figure 27:
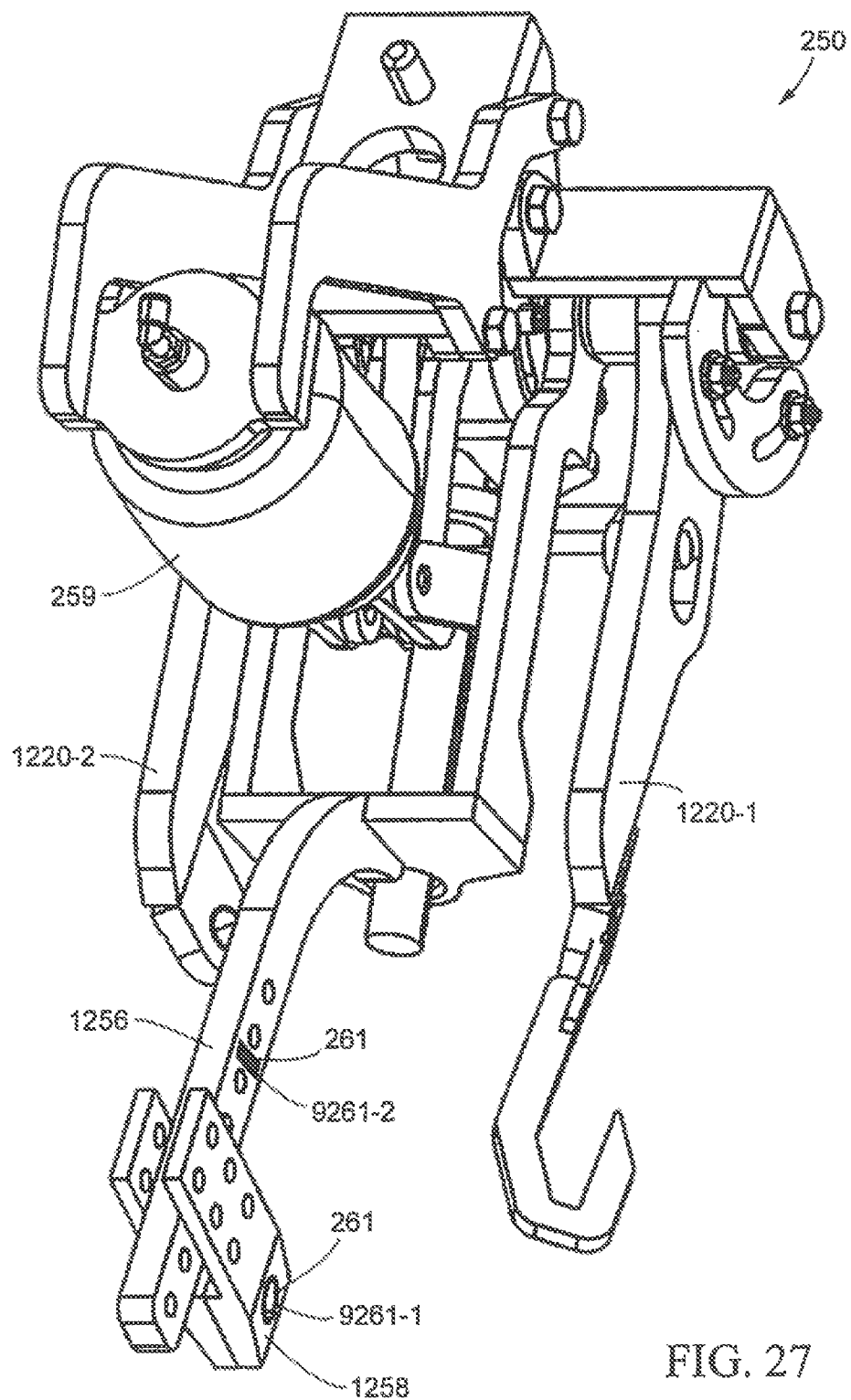
FIG. 27 is a perspective view of the trench closing assembly with a force sensor.

As is described in International Publication No. WO2017/197274, control of the amount of force to actuator 259 can be based on input from one or more of the trench closing sensor, the angle sensor, a force sensor 261, which is disposed on trench closing assembly 250, or position sensor 900. The control can be closed loop or open loop. Force sensor 261 can be disposed on trench closing assembly 250 at any location that measures the force on any part of trench closing assembly 250. In one embodiment, force sensor 261 is disposed to measure a force applied to press wheels 255. An example of a location is at location 9261-A or location 9261-B, which is illustrated in FIG. 27. For location 9261-A, a load sensing pin can be used. For location 9261-B, a Wheatstone bridge can be used.

Figure 66:
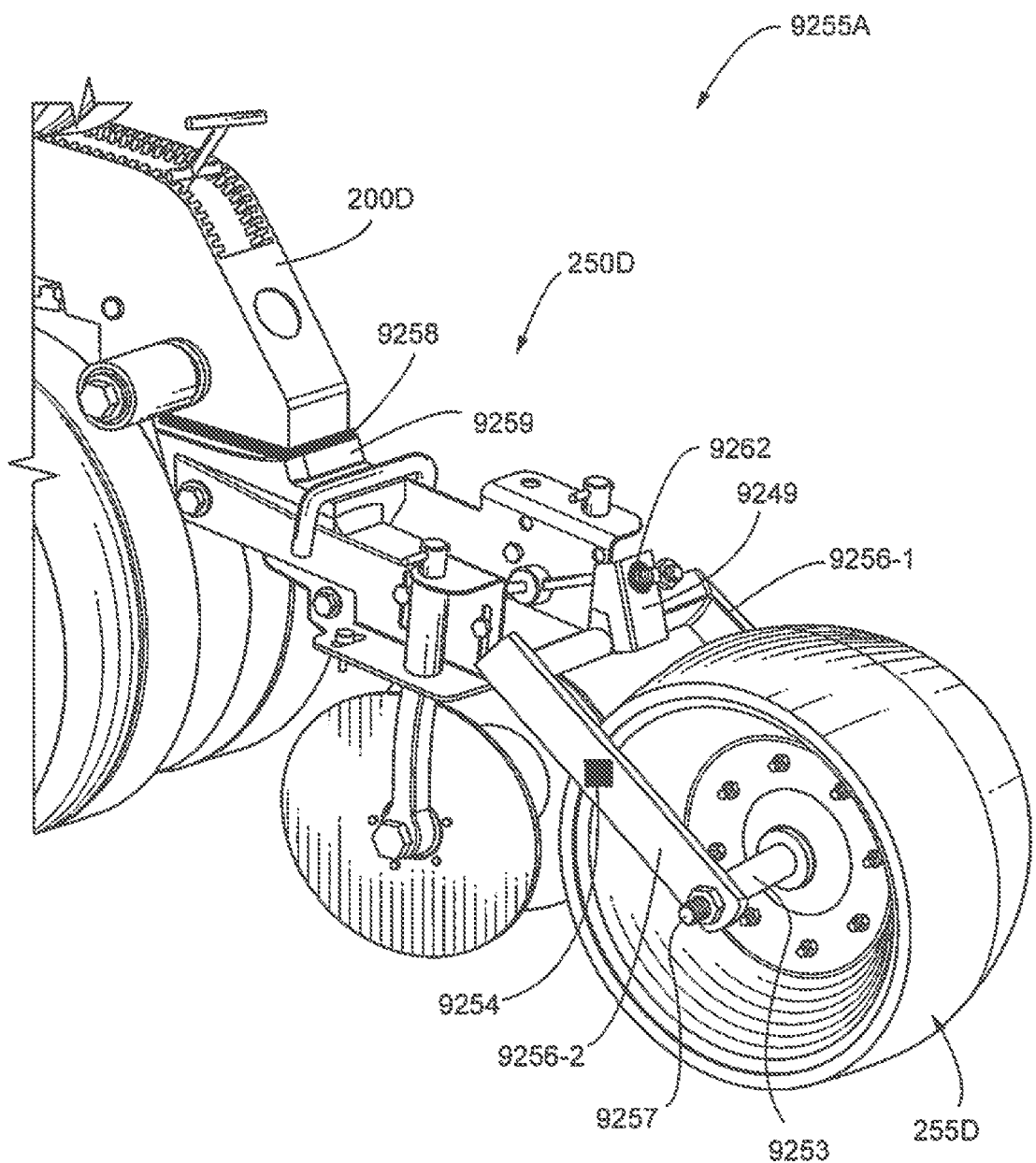
FIG. 66 is a perspective view of a packing wheel system with a force sensor of one embodiment.
Figure 67:
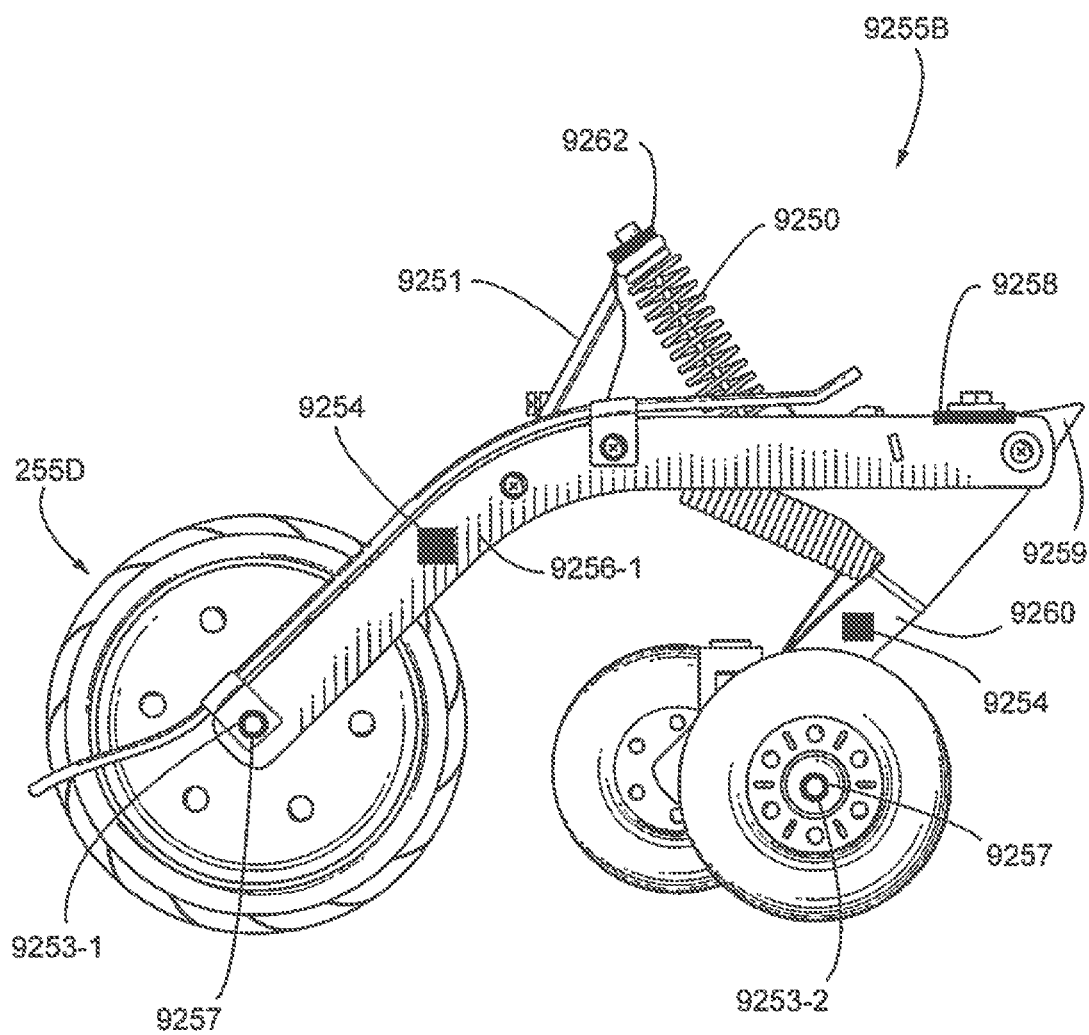
FIG. 67 is a perspective view of a packing wheel system with a force sensor of one embodiment.
Figure 68:
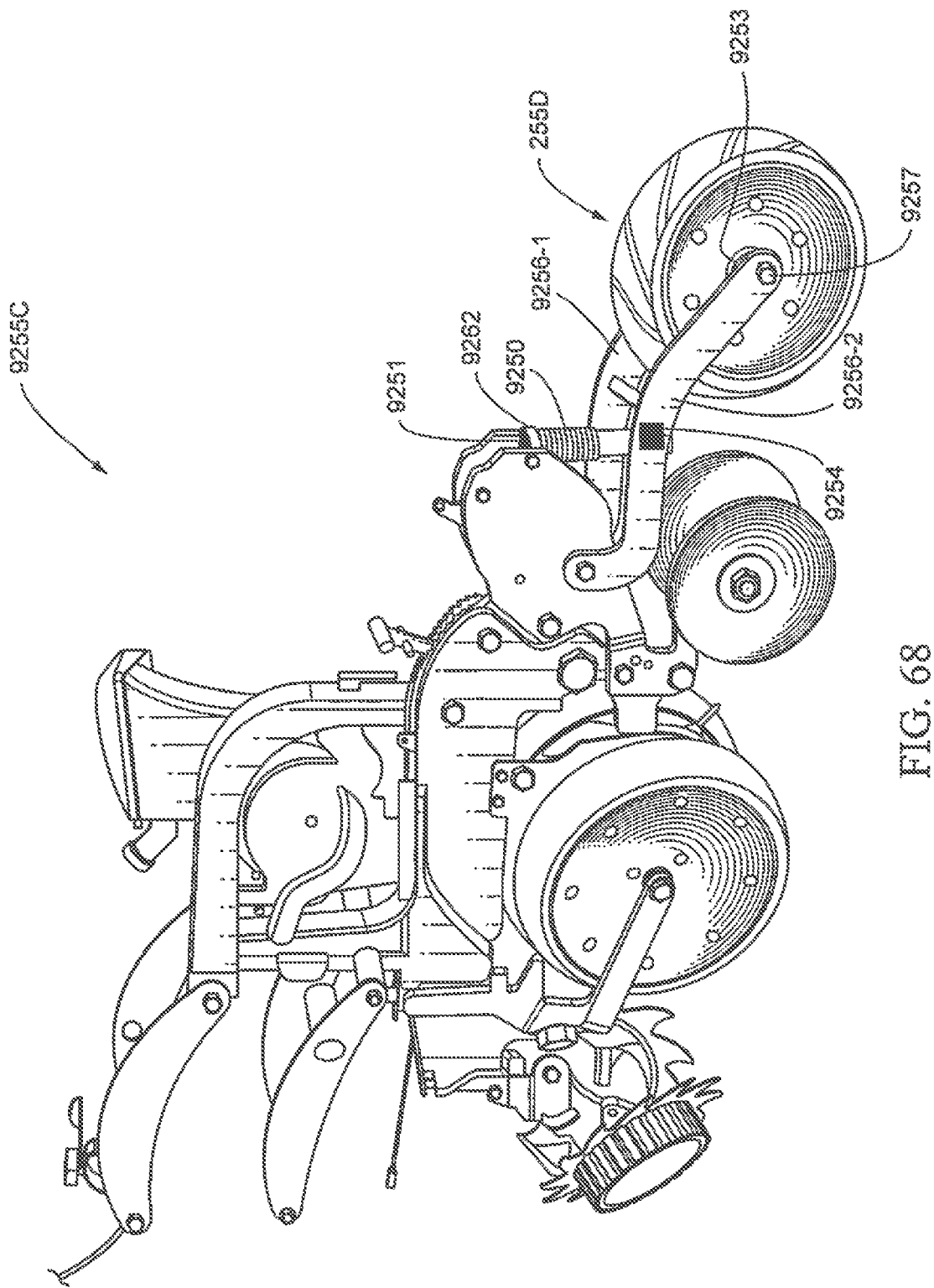
FIG. 68 is a perspective view of a packing wheel system with a force sensor of one embodiment.
Figure 69:
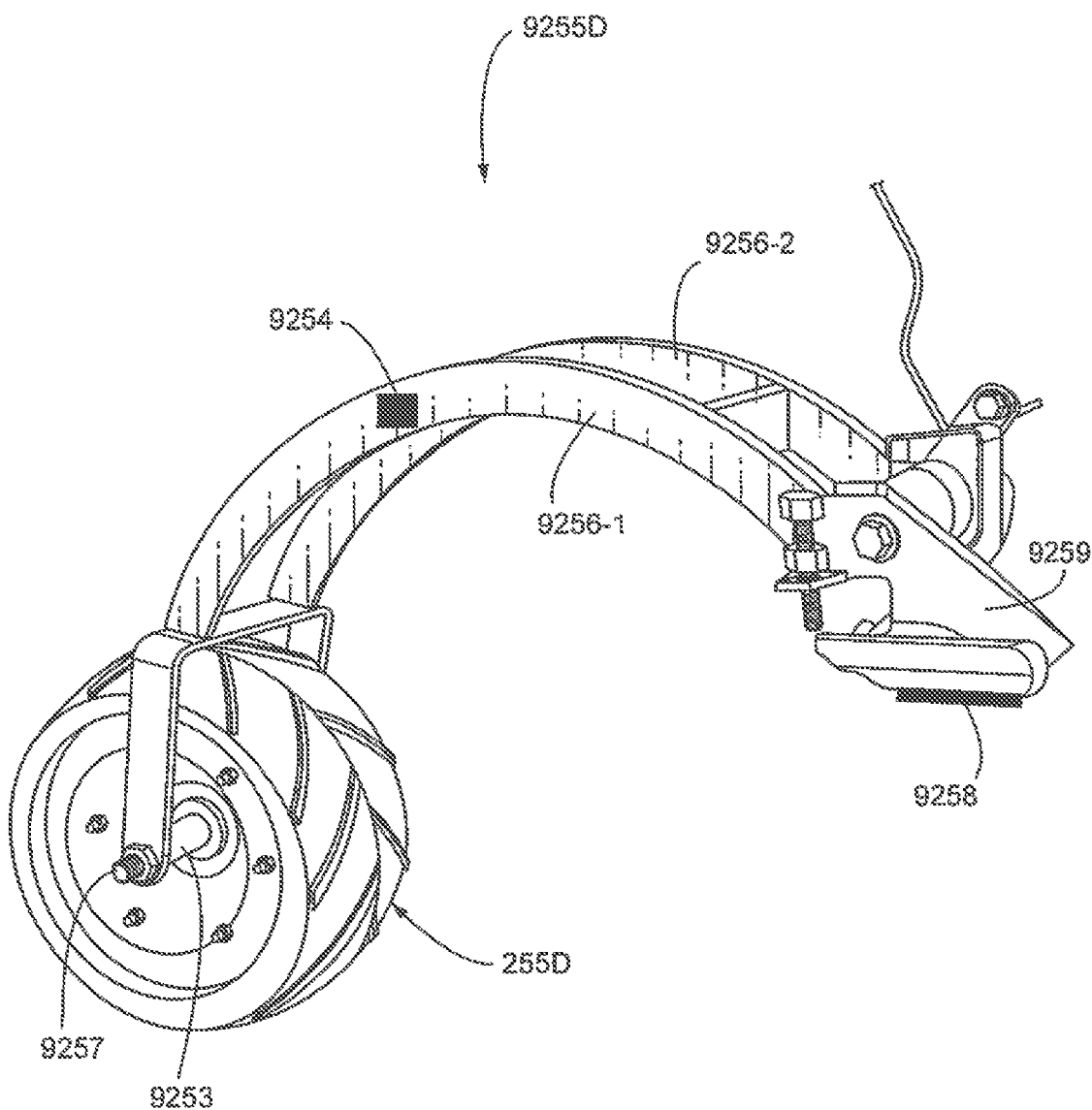
FIG. 69 is a perspective view of a packing wheel system with a force sensor of one embodiment.
Figure 70:
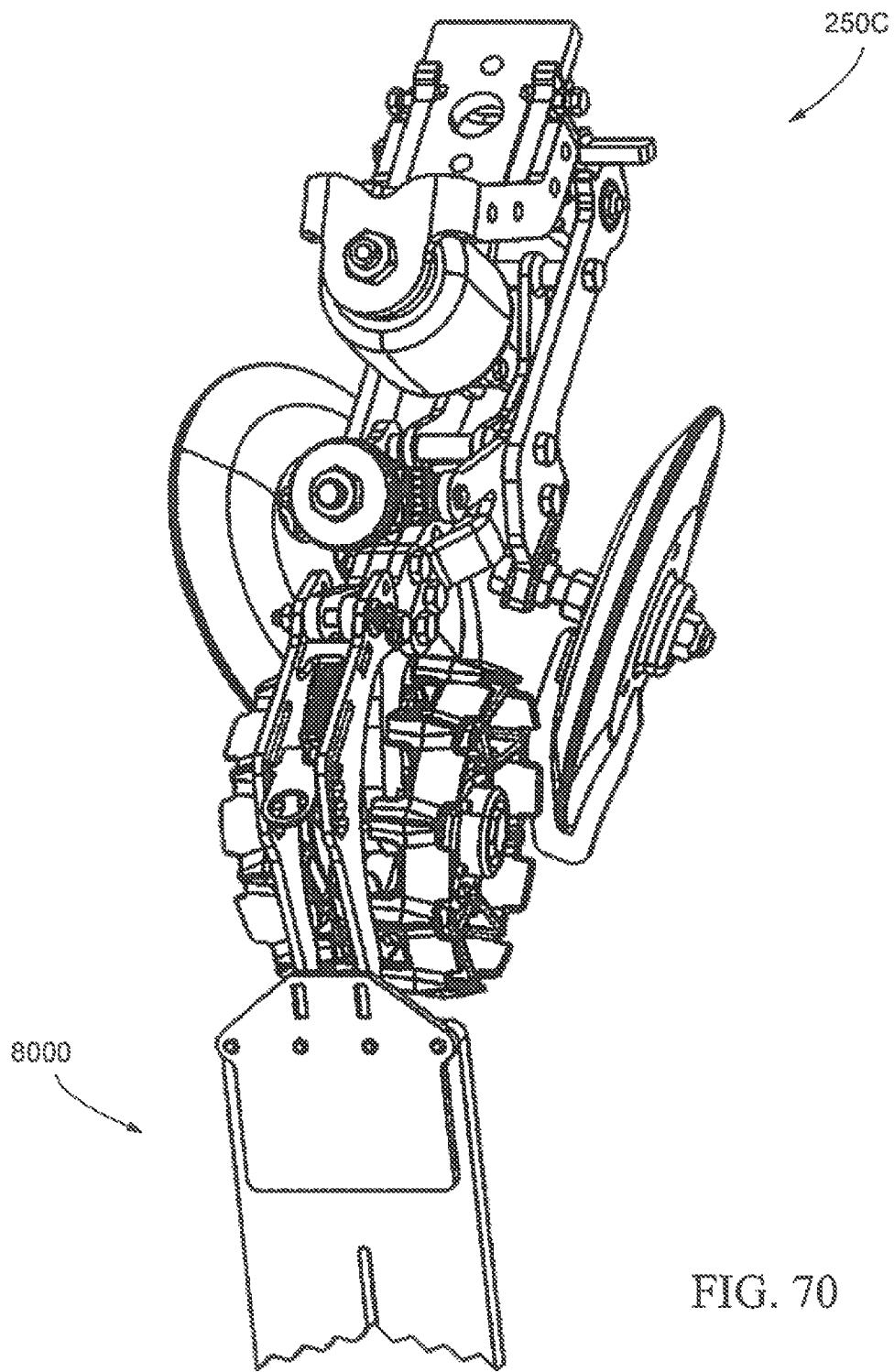
FIG. 70 is a perspective view of a trench closing assembly further including a soil leveler according to one embodiment.
Figure 71:
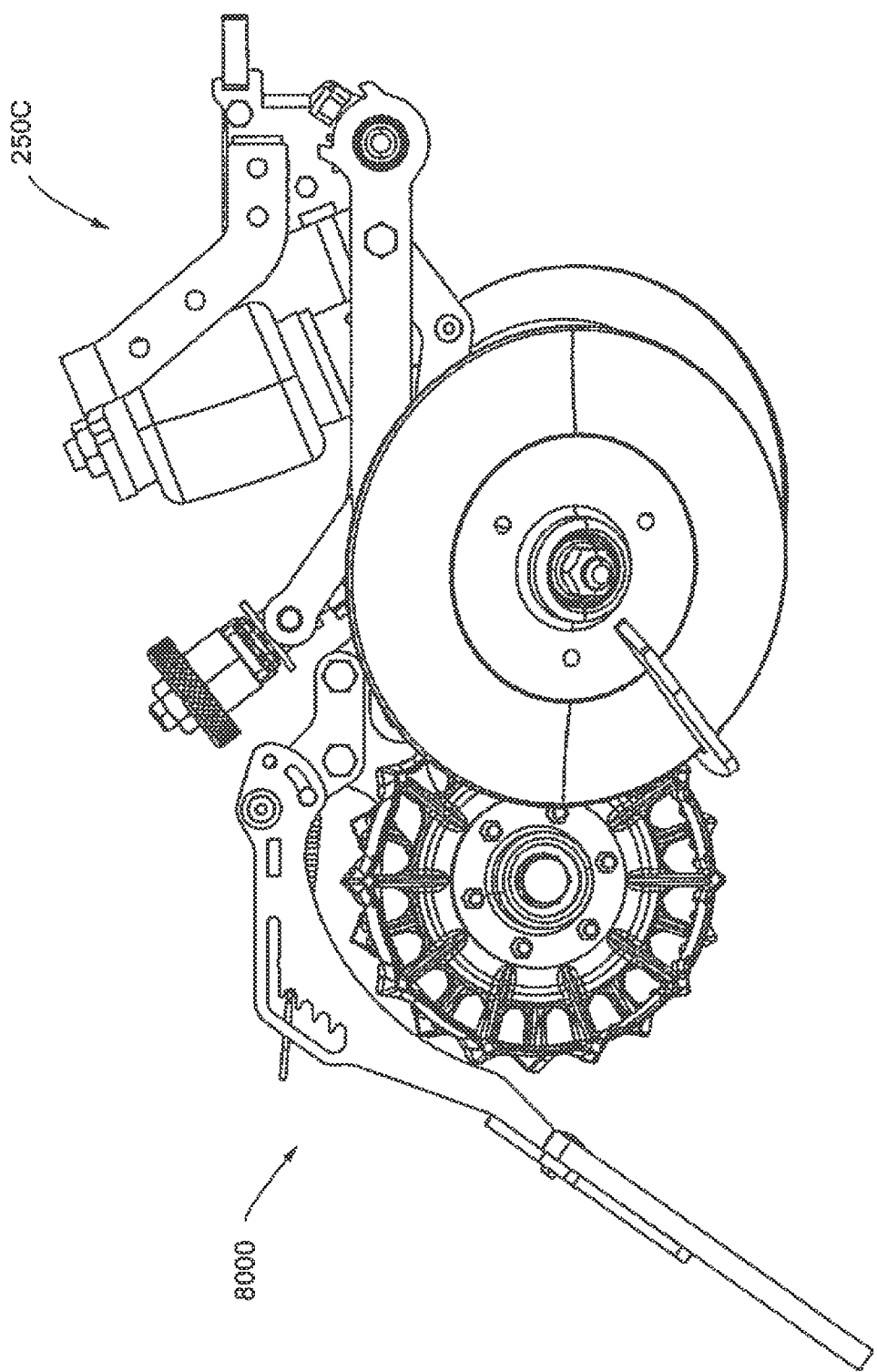
FIG. 71 is a side elevation view of the trench closing assembly of FIG. 70.
Figure 72:
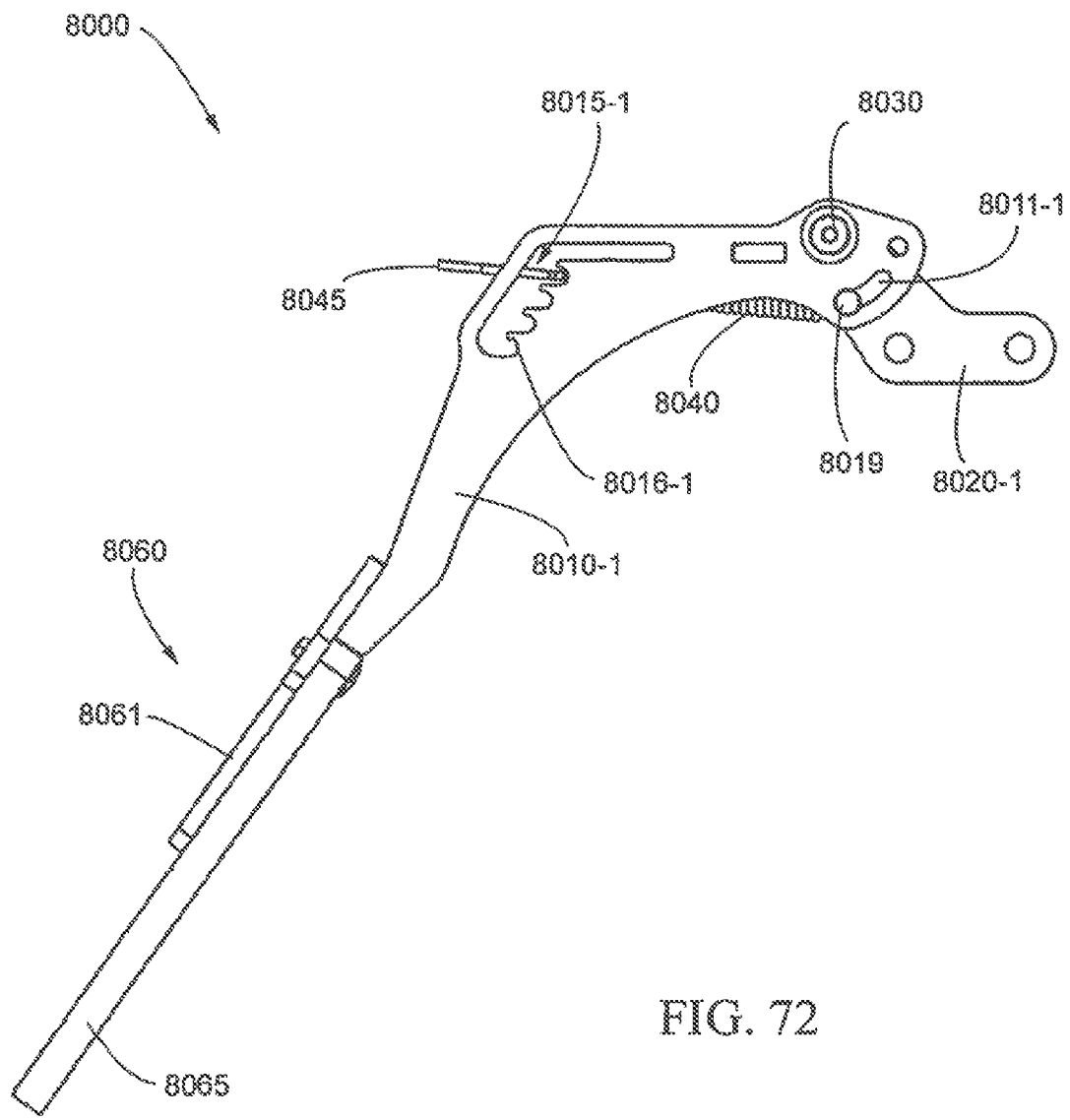
FIG. 72 is a side elevation view of the soil leveler of FIG. 70.
Figure 75:
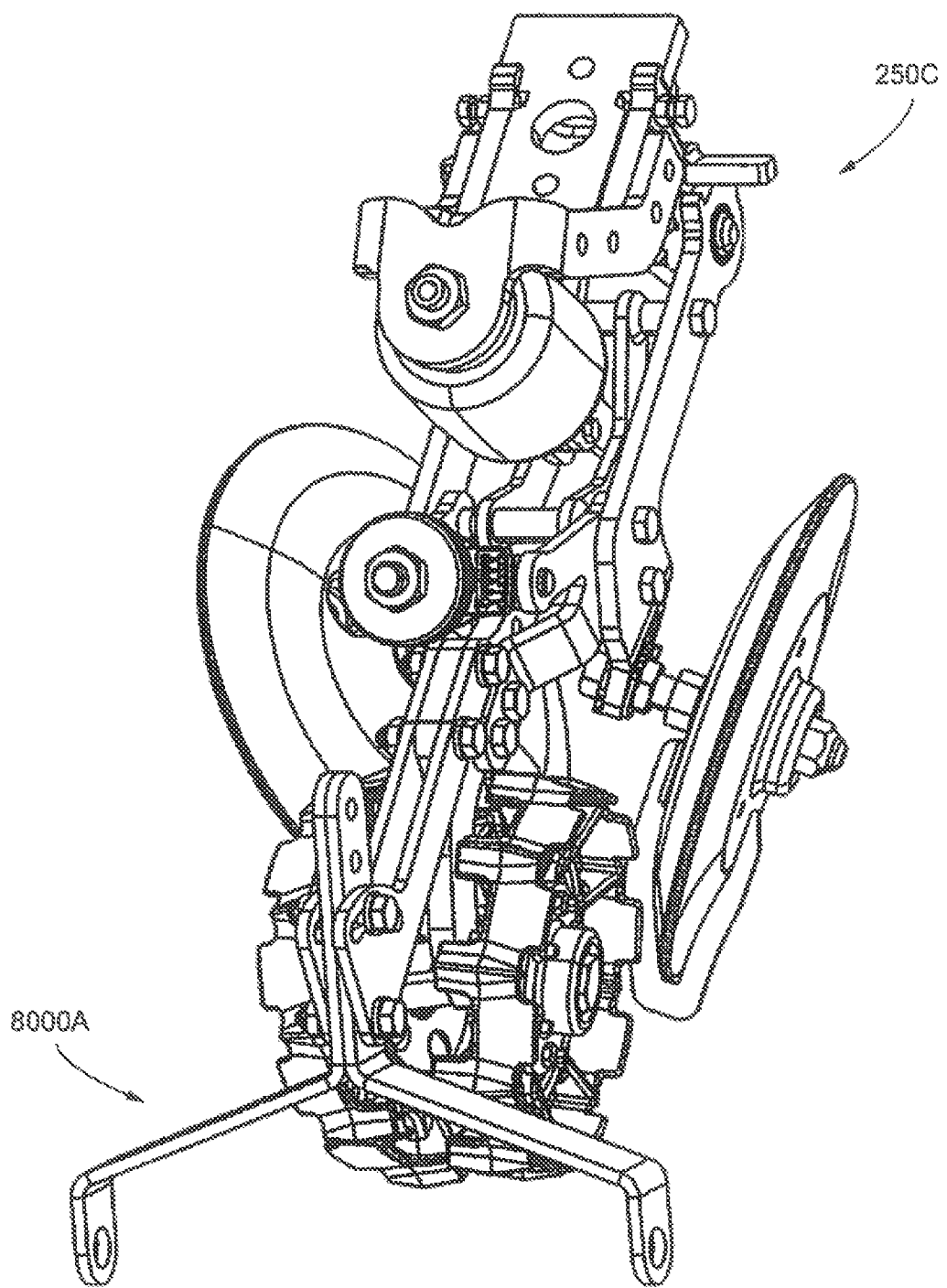
FIG. 75 is a perspective view of a trench closing assembly further including a soil leveler according to one embodiment.
Figure 76:
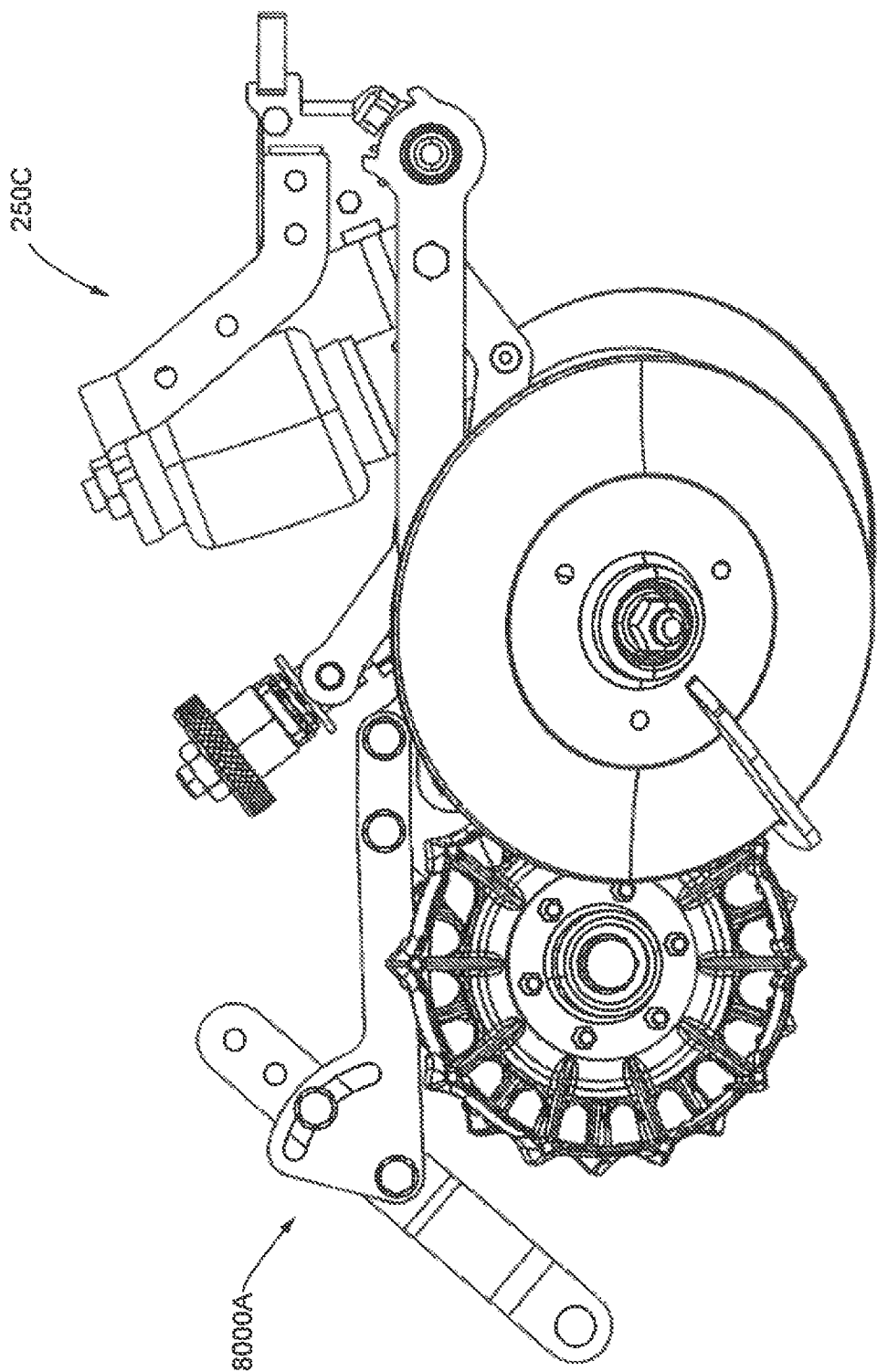
FIG. 76 is a side elevation view of the trench closing assembly of FIG. 75.
Figure 77:
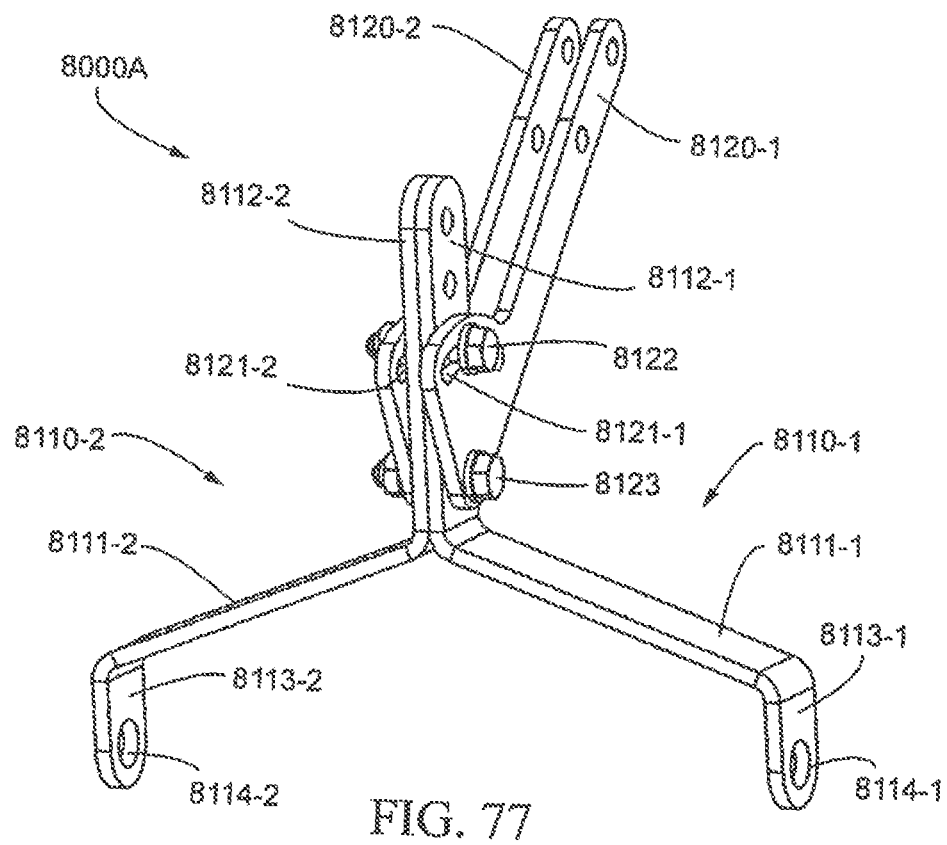
FIG. 77 is a perspective view of the soil leveler of FIG. 75.
Figure 78:
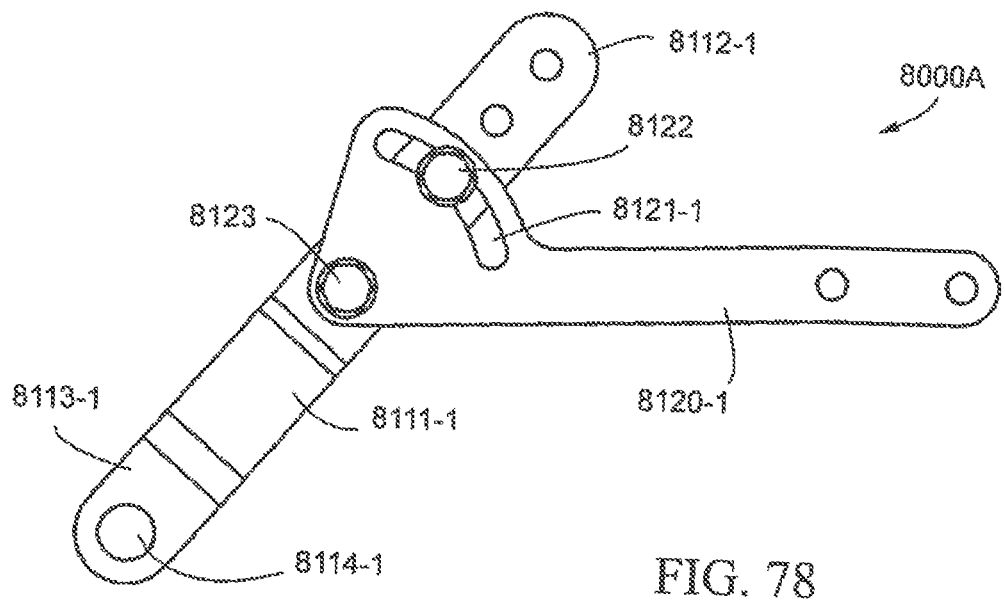
FIG. 78 is a side elevation view of the soil leveler of FIG. 77.
Figure 79:
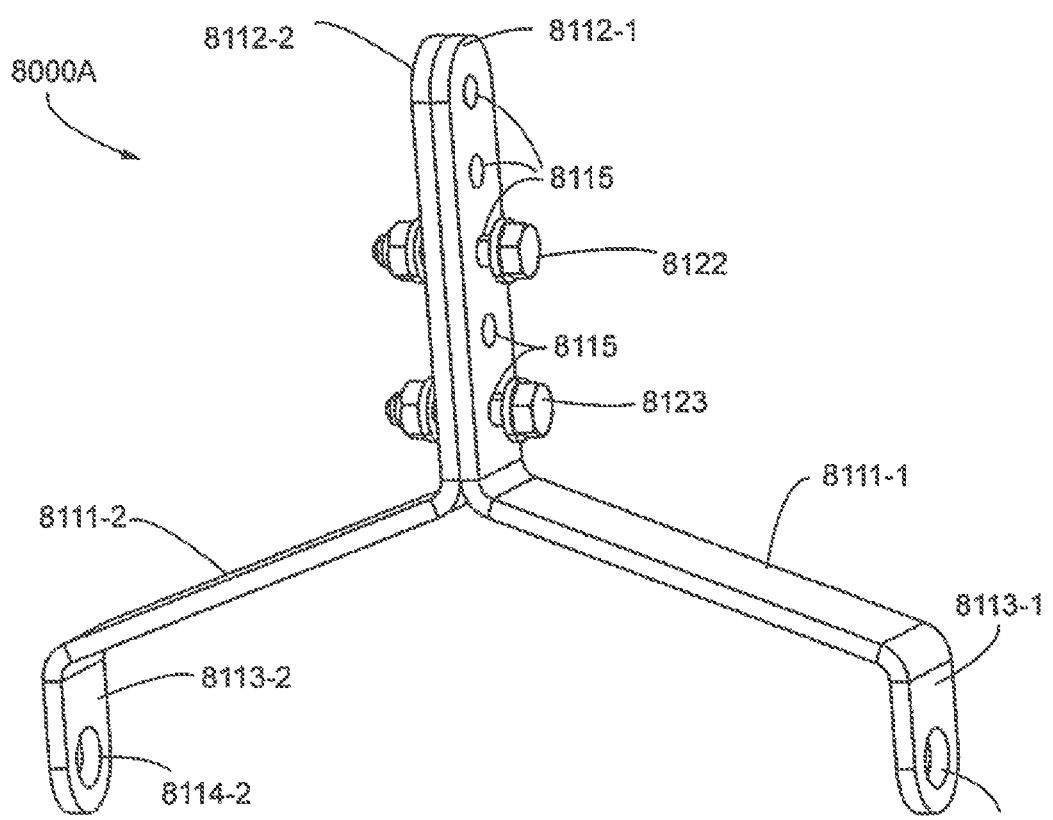
FIG. 79 is a perspective view of a portion of the soil leveler of FIG. 75.

For packing/firming wheels in general, a force sensor 261 can be a load pin installed on the axle, on the arm connecting the packing/firming wheel to the trench closing assembly 250 or row unit 200, at the connection of the packing/firming wheel arm to trench closing assembly 250 or row unit 200, or where a spring/actuator connects to the packing/firming wheel frame. FIGS. 66-69 illustrate various locations for force sensors 261 on different press wheel systems 9255A, 9255B, 9255C, and 9255D. Each press wheel system 9255A, 9255B, 9255C, and 9255D has a press wheel 255D and mounting arms 9256-1 and 9256-2. Press wheel system 9255A, 9255B, 9255C and 9255D have a connection bracket 9259 for connection to row unit 200 or to closing system 250. A load sensor 9258 can be disposed between connection bracket 9259 and row unit 200 or closing system 250. A load sensing pin 9257 can be disposed on axle 9253 or as shown in FIG. 67 on axles 9253-1 or 9253-2. A force sensor 9254, such as a Wheatstone bridge, can be disposed on arm 9256 (9256-1 or 9256-2) or as shown in FIG. 67 on arm 9256 or shank 9260. In FIGS. 67 and 68, a force sensor 9262 can be disposed where spring 9250 is attached to frame 9251 or 9251A. In FIG. 66, a force sensor 9262 can be disposed at connection 9249.

Force sensors 261, 9258, 9257, 9254, 9262 are in signal communication with monitor 300.

Figure 28:
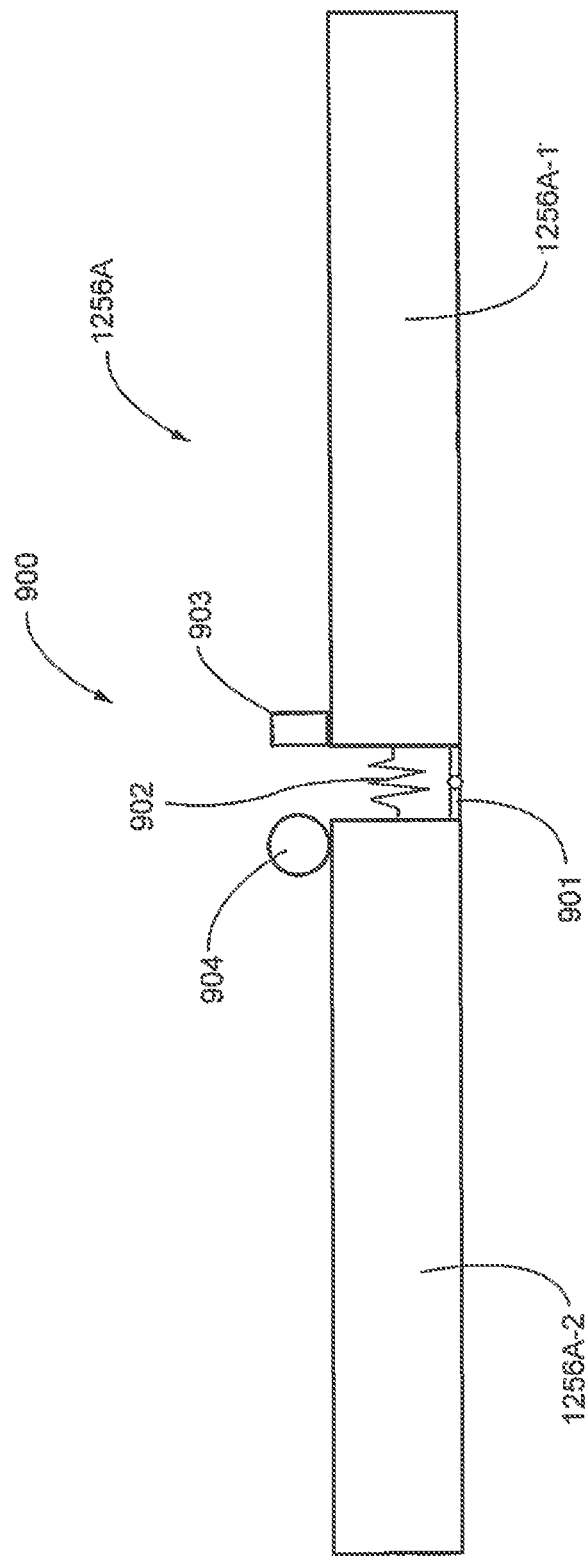
FIG. 28 is a side elevation view of the modified mounting arm with a position sensor.

In another embodiment, instead of a force sensor 261, a position sensor 900 can be used. Referring to FIG. 28, modified mounting arm 1256A has a first section 1256A-1 and a second section 1256A-2 connected with hinge 901 and with biasing member 902 (such as a spring) disposed between first section 1256A-1 and second section 1256A-2. Position sensor 900 includes a transmitter 904 and a receiver 903. It is understood that the positions of transmitter 904 and receiver 903 can be switched. An example of the transmitter 904 and receiver 903 are a magnet and Hall effect sensor. As downward forces are applied to modified mounting arm 1256A, biasing member 902 is compressed, and the distance between transmitter 904 and receiver 903 is reduced. Position sensor 900 is in signal communication with monitor 300.

Soil Leveler

FIGS. 70-74 illustrate a soil leveler 8000 according to one embodiment. As illustrated, soil leveler 8000 is attached to mounting arm 1256C of trench closing assembly 250C. Soil leveler 8000 has a first bracket 8020-1 and a second bracket 8020-2 for attaching to mounting arm 1256C. Pivotably connected to first bracket 8020-1 and second bracket 8020-2 through pivot 8030 are first arm 8010-1 and second arm 8010-2. Optionally, to stabilize first arm 8010-1 and second arm 8010-2 is cross brace 8015 connecting first arm 8010-1 and second arm 8010-2. To adjust a relative angle between the first arm 8010-1 and second arm 8010-2 and first bracket 8020-1 and second bracket 8020-2, each arm 8010 (8010-1 and 8010-2) have a slot 8011 (8011-1 shown, and 8011-2 not shown). A fastener 8019 is disposed through slots 8011 and through first bracket 8020-1 and second bracket 8020-2. Each arm 8010 (8010-1 and 8010-2) have a space 8015 (8015-1 and 8015-2) having notches 8016 (8016-1 and 8016-2), respectively. Plate 8045 is engagable with notches 8016 (8016-1 and 8016-2). Attached to plate 8045 and disposed about fastener 8019 is biasing element 8040 (such as a spring). Moving plate 8045 to different notches 8016 (8016-1 and 8016-2) adjusts the amount of biasing force applied to arms 8010 (8010-1 and 8010-2). Attached to arms 8010 (8010-1 and 8010-2) is flap 8060. Flap 8060 can be a unitary part, or as illustrated, flap 8060 has plate 8061 attached to arms 8010 (8010-1 and 8010-2) and flap portion 8065 attached to plate 8061. Optionally, flap portion 8065 can have a serrated edge 8066 for engaging the soil. Serrated edge 8066 can be sloped upwards from edges 8062 (8062-1, 8062-2) to a center 8063 of flap portion 8065.

FIGS. 75-79 illustrate another soil leveler 8000A. As illustrated, soil leveler 8000A is attached to mounting arm 1256C of trench closing assembly 250C. Soil leveler 8000A has a first bracket 8120-1 and second bracket 8120-2 for attaching to mounting arm 1256C. Connected to first bracket 8120-1 and second bracket 8120-2 are first arm 8110-1 and second arm 8110-2. As shown, first arm 8110-1 and second arm 8110-2 are disposed between first bracket 8120-1 and second bracket 8120-2, but first arm 8110-1 and second arm 8110-2 are disposed outside of first bracket 8120-1 and second bracket 8120-2. Arms 8110 (8110-1 and 8110-2) have a first section 8112 (8112-1 and 8112-2) for connecting to first bracket 8120-1 and second bracket 8120-2. Extending laterally outward (transverse to the direction of travel) is a lateral segment 8111 (8111-1 and 8111-2). Disposed downwardly from lateral segment 8111 (8111-1 and 8111-2) is leg 8113 (8113-1 and 8113-2). Disposed in leg 8113 (8113-1 and 8113-2) is a hole 8114 (8114-1 and 8114-2). While not shown, a drag line extends from hole 8114-1 to hole 8114-2 and has a length to drag across the ground. Examples of the drag line include, but are not limited to, a chain, a wire, a cable, or a rope. Each bracket 8120 (8120-1 and 8120-2) have an adjustment slot 8121 (8121-1 and 8121-2) through which fastener 8122 is disposed, and fastener 8122 is disposed through first section 8112 (8112-1 and 8112-2) of arms 8110 (8110-1 and 8110-2). Fastener 8123 is also disposed through each bracket 8120 (8120-1 and 8120-2) and each first section 8112 (8112-1 and 8112-2) of arms 8110 (8110-1 and 8110-2). The relative angle between the brackets 8120 (8120-1 and 8120-2) and the arm 8110 (8110-1 and 8110-2) can be adjusted by pivoting about fastener 8123. To adjust a distance between holes 8114 (8114-1 and 8114-2) and brackets 8120 (8120-1 and 8120-2), first sections 8112 (8112-1 and 8112-2) can optionally have a plurality of holes 8115 for adjusting a position of arms 8110 (8110-1 and 8110-2).

FIGS. 80-104 illustrate a trench closing assembly 250D according to another embodiment. In this embodiment, trench closing assembly 250D has a main frame 251D that is connected to row unit 200. Trench closing assembly 250D has a frame 1520, an actuator 259, a pair of closing wheels 254D-1, 254D-2, and optionally, a press wheel 255D.

Figures 115, 116:
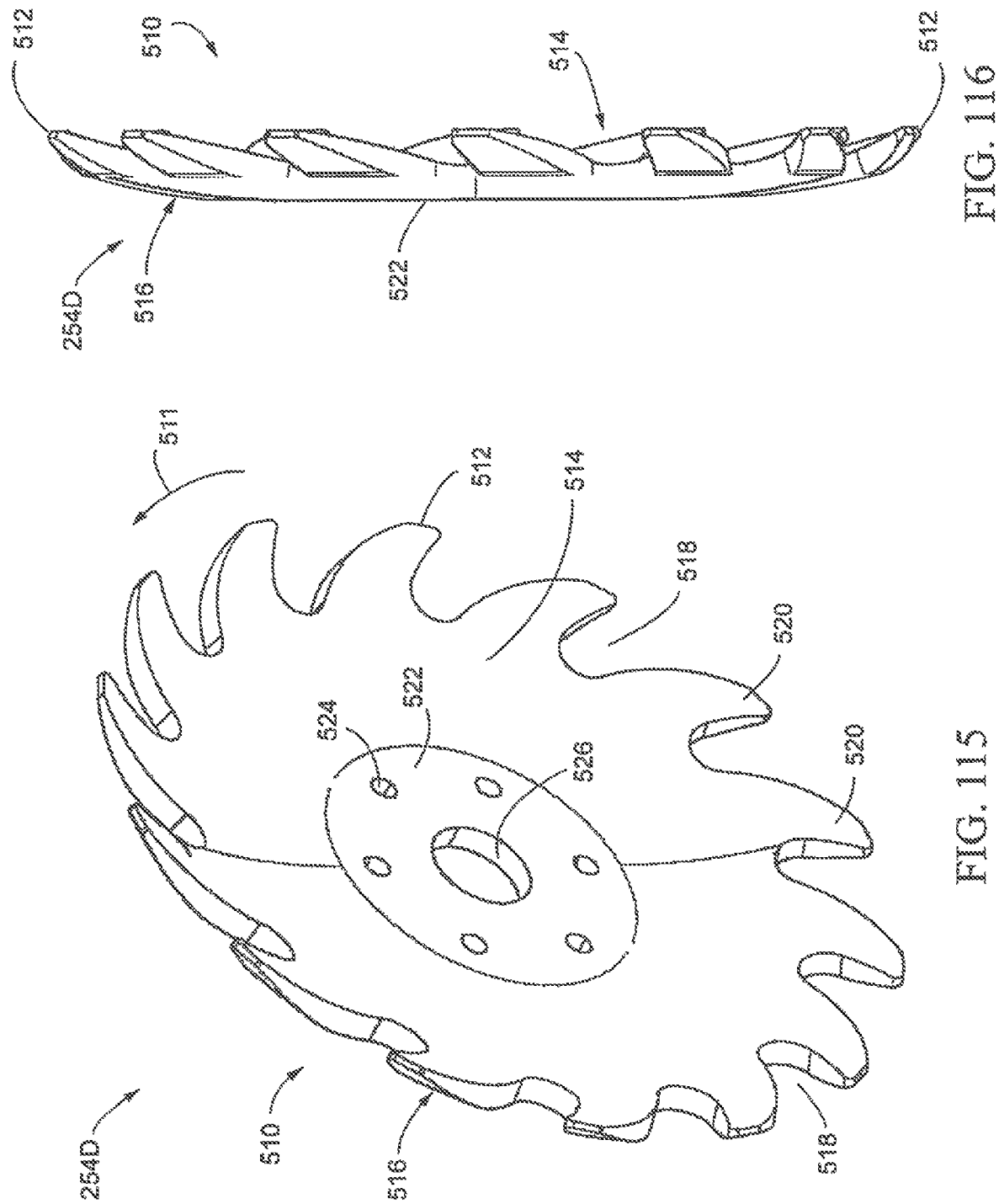
FIG. 115 is an enlarged perspective view of one embodiment of the closing wheel shown in FIG. 80.
FIG. 116 is a side elevation of the closing wheel of FIG. 115.
Figure 117:
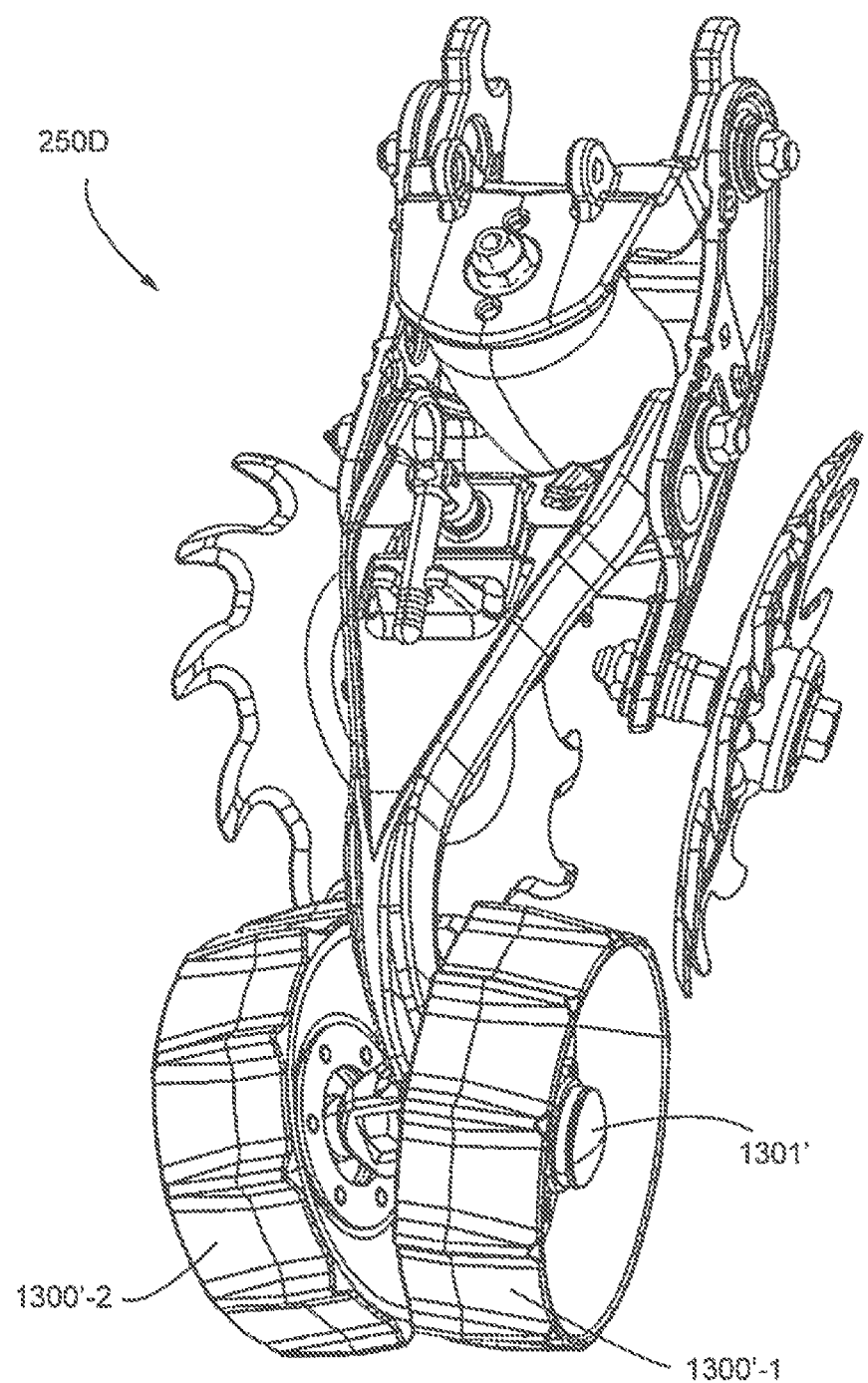
FIG. 117 is a perspective view of a trench closing assembly with an embodiment of a wheel which may be used as press wheels.
Figure 121:
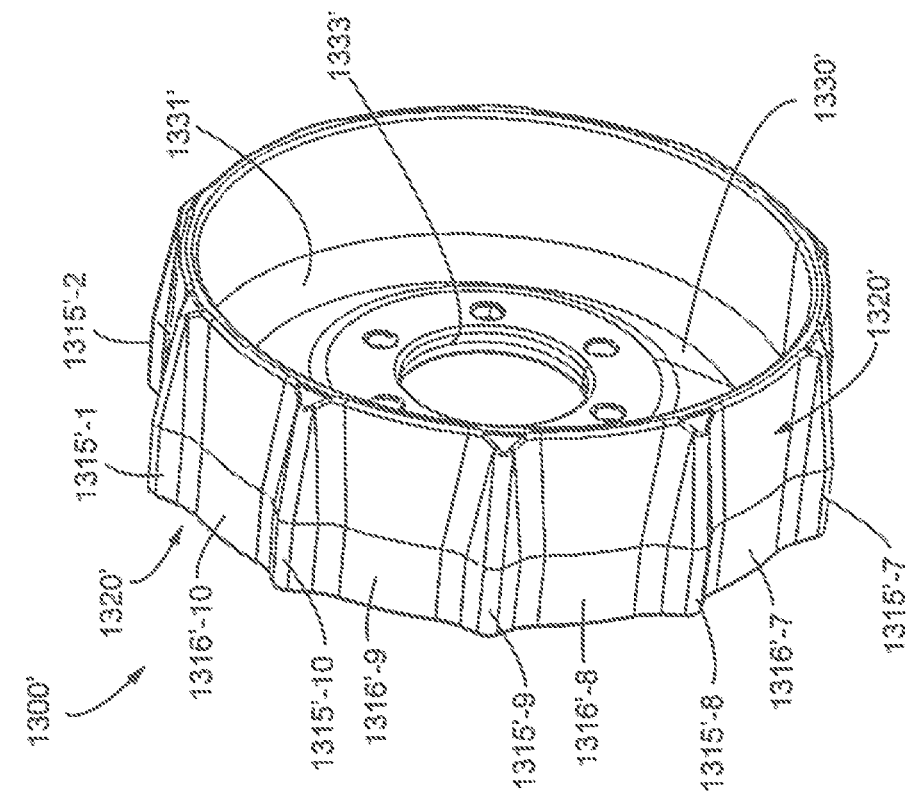
Figure 118:
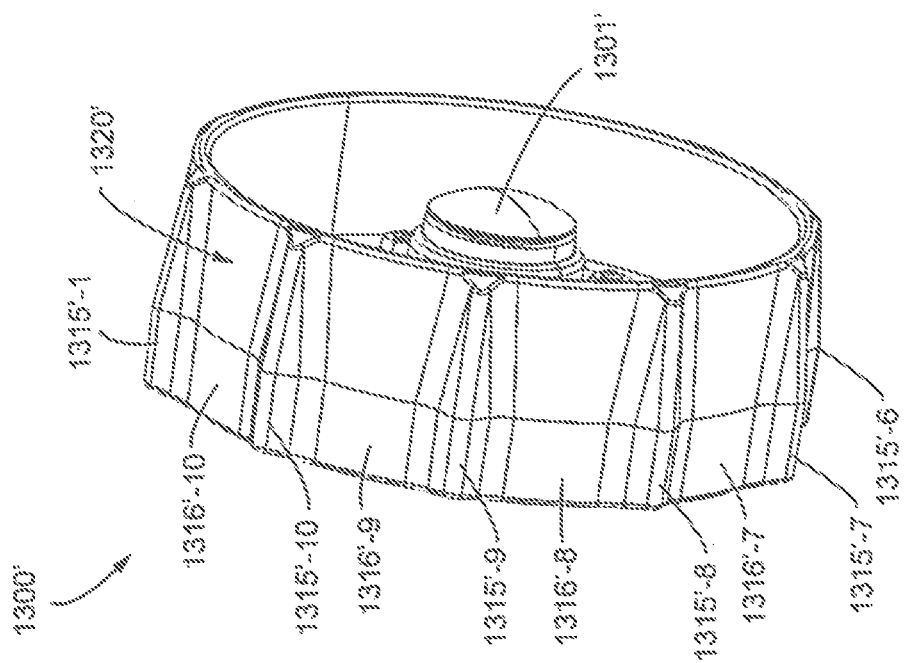
Figures 119, 120:
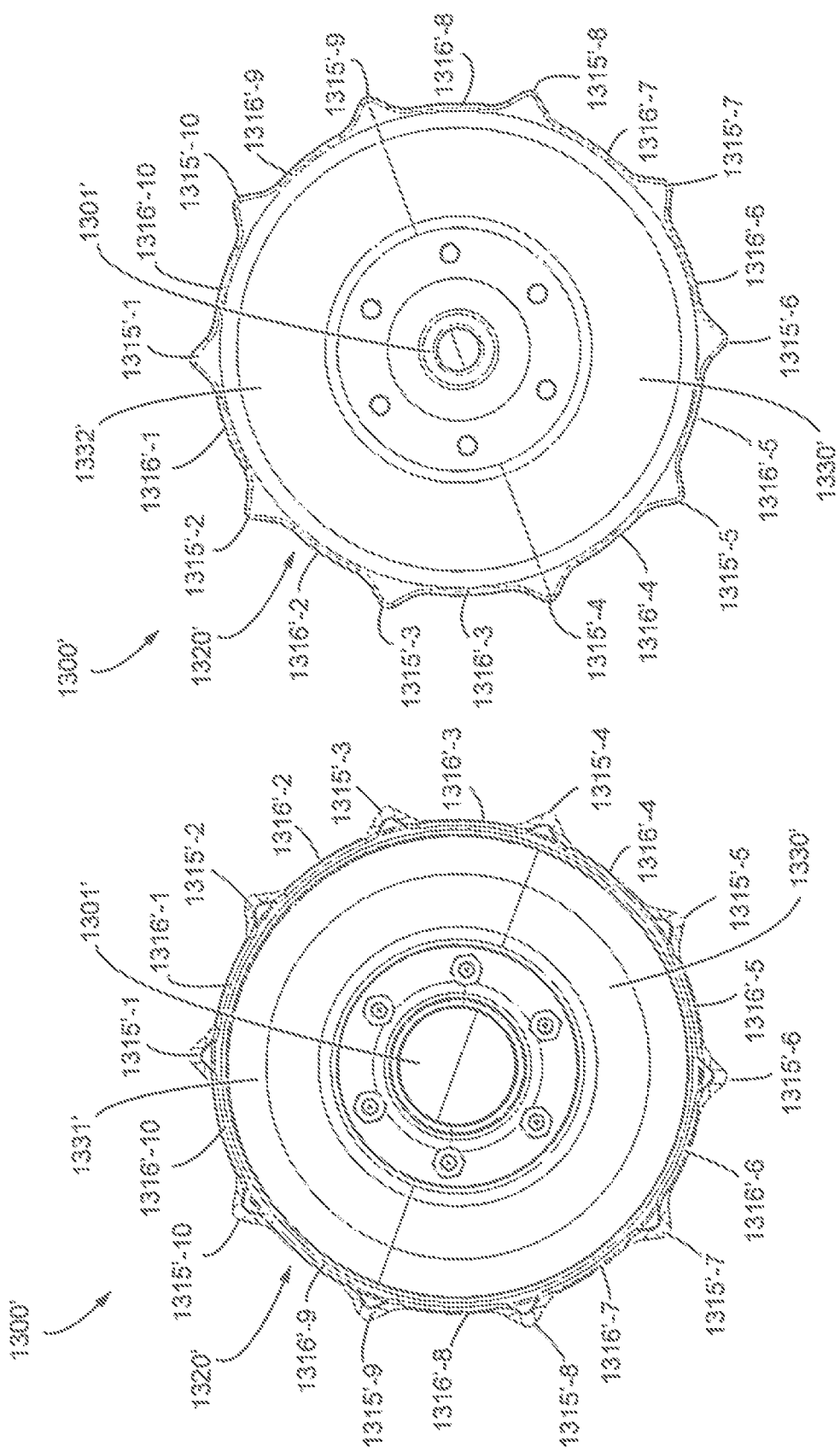

FIGS. 115 and 116 are enlarged perspective and side elevation views, respectively, of the closing wheels 254D-1, 254D-2 of the trench closing assembly 250D. The closing wheels 254D-1, 254D-2 are mirror images of one other and therefore only one closing wheel is shown in FIGS. 115 and 116 generally designated by referenced by reference number 254D. In this embodiment, the closing wheels 254D comprise a generally dish-shaped body 510 in the form of a disc blade with a circumferential edge 512 and having a concave surface 514 on one side and a convex surface 516 on the opposing side. As best viewed in FIG. 80, the closing wheels 254D-1, 254D-2 are mounted so as to be disposed on each side of the open furrow with their convex sides 516 oriented inward toward the open furrow. The closing wheels 254D-1, 254D-2 are also oriented such that they angle outwardly upward (i.e., their respective circumferential edges 512 are closer to one another or they converge toward one another in the direction of the soil surface). Additionally, the closing wheels 254D-1, 254D-2 are mounted at an angle with respect to one another fore and aft (i.e., in the direction of travel) such that their respective circumferential edges 512 are closer to one another toward the rear than toward the forward direction of travel. Thus, due to their orientation and the convex shape toward the open furrow, as the row unit is drawn through the field causing the closing wheels to rotate through the soil, the closing wheels act to push the soil inward toward the open furrow, thus "closing" or filling the furrow with soil to cover the previously deposited seed.

The circumferential edge 512 of the dish-shaped body 510 may be continuous or the circumferential edge 512 may include a series of radially spaced notches 518 that are cut or otherwise formed around the outer circumferential periphery resulting in a series of radially spaced teeth or spikes 520. The notches 518 may be formed, so that each tooth or spike 520 curves or sweeps opposite the direction of rotation as indicated by arrow 511. It should be appreciated that this rearward swept orientation will reduce the amount of soil thrown by the teeth 520 because the teeth rotate out of the soil more vertically than if the teeth were straight. To improve penetration into the soil, the convex side 516 may be ground down, beveled or otherwise formed to taper toward the circumferential edge 512 as best viewed in FIG. 116, so the circumferential edge 512 is thinner or sharper for easier penetration into the soil.

Figure 80:
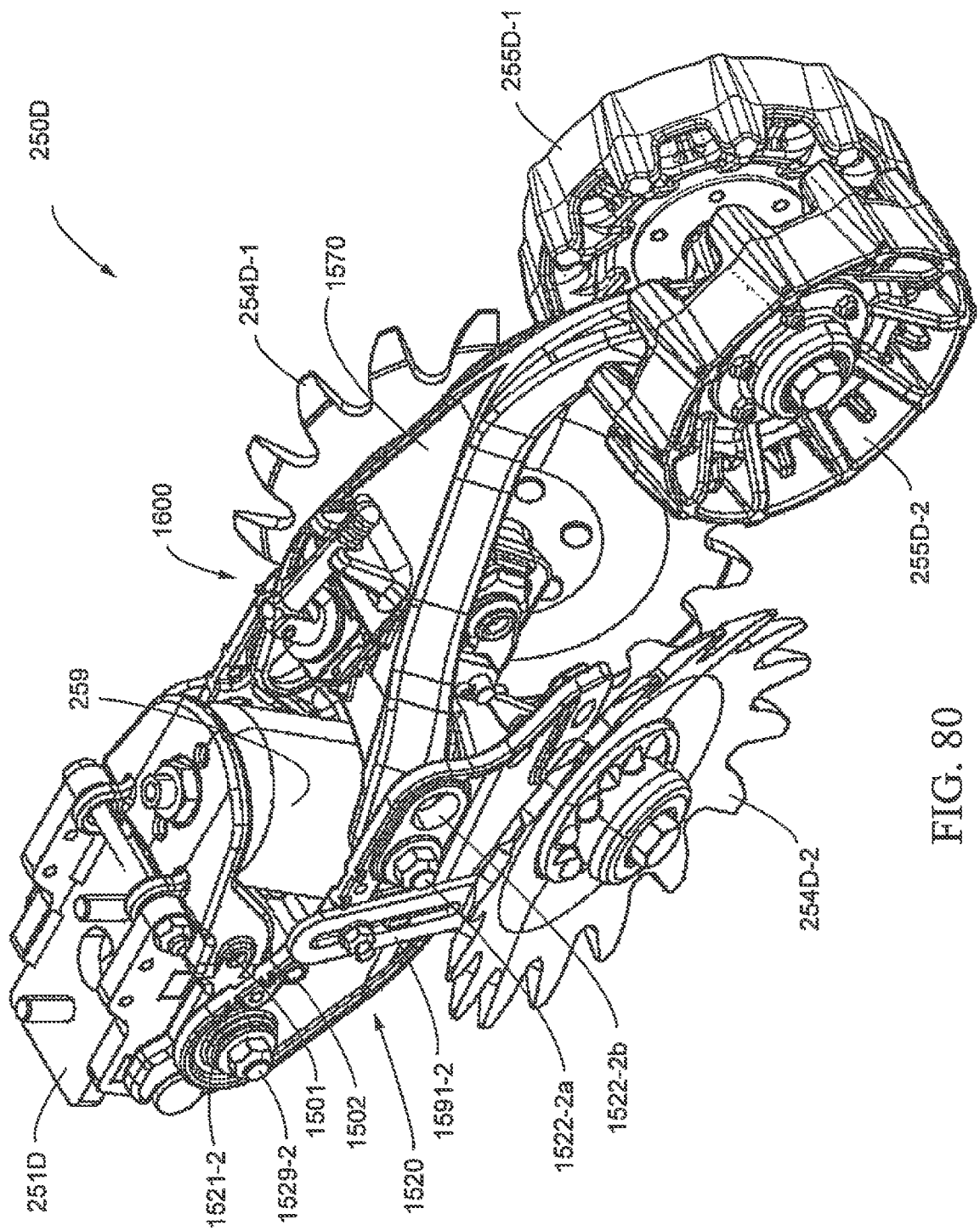
FIG. 80 is a left side elevation view of an embodiment of a trench closing assembly.
Figure 86:
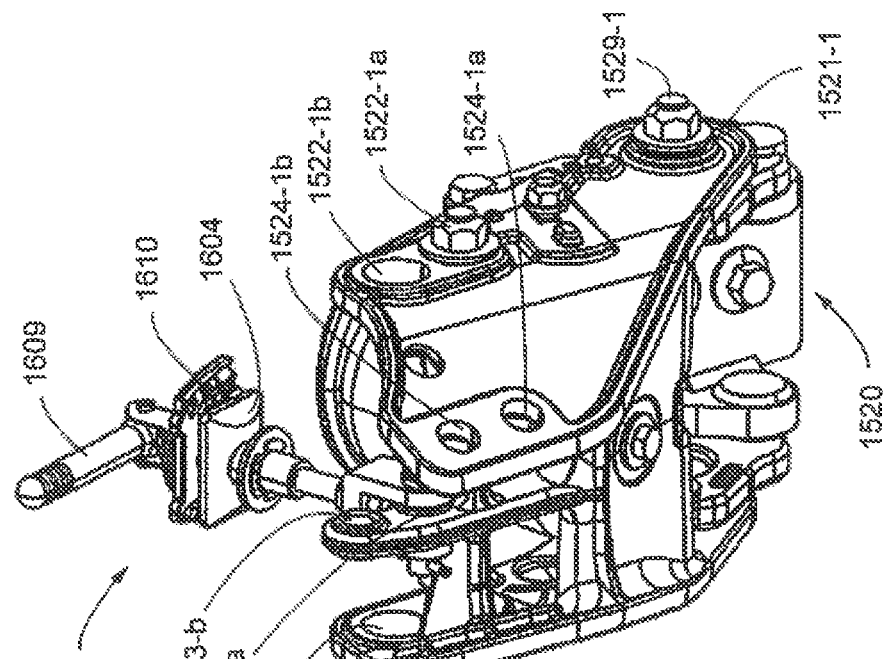
FIG. 86 is a bottom perspective view of the trench closing assembly of FIG. 85 with some parts removed.
Figure 85:
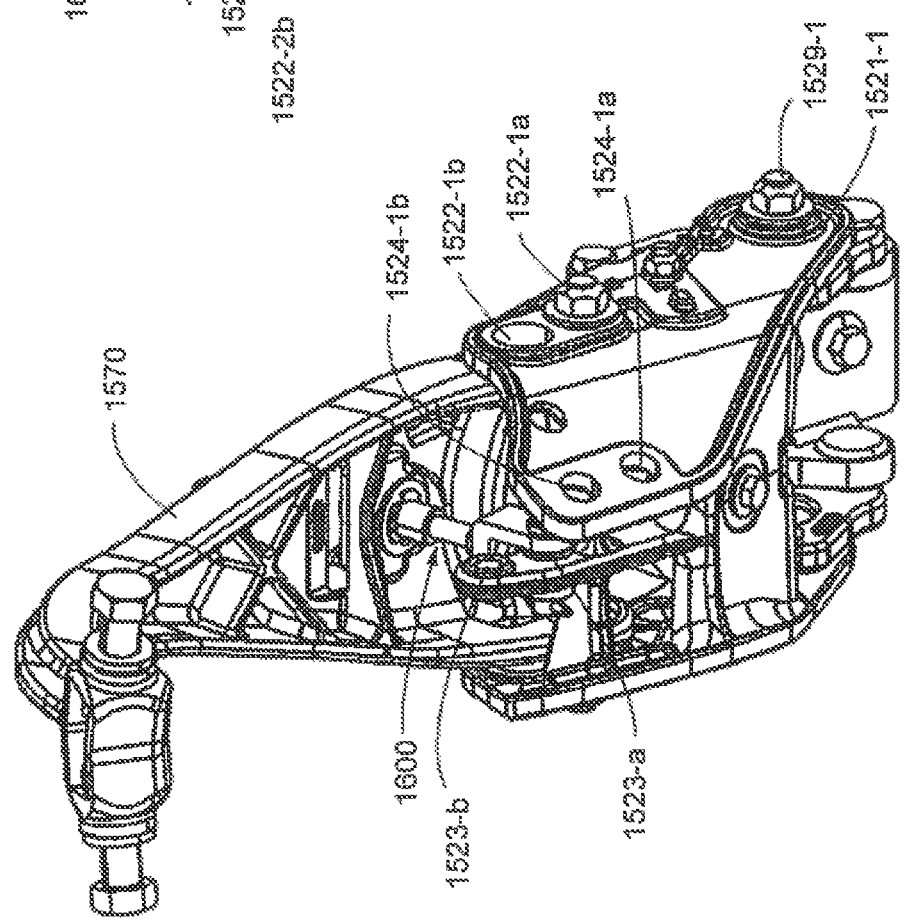
FIG. 85 is a bottom perspective view of the trench closing assembly of FIG. 84 with some parts removed.
Figure 100:
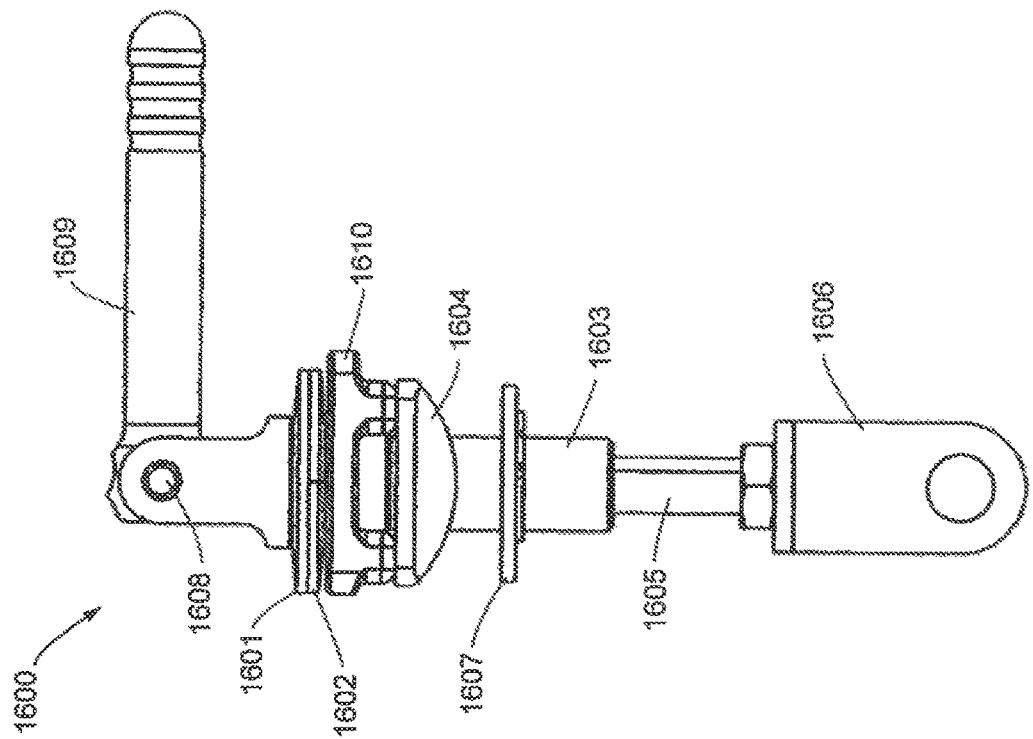
Figure 99:
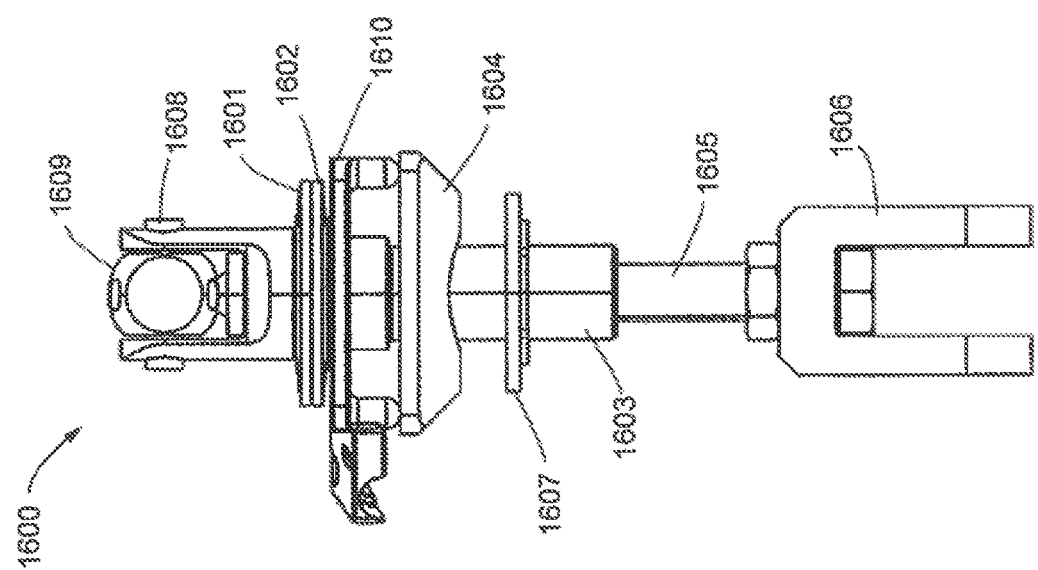
FIG. 99 is a left side elevation view of the handle assembly of FIG. 98.
Figure 103:
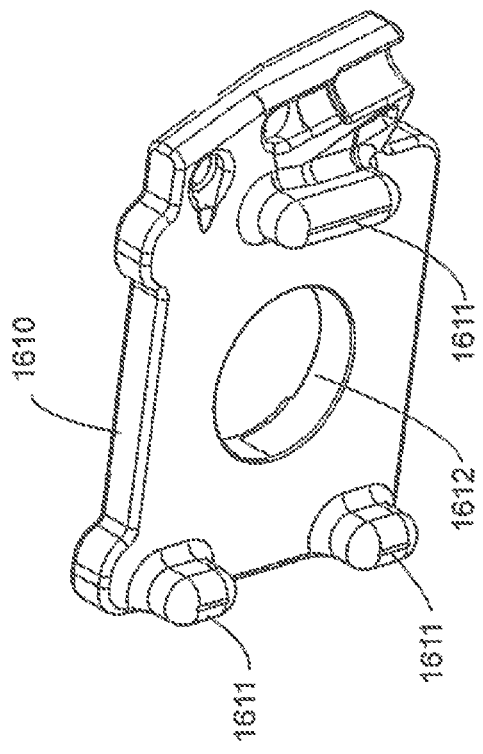
FIG. 103 is a top perspective view of the pressure sensor of FIG. 102.
Figure 102:
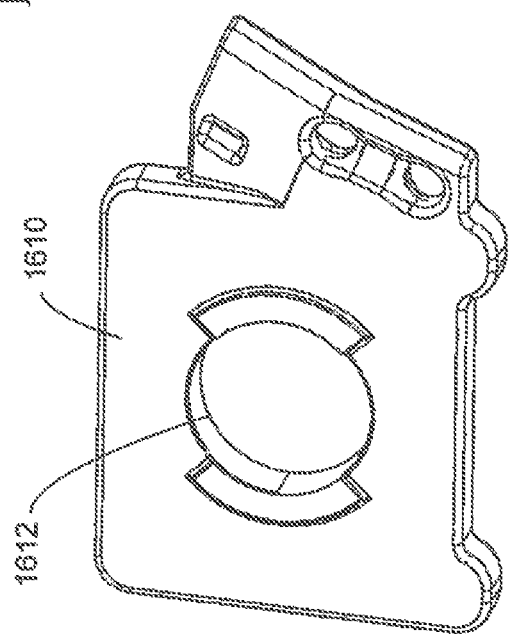
FIG. 102 is a bottom perspective view of the pressure sensor of the handle assembly of FIG. 98.
Figure 101:
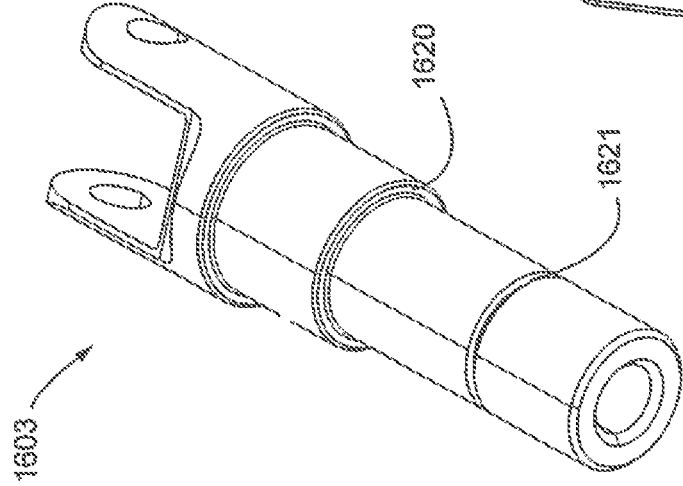
FIG. 101 is a perspective view of the shank of the handle assembly of FIG. 98.
Figure 104:
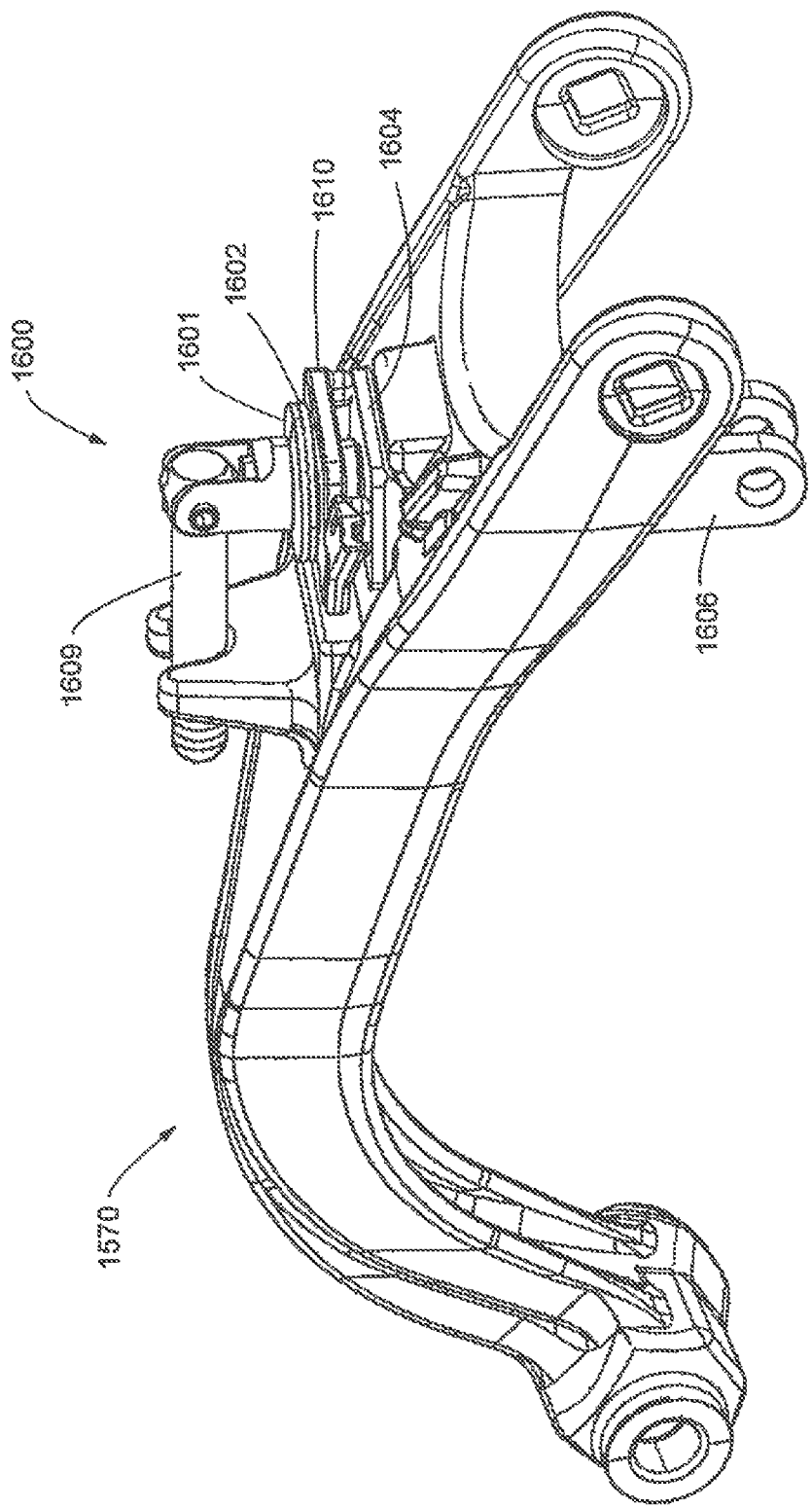
FIG. 104 is a perspective view of the handle assembly and mounting arm of the trench closing assembly of FIG. 80.

The dish shaped body 510 may have a generally flat or planar central region 522 with bolt holes 524 and a central aperture 526 for mounting to a hub or spindle as shown in FIG. 80.

The closing wheel 524D may be fabricated by any suitable means. One exemplary manner of fabrication is to cut the body 510 out of flat plate steel having a generally uniform thickness to produce a wheel blank. The blank may then be placed in a forming die and pressed to the desired dish-shape. The dish-shaped blank may then undergo further processing, such as cutting the notches 518, if desired, to form teeth 520 around the outer circumferential periphery. The outer circumferential periphery may then be ground or tapered to produce a thinner or sharper outer circumferential edge. Alternatively the notches or teeth may be cut into the blank before being pressed to the desired dish shape.

As illustrated, the press wheel 255D may comprise a pair of press wheels 255D-1, 255D-2, but a single press wheel (not shown) may be utilized. Actuator 259 can apply one force between frame 251D and frame 1520, and this force can be divided between the closing wheels 254 and the press wheel 255D.

Turning to FIGS. 91-96, frame 251D has a connection bracket 1540 and an attachment bracket 1550. Connection bracket 1540 can have one or more bolts 1209D extending through apertures 1207D in connection bracket 1540 for mounting the frame 251D to the row unit 200. Connection bracket 1540 (as with connection brackets 1200 and 1201A) can be varied to mate attachment to different styles of row units. Connection bracket 1540 has a first side 1542-1, a second side 1542-2, and a plate 1543 disposed between first side 1542-1 and second side 1542-2. First side 1542-1 and second side 1542-2 each have a post 1541-1 and 1541-2, respectively, protruding perpendicularly outward.

Attachment bracket 1550 connects to connection bracket 1540. Attachment bracket 1550 provides a common structure for mounting other parts while connection bracket 1540 has a varied structure to mate with different styles of row units. Attachment bracket has a first side 1552-1, a second side 1552-2, a crossbar 1557 disposed between first side 1552-1 and second side 1552-2, and plate 1553 disposed between first side 1552-1 and second side 1552-2, and plate 1553. First side 1552-1 and second side 1552-2 each have a u-shaped opening 1555-1 and 1555-2, respectively, for connection to posts 1541-1 and 1541-2, respectively. First side 1552-1 and second side 1552-2 have openings 1558-1 and 1558-2, respectively, for accepting pivots 1529-1 and 1529-2, respectively. Attachment bracket 1550 can be secured to connection bracket with fastener 1549. Optionally, attachment bracket 1550 can also have an opening 1501 disposed in first side 1552-1 or second side 1552-2 for accepting a pin. While connection bracket 1540 is illustrated with separate parts it may be fabricated as a unitary part.

Optionally, as illustrated in FIGS. 82 and 84, a guard 1590 can be disposed on frame 1520 ahead of closing wheels 254D-1, 254D-2. Guard 1590 can prevent rocks, rootballs, or other trash from approaching closing wheels 254D-1, 254D-2. The height of guard 1590 can be adjusted by changing the placement of arms 1591-1 and 1591-2 on frame 1520.

Turning to FIGS. 97-98, mounting arm 1570 has a first side 1571-1, a second side 1571-2, a plate 1574 disposed between first side 1571-1 and second side 1571-2, a hole 1573 through plate 1574 for passage of sleeve 1603, axle hubs 1575-1 and 1575-2 for mounting press wheels 255D-1 and 255D-2, respectively, and, optionally, a handle cradle 1579.

Turing to FIGS. 83-90, frame 1520 is pivotally connected to frame 251D through pivots 1529-1 and 1529-2. Frame 1520 has a first side 1526-1 and a second side 1526-2, a plate 1525 connecting first side 1526-1 and second side 1526-2, a connection arm 1527 extending rearwardly along the direction of travel from plate 1525, a cross-brace 1528-1 connecting connection arm 1527 to first arm 1526-1, a cross-brace 1528-2 connecting connection arm 1527 to second arm 1526-2. First side 1526-1 and second side 1526-2 have openings 1521-1 and 1521-2 for disposing about pivots 1529-1 and 1529-2, respectively. Mounting arm 1570 can attach to frame 1520 at connections 1522-1a and 1522-2a or to 1522-1b and 1522-2b. The plurality of connections allows the distance between closing wheels 254D-1, 254D-2, and press wheel 255D (255D-1, 255D-2) to be changed. There can be one connection 1522 or a plurality of connections 1522. As the mounting arm 1570 position is changed, there are also corresponding connections 1523-a and 1523-b (matching in number to connection 1522) for connecting handle assembly 1600 to frame 1520. Frame 1520 also has connections 1524 (1524-1a, 1524-1b, 1524-2a, and 1524-2b) for mounting closing wheels 254D-1, 254D-2. While there can be one set of connections 1524, the plurality of connections 1524 allow for forward and back placement of the closing wheels 254D-1, 254D-2 on frame 1520, or closing wheels 254D-1, 254D-2 can be offset from each other with one closing wheels 254D-1, 254D-2 being mounted to a forward location (the "a" position) or to a rear location (the "b" position). As illustrated, closing wheels 254D-1, 254D-2 are offset from each other. Optionally, frame 1520 can have an opening 1502 in either the first side 1526-1 or second side 1526-2 (shown in 1526-2) for accepting a pin. Frame 1520 can be raised to allow opening 1501 and opening 1502 to align for accepting a pin (not shown). This allows trench closing assembly 250D to be raised for transport or when closing is not needed. While illustrated on one side, openings 1501 and 1502 can be disposed on both sides.

Actuator 259 is disposed between plate 1525 and plate 1553 to apply a force to plate 1553 to cause frame 1520 to pivot and apply pressure to closing wheels 254D-1 and 254D-2.

Turning to FIGS. 99-104, handle assembly 1600 is illustrated. Handle assembly 1600 has a sleeve 1603 having a first diameter 1620 and a second diameter 1621. Second diameter 1621 is small enough to be disposed through load sensor 1610, and first diameter 1620 is large enough so that it cannot pass through load sensor 1610. Sleeve 1603 has a bracket 1622 (u-shaped bracket as illustrated or any other shape) for accepting handle 1609. Disposed on sleeve 1603 below bracket 1622 are bevel washers 1601 and 1602. Bevel washer 1601 and bevel washer 1602 are disposed with their concave surfaces facing each other. This allows bevel washers 1601 and 1602 to flex to absorb shocks experienced by trench closing assembly 250D to prevent overloading of load sensor 1610. Before bevel washers 1601 and 1602 reach maximum flex, first diameter 1620 will contact plate 1604 to limit the travel. Load sensor 1610 is a pancake load sensor. Load sensor 1610 has a hole 1612 for passage of sleeve 1603. Disposed on the underside of load sensor 1610 are a plurality of feet 1611 to allow load sensor 1610 to flex and measure force. Load sensor 1610 can be disposed on mounting arm 1570 directly, or as shown, a plate 1604 can be disposed between load sensor 1610 and mounting arm 1570. Optionally, a washer 1607 can be disposed about sleeve 1603 under mounting arm 1570. Handle assembly 1600 is connected to frame 1520 at connection 1523-a or 1523-b with a bracket 1606 (u-shaped bracket) and a bolt 1605 connecting bracket 1606 with sleeve 1603. In the horizontal position, handle 1609 locks handle assembly 1600 in place against mounting arm 1570. In the vertical position, handle 1609 releases handle assembly from engagement with mounting arm 1570. Bolt 1605 can be adjusted to set a vertical placement of mounting arm 1570 relative to frame 1520.

Load sensor 1610 can be connected to a network directly through a plug (not shown) having a CAN processor to allow direct communication over a CAN network. The CAN processor can communicate pressure readings and provide control signals over the CAN network. Alternatively, load sensor 1610 can be connected to a control module (either an on-row module, or a module controlling a plurality of row) to communicate pressure readings that are then processed by the control module.

Figure 107:
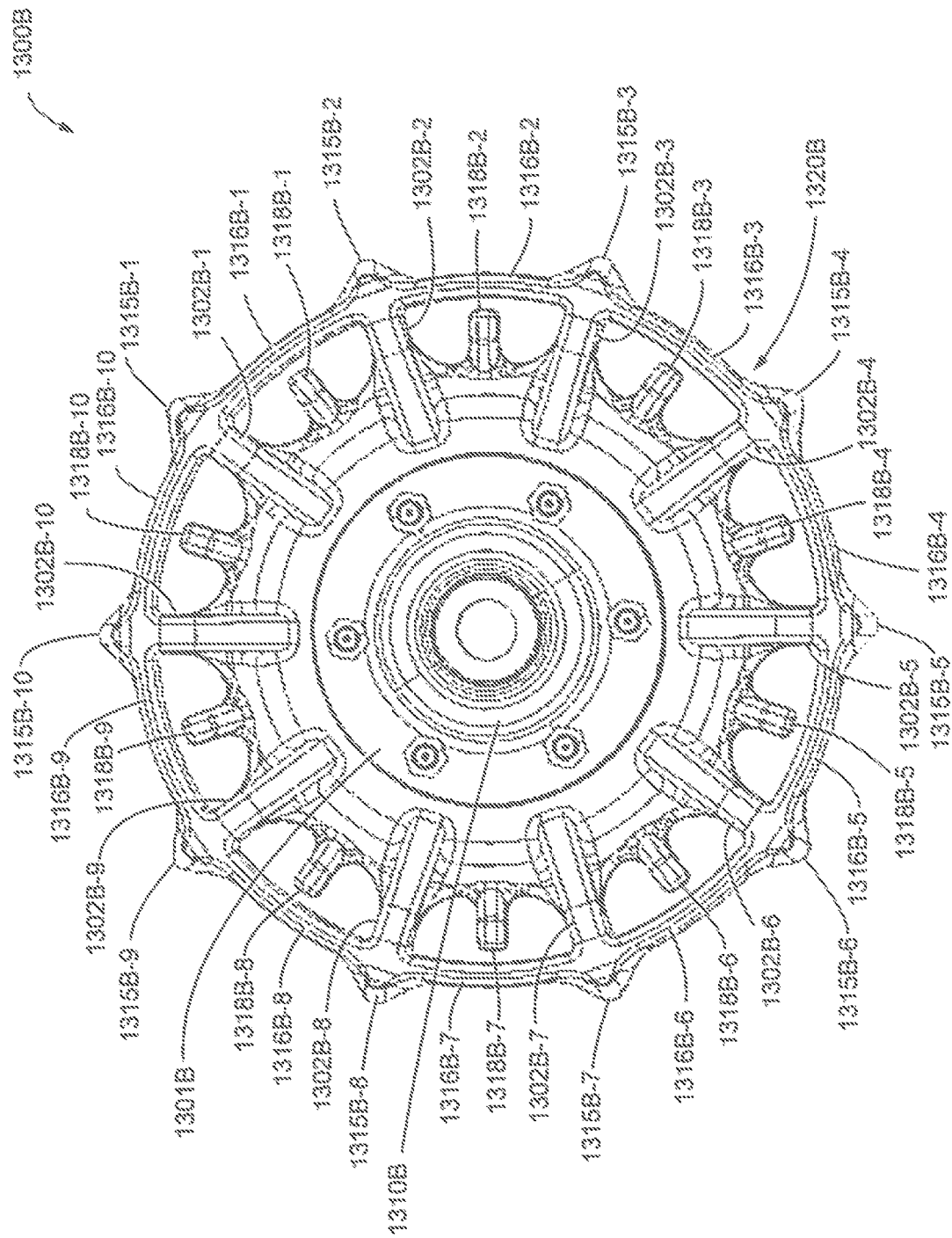
FIG. 107 is a front elevation view of the press wheel of FIG. 105.

FIGS. 105-107 illustrate another embodiment of a wheel 1300B. Wheel 1300B can be used as press wheel 255, 255A, 255C or 255D. Wheel 1300B comprises a spoke disk 1310B and a hub 1301B. Spoke disk 1310B can be molded as a unitary part. Spoke disk 1310B has plurality of spokes 1302B (1302B-1 to 1302B-10). Connecting spokes 1302B is a tread 1320B. Tread 1320B has a rib 1315B (1315B-1 to 1315B-10) disposed at the radial end of spoke 1302B. Between each rib 1315B, there is a tread portion 1316B (1316B-1 to 1316B-10). Tread portion 1316B can extend through the entire width A of a rib 1315B, or tread portion 1316B can extend only a portion of the width A to leave a gap 1317B (1317B-1 to 1317B-10). Wheel 1300B can be similar to wheel 1300A. Tread portion 1316B can be flexible to allow tread portion 1316B to deflect inward towards hub 1301B. To limit the amount of flex of tread portion 1316B, stops 1318B can be disposed radially outward from spoke disk 1310B between spokes 1302B. The height of stops 1318B (as a percentage of the distance between spoke disk 1310B and tread portion 1316B) and the width of stops 1318B (as a percentage of the distance between spokes 1302B) can be varied to regulate the amount of flex permitted for tread portion 1316B so that mud that is built up on tread portion 1316B will come off of tread portion 1316B.

FIGS. 108 to 114 illustrate a fluid control assembly 6800 according to one embodiment. Fluid control assembly 6800 controls the flow of fluid to and from actuator 259. Fluid control assembly has a housing 6801. There is a fluid inlet port 6802 from a fluid source (not shown). In one embodiment, the fluid can be air, but other fluids can be used. There is an outlet port 6803 on housing 6801 to return fluid to the fluid source, or in the case of air, outlet port 6803 can vent to atmosphere. Fluid control assembly 6800 has a conduit 6804 on housing 6801 to provide fluid communication to actuator 259. Fluid control assembly 6800 has a port 6809 disposed through housing 6801 to allow signal communication with communication port 6890.

Figure 109:
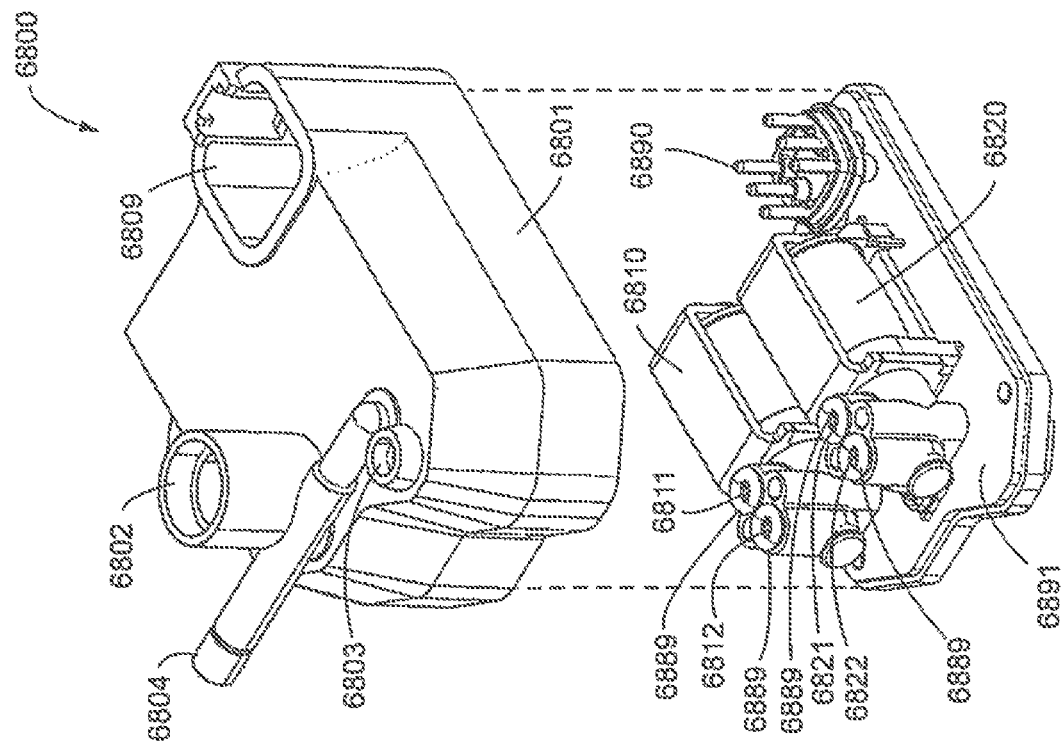
FIG. 109 is an exploded perspective view of the fluid control assembly of FIG. 108.
Figure 108:
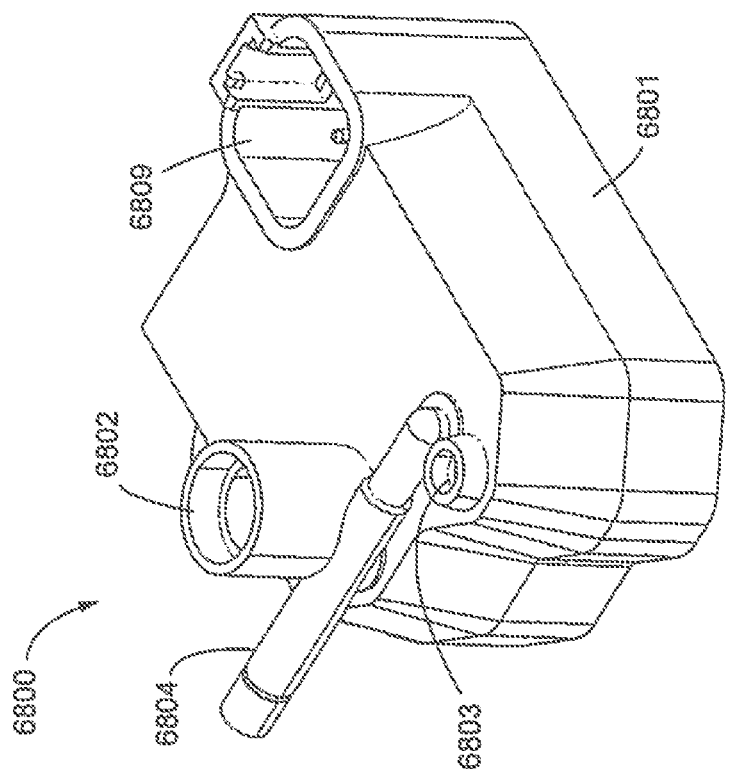
FIG. 108 is a perspective view of an embodiment of a fluid control assembly.
Figure 111:
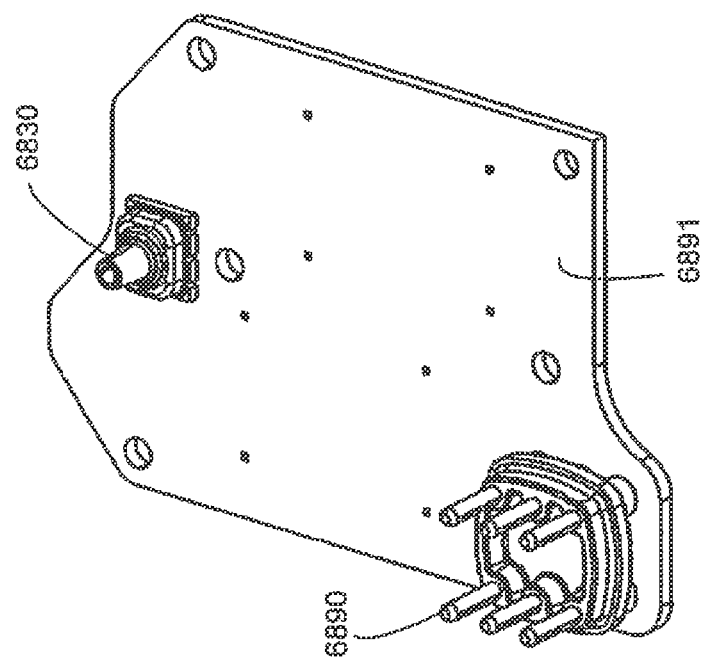
FIG. 111 is a perspective view of the board of the fluid control assembly of FIG. 108.
Figure 110:
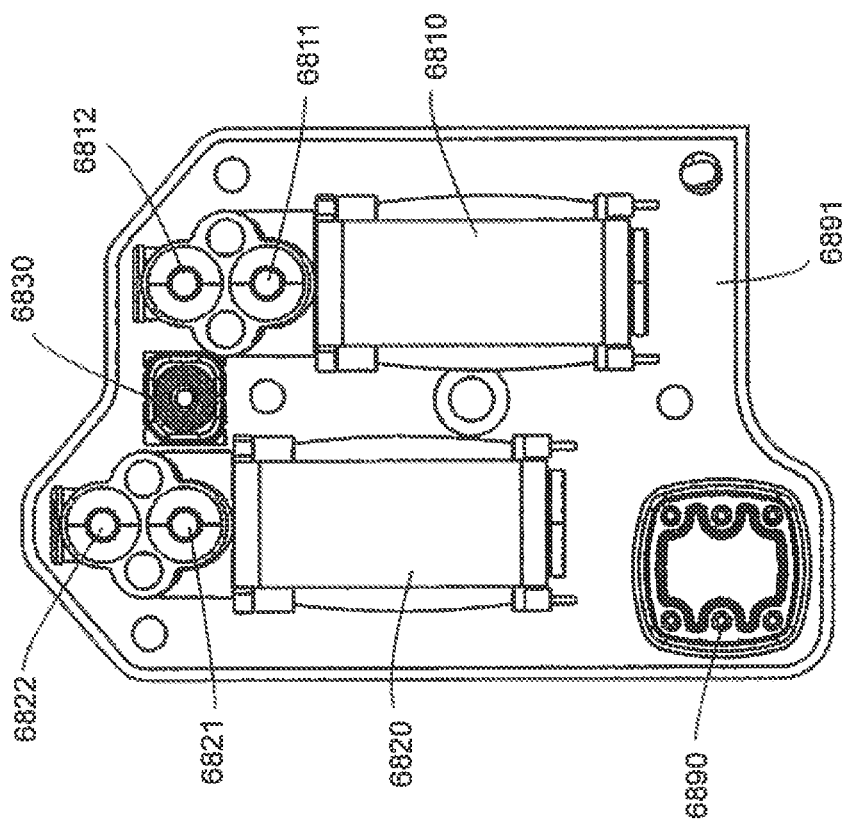
FIG. 110 is a top plan view of the fluid control assembly of FIG. 108.

Turning to FIGS. 109-111 with the housing 6801 removed, board 6891 can be seen having communication port 6890 disposed on board 6891. Board 6891 contains circuitry (not shown) to control fluid control assembly 6800. A first valve 6810 and a second valve 6820 are disposed on board 6891. First valve 6810 and second valve 6820 can be identical. Examples of these valves are 2-way pneumatic valves from Asco Valve, Inc., 160 Park Avenue, Florham Park, NJ, 07932. These valves can operate normally closed.

First valve 6810 has an inlet 6811, which is in fluid communication with inlet port 6802, and an outlet 6812, which is in fluid communication with conduit 6804. Second valve 6820 has an inlet 6821, which is in fluid communication with conduit 6804, and an outlet 6822, which is in fluid communication with outlet port 6803. Seals 6889, such as o-rings, can seal inlet 6811, outlet 6812, inlet 6821, and outlet 6822.

Also disposed in fluid control assembly 6800 is a pressure sensor 6830, which is in data communication with board 6891. While pressure sensor 6803 can be disposed anywhere in fluid control assembly 6800, it is illustrated as being disposed on board 6891. Pressure sensor 6830 is in fluid communication with conduit 6804 through conduit 6808. An example of pressure sensor 6803 is a Honeywell board mounted pressure sensor.

Figure 113:
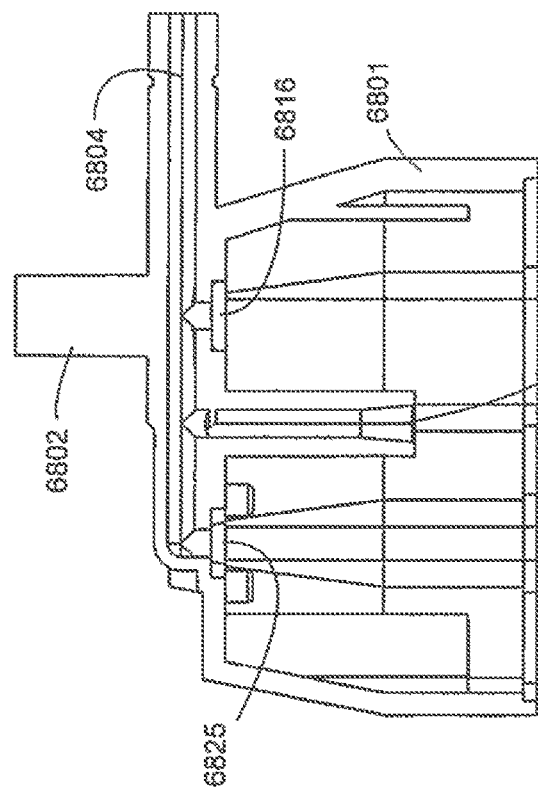
FIG. 113 is a section elevation view of the housing of FIG. 112.
Figure 114:
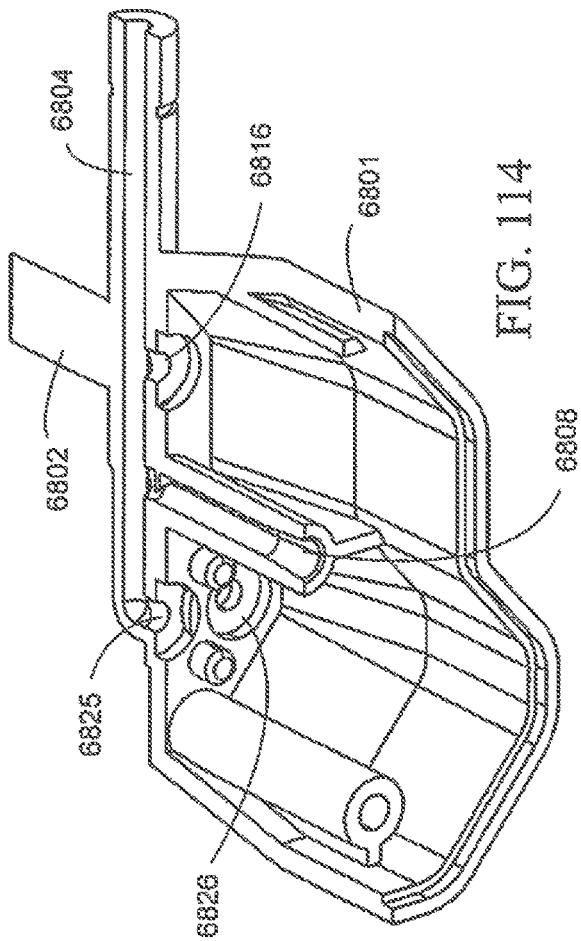
FIG. 114 is a bottom perspective view of the section of the housing of FIG. 113.
Figure 112:
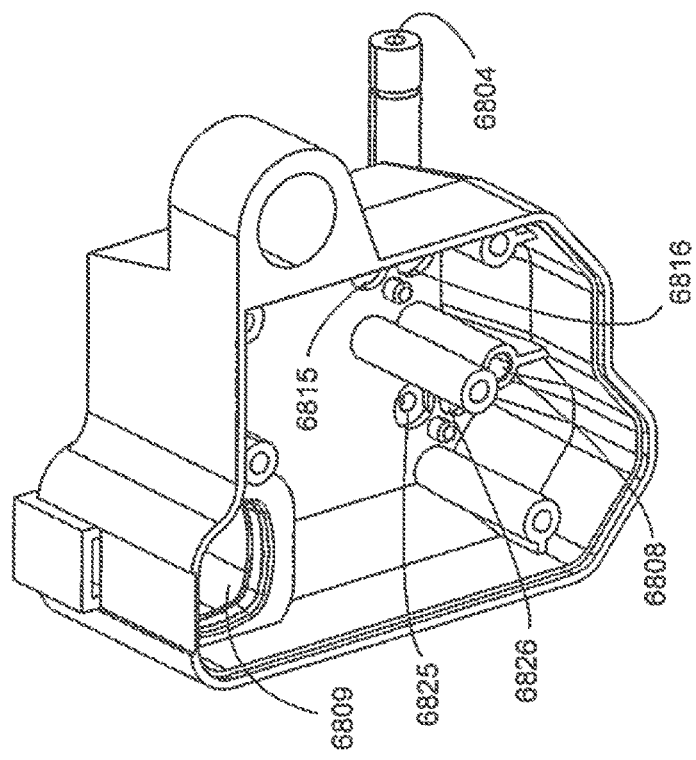
FIG. 112 is a bottom perspective view of the housing of the fluid control assembly of FIG. 108.

Turning to FIGS. 112-114, fluid communication of conduit 6804 is illustrated. Conduit 6804 is in fluid communication outlet 6802 through port 6816. Conduit 6804 is in fluid communication with pressure sensor 6830 through conduit 6808. Conduit 6804 is in fluid communication with inlet 6821 through port 6825. Outlet 6822 is in fluid communication with outlet port 6803 through port 6826. Inlet port 6802 is in fluid communication with inlet 6811 through port 6815. Seals 6889 can be disposed in ports 6815, 6816, 6825, and 6826.

Communication port 6890 can be any port used in various types of signal/data communication. Examples include, but are not limited to, Computer Area Network (CAN) port, USB, Ethernet, or RS-232. All processing of signals and control can be done on board 6891, or signals can be sent to monitor 300 or a remote controller (not shown) for processing and control to return a signal to fluid control assembly 6800 to control valves 6810 and 6820. Closed loop control can be used to control the pressure in actuator 259 to a selected value that is set by an operator. The selected value can be a selected amount of pressure for actuator 259, or the selected value can be a selected position for trench closing assembly 250, 250A, 250B, 250C or 250D, such as from position sensor 900. As the hardness of soil changes, more or less pressure is needed to maintain the same amount of closing. In harder soils, an increase in pressure may be needed to obtain the same amount of closing, and in softer soils, a decrease in pressure may be used.

In another embodiment, pressure to actuator 259 can be controlled based on an amount of closing as measured by a trench closing sensor. Trench closing sensors are described in International Patent Publication No. WO2017/197274, or in U.S. Application Nos. 62/586,397; 62/640,279; and 62/672,993, all of which are incorporated herein by reference in their entireties.

In operation, when valves 6810 and 6820 are closed, pressure in actuator 259 can be measured by pressure sensor 6830. If additional pressure is needed in actuator 259, valve 6810 can be opened (with valve 6820 closed) to place inlet port 6802 in fluid communication to conduit 6804 to actuator 259. If too much pressure is in actuator 259, valve 6820 can be opened (with valve 6810 closed) to place outlet port 6803 in fluid communication to conduit 6804 to actuator 259.

Fluid control assembly 6800 can be disposed anywhere on trench closing assembly 250, 250A, 250B, 250C, 250D or on row unit 200.

In another embodiment, a feed forward control method is provided to adjust the downforce control system 214 based on a force applied to the actuator 259. If a change in force applied by the actuator 259 is applied, the same amount of change or a portion thereof can also be made to the downforce control system 214. This can be done to balance the force on the row unit 200. For example, if an increase of 50 units of force is to be applied by the actuator 259, then a signal can be sent to also increase the force applied by the downforce control system 214 by an additional 50 units of force. In other embodiments, the change of force to the downforce control system 214 can be the opposite to the change in force applied by the actuator 259. For example, if an increase of 50 units of force is to be applied by the actuator 259, then a signal can be sent to decrease the force applied by the downforce control system 214 by 50 units of force. In either embodiment, the amount of change to the downforce control system 214 can be less than, equal to, or greater than the change in force applied by the actuator 259.

In another embodiment, there can be just one sensor 10000 per row to control both the actuator 259 and the downforce control system 214. Sensor 10000 is not separately illustrated, but it is a reference to any of the following sensors: downforce sensor 238, force sensor 261, force sensor 1298, force sensor 9258, force sensor 9257, force sensor 9254, force sensor 9262, position sensor 900, angle sensor 3006, trench closing sensor 1000, or load sensor 1610. Because of the close proximity of the closing system 250 (or its alternatives) to the opening system 220, the soil is going to be approximately the same in terms of one or more of hardness, moisture, texture, etc. Setting the force for one system (i.e., the closing system 250 or the opening system 220) will dictate a proportional amount of force needed for the other system (i.e., the opening system 220 or the closing system 250). For example, if the downforce sensor 238 measures a change in force indicating that the soil is harder and sends a signal to the downforce control system 214 to increase the downforce to the row unit 200, the same signal can be sent to the actuator 259 to also increase the downforce applied by the actuator 259. The amount of force can be the same or a portion thereof. The force applied to the downforce control system 214 and the actuator 259 can be proportional to each other. By way of example, the absolute amount of force needed to open a 2 inch deep trench in the soil is greater than the amount of force needed to open a 1 inch deep trench in the soil, but the amount of force required to close the 2 inch deep trench as compared to the 1 inch deep trench may not be the same percentage change as the force needed to open the respective trenches. The system can thus adjust one system relative to the other system for a given depth.

In another embodiment, instead of or in conjunction with any of the various sensors (i.e., force sensor 261, force sensor 1298, force sensor 9258, force sensor 9257, force sensor 9254, force sensor 9262, position sensor 900, angle sensor 3006, trench closing sensor 1000 or load sensor 1610), the force applied by the actuator 259 can be obtained from a downforce prescription map. An example of a downforce prescription map is described in U.S. Patent Application Publication No. 2012/0186503, which is incorporated herein in its entirety by reference. The amount of downforce applied can be prescribed based on one or more of hardness, texture, moisture, organic matter, or any other soil data layer that impacts the force needed to open or close a seed trench.

The following are non-limiting Examples.

Example 1: A wheel comprising: a central axis; a circumferential tread coaxial with the central axis, the circumferential tread extending axially between an inner edge and an outer edge defining an axial width of the wheel; a wall member joined with the circumferential tread, the wall member being continuous between the circumferential tread and a central opening, the wall member extending axially outward from the inner edge of the circumferential tread toward an outer edge of the circumferential tread by an axial distance, the axial distance not extending beyond a vertical plane that is perpendicular to the central axis at a midpoint of the axial width, the circumferential tread and the wall member together defining a shape in the form of an uppercase Greek letter sigma.

Example 2: The wheel of claim Example 1, wherein the axial distance is equal to or less than one half of the axial width.

Example 3: The wheel of any of any preceding Example, wherein the axial distance is between 10% and one half of the axial width.

Example 4: The wheel of any preceding Example, further comprising a plurality of ribs disposed about the circumferential tread, the ribs extending axially in a direction parallel with the central axis.

Example 5: The wheel of Example 2, further comprising a plurality of ribs disposed about the circumferential tread, the ribs extending axially in a direction parallel with the central axis.

Example 6: The wheel of Example 3, further comprising a plurality of ribs disposed about the circumferential tread, the ribs extending axially in a direction parallel with the central axis.

Example 7: The wheel of any preceding Example, wherein a portion of the circumferential tread extending outward beyond the axial distance is capable of flexing radially inward.

Example 8: The wheel of Example 4, wherein a portion of the circumferential tread extending outward beyond the axial distance is capable of flexing radially inward.

Example 9: The wheel of Example 5, wherein a portion of the circumferential tread extending outward beyond the axial distance is capable of flexing radially inward.

Example 10: The wheel of Example 6, wherein a portion of the circumferential tread extending outward beyond the axial distance is capable of flexing radially inward.

Example 11: A trench closing system for a row unit of an agricultural planter, the row unit having a row unit frame supporting an opener disk for opening a seed trench in a soil surface as the row unit travels in a forward direction of travel, the trench closing system comprising: a main frame supported by and extending rearwardly from the row unit frame; a frame member pivotally supported from said main frame; a pair of closing wheels each rotatably supported by said frame member with a first one of the pair of closing wheels disposed on a first side of the seed trench and a second one of the pair of closing wheels disposed on a second side of the seed trench, said pair of closing wheels cooperating with one another to close the opened seed trench with soil as the row unit travels in the forward direction of travel; an actuator supported between said main frame and said frame member such that said actuator is adapted to a apply a down force on said frame member; a mounting arm pivotally mounted to said frame member, said mounting arm supporting a press wheel rearward of said closing wheels, wherein the press wheel is the wheel of any of Examples 1 to 10.

Various embodiments of the invention have been described above for purposes of illustrating the details thereof and to enable one of ordinary skill in the art to make and use the invention. The details and features of the disclosed embodiments are not intended to be limiting, as many variations and modifications will be readily apparent to those of skill in the art.

The invention claimed is:

1. A unitary molded wheel adapted to be rotatably mounted to a mounting arm for packing soil over a seed trench, the unitary molded wheel comprising:
   a central axis;
   a circumferential tread coaxial with the central axis, the circumferential tread defining an axial width of the wheel;
   a wall member unitarily molded with the circumferential tread, the wall member extending radially inward from the circumferential tread to a central opening coaxial with the central axis, the central opening adapted to receive a hub by which the unitary molded wheel is rotatably mounted to the mounting arm, wherein an outer side edge of the unitary molded wheel is oriented away from the mounting arm and an inner side edge of the unitary molded wheel is oriented toward the mounting arm, the wall member being continuous between the circumferential tread and the central opening, the wall member extending axially outward from the inner side edge of the unitary molded wheel toward the outer side edge of the unitary molded wheel by an axial distance, the axial distance not extending beyond a vertical plane that is perpendicular to the central axis at a midpoint of the axial width;
   whereby, with the unitary molded wheel mounted to the hub, the continuous wall member prevents soil passing through the unitary molded wheel as the unitary molded wheel rotates over the seed trench packing the soil.

2. The unitary molded wheel of claim 1, wherein the axial distance is equal to or less than one half of the axial width.

3. The unitary molded wheel of claim 1, wherein the axial distance is between 10% and one half of the axial width.

4. The unitary molded wheel of claim 1, further comprising a plurality of ribs disposed about the circumferential tread, the ribs extending axially in a direction parallel with the central axis.

5. The unitary molded wheel of claim 2, further comprising a plurality of ribs disposed about the circumferential tread, the ribs extending axially in a direction parallel with the central axis.

6. The unitary molded wheel of claim 3, further comprising a plurality of ribs disposed about the circumferential tread, the ribs extending axially in a direction parallel with the central axis.

7. The unitary molded wheel of claim 1, wherein a portion of the circumferential tread extending outward beyond the axial distance is capable of flexing radially inward toward the central axis.

8. The unitary molded wheel of claim 4, wherein a portion of the circumferential tread extending outward beyond the axial distance is capable of flexing radially inward toward the central axis.

9. The unitary molded wheel of claim 5, wherein a portion of the circumferential tread extending outward beyond the axial distance is capable of flexing radially inward toward the central axis.

10. The unitary molded wheel of claim 6, wherein a portion of the circumferential tread extending outward beyond the axial distance is capable of flexing radially inward toward the central axis.

11. A trench closing system for a row unit of an agricultural planter, the row unit having a row unit frame supporting an opener disk for opening a seed trench in a soil surface as the row unit travels in a forward direction of travel, the trench closing system comprising:
   a main frame supported by and extending rearwardly from the row unit frame relative to the forward direction of travel;
   a frame member pivotally supported from the main frame;
   a first closing wheel rotatably supported by the frame member on a first side of the opened seed trench;
   a second closing wheel rotatably supported by the frame member on a second side of the opened seed trench, the first and second closing wheels cooperating with one another to close the opened seed trench with soil as the row unit travels in the forward direction of travel;
   an actuator supported between the main frame and the frame member such that the actuator is adapted to apply a down force on the frame member;
   a mounting arm pivotally mounted to the frame member, the mounting arm supporting a unitary molded press wheel rearward of the first and second closing wheels, the unitary molded press wheel comprising:
      a central axis;
      a circumferential tread coaxial with the central axis, the circumferential tread defining an axial width of the press wheel;
      a wall member unitarily molded with the circumferential tread, the wall member extending radially inward from the circumferential tread to a central opening coaxial with the central axis, the central opening adapted to receive a hub by which the unitary molded press wheel is rotatably mounted to the mounting arm, wherein an outer side edge of the unitary molded press wheel is oriented away from the mounting arm and an inner side edge of the unitary molded press wheel is oriented toward the mounting arm, the wall member being continuous between the circumferential tread and the central opening, the wall member extending axially outward from the inner side edge of the unitary molded press wheel toward the outer side edge of the unitary molded press wheel by an axial distance, the axial distance not extending beyond a vertical plane that is perpendicular to the central axis at a midpoint of the axial width;

whereby, with the unitary molded press wheel mounted to the hub, the continuous wall member prevents soil passing through the unitary molded press wheel as the unitary molded press wheel rotates over the seed trench packing the soil.

12. The trench closing system of claim 11, wherein the axial distance is equal to or less than one half of the axial width.

13. The trench closing system of claim 11, wherein the axial distance is between 10% and one half of the axial width.

14. The trench closing system of claim 11, wherein the unitary molded press wheel further includes a plurality of ribs disposed about the circumferential tread, the ribs extending axially in a direction parallel with the central axis.

15. The trench closing system of claim 12, wherein the unitary molded press wheel further includes a plurality of ribs disposed about the circumferential tread, the ribs extending axially in a direction parallel with the central axis.

16. The trench closing system of claim 13, wherein the unitary molded press wheel further includes a plurality of ribs disposed about the circumferential tread, the ribs extending axially in a direction parallel with the central axis.

17. The trench closing system of claim 11, wherein a portion of the circumferential tread extending outward beyond the axial distance is capable of flexing radially inward toward the central axis.

18. The trench closing system of claim 14, wherein a portion of the circumferential tread extending outward beyond the axial distance is capable of flexing radially inward toward the central axis.

19. The trench closing system of claim 15, wherein a portion of the circumferential tread extending outward beyond the axial distance is capable of flexing radially inward toward the central axis.

20. The trench closing system of claim 16, wherein a portion of the circumferential tread extending outward beyond the axial distance is capable of flexing radially inward toward the central axis.

* * * * *